US008615451B1

(12) United States Patent
Thiele et al.

(10) Patent No.: US 8,615,451 B1
(45) Date of Patent: *Dec. 24, 2013

(54) CONSISTENT INTERFACE FOR GOODS AND ACTIVITY CONFIRMATION

(75) Inventors: Christopher Thiele, Kronau (DE); Vitor Eduardo Seifert Bazzo, St. Leon-Rot (DE); Sedat Gueler, Bruchsal (DE); Patrick Josef Bardroff, Leimen (DE); Guimei Zhang, Heidelberg (DE); Benjamin Ringl, Leimen (DE); Wolfgang Barheine, Bruchsal (DE); Christoph Scheiber, Reilingen (DE); Matthias Asal, Walldorf (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,864

(22) Filed: Jun. 28, 2012

(51) Int. Cl.
*G06Q 10/00* (2012.01)

(52) U.S. Cl.
USPC .............................. 705/28; 705/7.11; 707/829

(58) Field of Classification Search
None
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,463,555 | A | 10/1995 | Ward et al. |
| 5,627,764 | A | 5/1997 | Schutzman et al. |
| 5,717,925 | A | 2/1998 | Harper et al. |
| 5,787,237 | A | 7/1998 | Reilly |
| 5,812,987 | A | 9/1998 | Luskin et al. |
| 5,966,695 | A | 10/1999 | Melchione et al. |
| 5,970,465 | A | 10/1999 | Dietrich et al. |
| 5,970,475 | A | 10/1999 | Barnes et al. |
| 5,983,284 | A | 11/1999 | Argade |
| 6,047,264 | A | 4/2000 | Fisher et al. |
| 6,058,378 | A | 5/2000 | Clark et al. |
| 6,073,137 | A | 6/2000 | Brown et al. |
| 6,092,196 | A | 7/2000 | Reiche |
| 6,104,393 | A | 8/2000 | Santos-Gomez |
| 6,115,690 | A | 9/2000 | Wong |
| 6,125,391 | A | 9/2000 | Meltzer et al. |
| 6,138,118 | A | 10/2000 | Koppstein et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

Altintas et al.; "Aurora Software Product Line"; Cybersoft Information Technologies Co.; 2005; pp. 1-8.

(Continued)

*Primary Examiner* — Luna Champagne
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a goods and activity confirmation business object.

5 Claims, 106 Drawing Sheets

(56) References Cited

U.S. PATENT DOCUMENTS

| | | | |
|---|---|---|---|
| 6,154,732 | A | 11/2000 | Tarbox |
| 6,222,533 | B1 | 4/2001 | Notani et al. |
| 6,226,675 | B1 | 5/2001 | Meltzer et al. |
| 6,229,551 | B1 | 5/2001 | Huang |
| 6,311,165 | B1 | 10/2001 | Coutts et al. |
| 6,327,700 | B1 | 12/2001 | Chen et al. |
| 6,331,972 | B1 | 12/2001 | Harris et al. |
| 6,332,163 | B1 | 12/2001 | Bowman-Amuah |
| 6,374,252 | B1 | 4/2002 | Althoff et al. |
| 6,401,101 | B1 | 6/2002 | Britton et al. |
| 6,424,979 | B1 | 7/2002 | Livingston et al. |
| 6,434,159 | B1 | 8/2002 | Woodward et al. |
| 6,438,594 | B1 | 8/2002 | Bowman-Amuah |
| 6,442,620 | B1 | 8/2002 | Thatte et al. |
| 6,446,136 | B1 | 9/2002 | Pohlmann et al. |
| 6,513,019 | B2 | 1/2003 | Lewis |
| 6,523,027 | B1 | 2/2003 | Underwood |
| 6,542,912 | B2 | 4/2003 | Meltzer et al. |
| 6,591,260 | B1 | 7/2003 | Schwarzhoff et al. |
| 6,643,660 | B1 | 11/2003 | Miller et al. |
| 6,725,122 | B2 | 4/2004 | Mori et al. |
| 6,738,747 | B1 | 5/2004 | Tanaka et al. |
| 6,745,229 | B1 | 6/2004 | Gobin et al. |
| 6,763,353 | B2 | 7/2004 | Li et al. |
| 6,775,647 | B1 | 8/2004 | Evans et al. |
| 6,868,370 | B1 | 3/2005 | Burbridge et al. |
| 6,937,992 | B1 | 8/2005 | Benda et al. |
| 6,970,844 | B1 | 11/2005 | Bierenbaum |
| 7,020,594 | B1 | 3/2006 | Chacon |
| 7,039,606 | B2 | 5/2006 | Hoffman et al. |
| 7,055,132 | B2 | 5/2006 | Bogdan et al. |
| 7,069,278 | B2 | 6/2006 | Telkowski |
| 7,076,449 | B2 | 7/2006 | Tsunenari et al. |
| 7,131,069 | B1 | 10/2006 | Rush et al. |
| 7,206,768 | B1 | 4/2007 | deGroeve et al. |
| 7,249,157 | B2 | 7/2007 | Stewart et al. |
| 7,249,195 | B2 | 7/2007 | Panec et al. |
| 7,269,569 | B2 | 9/2007 | Spira et al. |
| 7,292,965 | B1 | 11/2007 | Mehta et al. |
| 7,321,864 | B1 | 1/2008 | Gendler |
| 7,363,271 | B2 | 4/2008 | Morimoto |
| 7,379,931 | B2 | 5/2008 | Morinville |
| 7,383,990 | B2 | 6/2008 | Veit |
| 7,406,358 | B2 | 7/2008 | Preiss |
| 7,426,520 | B2 | 9/2008 | Gorelik et al. |
| 7,451,177 | B1 | 11/2008 | Johnson et al. |
| 7,454,362 | B1 | 11/2008 | Hayes et al. |
| 7,481,367 | B2 | 1/2009 | Fees et al. |
| 7,509,278 | B2 | 3/2009 | Jones |
| 7,515,697 | B2 | 4/2009 | Eng et al. |
| 7,516,088 | B2 | 4/2009 | Johnson et al. |
| 7,523,466 | B2 | 4/2009 | DeAngelis |
| 7,536,697 | B2 | 5/2009 | Wiseman et al. |
| 7,574,383 | B1 | 8/2009 | Parasnis et al. |
| 7,617,128 | B2 | 11/2009 | Greak |
| 7,617,328 | B2 | 11/2009 | Lewis et al. |
| 7,627,504 | B2 | 12/2009 | Brady et al. |
| 7,634,482 | B2 | 12/2009 | Mukherjee et al. |
| 7,657,466 | B2 | 2/2010 | Klingenberg et al. |
| 7,689,711 | B2 | 3/2010 | Brouk et al. |
| 7,788,319 | B2 | 8/2010 | Schmidt et al. |
| 7,797,204 | B2 | 9/2010 | Balent |
| 7,805,383 | B2 | 9/2010 | Veit et al. |
| 7,853,491 | B2 | 12/2010 | Wittmer et al. |
| 7,865,426 | B2 | 1/2011 | Volpert |
| 7,873,965 | B2 | 1/2011 | Hayton et al. |
| 7,895,209 | B2 | 2/2011 | Spence et al. |
| 7,941,236 | B2 | 5/2011 | Spearman |
| 7,962,385 | B2 | 6/2011 | Falk et al. |
| 8,082,243 | B2 | 12/2011 | Gorelik et al. |
| 8,127,035 | B1 | 2/2012 | Hood et al. |
| 8,150,798 | B2 | 4/2012 | Ma et al. |
| 8,185,430 | B2 | 5/2012 | Edwards et al. |
| 8,326,795 | B2 | 12/2012 | Markovic |
| RE43,905 | E | 1/2013 | Bierenbaum |
| 8,370,272 | B2 | 2/2013 | Wickel et al. |
| 2001/0042032 | A1 | 11/2001 | Crawshaw et al. |
| 2001/0047372 | A1 | 11/2001 | Gorelik et al. |
| 2002/0013721 | A1 | 1/2002 | Dabbiere et al. |
| 2002/0026394 | A1 | 2/2002 | Savage et al. |
| 2002/0046053 | A1 | 4/2002 | Hare et al. |
| 2002/0052754 | A1 | 5/2002 | Joyce et al. |
| 2002/0065680 | A1 | 5/2002 | Kojima et al. |
| 2002/0072988 | A1 | 6/2002 | Aram |
| 2002/0087481 | A1 | 7/2002 | Harif |
| 2002/0087483 | A1 | 7/2002 | Harif |
| 2002/0099634 | A1 | 7/2002 | Coutts et al. |
| 2002/0107765 | A1 | 8/2002 | Walker |
| 2002/0112171 | A1 | 8/2002 | Ginter et al. |
| 2002/0138318 | A1 | 9/2002 | Ellis et al. |
| 2002/0147668 | A1 | 10/2002 | Smith et al. |
| 2002/0152104 | A1 | 10/2002 | Ojha et al. |
| 2002/0152145 | A1 | 10/2002 | Wanta et al. |
| 2002/0156693 | A1 | 10/2002 | Stewart et al. |
| 2002/0156930 | A1 | 10/2002 | Velasquez |
| 2002/0157017 | A1 | 10/2002 | Mi et al. |
| 2002/0169657 | A1 | 11/2002 | Singh et al. |
| 2002/0184070 | A1 | 12/2002 | Chen et al. |
| 2002/0186876 | A1 | 12/2002 | Jones et al. |
| 2002/0194045 | A1 | 12/2002 | Shay et al. |
| 2003/0004799 | A1 | 1/2003 | Kish |
| 2003/0041178 | A1 | 2/2003 | Brouk et al. |
| 2003/0046639 | A1 | 3/2003 | Fai et al. |
| 2003/0069648 | A1 | 4/2003 | Douglas et al. |
| 2003/0083910 | A1 | 5/2003 | Sayal et al. |
| 2003/0084428 | A1 | 5/2003 | Agostini et al. |
| 2003/0086594 | A1 | 5/2003 | Gross |
| 2003/0097287 | A1 | 5/2003 | Franz et al. |
| 2003/0120502 | A1 | 6/2003 | Robb et al. |
| 2003/0120665 | A1 | 6/2003 | Fox et al. |
| 2003/0126077 | A1 | 7/2003 | Kantor et al. |
| 2003/0167193 | A1 | 9/2003 | Jones et al. |
| 2003/0171962 | A1 | 9/2003 | Hirth et al. |
| 2003/0172007 | A1 | 9/2003 | Helmolt et al. |
| 2003/0172135 | A1 | 9/2003 | Bobick et al. |
| 2003/0172343 | A1 | 9/2003 | Leymater et al. |
| 2003/0195815 | A1 | 10/2003 | Li et al. |
| 2003/0204452 | A1 | 10/2003 | Wheeler |
| 2003/0204637 | A1 | 10/2003 | Chong |
| 2003/0208389 | A1 | 11/2003 | Kurihara et al. |
| 2003/0212614 | A1 | 11/2003 | Chu et al. |
| 2003/0216978 | A1 | 11/2003 | Sweeney et al. |
| 2003/0220875 | A1 | 11/2003 | Lam et al. |
| 2003/0229522 | A1 | 12/2003 | Thompson et al. |
| 2003/0229550 | A1 | 12/2003 | DiPrima et al. |
| 2003/0233295 | A1 | 12/2003 | Tozawa et al. |
| 2003/0236748 | A1 | 12/2003 | Gressel et al. |
| 2004/0002883 | A1 | 1/2004 | Andrews et al. |
| 2004/0006653 | A1 | 1/2004 | Kamen et al. |
| 2004/0015366 | A1 | 1/2004 | Wiseman et al. |
| 2004/0024662 | A1 | 2/2004 | Gray et al. |
| 2004/0024862 | A1 | 2/2004 | Wall et al. |
| 2004/0034577 | A1 | 2/2004 | Van Hoose et al. |
| 2004/0039665 | A1 | 2/2004 | Ouchi |
| 2004/0073510 | A1 | 4/2004 | Logan |
| 2004/0083201 | A1 | 4/2004 | Sholl et al. |
| 2004/0083233 | A1 | 4/2004 | Willoughby |
| 2004/0122730 | A1 | 6/2004 | Tucciarone et al. |
| 2004/0133445 | A1 | 7/2004 | Rajan et al. |
| 2004/0138942 | A1 | 7/2004 | Pearson et al. |
| 2004/0148227 | A1 | 7/2004 | Tabuchi et al. |
| 2004/0167894 | A1 | 8/2004 | Ziv |
| 2004/0172360 | A1 | 9/2004 | Mabrey et al. |
| 2004/0186891 | A1 | 9/2004 | Panec et al. |
| 2004/0187140 | A1 | 9/2004 | Aigner et al. |
| 2004/0220910 | A1 | 11/2004 | Zang et al. |
| 2004/0254945 | A1 | 12/2004 | Schmidt et al. |
| 2004/0267597 | A1 | 12/2004 | Kobrosly et al. |
| 2004/0267714 | A1 | 12/2004 | Frid et al. |
| 2005/0015273 | A1 | 1/2005 | Iyer |
| 2005/0021366 | A1 | 1/2005 | Pool et al. |
| 2005/0033588 | A1 | 2/2005 | Ruiz et al. |
| 2005/0038718 | A1 | 2/2005 | Barnes et al. |
| 2005/0038744 | A1 | 2/2005 | Viijoen |

(56) References Cited

U.S. PATENT DOCUMENTS

2005/0049903 A1 3/2005 Raja
2005/0055369 A1 3/2005 Gorelik et al.
2005/0065987 A1 3/2005 Telkowski et al.
2005/0066240 A1 3/2005 Sykes et al.
2005/0071262 A1 3/2005 Kobeh et al.
2005/0080640 A1 4/2005 Bhaskaran et al.
2005/0108085 A1 5/2005 Dakar et al.
2005/0108168 A1 5/2005 Halpin et al.
2005/0108276 A1 5/2005 Sriram
2005/0131947 A1 6/2005 Laub et al.
2005/0159997 A1 7/2005 John
2005/0171833 A1 8/2005 Jost et al.
2005/0182639 A1 8/2005 Dale
2005/0187797 A1 8/2005 Johnson
2005/0187866 A1 8/2005 Lee
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0216421 A1 9/2005 Barry et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0246240 A1 11/2005 Padilla
2005/0256753 A1 11/2005 Veit et al.
2005/0278693 A1 12/2005 Brunell et al.
2006/0004934 A1 1/2006 Guldner et al.
2006/0005098 A1 1/2006 Lotz et al.
2006/0020515 A1 1/2006 Lee et al.
2006/0026552 A1 2/2006 Mazzitelli et al.
2006/0026586 A1 2/2006 Remmel et al.
2006/0036941 A1 2/2006 Neil
2006/0047574 A1 3/2006 Sundaram et al.
2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.
2006/0106824 A1 5/2006 Stuhec
2006/0184435 A1 8/2006 Mostowfi
2006/0212376 A1 9/2006 Snyder et al.
2006/0280302 A1 12/2006 Baumann et al.
2006/0282360 A1 12/2006 Kahn et al.
2007/0027742 A1 2/2007 Emuchay et al.
2007/0043583 A1 2/2007 Davulcu et al.
2007/0055688 A1 3/2007 Blattner
2007/0061154 A1 3/2007 Markvoort et al.
2007/0067411 A1 3/2007 Angelov
2007/0067753 A1 3/2007 Pocklington et al.
2007/0078799 A1 4/2007 Huber-Buschbeck et al.
2007/0112574 A1 5/2007 Greene
2007/0118391 A1 5/2007 Malaney et al.
2007/0124227 A1 5/2007 Dembo et al.
2007/0129978 A1 6/2007 Shirasu et al.
2007/0132585 A1 6/2007 Llorca et al.
2007/0150387 A1 6/2007 Seubert et al.
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0174811 A1 7/2007 Kaetker et al.
2007/0214065 A1 9/2007 Kahlon et al.
2007/0219864 A1 9/2007 Vollrath et al.
2007/0225949 A1 9/2007 Sundararajan et al.
2007/0226066 A1 9/2007 Brunner et al.
2007/0226090 A1 9/2007 Stratton
2007/0255639 A1 11/2007 Seifert
2007/0265860 A1 11/2007 Herrmann et al.
2007/0265862 A1 11/2007 Freund et al.
2007/0288250 A1 12/2007 Lemcke et al.
2007/0294159 A1 12/2007 Cottle
2007/0295803 A1 12/2007 Levine et al.
2008/0005012 A1 1/2008 Deneef
2008/0016242 A1 1/2008 Panec et al.
2008/0021754 A1 1/2008 Horn et al.
2008/0040243 A1 2/2008 Chang et al.
2008/0046104 A1 2/2008 Van Camp et al.
2008/0046421 A1 2/2008 Bhatia et al.
2008/0065443 A1 3/2008 Gorur et al.
2008/0120129 A1* 5/2008 Seubert et al. .................... 705/1
2008/0120190 A1 5/2008 Joao et al.
2008/0120204 A1 5/2008 Conner et al.
2008/0120313 A1 5/2008 O'Brien et al.
2008/0133303 A1 6/2008 Singh et al.
2008/0144791 A1 6/2008 Harifi et al.
2008/0154969 A1 6/2008 DeBie
2008/0162266 A1 7/2008 Griessmann et al.
2008/0184265 A1 7/2008 Kasi et al.
2008/0196108 A1 8/2008 Dent et al.
2008/0215354 A1 9/2008 Halverson et al.
2008/0243578 A1 10/2008 Veit
2008/0288317 A1 11/2008 Kakar
2008/0300962 A1 12/2008 Cawston et al.
2009/0006203 A1 1/2009 Fordyce et al.
2009/0063287 A1 3/2009 Tribout et al.
2009/0077074 A1 3/2009 Hosokawa
2009/0089198 A1 4/2009 Kroutik
2009/0094274 A1 4/2009 Gorelik et al.
2009/0164497 A1 6/2009 Steinmaier et al.
2009/0192926 A1 7/2009 Tarapata
2009/0193432 A1 7/2009 McKegney et al.
2009/0222360 A1 9/2009 Schmitt et al.
2009/0248429 A1 10/2009 Doenig et al.
2009/0248430 A1 10/2009 Hubert et al.
2009/0248431 A1 10/2009 Schoknecht et al.
2009/0248463 A1 10/2009 Piochon et al.
2009/0248473 A1 10/2009 Doenig et al.
2009/0248487 A1 10/2009 Santoso et al.
2009/0248547 A1 10/2009 Doenig et al.
2009/0248558 A1 10/2009 Hollberg et al.
2009/0248586 A1 10/2009 Kaisermayr et al.
2009/0248698 A1 10/2009 Rehmann
2009/0249358 A1 10/2009 Schuette
2009/0249362 A1 10/2009 Lindemann et al.
2009/0254971 A1 10/2009 Herz et al.
2009/0271245 A1 10/2009 Joshi et al.
2009/0276338 A1 11/2009 Masermann et al.
2009/0300578 A1 12/2009 Neil
2009/0326988 A1 12/2009 Barth et al.
2009/0327009 A1 12/2009 Schmitt et al.
2009/0327105 A1 12/2009 Moussa et al.
2009/0327106 A1 12/2009 Bartelt et al.
2010/0001834 A1 1/2010 Brunswig et al.

(56) References Cited

U.S. PATENT DOCUMENTS

| | | | |
|---|---|---|---|
| 2010/0014510 | A1 | 1/2010 | Boreli et al. |
| 2010/0070391 | A1 | 3/2010 | Storr et al. |
| 2010/0070395 | A1 | 3/2010 | Elkeles et al. |
| 2010/0106555 | A1 | 4/2010 | Mneimneh et al. |
| 2010/0131379 | A1 | 5/2010 | Dorais et al. |
| 2010/0131394 | A1 | 5/2010 | Rutsch et al. |
| 2010/0153297 | A1 | 6/2010 | Haaf et al. |
| 2010/0161366 | A1 | 6/2010 | Clemens et al. |
| 2010/0161425 | A1 | 6/2010 | Sideman |
| 2010/0169888 | A1 | 7/2010 | Hare et al. |
| 2010/0198631 | A1 | 8/2010 | Edwards et al. |
| 2010/0217645 | A1 | 8/2010 | Jin et al. |
| 2010/0217820 | A1 | 8/2010 | Brouk et al. |
| 2010/0218245 | A1 | 8/2010 | Brouk et al. |
| 2010/0241729 | A1 | 9/2010 | Angelov |
| 2010/0306536 | A1 | 12/2010 | Brouk et al. |
| 2011/0046775 | A1 | 2/2011 | Bailey et al. |
| 2011/0077999 | A1 | 3/2011 | Becker et al. |
| 2011/0078048 | A1 | 3/2011 | Becker et al. |
| 2011/0088000 | A1 | 4/2011 | Mackay |
| 2011/0153767 | A1 | 6/2011 | Coldicott et al. |
| 2011/0276636 | A1 | 11/2011 | Cheng et al. |
| 2011/0307289 | A1 | 12/2011 | Hosur et al. |
| 2012/0118983 | A1 | 5/2012 | Harris |

FOREIGN PATENT DOCUMENTS

| | | |
|---|---|---|
| CN | 1632806 | 6/2005 |
| CN | 1765138 | 4/2006 |
| CN | 1767537 | 5/2006 |
| CN | 101174957 | 5/2008 |
| CN | 101288092 | 10/2008 |
| WO | WO 2008/005102 | 1/2008 |

OTHER PUBLICATIONS

Annevelink et al.; "Heterogeneous Database Intergration in a Physician Workstation"; 1992; 5 pages.
Arsanjani, Ali; "Developing and Integrating Enterprise Components and Services"; Communications of the ACM; vol. 45, No. 10; Oct. 2002; pp. 31-34.
Aversano, Lerina et al.; "Introducing eServices in Business Process Models"; SEKE '02; Ischia Italy; Jul. 15-19, 2002; pp. 481-488.
Baker, Stacy; "Benefits of Assortment Planning"; Assortment Planning for Apparel Retailers—2005 Management Briefing; Just Style; Jun. 2005; 3 pages.
Bastide, Remi et al.; "Formal Specification of CORBA Services: Experience and Lessons Learned"; 2000; pp. 105-117.
Boetterweck, Goetz; "A Model-Driven Approach to the Engineering of Multiple User Interfaces"; Lecture Notes in Computer Science; 2007; vol. 4364/2007; pp. 106-115.
Born, Marc et al.; "Customizing UML for Component Design"; www.dot-profile.de; UML Workshop, Palm Springs, CA; Nov. 2000.
Bratthall, Lars G. et al.; "Integrating Hundreds of Products through One Architecture—The Industrial IT Architecture"; ICSE '02; Orlando, Florida; May 19-25, 2002; pp. 604-614.
Bussler, Christoph; "The Role of B2B Engines in B2B Integration Architectures"; SIGMOD Record; vol. 31, No. 1; Mar. 2002; pp. 67-72.
Carlson, David A.; "Designing XML Vocabularies with UML"; OOPSLA 2000 Companion; Minneapolis, Minnesota; 2000; pp. 95-96.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Cole, James et al.; "Extending Support for Contracts in ebXML"; IEEE; 2001; pp. 119-127.
Damodaran, Suresh; "B2B Integration over the Internet with XML—RosettaNet Successes and Challenges"; WWW2004; May 17-22, 2004; pp. 188-195.
Definition of "header" and "message header"; Newton's Telecom Dictionary; 18th Edition; 2002; pp. 347, 464.
Diehl et al.; "Service Architecture for an Object-Oriented Next Generation Profile Register"; date unknown; 8 pages.
DiNitto, Elisabetta et al.; "Deriving Executable Process Descriptions from UML"; ICSE '02; May 19-25, 2002; pp. 155-165.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
"DOTS Inc. Selects Compass Software's smartmerchandising for Merchandise Planning and Assortment Planning"; PR Newswire; Dec. 11, 2002; 2 pages.
Eyal, Anat et al.; "Integrating and Customizing Heterogeneous E-Commerce Applications"; The VLDB Journal; Aug. 2001; pp. 16-38.
Fingar, Peter; "Component-Based Frameworks for E-Commerce"; Communications of the ACM; vol. 43, No. 10; Oct. 2000; pp. 61-66.
Fremantle, Paul et al.; "Enterprise Services"; Communications of the ACM; vol. 45, No. 10; Oct. 2002; pp. 77-79.
FSML—Financial Services Markup Language (Jul. 14, 1999) http://xml.coverpages.org/FSML-v1500a.pdf; pp. 1-159 (2 parts).
Gable, Julie; "Enterprise Application Integration"; Information Management Journal; Mar./Apr. 2002; pp. 48-52.
Gillibrand, David; "Essential Business Object Design"; Communications of the ACM; vol. 43, No. 2; Feb. 2000; pp. 117-119.
Glushko, Robert J. et al.; "An XML Framework for Agent-Based E-Commerce"; Communications of the ACM; vol. 42, No. 3; Mar. 1999; pp. 106-114.
Gokhale, Aniruddha et al.; "Applying Model-Integrated Computing to Component Middleware and Enterprise Applications"; Communications of the ACM; vol. 45, No. 10; Oct. 2002; pp. 65-70.
Gosain, Sanjay et al.; "The Impact of Common E-Business Interfaces"; Communications of the ACM; vol. 46, No. 2; Dec. 2003; pp. 186-195.
Gruhn, Volker et al.; "Workflow Management Based on Process Model Repositories"; IEEE 1998; pp. 379-388.
Han, Zaw Z. et al.; "Interoperability from Electronic Commerce to Litigation Using XML Rules"; 2003; pp. 93-94.
Hasselbring, Wilhelm; "Information System Integration"; Communications of the ACM; vol. 43, No. 6; Jun. 2000; pp. 33-38.
He, Ning et al.; "B2B Contract Implementation Using Windows DNS"; 2001; pp. 71-79.
"Header", Newton's Telecom Dictionary; 12th Edition, 2004; pp. 389-390.
Himoff et al.; "MAGENTA Technology: Multi-Agent Systems for Industrial Logistics"; AAMAS'05; Jul. 25-29, 2005; 2005 ACM; pp. 60-66:1-7).
Hogg, K. et al.; "An Evaluation of Web Services in the Design of a B2B Application"; 27th Australasian Computer Science Conference; Dunedin, New Zealand; 2004; pp. 331-340.
Huhns, Michael N. et al.; "Automating Supply-Chain Mangement"; Jul. 15-19, 2002; pp. 1017-1024.
Jaeger, Dirk et al.; "Using UML for Software Process Modeling"; 1999; pp. 91-108.
Kappel, Gerti et al.; "A Framework for Workflow Management Systems Based on Objects, Rules, and Roles"; ACM Computing Surveys; ACM Press; vol. 32; Mar. 2000; 5 pages.
Karp, Alan H.; "E-speak E-xplained"; Communications of the ACM; vol. 46, No. 7; Jul. 2003; pp. 113-118.
Ketabchi et al.; "Object-Oriented Database Management Support for Software Maintenance and Reverse Engineering"; Department of Electrical Engineering and Computer Science, Santa Clara University; 1989; 4 pages.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Kim, Dan Jong et al.; "A Comparison of B2B E-Service Solutions"; Communications of the ACM; vol. 46, No. 12; Dec. 2003; pp. 317-324.

(56) References Cited

OTHER PUBLICATIONS

Kim, HyoungDo; "Conceptual Modeling and Specification Generation for B2B Business Processes Based on ebXML"; SIGMOD Record; vol. 31, No. 1; Mar. 2002; pp. 37-42.
Lee, Jinyoul et al.; "Enterprise Integration with ERP and EAI"; Communications of the ACM; vol. 46, No. 2; Feb. 2003; pp. 54-60.
Levi, Keith et al.; "A Goal-Driven Approach to Enterprise Component Identification and Specification"; Communications of the ACM; vol. 45, No. 10; Oct. 2002; pp. 45-52.
Lockemann et al.; "Flexibility through Multi-Agent Systems: Solutions or Illusions"; SOFSEM 2004; pp. 41-56.
Lynn, Chris; "Sony Enters Brand Asset Management Market"; The Seybold Report; Analyzing Publishing Technologies; Aug. 4, 2004; <www.Seybold365.com>; 3 pages.
Maamar, Zakaria et al.; "Toward Intelligent Business Objects"; Communications of the ACM; vol. 43, No. 10; Oct. 2000; pp. 99-101.
Mascolo et al.; "An Analytical Method for Performance Evaluation of Kanban Controlled Production Systems"; Operations Research; vol. 44, No. 1; 1996; pp. 50-64.
Medjahed, Brahim et al.; "Composing Web Services on the Semantic Web"; The VLDB Journal; vol. 12, No. 4, Sep. 23, 2003; pp. 333-351.
Medjahed, Brahim et al; "Business-to-Business Interactions: Issues and Enabling Technologies"; The VLDB Journal; vol. 12, No. 1; Apr. 3, 2003; pp. 59-89.
Meltzer, Bart et al.; "XML and Electronic Commerce: Enabling the Network Economy"; SIGMOD Record; ACM Press; vol. 27, No. 4; Dec. 1998; pp. 21-24.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3. Retrieved on Mar. 17, 2005.
Quix, Christoph et al.; "Business Data Management for Business-to-Business Electronic Commerce"; SIGMOD Record; vol. 31, No. 1; Mar. 2002; pp. 49-54.
SAP 2008 Annual Report; 256 pages.
"SAP Labs and HP Team to Advance Internet-Based Supply Chain Collaboration"; Business Editors and Technology Writers; Business Wire; New York; Feb. 3, 2000; 4 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
SAP Structured Entity Relationship Model (SAP-SERM) for R/3 System Release 4.0 Introduction and Index; Dec. 1998; 26 pages.
SAP; "BC-Central Maintenance and Transport Objects"; Release 4.6C; Apr. 200; 15 pages.
Schulze, Wolfgang et al.; "Standardising on Workflow-Management—The OMG Workflow Management Facility"; SIGGROUP Bulletin; vol. 19, No. 1; Apr. 1998; pp. 24-30.
Shi, Min-Hua et al.; "MQML—Message Queuing Markup Language"; Proceedings of the 4th IEEE International Workshop on Advanced Issues of E-Commerce and Web-Based Information Systems (WECWIS 2002); 2002; 8 pages.
Siegel, Jon; "OMG Overview: CORBA and the OMA in Enterprise Computing"; Communications of the ACM; vol. 41, No. 10; Oct. 1998; pp. 37-43.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Soederstroem, Eva; "Standardising the Business Vocabulary of Standards"; SAC, Madrid, Spain; 2002; pp. 1048-1052.
Sprott, David; "Componentizing the Enterprise Application Packages"; Communications of the ACM; vol. 43, No. 4; Apr. 2000; pp. 63-69.
Statement in Accordance with the Notice from the European Patent Office dated Oct. 1, 2007 Concerning Business Methods—EPC; Official Journal of the European Patent Office; Munich; Nov. 1, 2007; pp. 592-593.
Stonebraker, Michael; "Too Much Middleware"; SIGMOD Record; vol. 31, No. 1; Mar. 2002; pp. 97-106.
Stumptner, Markus et al.; "On the Road to Behavior-Based Integration"; First Asia-Pacific Conferences on Conceptual Modelling; Dunedin, New Zealand; Jan. 2004; pp. 15-22.
Sutherland, Jeff; "Business Objects in Corporate Information Systems"; ACM Computing Surveys; vol. 27, No. 2; Jun. 1995; pp. 274-276.
Sutherland, Jeff; "Why I Love the OMG: Emergence of a Business Object Component Architecture"; StandardView; vol. 6, No. 1; Mar. 1998; pp. 4-13.
Tenenbaum, Jay M. et al.; "Eco System: An Internet Commerce Architecture"; IEEE; May 1997; pp. 48-55.
Terai, Koichi et al.; "Coordinating Web Services Based on Business Models"; 2003; pp. 473-478.
Trastour, David et al.; "Semantic Web Support for the Business-to-Business E-Commerce Lifecycle"; WWW2002, Honolulu, Hawaii; May 7-11, 2002; pp. 89-98.
"UML in the .com Enterprise: Modeling CORBA, Components, XML/XMI and Metadata Workshop"; <http://www.omg.org/news/meetings/workshops/uml_presentations.htm> retrieved on Mar. 17, 2005.
"Visual and Quantitative Assortment Planning Applications Drive Partnership and Profit"; PR Newswire; Jan. 12, 2006; 3 pages.
Webster's Revised Unabridged Dictionary (1913+1828); Def. "merchandise"; <http://machaut.uchicago.edu/?resource=Webster%27s&word=merchandise&use1913=on&u>. Retrieved on Sep. 1, 2009.
Yang, J. et al.; "Service Deployment for Virtual Enterprises"; IEEE; 2001; pp. 107-115.
Yang, Jian et al.; "Interoperation Support for Electronic Business"; Communications of the ACM; vol. 43, No. 6; Jun. 2000; pp. 39-47.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
Communication Pursuant to Article 94(3) EPC issued in European Application No. 07835755.5 on Feb. 22, 2012; 7 pages.
Communication Pursuant to Article 94(3) EPC issued in related European Application No. 05757432.9 on Jan. 26, 2009; 4 pages.
Communication Pursuant to Article 94(3) issued in European Application No. 05757432.9 on Apr. 12, 2011; 5 pages.
Communication Pursuant to Article 94(3) issued in European Application No. 05766672.9 on Jul. 14, 2011; 4 pages.
Communication Pursuant to Rules 70(2) and 70a(2) EPC issued in related European Application No. 07835755.5 on Feb. 28, 2011; 6 pages.
International Preliminary Report on Patentability under Chapter I issued in International Application No. PCT/US2005/019961 on Dec. 4, 2006; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Preliminary Report on Patentability under Chapter I issued in International Application No. PCT/US2005/022137 on Dec. 28, 2006; 5 pages.
International Preliminary Report on Patentability under Chapter I issued in International Application No. PCT/US2007/011378 on Nov. 17, 2008; 11 pages.
International Search Report and Written Opinion issued in International Application No. PCT/CN2011/001238 on May 3, 2012; 9 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.

(56) References Cited

OTHER PUBLICATIONS

International Search Report and Written Opinion of the International Searching Authority issued in International Application No. PCT/CN2010/073868 on Mar. 17, 2011; 10 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Search Report and Written Opinion of the International Searching Authority issued in International Application No. PCT/US2005/022137 on May 12, 2006; 7 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2007/011378 on Apr. 30, 2008; 17 pages.
Supplementary European Search Report issued in related European Application No. 05766672.9 on Oct. 6, 2009; 3 pages.
Supplementary European Search Report issued in related European Application No. 05823434.5 on Sep. 28, 2009; 3 pages.
Notice of Allowance issued in related U.S. Appl. No. 11/864,866 on Jul. 22, 2011; 6 pages.
Notice of Allowance issued in related U.S. Appl. No. 11/864,866 on Mar. 13, 2012; 7 pages.
Notice of Allowance issued in related U.S. Appl. No. 12/060,178 on Dec. 6, 2010; 4 pages.
Notice of Allowance issued in related U.S. Appl. No. 12/060,178 on Sep. 2, 2011; 9 pages.
Notice of Allowance issued in related U.S. Appl. No. 11/145,464 on Feb. 23, 2011; 7 pages.
Notice of Allowance issued in related U.S. Appl. No. 11/145,464 on Feb. 6, 2012; 7 pages.
Notice of Allowance issued in related U.S. Appl. No. 11/145,464 on Nov. 1, 2010; 4 pages.
Notice of Allowance issued in related U.S. Appl. No. 11/166,065 on Oct. 9, 2012; 10 pages.
Notice of Allowance issued in related U.S. Appl. No. 11/166,065 on Sep. 20, 2010; 6 pages.
Notice of Allowance issued in related U.S. Appl. No. 11/364,538 on Dec. 13, 2010; 5 pages.
Notice of Allowance issued in related U.S. Appl. No. 11/364,538 on Jul. 23, 2012; 7 pages.
Notice of Allowance issued in related U.S. Appl. No. 11/364,538 on Jul. 26, 2011; 6 pages.
Notice of Allowance issued in related U.S. Appl. No. 11/731,857 on Apr. 11, 2011; 8 pages.
Notice of Allowance issued in related U.S. Appl. No. 11/731,857 on Dec. 14, 2011; 7 pages.
Notice of Allowance issued in related U.S. Appl. No. 11/731,857 on Nov. 29, 2010; 4 pages.
Notice of Allowance issued in related U.S. Appl. No. 11/731,857 on Oct. 9, 2012; 7 pages.
Notice of Allowance issued in related U.S. Appl. No. 11/775,821 on Feb. 4, 2011; 4 pages.
Notice of Allowance issued in related U.S. Appl. No. 11/775,821 on Jul. 16, 2010; 4 pages.
Notice of Allowance issued in related U.S. Appl. No. 11/775,821 on Nov. 2, 2012; 5 pages.
Notice of Allowance issued in related U.S. Appl. No. 11/775,821 on Oct. 22, 2010; 4 pages.
Notice of Allowance issued in related U.S. Appl. No. 11/803,178 on May 17, 2011; 13 pages.
Notice of Allowance issued in related U.S. Appl. No. 11/803,178 on Jul. 17, 2012; 15 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jan. 9, 2012;12 pages.
Notice of Allowance issued in related U.S. Appl. No. 11/864,832 on Jul. 30, 2012;12 pages.
Notice of Allowance issued in related U.S. Appl. No. 11/864,832 on Jul. 7, 2011;11 pages.
Notice of Allowance issued in related U.S. Appl. No. 11/864,832 on Mar. 24, 2010; 11 pages.
Notice of Allowance issued in related U.S. Appl. No. 12/147,395 on Dec. 24, 2012; 11 pages.
Notice of Allowance issued in related U.S. Appl. No. 12/147,395 on Oct. 26, 2010; 10 pages.
Notice of Allowance issued in related U.S. Appl. No. 12/147,449 on Apr. 28, 2011; 9 pages.
Notice of Allowance issued in U.S. Appl. No. 11/155,368 on Mar. 14, 2011; 7 pages.
Notice of Allowance issued in U.S. Appl. No. 11/155,368 on Jul. 23, 2012; 7 pages.
Notice of Allowance issued in U.S. Appl. No. 11/155,368 on Nov. 8, 2011; 7 pages.
Notice of Allowance issued in U.S. Appl. No. 11/155,368 on Oct. 7, 2010; 4 pages.
Notice of Allowance issued in U.S. Appl. No. 11/166,065 on Feb. 15, 2012; 7 pages.
Notice of Allowance issued in U.S. Appl. No. 11/166,065 on Mar. 8, 2011; 5 pages.
Notice of Allowance issued in U.S. Appl. No. 11/640,422 on May 22, 2012; 7 pages.
Notice of Allowance issued in U.S. Appl. No. 11/640,422 on Sep. 29, 2011; 7 pages.
Notice of Allowance issued in U.S. Appl. No. 11/775,821 on Dec. 30, 2011; 5 pages.
Notice of Allowance issued in U.S. Appl. No. 11/775,821 on Sep. 21, 2011; 5 pages.
Notice of Allowance issued in U.S. Appl. No. 11/864,786 on Nov. 7, 2012; 7 pages.
Notice of Allowance issued in U.S. Appl. No. 11/864,811 on Mar. 2, 2012; 8 pages.
Notice of Allowance issued in U.S. Appl. No. 11/864,811 on Nov. 14, 2011; 8 pages.
Notice of Allowance issued in U.S. Appl. No. 11/864,811 on Sep. 10, 2012; 10 pages.
Notice of Allowance issued in U.S. Appl. No. 12/059,971 on Jun. 28, 2012; 12 pages.
Notice of Allowance issued in U.S. Appl. No. 12/060,062 on Mar. 20, 2012; 16 pages.
Notice of Allowance issued in U.S. Appl. No. 12/060,062 on Nov. 9, 2012; 7 pages.
Notice of Allowance issued in U.S. Appl. No. 12/060,155 on Apr. 24, 2012; 15 pages.
Notice of Allowance issued in U.S. Appl. No. 12/060,171 on Oct. 3, 2012; 10 pages.
Notice of Allowance issued in U.S. Appl. No. 12/060,192 on Mar. 2, 2012; 18 pages.
Notice of Allowance issued in U.S. Appl. No. 12/060,192 on Oct. 29, 2012; 12 pages.
Notice of Allowance issued in U.S. Appl. No. 12/147,378 on Aug. 31, 2012; 9 pages.
Notice of Allowance issued in U.S. Appl. No. 12/147,378 on Nov. 9, 2011; 16 pages.
Notice of Allowance issued in U.S. Appl. No. 12/147,395 on May 4, 2011; 10 pages.
Notice of Allowance issued in U.S. Appl. No. 12/323,116 on Jun. 11, 2012; 10 pages.

(56) References Cited

OTHER PUBLICATIONS

Notice of Allowance issued in U.S. Appl. No. 12/323,139 on Mar. 14, 2012; 10 pages.
Notice of Allowance issued in U.S. Appl. No. 12/323,139 on Mar. 4, 2011; 13 pages.
Notice of Allowance issued in U.S. Appl. No. 12/571,140 on Mar. 20, 2012; 16 pages.
Notice of Allowance issued in U.S. Appl. No. 12/571,140 on Nov. 9, 2012; 8 pages.
Notice of Allowance issued in U.S. Appl. No. 12/815,618 on May 10, 2012; 7 pages.
Notice of Allowance issued in U.S. Appl. No. 12/815,639 on Sep. 24, 2012; 9 pages.
Notice of Allowance issued in U.S. Appl. No. 12/816,293 on Sep. 19, 2012; 7 pages.
Advisory Action issued in U.S. Appl. No. 11/155,368 on Mar. 31, 2010; 3 pages.
Office Action issued in related U.S. Appl. No. 11/640,422 on Apr. 2, 2009; 13 pages.
Office Action issued in related U.S. Appl. No. 12/060,178 on Dec. 7, 2009; 6 pages.
Office Action issued in related U.S. Appl. No. 12/060,178 on May 25, 2010; 19 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/145,464 on Jan. 22, 2009; 30 pages.
Office Action issued in related U.S. Appl. No. 11/155,368 on Dec. 10, 2009; 43 pages.
Office Action issued in related U.S. Appl. No. 11/155,368 on May 14, 2009; 6 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/640,422 on Dec. 30, 2009; 9 pages.
Office Action issued in related U.S. Appl. No. 11/731,857 on Feb. 4, 2010; 22 pages.
Office Action issued in related U.S. Appl. No. 11/731,857 on May 15, 2009; 11 pages.
Office Action issued in related U.S. Appl. No. 11/775,821 on Jan. 22, 2010; 16 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Office Action issued in related U.S. Appl. No. 11/864,863 on Dec. 22, 2011; 20 pages.
Office Action issued in related U.S. Appl. No. 11/864,863 on Jul. 21, 2011; 29 pages.
Office Action issued in related U.S. Appl. No. 11/864,866 on Feb. 3, 2011; 20 pages.
Office Action issued in related U.S. Appl. No. 11/864,871 on Apr. 21, 2010; 20 pages.
Office Action issued in related U.S. Appl. No. 11/864,871 on Oct. 1, 2010; 30 pages.
Office Action issued in related U.S. Appl. No. 12/059,804 on Apr. 28, 2011; 14 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/059,971 on May 18, 2011; 13 pages.
Office Action issued in related U.S. Appl. No. 12/059,971 on Nov. 4, 2010; 20 pages.
Office Action issued in related U.S. Appl. No. 12/060,054 on Dec. 7, 2011; 15 pages.
Office Action issued in related U.S. Appl. No. 12/060,054 on Jun. 29, 2011; 15 pages.
Office Action issued in related U.S. Appl. No. 12/060,062 on Jul. 13, 2011; 16 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,155 on May 10, 2011; 8 pages.
Office Action issued in related U.S. Appl. No. 12/060,155 on Oct. 31, 2011; 15 pages.
Office Action issued in related U.S. Appl. No. 12/060,171 on Aug. 11, 2009; 11 pages.
Office Action issued in related U.S. Appl. No. 12/060,171 on Jan. 26, 2011; 17 pages.
Office Action issued in related U.S. Appl. No. 12/060,171 on Jul. 1, 2010; 19 pages.
Office Action issued in related U.S. Appl. No. 12/060,171 on Mar. 1, 2012; 19 pages.
Office Action issued in related U.S. Appl. No. 12/060,171 on Mar. 19, 2010; 10 pages.
Office Action issued in related U.S. Appl. No. 12/060,192 on Apr. 14, 2011; 18 pages.
Office Action issued in related U.S. Appl. No. 12/060,192 on Sep. 6, 2011; 18 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Office Action issued in U.S. Appl. No. 11/640,422 on May 14, 2010; 12 pages.
Office Action issued in U.S. Appl. No. 11/864,786 on Mar. 30, 2012; 12 pages.
Office Action issued in U.S. Appl. No. 11/864,811 on Jul. 26, 2011; 7 pages.
Office Action issued in U.S. Appl. No. 11/864,811 on Mar. 18, 2011; 10 pages.
Office Action issued in U.S. Appl. No. 12/059,804 on Nov. 14, 2011; 15 pages.
Office Action issued in U.S. Appl. No. 12/060,144 on Dec. 8, 2011; 18 pages.
Office Action issued in U.S. Appl. No. 12/060,144 on Jun. 23, 2011; 16 pages.
Office Action issued in U.S. Appl. No. 12/147,378 on Jun. 17, 2011; 10 pages.
Office Action issued in U.S. Appl. No. 12/147,414 on Apr. 14, 2011; 30 pages.
Office Action issued in U.S. Appl. No. 12/147,414 on Oct. 26, 2011; 27 pages.
Office Action issued in U.S. Appl. No. 12/323,116 on Jan. 27, 2012; 7 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.

(56) References Cited

OTHER PUBLICATIONS

Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,576 on Oct. 12, 2012; 11 pages.
Office Action issued in U.S. Appl. No. 12/815,618 on Dec. 22, 2011; 8 pages.
Office Action issued in U.S. Appl. No. 12/815,639 on May 24, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,750 on Sep. 28, 2012; 66 pages.
Office Action issued in U.S. Appl. No. 12/815,802 on Jul. 20, 2012; 16 pages.
Office Action issued in U.S. Appl. No. 12/815,911 on Sep. 26, 2012; 14 pages.
Office Action issued in U.S. Appl. No. 12/816,083 on May 9, 2012; 20 pages.
Office Action issued in U.S. Appl. No. 12/816,083 on Sep. 21, 2012; 22 pages.
Office Action issued in U.S. Appl. No. 12/816,170 on Jul. 24, 2012; 9 pages.
Office Action issued in U.S. Appl. No. 12/816,268 on Oct. 11, 2012; 11 pages.
Office Action issued in U.S. Appl. No. 12/816,293 on Apr. 25, 2012; 10 pages.
Office Action issued in U.S. Appl. No. 13/192,543 on Aug. 28, 2012; 14 pages.
Office Action issued in U.S. Appl. No. 13/192,555 on Jul. 20, 2012; 7 pages.
Office Action issued in U.S. Appl. No. 13/192,574 on Oct. 24, 2012; 6 pages.
Office Action issued in U.S. Appl. No. 13/192,612 on Oct. 4, 2012; 12 pages.
Office Action issued in U.S. Appl. No. 13/349,477 on Jun. 29, 2012; 13 pages.
Office Action issued in U.S. Appl. No. 13/349,477 on Nov. 15, 2012; 15 pages.
Office Action issued in U.S. Appl. No. 13/535,881 on Dec. 21, 2012; 7 pages.
Business Object DTF, Common Business Objects, Ver 1.5; OMG Document bom; Framingham Corporate Center, Framingham, MA; 20 pages; Dec. 4, 1997.
Chou et al. "Web Services for Service-Oriented Communication", International Conference on Collaborative Computing: Networking, Applications and Worksharing, CollaborateCom 2006, pp. 1-8, 2006.
Intersystems, Evaluating Integration Software, Ensemble White Paper, 2007, http://www.intersystems.com/ensemble/whitepapers/pdf/evaluating-integration-software.pdf.
Nemuraite, Lina; "Business Object Modeling Framework for Distributed Enterprise", Kaunas University of Technology, Launas, Lithuania, Jan. 1999; pp. 189-202.
Oracle Application Integration Architecture Enterprise Business Objects (EBO) Concepts—Concepts, Structure, Terminologies and Design Rules, An Oracle White Paper; 29 pages; Aug. 2009.
Notice of Allowance issued in U.S. Appl. No. 11/640,422 on Apr. 23, 2012; 8 pages.
Notice of Allowance issued in U.S. Appl. No. 11/864,811 on Mar. 19, 2013; 9 pages.
Notice of Allowance issued in U.S. Appl. No. 11/864,866 on Jan. 25, 2013; 7 pages.
Notice of Allowance issued in U.S. Appl. No. 12/060,144 on Mar. 20, 2013; 12 pages.
Notice of Allowance issued in U.S. Appl. No. 12/060,155 on Jan. 11, 2013; 5 pages.
Notice of Allowance issued in U.S. Appl. No. 12/060,178 on Feb. 14, 2013; 7 pages.
Notice of Allowance issued in U.S. Appl. No. 12/323,139 on Feb. 8, 2013; 9 pages.
Notice of Allowance issued in U.S. Appl. No. 12/815,618 on May 7, 2013; 8 pages.
Notice of Allowance issued in U.S. Appl. No. 12/815,802 on Nov. 27, 2012; 9 pages.
Office Action issued in U.S. Appl. No. 12/815,576 on Feb. 15, 2013; 13 pages.
Office Action issued in U.S. Appl. No. 12/815,750 on Feb. 21, 2013; 67 pages.
Office Action issued in U.S. Appl. No. 12/815,869 on Feb. 15, 2013; 27 pages.
Office Action issued in U.S. Appl. No. 12/815,911 on Feb. 25, 2013; 15 pages.
Office Action issued in U.S. Appl. No. 12/816,268 on Apr. 26, 2013; 17 pages.
Office Action issued in U.S. Appl. No. 12/823,996 on Apr. 25, 2013; 8 pages.
Office Action issued in U.S. Appl. No. 12/823,996 on Mar. 22, 2013, 7 pages.
Office Action issued in U.S. Appl. No. 13/186,361 on Feb. 26, 2013, 10 pages.
Office Action issued in U.S. Appl. No. 13/192,543 on Dec. 13, 2012; 26 pages.
Office Action issued in U.S. Appl. No. 13/192,553 on Feb. 11, 2013, 23 pages.
Office Action issued in U.S. Appl. No. 13/192,555 on Mar. 1, 2013; 11 pages.
Office Action issued in U.S. Appl. No. 13/192,564 on Apr. 22, 2013; 21 pages.
Office Action issued in U.S. Appl. No. 13/192,574 on Apr. 30, 2013; 5 pages.
Office Action issued in U.S. Appl. No. 13/192,599 on Mar. 21, 2013; 29 pages.
Office Action issued in U.S. Appl. No. 13/218,876 on Apr. 5, 2013; 10 pages.
Office Action issued in U.S. Appl. No. 13/535,433 on Mar. 4, 2013; 11 pages.
Office Action issued in U.S. Appl. No. 13/535,521 on Apr. 16, 2013; 16 pages.
Office Action issued in U.S. Appl. No. 13/535,667 on Dec. 26, 2012; 9 pages.
Office Action issued in U.S. Appl. No. 13/535,723 on Apr. 24, 2013; 16 pages.
Office Action issued in U.S. Appl. No. 13/754,608 on Apr. 215, 2013; 15 pages.

* cited by examiner

| Package | | Level 1 | Level 2 | Level 3 | Level 4 | Cardinality | Data Type Name |
|---|---|---|---|---|---|---|---|
| Goods and Activity Confirmation Inventory Change Item Overview Simple by Elements Query_sync<br><br>340000 | | Goods and Activity Confirmation Inventory Change Item Overview Simple by Elements Query_sync<br><br>340002 | | | | | GoodsAndActivityConfirmationInventoryChangeItemOverviewSimpleByElementsQueryMessage_sync<br><br>340004 |
| | GoodsAndActivityConfirmationInventoryChangeItemOverviewSimpleSelectionByElements<br><br>340006 | | GoodsAndActivityConfirmationInventoryChangeItemOverviewSimpleSelectionByElements<br><br>340008 | | | 1<br><br>340010 | GoodsAndActivityConfirmationInventoryChangeItemOverviewSimpleByElementsQuery<br><br>340012 |
| | | | | SelectionByInventoryLocationInventoryTypeCode<br><br>340014 | | 0..N<br><br>340016 | GACCnfInvItOvSBEIQuerySelectionByInventoryLocationInventoryTypeCode<br><br>340018 |

FIG. 34-2

| Package | | Level 1 | Level 2 | Level 3 | Level 4 | Cardinality | Data Type Name |
|---|---|---|---|---|---|---|---|
| | | | | | InclusionExclusionCode 340020 | 0..1 340022 | InclusionExclusionCode 340024 |
| | | | | | IntervalBoundaryTypeCode 340026 | 1 340028 | IntervalBoundaryTypeCode 340030 |
| | | | | | LowerBoundaryInventoryTypeCode 340032 | 0..1 340034 | InventoryTypeCode 340036 |
| | | | | | UpperBoundaryInventoryTypeCode 340038 | 0..1 340040 | InventoryTypeCode 340042 |
| | | | | SelectionByInventoryLocationLocationUUID 340044 | | 0..N 340046 | GoodsAndActivityConfirmationInventoryChangeItemOverviewSimpleByElementsQuerySelectionByInventoryLocationLocationUUID 340048 |
| | | | | | InclusionExclusionCode 340050 | 0..1 340052 | InclusionExclusionCode 340054 |

FIG. 34-3

| Package | | Level 1 | Level 2 | Level 3 | Level 4 | Cardinality | Data Type Name |
|---|---|---|---|---|---|---|---|
| | | | | | IntervalBoundaryTypeCode 340056 | 1 340058 | IntervalBoundaryTypeCode 340060 |
| | | | | | LowerBoundaryLocationUUID 340062 | 0..1 340064 | UUID 340066 |
| | | | | | UpperBoundaryLocationUUID 340068 | 0..1 340070 | UUID 340072 |
| | | | | SelectionByInventoryLocationLocationID 340074 | | 0..N 340076 | GoodsAndActivityConfirmationInventoryChangeItemOverviewSimpleByElementsQuerySelectionByInventoryLocationLocationID 340078 |
| | | | | | InclusionExclusionCode 340080 | 0..1 340082 | InclusionExclusionCode 340084 |
| | | | | | IntervalBoundaryTypeCode 340086 | 1 340088 | IntervalBoundaryTypeCode 340090 |

FIG. 34-4

| Package | | Level 1 | Level 2 | Level 3 | Level 4 | Cardinality | Data Type Name |
|---|---|---|---|---|---|---|---|
| | | | | | LowerBoundaryLocationID 340092 | 0..1 340094 | LocationID 340096 |
| | | | | | UpperBoundaryLocationID 340098 | 0..1 340100 | LocationID 340102 |
| | | | | SelectionByInventoryLocationCustodianPartyUUID 340104 | | 0..N 340106 | GACCnfInvItOvSBEIQuerySelectionByInventoryLocationCustodianPartyUUID 340108 |
| | | | | | InclusionExclusionCode 340110 | 0..1 340112 | InclusionExclusionCode 340114 |
| | | | | | IntervalBoundaryTypeCode 340116 | 1 340118 | IntervalBoundaryTypeCode 340120 |
| | | | | | LowerBoundaryCustodianPartyUUID 340122 | 0..1 340124 | UUID 340126 |

FIG. 34-5

| Package | | Level 1 | Level 2 | Level 3 | Level 4 | Cardinality | Data Type Name |
|---|---|---|---|---|---|---|---|
| | | | | | UpperBoundaryCustodianPartyUUID 340128 | 0..1 340130 | UUID 340132 |
| | | | | SelectionByInventoryLocationCustodianPartyInternalID 340134 | | 0..N 340136 | GACCnfInvItOvSBEIQuerySelectionByInventoryLocationCustodianPartyInternalID 340138 |
| | | | | | InclusionExclusionCode 340140 | 0..1 340142 | InclusionExclusionCode 340144 |
| | | | | | IntervalBoundaryTypeCode 340146 | 1 340148 | IntervalBoundaryTypeCode 340150 |
| | | | | | LowerBoundaryCustodianPartyInternalID 340152 | 0..1 340154 | BusinessPartnerInternalID 340156 |

FIG. 34-6

| Package | | Level 1 | Level 2 | Level 3 | Level 4 | Cardinality | Data Type Name |
|---|---|---|---|---|---|---|---|
| | | | | | UpperBoundaryCustodianPartyInternalID 340158 | 0..1 340160 | BusinessPartnerInternalID 340162 |
| | | | | SelectionByInventoryLocationLogisticsAreaUUID 340164 | | 0..N 340166 | GACCnfInvltOvSBElQuerySelectionByInventoryLocationLogisticsAreaUUID 340168 |
| | | | | | InclusionExclusionCode 340170 | 0..1 340172 | InclusionExclusionCode 340174 |
| | | | | | IntervalBoundaryTypeCode 340176 | 1 340178 | IntervalBoundaryTypeCode 340180 |
| | | | | | LowerBoundaryLogisticsAreaUUID 340182 | 0..1 340184 | UUID 340186 |
| | | | | | UpperBoundaryLogisticsAreaUUID 340188 | 0..1 340190 | UUID 340192 |

FIG. 34-7

| Package | | Level 1 | Level 2 | Level 3 | Level 4 | Cardinality | Data Type Name |
|---|---|---|---|---|---|---|---|
| | | | | SelectionByInventoryLocationLogisticsAreaKeyID 340194 | | 0..N 340196 | GACCnfInvltOvSBEIQuerySelectionByInventoryLocationLogisticsAreaKeyID 340198 |
| | | | | | InclusionExclusionCode 340200 | 0..1 340202 | InclusionExclusionCode 340204 |
| | | | | | IntervalBoundaryTypeCode 340206 | 1 340208 | IntervalBoundaryTypeCode 340210 |
| | | | | | LowerBoundaryID 340212 | 0..1 340214 | LogisticsAreaID 340216 |
| | | | | | UpperBoundaryID 340218 | 0..1 340220 | LogisticsAreaID 340222 |
| | | | | SelectionByInventoryLocationLogisticsAreaKeySiteID 340224 | | 0..N 340226 | GACCnfInvltOvSBEIQuerySelectionByInventoryLocationLogisticsAreaKeySiteID 340228 |

FIG. 34-8

| Package | | Level 1 | Level 2 | Level 3 | Level 4 | Cardinality | Data Type Name |
|---|---|---|---|---|---|---|---|
| | | | | | InclusionExclusionCode 340230 | 0..1 340232 | InclusionExclusionCode 340234 |
| | | | | | IntervalBoundaryTypeCode 340236 | 1 340238 | IntervalBoundaryTypeCode 340240 |
| | | | | | LowerBoundarySiteID 340242 | 0..1 340244 | LocationID 340246 |
| | | | | | UpperBoundarySiteID 340248 | 0..1 340250 | LocationID 340252 |
| | | | | SelectionByInventoryLocationInventoryManagedLocationUUID 340254 | | 0..N 340256 | GACCnfInvItOvSBEIQuerySelectionByInventoryLocationInventoryManagedLocationUUID 340258 |
| | | | | | InclusionExclusionCode 340260 | 0..1 340262 | InclusionExclusionCode 340264 |

FIG. 34-9

| Package | | Level 1 | Level 2 | Level 3 | Level 4 | Cardinality | Data Type Name |
|---|---|---|---|---|---|---|---|
| | | | | | IntervalBoundaryTypeCode 340266 | 1 340268 | IntervalBoundaryTypeCode 340270 |
| | | | | | LowerBoundaryInventoryManagedLocationUUID 340272 | 0..1 340274 | UUID 340276 |
| | | | | | UpperBoundaryInventoryManagedLocationUUID 340278 | 0..1 340280 | UUID 340282 |
| | | | | SelectionByInventoryLocationInventoryManagedLogisticsAreaUUID 340284 | | 0..N 340286 | GACCnfInvItOvSBEIQuerySelectionByInventoryLocationInventoryManagedLogisticsAreaUUID 340288 |
| | | | | | InclusionExclusionCode 340290 | 0..1 340292 | InclusionExclusionCode 340294 |

FIG. 34-10

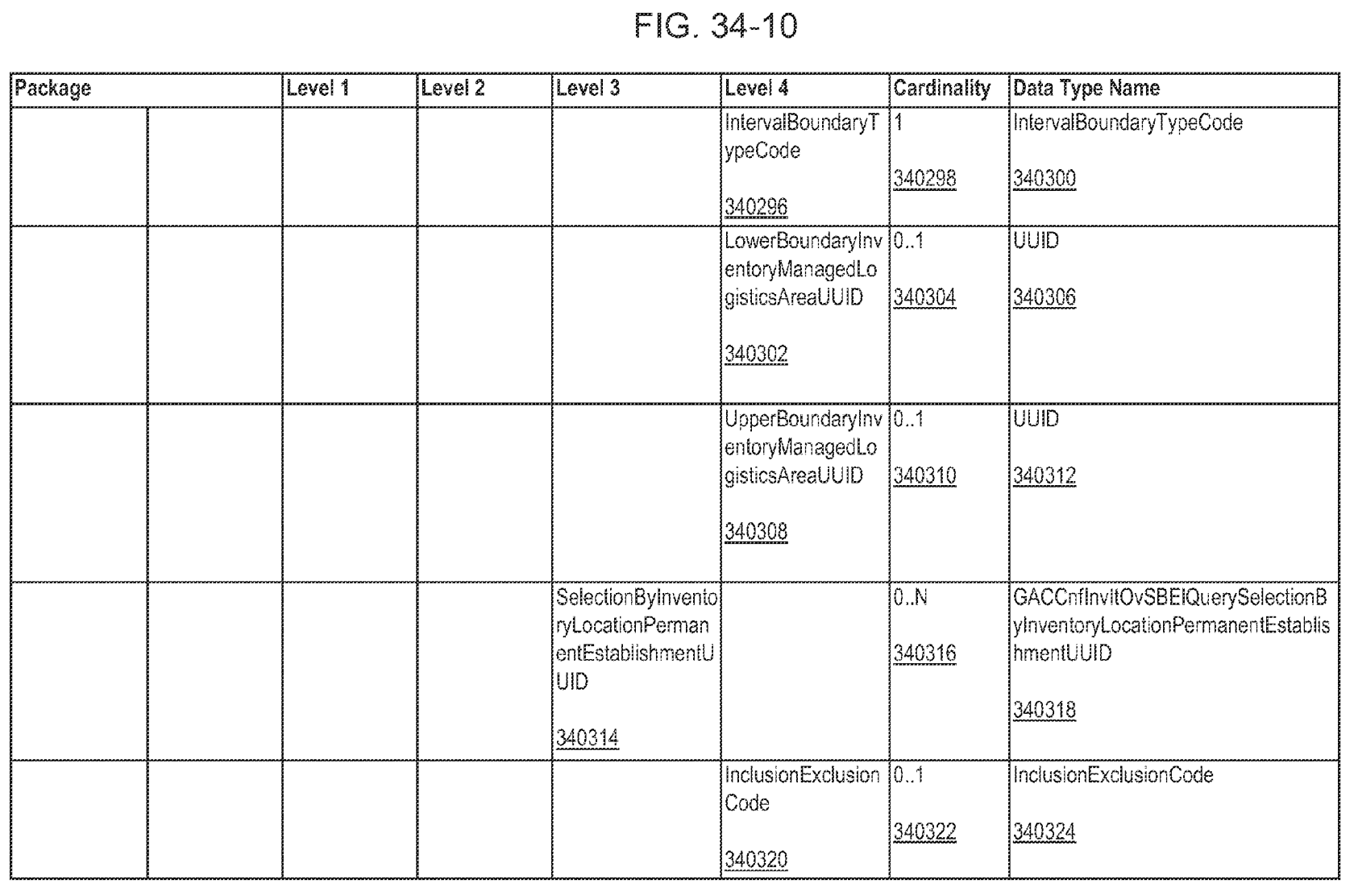

| Package | | Level 1 | Level 2 | Level 3 | Level 4 | Cardinality | Data Type Name |
|---|---|---|---|---|---|---|---|
| | | | | | IntervalBoundaryTypeCode 340296 | 1 340298 | IntervalBoundaryTypeCode 340300 |
| | | | | | LowerBoundaryInventoryManagedLogisticsAreaUUID 340302 | 0..1 340304 | UUID 340306 |
| | | | | | UpperBoundaryInventoryManagedLogisticsAreaUUID 340308 | 0..1 340310 | UUID 340312 |
| | | | | SelectionByInventoryLocationPermanentEstablishmentUUID 340314 | | 0..N 340316 | GACCnfInvItOvSBEIQuerySelectionByInventoryLocationPermanentEstablishmentUUID 340318 |
| | | | | | InclusionExclusionCode 340320 | 0..1 340322 | InclusionExclusionCode 340324 |

FIG. 34-11

| Package | | Level 1 | Level 2 | Level 3 | Level 4 | Cardinality | Data Type Name |
|---|---|---|---|---|---|---|---|
| | | | | | IntervalBoundaryTypeCode 340326 | 1 340328 | IntervalBoundaryTypeCode 340330 |
| | | | | | LowerBoundaryPermanentEstablishmentUUID 340332 | 0..1 340334 | UUID 340336 |
| | | | | | UpperBoundaryPermanentEstablishmentUUID 340338 | 0..1 340340 | UUID 340342 |
| | | | | SelectionByInventoryItemChangeMainInventorySeparatingValuesMaterialUUID 340344 | | 0..N 340346 | GACCnfInvItOvSBEIQuerySelectionByInventoryItemChangeMainInventorySeparatingValuesMaterialUUID 340348 |
| | | | | | InclusionExclusionCode 340350 | 0..1 340352 | InclusionExclusionCode 340354 |

FIG. 34-12

| Package | | Level 1 | Level 2 | Level 3 | Level 4 | Cardinality | Data Type Name |
|---|---|---|---|---|---|---|---|
| | | | | | IntervalBoundaryTypeCode 340356 | 1 340358 | IntervalBoundaryTypeCode 340360 |
| | | | | | LowerBoundaryMaterialUUID 340362 | 0..1 340364 | UUID 340366 |
| | | | | | UpperBoundaryMaterialUUID 340368 | 0..1 340370 | UUID 340372 |
| | | | | SelectionByInventoryItemChangeMainInventorySeparatingValuesMaterialKeyProductTypeCode 340374 | | 0..N 340376 | GACCnfInvItOvSBEIQuerySelectionByInventoryItemChangeMainInventorySeparatingValuesMaterialKeyProductTypeCode 340378 |
| | | | | | InclusionExclusionCode 340380 | 0..1 340382 | InclusionExclusionCode 340384 |
| | | | | | IntervalBoundaryTypeCode 340386 | 1 340388 | IntervalBoundaryTypeCode 340390 |

FIG. 34-13

| Package | | Level 1 | Level 2 | Level 3 | Level 4 | Cardinality | Data Type Name |
|---|---|---|---|---|---|---|---|
| | | | | | LowerBoundaryProductTypeCode 340392 | 0..1 340394 | ProductTypeCode 340396 |
| | | | | | UpperBoundaryProductTypeCode 340398 | 0..1 340400 | ProductTypeCode 340402 |
| | | | | SelectionByInventoryItemChangeMainInventorySeparatingValuesMaterialKeyProductIdentifierTypeCode 340404 | | 0..N 340406 | GACCnfInvItOvSBEIQuerySelectionByInventoryItemChangeMainInventorySeparatingValuesMaterialKeyProductIdentifierTypeCode 340408 |
| | | | | | InclusionExclusionCode 340410 | 0..1 340412 | InclusionExclusionCode 340414 |
| | | | | | IntervalBoundaryTypeCode 340416 | 1 340418 | IntervalBoundaryTypeCode 340420 |

FIG. 34-14

| Package | | Level 1 | Level 2 | Level 3 | Level 4 | Cardinality | Data Type Name |
|---|---|---|---|---|---|---|---|
| | | | | | LowerBoundaryProductIdentifierTypeCode 340422 | 0..1 340424 | ProductIdentifierTypeCode 340426 |
| | | | | | UpperBoundaryProductIdentifierTypeCode 340428 | 0..1 340430 | ProductIdentifierTypeCode 340432 |
| | | | | SelectionByInventoryItemChangeMainInventorySeparatingValuesMaterialKeyProductID 340434 | | 0..N 340436 | GACCnfInvItOvSBEIQuerySelectionByInventoryItemChangeMainInventorySeparatingValuesMaterialKeyProductID 340438 |
| | | | | | InclusionExclusionCode 340440 | 0..1 340442 | InclusionExclusionCode 340444 |
| | | | | | IntervalBoundaryTypeCode 340446 | 1 340448 | IntervalBoundaryTypeCode 340450 |

FIG. 34-15

| Package | | Level 1 | Level 2 | Level 3 | Level 4 | Cardinality | Data Type Name |
|---|---|---|---|---|---|---|---|
| | | | | | LowerBoundaryProductID 340452 | 0..1 340454 | ProductID 340456 |
| | | | | | UpperBoundaryProductID 340458 | 0..1 340460 | ProductID 340462 |
| | | | | SelectionByInventoryItemChangeMainInventorySeparatingValuesOwnerPartyUUID 340464 | | 0..N 340466 | GACCnfInvItOvSBEIQuerySelectionByInventoryItemChangeMainInventorySeparatingValuesOwnerPartyUUID 340468 |
| | | | | | InclusionExclusionCode 340470 | 0..1 340472 | InclusionExclusionCode 340474 |
| | | | | | IntervalBoundaryTypeCode 340476 | 1 340478 | IntervalBoundaryTypeCode 340480 |
| | | | | | LowerBoundaryOwnerPartyUUID 340482 | 0..1 340484 | UUID 340486 |

FIG. 34-16

| Package | | Level 1 | Level 2 | Level 3 | Level 4 | Cardinality | Data Type Name |
|---|---|---|---|---|---|---|---|
| | | | | | UpperBoundaryOwnerPartyUUID<br>340488 | 0..1<br>340490 | UUID<br>340492 |
| | | | | SelectionByInventoryItemChangeMainInventorySeparatingValuesOwnerPartyID<br>340494 | | 0..N<br>340496 | GACCnfInvItOvSBElQuerySelectionByInventoryItemChangeMainInventorySeparatingValuesOwnerPartyID<br>340498 |
| | | | | | InclusionExclusionCode<br>340500 | 0..1<br>340502 | InclusionExclusionCode<br>340504 |
| | | | | | IntervalBoundaryTypeCode<br>340506 | 1<br>340508 | IntervalBoundaryTypeCode<br>340510 |
| | | | | | LowerBoundaryOwnerPartyID<br>340512 | 0..1<br>340514 | BusinessPartnerInternalID<br>340516 |
| | | | | | UpperBoundaryOwnerPartyID<br>340518 | 0..1<br>340520 | BusinessPartnerInternalID<br>340522 |

FIG. 34-17

| Package | | Level 1 | Level 2 | Level 3 | Level 4 | Cardinality | Data Type Name |
|---|---|---|---|---|---|---|---|
| | | | | SelectionByInventoryItemChangeMainInventorySeparatingValuesSupplyPlanningAreaUUID 340524 | | 0..N 340526 | GACCnfInvItOvSBEIQuerySelectionByInventoryItemChangeMainInventorySeparatingValuesSupplyPlanningAreaUUID 340528 |
| | | | | | InclusionExclusionCode 340530 | 0..1 340532 | InclusionExclusionCode 340534 |
| | | | | | IntervalBoundaryTypeCode 340536 | 1 340538 | IntervalBoundaryTypeCode 340540 |
| | | | | | LowerBoundarySupplyPlanningAreaUUID 340542 | 0..1 340544 | UUID 340546 |
| | | | | | UpperBoundarySupplyPlanningAreaUUID 340548 | 0..1 340550 | UUID 340552 |

FIG. 34-18

| Package | | Level 1 | Level 2 | Level 3 | Level 4 | Cardinality | Data Type Name |
|---|---|---|---|---|---|---|---|
| | | | | SelectionByInventoryItemChangeMainInventorySeparatingValuesSupplyPlanningAreaID 340554 | | 0..N 340556 | GACCnfInvItOvSBEIQuerySelectionByInventoryItemChangeMainInventorySeparatingValuesSupplyPlanningAreaID 340558 |
| | | | | | InclusionExclusionCode 340560 | 0..1 340562 | InclusionExclusionCode 340564 |
| | | | | | IntervalBoundaryTypeCode 340566 | 1 340568 | IntervalBoundaryTypeCode 340570 |
| | | | | | LowerBoundarySupplyPlanningAreaID 340572 | 0..1 340574 | SupplyPlanningAreaID 340576 |
| | | | | | UpperBoundarySupplyPlanningAreaID 340578 | 0..1 340580 | SupplyPlanningAreaID 340582 |

FIG. 34-19

| Package | | Level 1 | Level 2 | Level 3 | Level 4 | Cardinality | Data Type Name |
|---|---|---|---|---|---|---|---|
| | | | | SelectionByInventoryItemChangeMainInventorySeparatingValuesInventoryRestrictedUseIndicator 340584 | | 0..N 340586 | GACCnfInvItOvSBEIQuerySelectionByInventoryItemChangeMainInventorySeparatingValuesInventoryRestrictedUseIndicator 340588 |
| | | | | | InclusionExclusionCode 340590 | 0..1 340592 | InclusionExclusionCode 340594 |
| | | | | | IntervalBoundaryTypeCode 340596 | 1 340598 | IntervalBoundaryTypeCode 340600 |
| | | | | | LowerBoundaryInventoryRestrictedUseIndicator 340602 | 0..1 340604 | Indicator 340606 |
| | | | | | UpperBoundaryInventoryRestrictedUseIndicator 340608 | 0..1 340610 | Indicator 340612 |

FIG. 34-20

| Package | | Level 1 | Level 2 | Level 3 | Level 4 | Cardinality | Data Type Name |
|---|---|---|---|---|---|---|---|
| | | | | SelectionByInventoryItemChangeIdentifiedStockInventorySeparatingValuesIdentifiedStockUUID 340614 | | 0..N 340616 | GACCnfInvItOvSBEIQuerySelectionByInventoryItemChangeIdentifiedStockInventorySeparatingValuesIdentifiedStockUUID 340618 |
| | | | | | InclusionExclusionCode 340620 | 0..1 340622 | InclusionExclusionCode 340624 |
| | | | | | IntervalBoundaryTypeCode 340626 | 1 340628 | IntervalBoundaryTypeCode 340630 |
| | | | | | LowerBoundaryIdentifiedStockUUID 340632 | 0..1 340634 | UUID 340636 |
| | | | | | UpperBoundaryIdentifiedStockUUID 340638 | 0..1 340640 | UUID 340642 |

FIG. 34-21

| Package | | Level 1 | Level 2 | Level 3 | Level 4 | Cardinality | Data Type Name |
|---|---|---|---|---|---|---|---|
| | | | | SelectionByInventoryItemChangeIdentifiedStockInventorySeparatingValuesIdentifiedStockKeyID 340644 | | 0..N 340646 | GACCnfInvItOvSBEIQuerySelectionByInventoryItemChangeIdentifiedStockInventorySeparatingValuesIdentifiedStockKeyID 340648 |
| | | | | | InclusionExclusionCode 340650 | 0..1 340652 | InclusionExclusionCode 340654 |
| | | | | | IntervalBoundaryTypeCode 340656 | 1 340658 | IntervalBoundaryTypeCode 340660 |
| | | | | | LowerBoundaryID 340662 | 0..1 340664 | IdentifiedStockID 340666 |
| | | | | | UpperBoundaryID 340668 | 0..1 340670 | IdentifiedStockID 340672 |

FIG. 34-22

| Package | | Level 1 | Level 2 | Level 3 | Level 4 | Cardinality | Data Type Name |
|---|---|---|---|---|---|---|---|
| | | | | SelectionByInventoryItemChangeSpecialStockSeparatingValuesOutboundDeliveryReferenceID 340674 | | 0..N 340676 | GACCnfInvItOvSBEIQuerySelectionByInventoryItemChangeSpecialStockSeparatingValuesOutboundDeliveryReferenceID 340678 |
| | | | | | InclusionExclusionCode 340680 | 0..1 340682 | InclusionExclusionCode 340684 |
| | | | | | IntervalBoundaryTypeCode 340686 | 1 340688 | IntervalBoundaryTypeCode 340690 |
| | | | | | LowerBoundaryID 340692 | 0..1 340694 | BusinessTransactionDocumentID 340696 |
| | | | | | UpperBoundaryID 340698 | 0..1 340700 | BusinessTransactionDocumentID 340702 |

FIG. 34-23

| Package | | Level 1 | Level 2 | Level 3 | Level 4 | Cardinality | Data Type Name |
|---|---|---|---|---|---|---|---|
| | | | | SelectionByInventoryItemChangeSpecialStockSeparatingValuesOutboundDeliveryReferenceUUID 340704 | | 0..N 340706 | GACCnfInvItOvSBEIQuerySelectionByInventoryItemChangeSpecialStockSeparatingValuesOutboundDeliveryReferenceUUID 340708 |
| | | | | | InclusionExclusionCode 340710 | 0..1 340712 | InclusionExclusionCode 340714 |
| | | | | | IntervalBoundaryTypeCode 340716 | 1 340718 | IntervalBoundaryTypeCode 340720 |
| | | | | | LowerBoundaryUUID 340722 | 0..1 340724 | UUID 340726 |
| | | | | | UpperBoundaryUUID 340728 | 0..1 340730 | UUID 340732 |

FIG. 34-24

| Package | | Level 1 | Level 2 | Level 3 | Level 4 | Cardinality | Data Type Name |
|---|---|---|---|---|---|---|---|
| | | | | SelectionByInventoryItemChangeSpecialStockSeparatingValuesSiteLogisticsLotUUID 340734 | | 0..N 340736 | GACCnfInvItOvSBEIQuerySelectionByInventoryItemChangeSpecialStockSeparatingValuesSiteLogisticsLotUUID 340738 |
| | | | | | InclusionExclusionCode 340740 | 0..1 340742 | InclusionExclusionCode 340744 |
| | | | | | IntervalBoundaryTypeCode 340746 | 1 340748 | IntervalBoundaryTypeCode 340750 |
| | | | | | LowerBoundarySiteLogisticsLotUUID 340752 | 0..1 340754 | UUID 340756 |
| | | | | | UpperBoundarySiteLogisticsLotUUID 340758 | 0..1 340760 | UUID 340762 |

FIG. 34-25

| Package | | Level 1 | Level 2 | Level 3 | Level 4 | Cardinality | Data Type Name |
|---|---|---|---|---|---|---|---|
| | | | | SelectionByInventoryItemChangeSpecialStockSeparatingValuesSiteLogisticsLotID 340764 | | 0..N 340766 | GACCnfInvItOvSBEIQuerySelectionByInventoryItemChangeSpecialStockSeparatingValuesSiteLogisticsLotID 340768 |
| | | | | | InclusionExclusionCode 340770 | 0..1 340772 | InclusionExclusionCode 340774 |
| | | | | | IntervalBoundaryTypeCode 340776 | 1 340778 | IntervalBoundaryTypeCode 340780 |
| | | | | | LowerBoundarySiteLogisticsLotID 340782 | 0..1 340784 | BusinessTransactionDocumentID 340786 |
| | | | | | UpperBoundarySiteLogisticsLotID 340788 | 0..1 340790 | BusinessTransactionDocumentID 340792 |

FIG. 34-26

| Package | | Level 1 | Level 2 | Level 3 | Level 4 | Cardinality | Data Type Name |
|---|---|---|---|---|---|---|---|
| | | | | SelectionByInventoryItemChangeDefaultRecordedQuantityUUID 340794 | | 0..N 340796 | GACCnfInvItOvSBEIQuerySelectionByInventoryItemChangeDefaultRecordedQuantityUUID 340798 |
| | | | | | InclusionExclusionCode 340800 | 0..1 340802 | InclusionExclusionCode 340804 |
| | | | | | IntervalBoundaryTypeCode 340806 | 1 340808 | IntervalBoundaryTypeCode 340810 |
| | | | | | LowerBoundaryDefaultRecordedQuantityUUID 340812 | 0..1 340814 | UUID 340816 |
| | | | | | UpperBoundaryDefaultRecordedQuantityUUID 340818 | 0..1 340820 | UUID 340822 |

FIG. 34-27

| Package | | Level 1 | Level 2 | Level 3 | Level 4 | Cardinality | Data Type Name |
|---|---|---|---|---|---|---|---|
| | | | | SelectionByChangeReasonCode 340824 | | 0..N 340826 | GoodsAndActivityConfirmationInventoryChangeItemOverviewSimpleByElementsQuerySelectionByChangeReasonCode 340828 |
| | | | | | InclusionExclusionCode 340830 | 0..1 340832 | InclusionExclusionCode 340834 |
| | | | | | IntervalBoundaryTypeCode 340836 | 1 340838 | IntervalBoundaryTypeCode 340840 |
| | | | | | LowerBoundaryChangeReasonCode 340842 | 0..1 340844 | InventoryChangeReasonCode 340846 |
| | | | | | UpperBoundaryChangeReasonCode 340848 | 0..1 340850 | InventoryChangeReasonCode 340852 |

FIG. 34-28

| Package | | Level 1 | Level 2 | Level 3 | Level 4 | Cardinality | Data Type Name |
|---|---|---|---|---|---|---|---|
| | | | | SelectionByID<br><br>340854 | | 0..N<br><br>340856 | GoodsAndActivityConfirmationInventoryChangeItemOverviewSimpleByElementsQuerySelectionByID<br><br>340858 |
| | | | | | InclusionExclusionCode<br><br>340860 | 0..1<br><br>340862 | InclusionExclusionCode<br><br>340864 |
| | | | | | IntervalBoundaryTypeCode<br><br>340866 | 1<br><br>340868 | IntervalBoundaryTypeCode<br><br>340870 |
| | | | | | LowerBoundaryID<br><br>340872 | 0..1<br><br>340874 | BusinessTransactionDocumentItemID<br><br>340876 |
| | | | | | UpperBoundaryID<br><br>340878 | 0..1<br><br>340880 | BusinessTransactionDocumentItemID<br><br>340882 |
| | | | | SelectionByInventoryMovementDirectionCode<br><br>340884 | | 0..N<br><br>340886 | GoodsAndActivityConfirmationInventoryChangeItemOverviewSimpleByElementsQuerySelectionByInventoryMovementDirectionCode<br><br>340888 |

FIG. 34-29

| Package | | Level 1 | Level 2 | Level 3 | Level 4 | Cardinality | Data Type Name |
|---|---|---|---|---|---|---|---|
| | | | | | InclusionExclusionCode 340890 | 0..1 340892 | InclusionExclusionCode 340894 |
| | | | | | IntervalBoundaryTypeCode 340896 | 1 340898 | IntervalBoundaryTypeCode 340900 |
| | | | | | LowerBoundaryInventoryMovementDirectionCode 340902 | 0..1 340904 | InventoryMovementDirectionCode 340906 |
| | | | | | UpperBoundaryInventoryMovementDirectionCode 340908 | 0..1 340910 | InventoryMovementDirectionCode 340912 |
| | | | | SelectionByInventoryRelevanceIndicator 340914 | | 0..N 340916 | GoodsAndActivityConfirmationInventoryChangeItemOverviewSimpleByElementsQuerySelectionByInventoryRelevanceIndicator 340918 |

FIG. 34-30

| Package | | Level 1 | Level 2 | Level 3 | Level 4 | Cardinality | Data Type Name |
|---|---|---|---|---|---|---|---|
| | | | | | InclusionExclusionCode 340920 | 0..1 340922 | InclusionExclusionCode 340924 |
| | | | | | IntervalBoundaryTypeCode 340926 | 1 340928 | IntervalBoundaryTypeCode 340930 |
| | | | | | LowerBoundaryInventoryRelevanceIndicator 340932 | 0..1 340934 | Indicator 340936 |
| | | | | | UpperBoundaryInventoryRelevanceIndicator 340938 | 0..1 340940 | Indicator 340942 |
| | | | | SelectionByInventoryManagedQuantity 340944 | | 0..N 340946 | GoodsAndActivityConfirmationInventoryChangeItemOverviewSimpleByElementsQuerySelectionByInventoryManagedQuantity 340948 |
| | | | | | InclusionExclusionCode 340950 | 0..1 340952 | InclusionExclusionCode 340954 |

FIG. 34-31

| Package | | Level 1 | Level 2 | Level 3 | Level 4 | Cardinality | Data Type Name |
|---|---|---|---|---|---|---|---|
| | | | | | IntervalBoundaryTypeCode 340956 | 1 340958 | IntervalBoundaryTypeCode 340960 |
| | | | | | LowerBoundaryInventoryManagedQuantity 340962 | 0..1 340964 | Quantity 340966 |
| | | | | | UpperBoundaryInventoryManagedQuantity 340968 | 0..1 340970 | Quantity 340972 |
| | | | | SelectionByInventoryManagedQuantityTypeCode 340974 | | 0..N 340976 | GoodsAndActivityConfirmationInventoryChangeItemOverviewSimpleByElementsQuerySelectionByInventoryManagedQuantityTypeCode 340978 |
| | | | | | InclusionExclusionCode 340980 | 0..1 340982 | InclusionExclusionCode 340984 |

FIG. 34-32

| Package | | Level 1 | Level 2 | Level 3 | Level 4 | Cardinality | Data Type Name |
|---|---|---|---|---|---|---|---|
| | | | | | IntervalBoundaryTypeCode 340986 | 1 340988 | IntervalBoundaryTypeCode 340990 |
| | | | | | LowerBoundaryInventoryManagedQuantityTypeCode 340992 | 0..1 340994 | QuantityTypeCode 340996 |
| | | | | | UpperBoundaryInventoryManagedQuantityTypeCode 340998 | 0..1 341000 | QuantityTypeCode 341002 |
| | | | | SelectionByDefaultRecordedQuantity 341004 | | 0..N 341006 | GoodsAndActivityConfirmationInventoryChangeItemOverviewSimpleByElementsQuerySelectionByDefaultRecordedQuantity 341008 |
| | | | | | InclusionExclusionCode 341010 | 0..1 341012 | InclusionExclusionCode 341014 |

FIG. 34-33

| Package | | Level 1 | Level 2 | Level 3 | Level 4 | Cardinality | Data Type Name |
|---|---|---|---|---|---|---|---|
| | | | | | IntervalBoundaryTypeCode 341016 | 1 341018 | IntervalBoundaryTypeCode 341020 |
| | | | | | LowerBoundaryDefaultRecordedQuantity 341022 | 0..1 341024 | Quantity 341026 |
| | | | | | UpperBoundaryDefaultRecordedQuantity 341028 | 0..1 341030 | Quantity 341032 |
| | | | | SelectionByDefaultRecordedQuantityTypeCode 341034 | | 0..N 341036 | GoodsAndActivityConfirmationInventoryChangeItemOverviewSimpleByElementsQuerySelectionByDefaultRecordedQuantityTypeCode 341038 |
| | | | | | InclusionExclusionCode 341040 | 0..1 341042 | InclusionExclusionCode 341044 |
| | | | | | IntervalBoundaryTypeCode 341046 | 1 341048 | IntervalBoundaryTypeCode 341050 |

FIG. 34-34

| Package | | Level 1 | Level 2 | Level 3 | Level 4 | Cardinality | Data Type Name |
|---|---|---|---|---|---|---|---|
| | | | | | LowerBoundaryDefaultRecordedQuantityTypeCode 341052 | 0..1 341054 | QuantityTypeCode 341056 |
| | | | | | UpperBoundaryDefaultRecordedQuantityTypeCode 341058 | 0..1 341060 | QuantityTypeCode 341062 |
| | | | | SelectionBySiteUUID 341064 | | 0..N 341066 | GoodsAndActivityConfirmationInventoryChangeItemOverviewSimpleByElementsQuerySelectionBySiteUUID 341068 |
| | | | | | InclusionExclusionCode 341070 | 0..1 341072 | InclusionExclusionCode 341074 |
| | | | | | IntervalBoundaryTypeCode 341076 | 1 341078 | IntervalBoundaryTypeCode 341080 |

FIG. 34-35

| Package | | Level 1 | Level 2 | Level 3 | Level 4 | Cardinality | Data Type Name |
|---|---|---|---|---|---|---|---|
| | | | | | LowerBoundarySiteUUID 341082 | 0..1 341084 | UUID 341086 |
| | | | | | UpperBoundarySiteUUID 341088 | 0..1 341090 | UUID 341092 |
| | | | | SelectionByTransferGroupID 341094 | | 0..N 341096 | GoodsAndActivityConfirmationInventoryChangeItemOverviewSimpleByElementsQuerySelectionByTransferGroupID 341098 |
| | | | | | InclusionExclusionCode 341100 | 0..1 341102 | InclusionExclusionCode 341104 |
| | | | | | IntervalBoundaryTypeCode 341106 | 1 341108 | IntervalBoundaryTypeCode 341110 |
| | | | | | LowerBoundaryTransferGroupID 341112 | 0..1 341114 | BusinessTransactionDocumentItemGroupID 341116 |

FIG. 34-36

| Package | | Level 1 | Level 2 | Level 3 | Level 4 | Cardinality | Data Type Name |
|---|---|---|---|---|---|---|---|
| | | | | | UpperBoundaryTransferGroupID 341118 | 0..1 341120 | BusinessTransactionDocumentItemGroupID 341122 |
| | | | | SelectionByConfirmationCreationDateTime 341124 | | 0..N 341126 | GoodsAndActivityConfirmationInventoryChangeItemOverviewSimpleByElementsQuerySelectionByConfirmationCreationDateTime 341128 |
| | | | | | InclusionExclusionCode 341130 | 0..1 341132 | InclusionExclusionCode 341134 |
| | | | | | IntervalBoundaryTypeCode 341136 | 1 341138 | IntervalBoundaryTypeCode 341140 |
| | | | | | LowerBoundaryConfirmationCreationDateTime 341142 | 0..1 341144 | GLOBAL_DateTime 341146 |
| | | | | | UpperBoundaryConfirmationCreationDateTime 341148 | 0..1 341150 | GLOBAL_DateTime 341152 |

FIG. 34-37

| Package | | Level 1 | Level 2 | Level 3 | Level 4 | Cardinality | Data Type Name |
|---|---|---|---|---|---|---|---|
| | | | | SelectionByConfirmationBusinessTransactionDateTime 341154 | | 0..N 341156 | GACCnfInvltOvSBEIQuerySelectionByConfirmationBusinessTransactionDateTime 341158 |
| | | | | | InclusionExclusionCode 341160 | 0..1 341162 | InclusionExclusionCode 341164 |
| | | | | | IntervalBoundaryTypeCode 341166 | 1 341168 | IntervalBoundaryTypeCode 341170 |
| | | | | | LowerBoundaryConfirmationBusinessTransactionDateTime 341172 | 0..1 341174 | GLOBAL_DateTime 341176 |
| | | | | | UpperBoundaryConfirmationBusinessTransactionDateTime 341178 | 0..1 341180 | GLOBAL_DateTime 341182 |

FIG. 34-38

| Package | | Level 1 | Level 2 | Level 3 | Level 4 | Cardinality | Data Type Name |
|---|---|---|---|---|---|---|---|
| | | | | SelectionByConfirmationCancellationStatusCode 341184 | | 0..N 341186 | GACCnfInvItOvSBEIQuerySelectionByConfirmationCancellationStatusCode 341188 |
| | | | | | InclusionExclusionCode 341190 | 0..1 341192 | InclusionExclusionCode 341194 |
| | | | | | IntervalBoundaryTypeCode 341196 | 1 341198 | IntervalBoundaryTypeCode 341200 |
| | | | | | LowerBoundaryConfirmationCancellationStatusCode 341202 | 0..1 341204 | CancellationStatusCode 341206 |
| | | | | | UpperBoundaryConfirmationCancellationStatusCode 341208 | 0..1 341210 | CancellationStatusCode 341212 |

FIG. 34-39

| Package | | Level 1 | Level 2 | Level 3 | Level 4 | Cardinality | Data Type Name |
|---|---|---|---|---|---|---|---|
| | | | | SelectionByConfirmationCancellationDocumentIndicator 341214 | | 0..N 341216 | GACCnfInvItOvSBEIQuerySelectionByConfirmationCancellationDocumentIndicator 341218 |
| | | | | | InclusionExclusionCode 341220 | 0..1 341222 | InclusionExclusionCode 341224 |
| | | | | | IntervalBoundaryTypeCode 341226 | 1 341228 | IntervalBoundaryTypeCode 341230 |
| | | | | | LowerBoundaryConfirmationCancellationDocumentIndicator 341232 | 0..1 341234 | Indicator 341236 |
| | | | | | UpperBoundaryConfirmationCancellationDocumentIndicator 341238 | 0..1 341240 | Indicator 341242 |

FIG. 34-40

| Package | | Level 1 | Level 2 | Level 3 | Level 4 | Cardinality | Data Type Name |
|---|---|---|---|---|---|---|---|
| | | | | SelectionByConfirmationCancelledConfirmationUUID 341244 | | 0..N 341246 | GACCnfInvltOvSBEIQuerySelectionByConfirmationCancelledConfirmationUUID 341248 |
| | | | | | InclusionExclusionCode 341250 | 0..1 341252 | InclusionExclusionCode 341254 |
| | | | | | IntervalBoundaryTypeCode 341256 | 1 341258 | IntervalBoundaryTypeCode 341260 |
| | | | | | LowerBoundaryConfirmationCancelledConfirmationUUID 341262 | 0..1 341264 | UUID 341266 |
| | | | | | UpperBoundaryConfirmationCancelledConfirmationUUID 341268 | 0..1 341270 | UUID 341272 |

FIG. 34-41

| Package | | Level 1 | Level 2 | Level 3 | Level 4 | Cardinality | Data Type Name |
|---|---|---|---|---|---|---|---|
| | | | | SelectionByConfirmationCompanyID 341274 | | 0..N 341276 | GoodsAndActivityConfirmationInventoryChangeItemOverviewSimpleByElementsQuerySelectionByConfirmationCompanyID 341278 |
| | | | | | InclusionExclusionCode 341280 | 0..1 341282 | InclusionExclusionCode 341284 |
| | | | | | IntervalBoundaryTypeCode 341286 | 1 341288 | IntervalBoundaryTypeCode 341290 |
| | | | | | LowerBoundaryConfirmationCompanyID 341292 | 0..1 341294 | OrganisationalCentreID 341296 |
| | | | | | UpperBoundaryConfirmationCompanyID 341298 | 0..1 341300 | OrganisationalCentreID 341302 |

FIG. 34-42

| Package | | Level 1 | Level 2 | Level 3 | Level 4 | Cardinality | Data Type Name |
|---|---|---|---|---|---|---|---|
| | | | | SelectionByConfirmationCompanyUUID 341304 | | 0..N 341306 | GoodsAndActivityConfirmationInventoryChangeItemOverviewSimpleByElementsQuerySelectionByConfirmationCompanyUUID 341308 |
| | | | | | InclusionExclusionCode 341310 | 0..1 341312 | InclusionExclusionCode 341314 |
| | | | | | IntervalBoundaryTypeCode 341316 | 1 341318 | IntervalBoundaryTypeCode 341320 |
| | | | | | LowerBoundaryConfirmationCompanyUUID 341322 | 0..1 341324 | UUID 341326 |
| | | | | | UpperBoundaryConfirmationCompanyUUID 341328 | 0..1 341330 | UUID 341332 |

FIG. 34-43

| Package | | Level 1 | Level 2 | Level 3 | Level 4 | Cardinality | Data Type Name |
|---|---|---|---|---|---|---|---|
| | | | | SelectionByConfirmationID 341334 | | 0..N 341336 | GoodsAndActivityConfirmationInventoryChangeItemOverviewSimpleByElementsQuerySelectionByConfirmationID 341338 |
| | | | | | InclusionExclusionCode 341340 | 0..1 341342 | InclusionExclusionCode 341344 |
| | | | | | IntervalBoundaryTypeCode 341346 | 1 341348 | IntervalBoundaryTypeCode 341350 |
| | | | | | LowerBoundaryConfirmationID 341352 | 0..1 341354 | BusinessTransactionDocumentID 341356 |
| | | | | | UpperBoundaryConfirmationID 341358 | 0..1 341360 | BusinessTransactionDocumentID 341362 |
| | | | | SelectionByConfirmationUUID 341364 | | 0..N 341366 | GoodsAndActivityConfirmationInventoryChangeItemOverviewSimpleByElementsQuerySelectionByConfirmationUUID 341368 |

FIG. 34-44

| Package | | Level 1 | Level 2 | Level 3 | Level 4 | Cardinality | Data Type Name |
|---|---|---|---|---|---|---|---|
| | | | | | InclusionExclusionCode 341370 | 0..1 341372 | InclusionExclusionCode 341374 |
| | | | | | IntervalBoundaryTypeCode 341376 | 1 341378 | IntervalBoundaryTypeCode 341380 |
| | | | | | LowerBoundaryConfirmationUUID 341382 | 0..1 341384 | UUID 341386 |
| | | | | | UpperBoundaryConfirmationUUID 341388 | 0..1 341390 | UUID 341392 |
| | ProcessingConditions 341394 | | ProcessingConditions 341396 | | | 1 341398 | QueryProcessingConditions 341400 |

FIG. 35-1

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| Goods and Activity Confirmation Inventory Change Item Overview Simple by Elements Response _sync 350000 | | | | Goods and Activity Confirmation Inventory Change Item Overview Simple by Elements Response _sync 350002 | | | | | | | | GoodsAndActivityConfirmationInventoryChangeItemOverviewSimpleByElementsResponseMessage_sync 350004 |
| | GoodsAndActivityConfirmationInventoryChangeItemOverview 350006 | | | | GoodsAndActivityConfirmationInventoryChangeItemOverview 350008 | | | | | | 0..N 350010 | GoodsAndActivityConfirmationInventoryChangeItemOverviewSimpleByElementsResponse 350012 |

FIG. 35-2

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | GoodsAndActivityConfirmationUUID 350014 | | | | | 0..1 350016 | UUID 350018 |
| | | | | | | GoodsAndActivityConfirmationID 350020 | | | | | 0..1 350022 | BusinessTransactionDocumentID 350024 |
| | | | | | | GoodsAndActivityConfirmationInventoryChangeItemUUID 350026 | | | | | 0..1 350028 | UUID 350030 |

FIG. 35-3

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | ChangeReasonCode 350032 | | | | | 0..1 350034 | InventoryChangeReasonCode 350036 |
| | | | | | | ChangeReasonName 350038 | | | | | 0..1 350040 | LANGUAGEINDEPENDENT_LONG_Name 350042 |
| | | | | | | ID 350044 | | | | | 0..1 350046 | BusinessTransactionDocumentItemID 350048 |
| | | | | | | InventoryMovementDirectionCode 350050 | | | | | 0..1 350052 | InventoryMovementDirectionCode 350054 |
| | | | | | | InventoryMovementDirectionName 350056 | | | | | 0..1 350058 | LANGUAGEINDEPENDENT_LONG_Name 350060 |

FIG. 35-4

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | InventoryRelevanceIndicator 350062 | | | | | 0..1 350064 | Indicator 350066 |
| | | | | | | InventoryManagedQuantity 350068 | | | | | 0..1 350070 | Quantity 350072 |
| | | | | | | InventoryManagedQuantityTypeCode 350074 | | | | | 0..1 350076 | QuantityTypeCode 350078 |
| | | | | | | InventoryManagedQuantityTypeName 350080 | | | | | 0..1 350082 | LANGUAGEINDEPENDENT_LONG_Name 350084 |

FIG. 35-5

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | DefaultRecordedQuantity 350086 | | | | | 0..1 350088 | Quantity 350090 |
| | | | | | | DefaultRecordedQuantityTypeCode 350092 | | | | | 0..1 350094 | QuantityTypeCode 350096 |
| | | | | | | DefaultRecordedQuantityTypeName 350098 | | | | | 0..1 350100 | LANGUAGEINDEPENDENT_LONG_Name 350102 |
| | | | | | | SiteUUID 350104 | | | | | 0..1 350106 | UUID 350108 |

FIG. 35-6

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | TransferGroupID 350110 | | | | | 0..1 350112 | BusinessTransactionDocumentItemGroupID 350114 |
| | | | | | | ConfirmationCreationDateTime 350116 | | | | | 0..1 350118 | GLOBAL_DateTime 350120 |
| | | | | | | ConfirmationBusinessTransactionDateTime 350122 | | | | | 0..1 350124 | GLOBAL_DateTime 350126 |
| | | | | | | ConfirmationCancellationStatusCode 350128 | | | | | 0..1 350130 | CancellationStatusCode 350132 |

FIG. 35-7

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | ConfirmationCancellationStatusName 350134 | | | | | 0..1 350136 | LANGUAGEINDEPENDENT_LONG_Name 350138 |
| | | | | | | ConfirmationCancellationDocumentIndicator 350140 | | | | | 0..1 350142 | Indicator 350144 |
| | | | | | | ConfirmationCancelledConfirmationUUID 350146 | | | | | 0..1 350148 | UUID 350150 |

FIG. 35-8

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | ConfirmationCompanyID 350152 | | | | | 0..1 350154 | OrganisationalCentreID 350156 |
| | | | | | | ConfirmationCompanyUUID 350158 | | | | | 0..1 350160 | UUID 350162 |
| | | | | | | ConfirmationID 350164 | | | | | 0..1 350166 | BusinessTransactionDocumentID 350168 |
| | | | | | | ConfirmationUUID 350170 | | | | | 0..1 350172 | UUID 350174 |
| | | | | | | OutboundDeliveryItemID 350176 | | | | | 0..1 350178 | BusinessTransactionDocumentItemID 350180 |

FIG. 35-9

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | OutboundDeliveryItemUUID 350182 | | | | | 0..1 350184 | UUID 350186 |
| | | | | | | OutboundDeliveryRootID 350188 | | | | | 0..1 350190 | BusinessTransactionDocumentID 350192 |
| | | | | | | OutboundDeliveryRootUUID 350194 | | | | | 0..1 350196 | UUID 350198 |
| | | | | | | OutboundDeliveryProcessingTypeCode 350200 | | | | | 0..1 350202 | BusinessTransactionDocumentProcessingTypeCode 350204 |

FIG. 35-10

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | OutboundDeliveryProcessingTypeName 350206 | | | | | 0..1 350208 | LANGUAGEINDEPENDENT_LONG_Name 350210 |
| | | | | | | OutboundDeliveryProductRecipientPartyKey 350212 | | | | | 0..1 350214 | GoodsAndActivityConfirmationInventoryChangeItemOverviewSimpleByElementsResponseOutboundDeliveryProductRecipientPartyKey 350216 |
| | | | | | | | PartyTypeCode 350218 | | | | 0..1 350220 | BusinessObjectTypeCode 350222 |
| | | | | | | | PartyTypeName 350224 | | | | 0..1 350226 | LANGUAGEINDEPENDENT_LONG_Name 350228 |

FIG. 35-11

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | | PartyID 350230 | | | | 0..1 350232 | PartyID 350234 |
| | | InventoryLocation 350236 | | | | InventoryLocation 350238 | | | | | 0..1 350240 | GoodsAndActivityConfirmationInventoryChangeItemOverviewSimpleByElementsResponseInventoryLocation 350242 |
| | | | | | | | InventoryTypeCode 350244 | | | | 0..1 350246 | InventoryTypeCode 350248 |
| | | | | | | | InventoryTypeName 350250 | | | | 0..1 350252 | LANGUAGEINDEPENDENT_LONG_Name 350254 |
| | | | | | | | LocationUUID 350256 | | | | 0..1 350258 | UUID 350260 |
| | | | | | | | LocationID 350262 | | | | 0..1 350264 | LocationID 350266 |

FIG. 35-12

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | | CustodianPartyUUID 350268 | | | | 0..1 350270 | UUID 350272 |
| | | | | | | | CustodianPartyInternalID 350274 | | | | 0..1 350276 | BusinessPartnerInternalID 350278 |
| | | | | | | | LogisticsAreaUUID 350280 | | | | 0..1 350282 | UUID 350284 |
| | | | | | | | LogisticsAreaKey 350286 | | | | 0..1 350288 | GoodsAndActivityConfirmationInventoryChangeItemOverviewSimpleByElementsResponseInventoryLocationLogisticsAreaKey 350290 |
| | | | | | | | | ID 350292 | | | 0..1 350294 | LogisticsAreaID 350296 |

FIG. 35-13

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | | | SiteID 350298 | | | 0..1 350300 | LocationID 350302 |
| | | | | | | | InventoryManagedLocationUUID 350304 | | | | 0..1 350306 | UUID 350308 |
| | | | | | | | InventoryManagedLogisticsArea UUID 350310 | | | | 0..1 350312 | UUID 350314 |
| | | | | | | | PermanentEstablishmentUUID 350316 | | | | 0..1 350318 | UUID 350320 |

FIG. 35-14

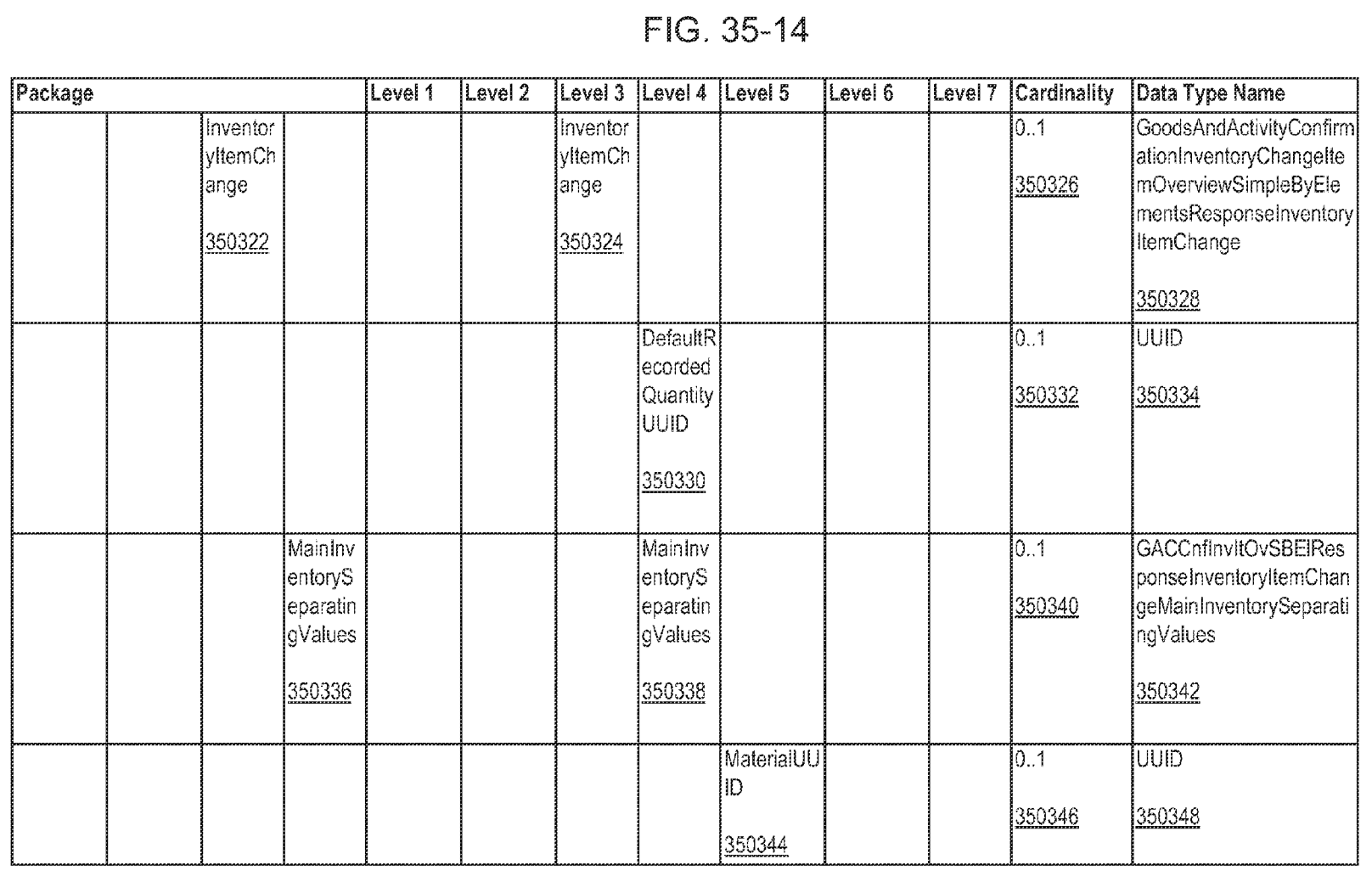

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | InventoryItemChange 350322 | | | | InventoryItemChange 350324 | | | | | 0..1 350326 | GoodsAndActivityConfirmationInventoryChangeItemOverviewSimpleByElementsResponseInventoryItemChange 350328 |
| | | | | | | | DefaultRecordedQuantityUUID 350330 | | | | 0..1 350332 | UUID 350334 |
| | | | MainInventorySeparatingValues 350336 | | | | MainInventorySeparatingValues 350338 | | | | 0..1 350340 | GACCnfInvItOvSBEIResponseInventoryItemChangeMainInventorySeparatingValues 350342 |
| | | | | | | | | MaterialUUID 350344 | | | 0..1 350346 | UUID 350348 |

FIG. 35-15

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | | | MaterialKey 350350 | | | 0..1 350352 | GACCnfInvItOvSBEIResponseInventoryItemChangeMainInventorySeparatingValuesMaterialKey 350354 |
| | | | | | | | | | ProductTypeCode 350356 | | 0..1 350358 | ProductTypeCode 350360 |
| | | | | | | | | | ProductTypeName 350362 | | 0..1 350364 | LANGUAGEINDEPENDENT_LONG_Name 350366 |
| | | | | | | | | | ProductIdentifierTypeCode 350368 | | 0..1 350370 | ProductIdentifierTypeCode 350372 |
| | | | | | | | | | ProductIdentifierTypeName 350374 | | 0..1 350376 | LANGUAGEINDEPENDENT_LONG_Name 350378 |
| | | | | | | | | | ProductID 350380 | | 0..1 350382 | ProductID 350384 |

FIG. 35-16

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | | | OwnerPartyUUID 350386 | | | 0..1 350388 | UUID 350390 |
| | | | | | | | | OwnerPartyID 350392 | | | 0..1 350394 | BusinessPartnerInternalID 350396 |
| | | | | | | | | SupplyPlanningAreaUUID 350398 | | | 0..1 350400 | UUID 350402 |
| | | | | | | | | SupplyPlanningAreaID 350404 | | | 0..1 350406 | SupplyPlanningAreaID 350408 |
| | | | | | | | | InventoryRestrictedUseIndicator 350410 | | | 0..1 350412 | Indicator 350414 |

FIG. 35-17

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | IdentifiedStockInventorySeparatingValues 350416 | | | | IdentifiedStockInventorySeparatingValues 350418 | | | | 0..1 350420 | GACCnfInvItOvSBEIResponseInventoryItemChangeIdentifiedStockInventorySeparatingValues 350422 |
| | | | | | | | | IdentifiedStockUUID 350424 | | | 0..1 350426 | UUID 350428 |
| | | | | | | | | IdentifiedStockKey 350430 | | | 0..1 350432 | GACCnfInvItOvSBEIResponseInventoryItemChangeIdentifiedStockInventorySeparatingValuesIdentifiedStockKey 350434 |
| | | | | | | | | | ID 350436 | | 0..1 350438 | IdentifiedStockID 350440 |

FIG. 35-18

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | | | | MaterialKey 350442 | | 0..1 350444 | GACCnfInvItOvSBEIResponseInventoryItemChangeIdentifiedStockInventorySeparatingValuesIdentifiedStockKeyMaterialKey 350446 |
| | | | | | | | | | | ProductTypeCode 350448 | 0..1 350450 | ProductTypeCode 350452 |
| | | | | | | | | | | ProductTypeName 350454 | 0..1 350456 | LANGUAGEINDEPENDENT_LONG_Name 350458 |
| | | | | | | | | | | ProductIdentifierTypeCode 350460 | 0..1 350462 | ProductIdentifierTypeCode 350464 |

FIG. 35-19

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | | | | | ProductIdentifierTypeName 350466 | 0..1 350468 | LANGUAGEINDEPENDENT_LONG_Name 350470 |
| | | | | | | | | | | ProductID 350472 | 0..1 350474 | ProductID 350476 |
| | | | SpecialStockSeparatingValues 350478 | | | | SpecialStockSeparatingValues 350480 | | | | 0..1 350482 | GACCnfInvItOvSBEIResponseInventoryItemChangeSpecialStockSeparatingValues 350484 |
| | | | | | | | | OutboundDeliveryReference 350486 | | | 0..1 350488 | GACCnfInvItOvSBEIResponseInventoryItemChangeSpecialStockSeparatingValuesOutboundDeliveryReference 350490 |
| | | | | | | | | | ID 350492 | | 0..1 350494 | BusinessTransactionDocumentID 350496 |

FIG. 35-20

| Package | | | | Level 1 | Level 2 | Level 3 | Level 4 | Level 5 | Level 6 | Level 7 | Cardinality | Data Type Name |
|---|---|---|---|---|---|---|---|---|---|---|---|---|
| | | | | | | | | | UUID<br>350498 | | 0..1<br>350500 | UUID<br>350502 |
| | | | | | | | | SiteLogisticsLotUUID<br>350504 | | | 0..1<br>350506 | UUID<br>350508 |
| | | | | | | | | SiteLogisticsLotID<br>350510 | | | 0..1<br>350512 | BusinessTransactionDocumentID<br>350514 |
| | ProcessingConditions<br>350516 | | | | ProcessingConditions<br>350518 | | | | | | 1<br>350520 | ResponseProcessingConditions<br>350522 |
| | Log<br>350524 | | | | Log<br>350526 | | | | | | 1<br>350528 | Log<br>350530 |

CONSISTENT INTERFACE FOR GOODS AND ACTIVITY CONFIRMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

Some details of the subject matter of this specification are described in previously-filed U.S. patent application Ser. No. 11/803,178, entitled "Consistent Set of Interfaces Derived From a Business Object Model", filed on May 11, 2007, which is hereby incorporated by reference.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a computer-readable medium includes program code for providing a message-based interface for exchanging information about goods and activity confirmation inventory change items. The medium comprises program code for receiving, via a message-based interface exposing at least one service as defined in a service registry and from a heterogeneous application executing in an environment of computer systems providing message-based services, a first message for a query about an overview of goods and activity confirmation inventory change items. The first message includes a message package hierarchically organized as a goods and activity confirmation inventory change item overview simple by elements query sync message entity, a goods and activity confirmation inventory change item overview simple selection by elements package including a goods and activity confirmation inventory change item overview simple selection by elements entity, and a processing conditions package including a processing conditions entity. The goods and activity confirmation inventory change item overview simple selection by elements entity includes at least one of the following: at least one selection by inventory location inventory type code, at least one selection by inventory location location universal unique identifier (UUID), at least one selection by inventory location location identifier (ID), and at least one selection by inventory location custodian party UUID. The medium further comprises program code for sending a second message to the heterogeneous application responsive to the first message.

Implementations can include the following. The goods and activity confirmation inventory change item overview simple selection by elements entity further includes at least one of the following: at least one selection by inventory location custodian party internal ID, at least one selection by inventory location logistics area UUID, at least one selection by inventory location logistics area key ID, at least one selection by inventory location logistics area key site ID, at least one selection by inventory location inventory managed location UUID, at least one selection by inventory location inventory managed logistics area UUID, at least one selection by inventory location permanent establishment UUID, at least one selection by inventory item change main inventory separating values material UUID, at least one selection by inventory item change main inventory separating values material key product type code, at least one selection by inventory item change main inventory separating values material key product identifier type code, at least one selection by inventory item change main inventory separating values material key product ID, at least one selection by inventory item change main inventory separating values owner party UUID, at least one selection by inventory item change main inventory separating values owner party ID, at least one selection by inventory item change main inventory separating values supply planning area UUID, at least one selection by inventory item change main inventory separating values supply planning area ID, at least one selection by inventory item change main inventory separating values inventory restricted use indicator, at least one selection by inventory item change identified stock inventory separating values identified stock UUID, at least one selection by inventory item change identified stock inventory separating values identified stock key ID, at least one selection by inventory item change special stock separating values outbound delivery reference ID, at least one selection by inventory item change special stock separating values outbound delivery reference UUID, at least one selection by inventory item change special stock separating values site logistics lot UUID, at least one selection by inventory item change special stock separating values site logistics lot ID, at least one selection by inventory item change default recorded quantity UUID, at least one selection by change reason code, at least one selection by ID, at least one selection by inventory movement direction code, at least one selection by inventory relevance indicator, at least one selection by inventory managed quantity, at least one selection by inventory managed quantity type code, at least one selection by default recorded quantity, at least one selection by default recorded quantity type code, at least one selection by site UUID, at least one selection by transfer group ID, at least one selection by confirmation creation date time, at least one selection by confirmation business transaction date time, at least one selection by confirmation cancellation status code, at least one selection by confirmation cancellation document indicator, at least one selection by confirmation cancelled confirmation UUID, at least one selection by confirmation company ID, at least one selection by confirmation company UUID, at least one selection by confirmation ID, and at least one selection by confirmation UUID.

In another aspect, a distributed system operates in a landscape of computer systems providing message-based services defined in a service registry. The system comprises a graphical user interface comprising computer readable instructions, embedded on tangible media, for a query about an overview of goods and activity confirmation inventory change items, the instructions using a request. The system further comprises a first memory storing a user interface controller for processing the request and involving a message including a message package hierarchically organized as a goods and activity confirmation inventory change item overview simple by elements query sync message entity, a goods and activity confirmation inventory change item overview simple selection by elements package including a goods and activity confirmation inventory change item overview simple selection by elements entity, and a processing conditions package including a processing conditions entity. The goods and activity confirmation inventory change item overview simple selection by elements entity includes at least one of the following: at least one selection by inventory location inventory type code, at least one selection by inventory location location universal unique identifier (UUID), at least one selection by inventory location location identifier (ID), and at least one selection by inventory location custodian party UUID. The system further comprises a second memory, remote from the graphical user interface, storing a plurality of service interfaces, wherein one of the service interfaces is operable to process the message via the service interface.

Implementations can include the following. The first memory is remote from the graphical user interface. The first memory is remote from the second memory.

BRIEF DESCRIPTION OF THE DRAWINGS

FIGS. 34-1 through 34-44 collectively depict an example Goods And Activity Confirmation Inventory Change Item Overview Simple By Elements Query Sync element structure.

FIGS. 35-1 through 35-20 collectively depict an example Goods And Activity Confirmation Inventory Change Item Overview Simple By Elements Response Sync element structure.

FIGS. 36-1 through 36-4 collectively depict an example Goods and Activity Confirmation object model.

DETAILED DESCRIPTION

A. Overview

Figure 1:
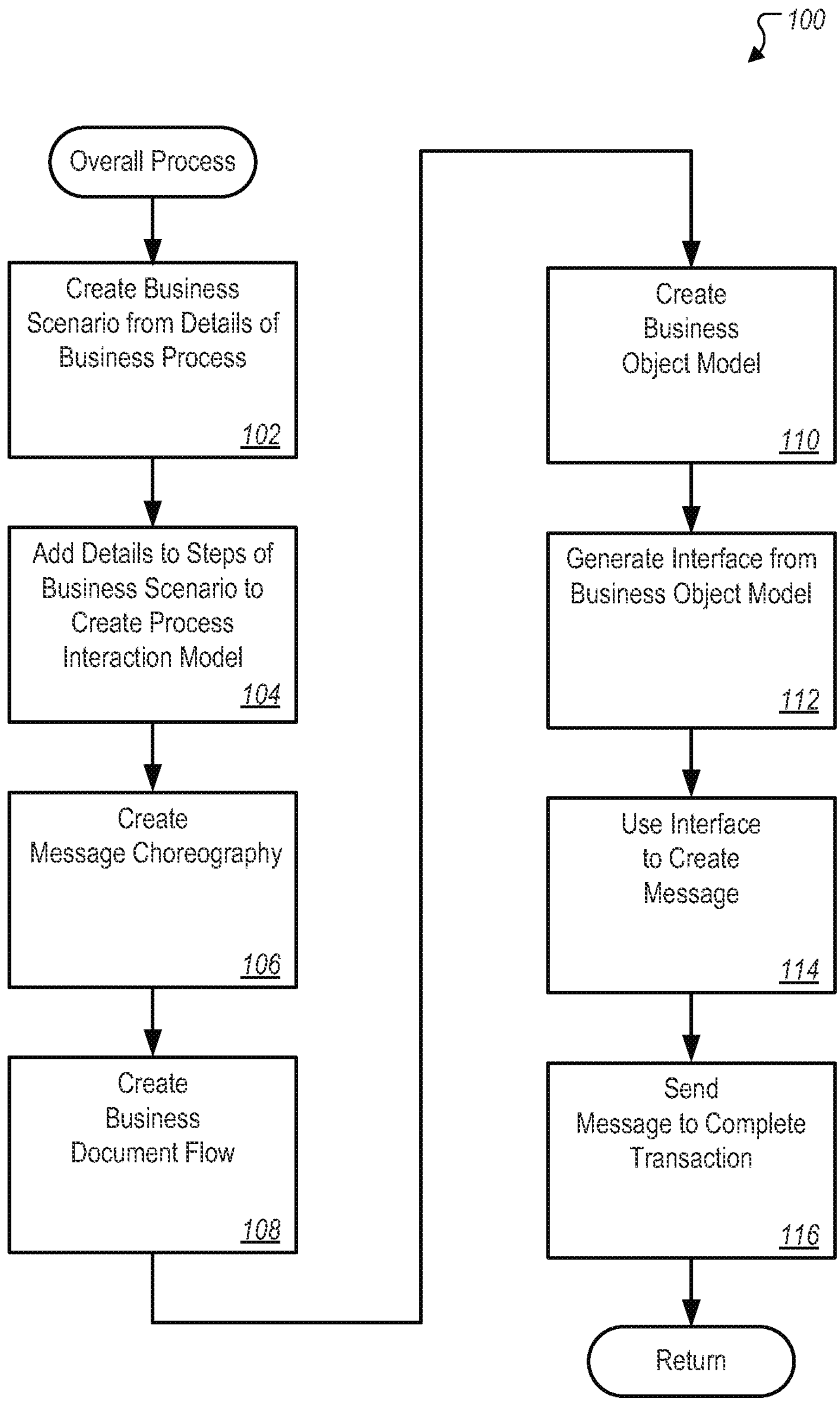
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
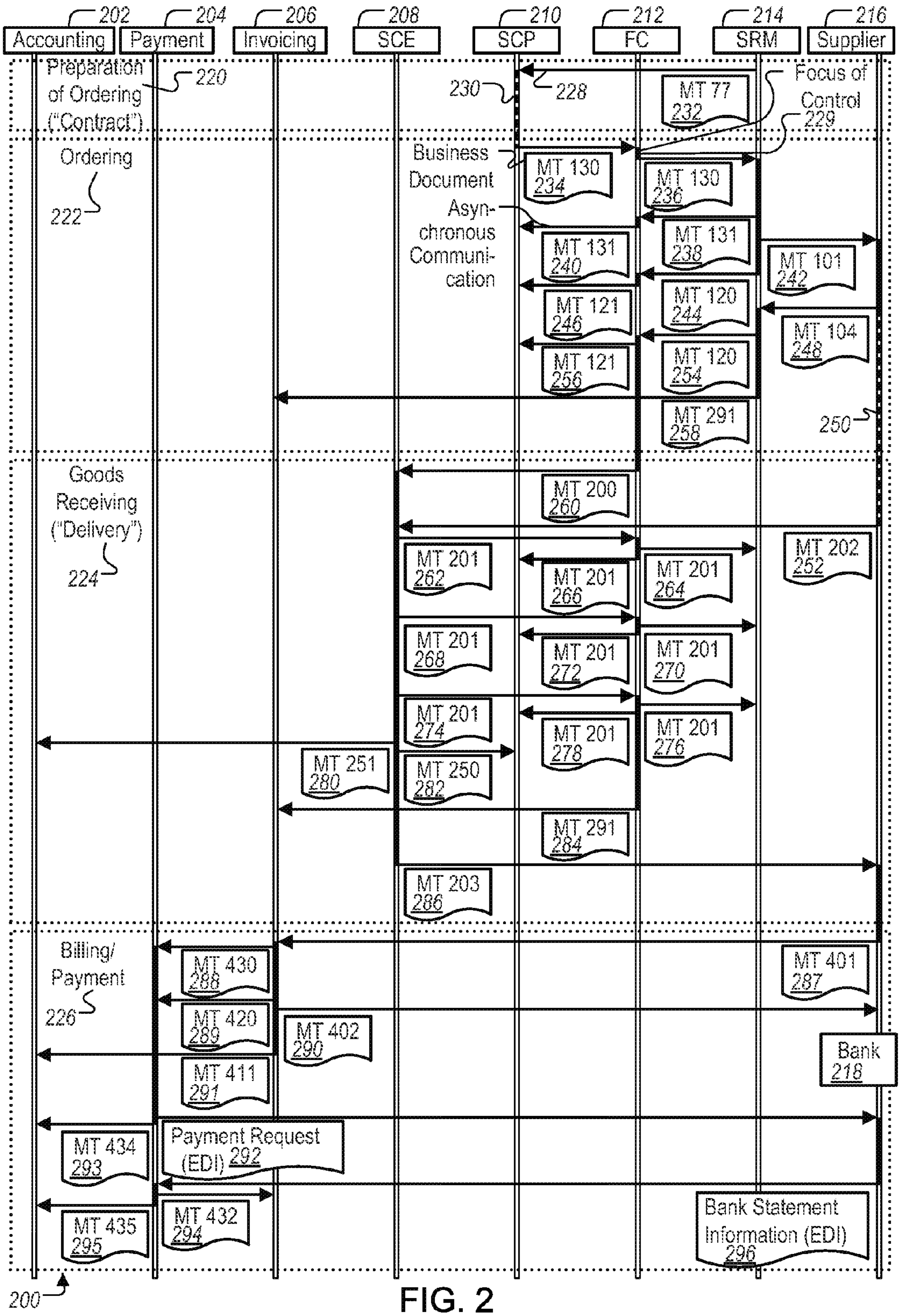
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
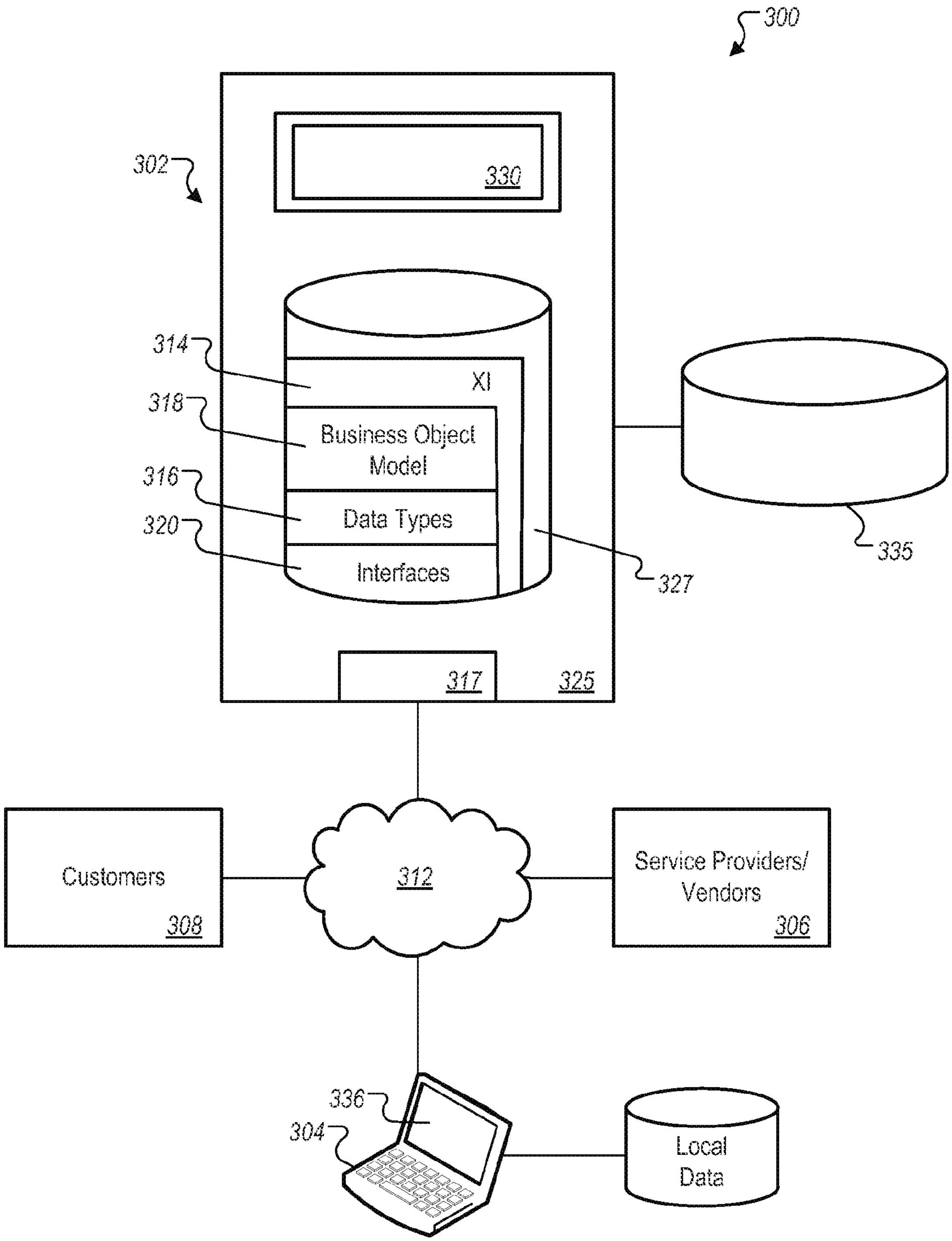
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
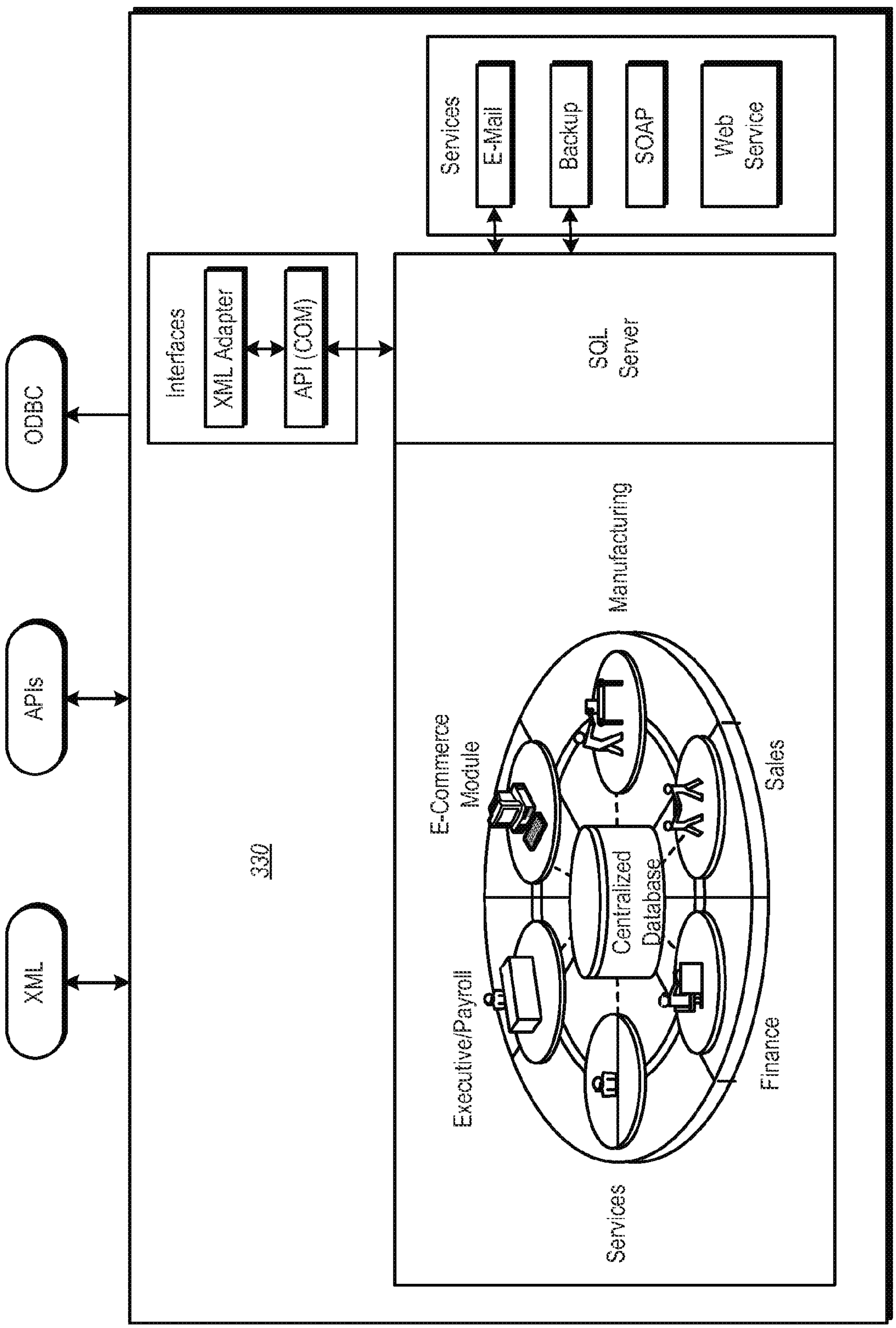
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 306 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
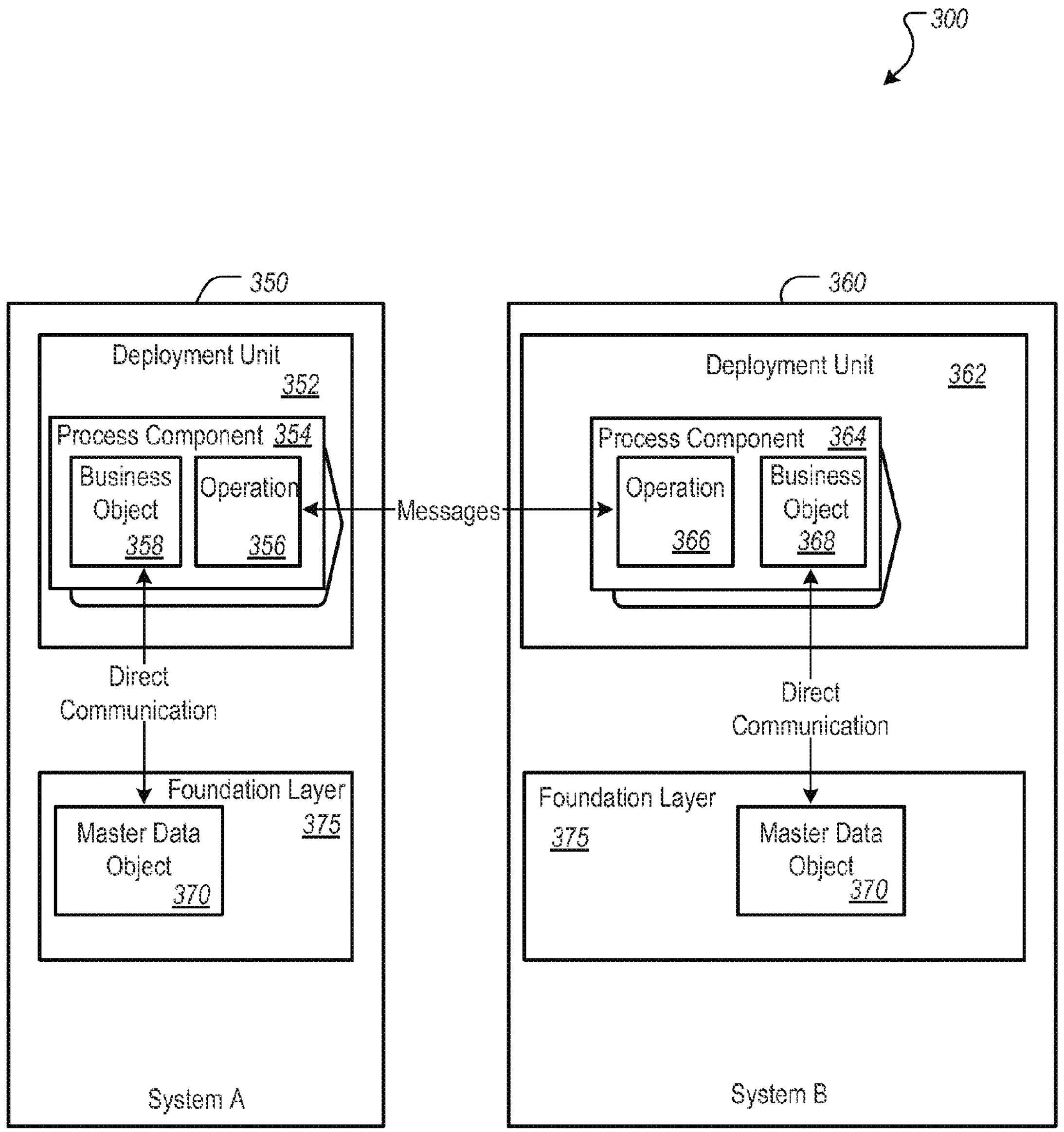

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
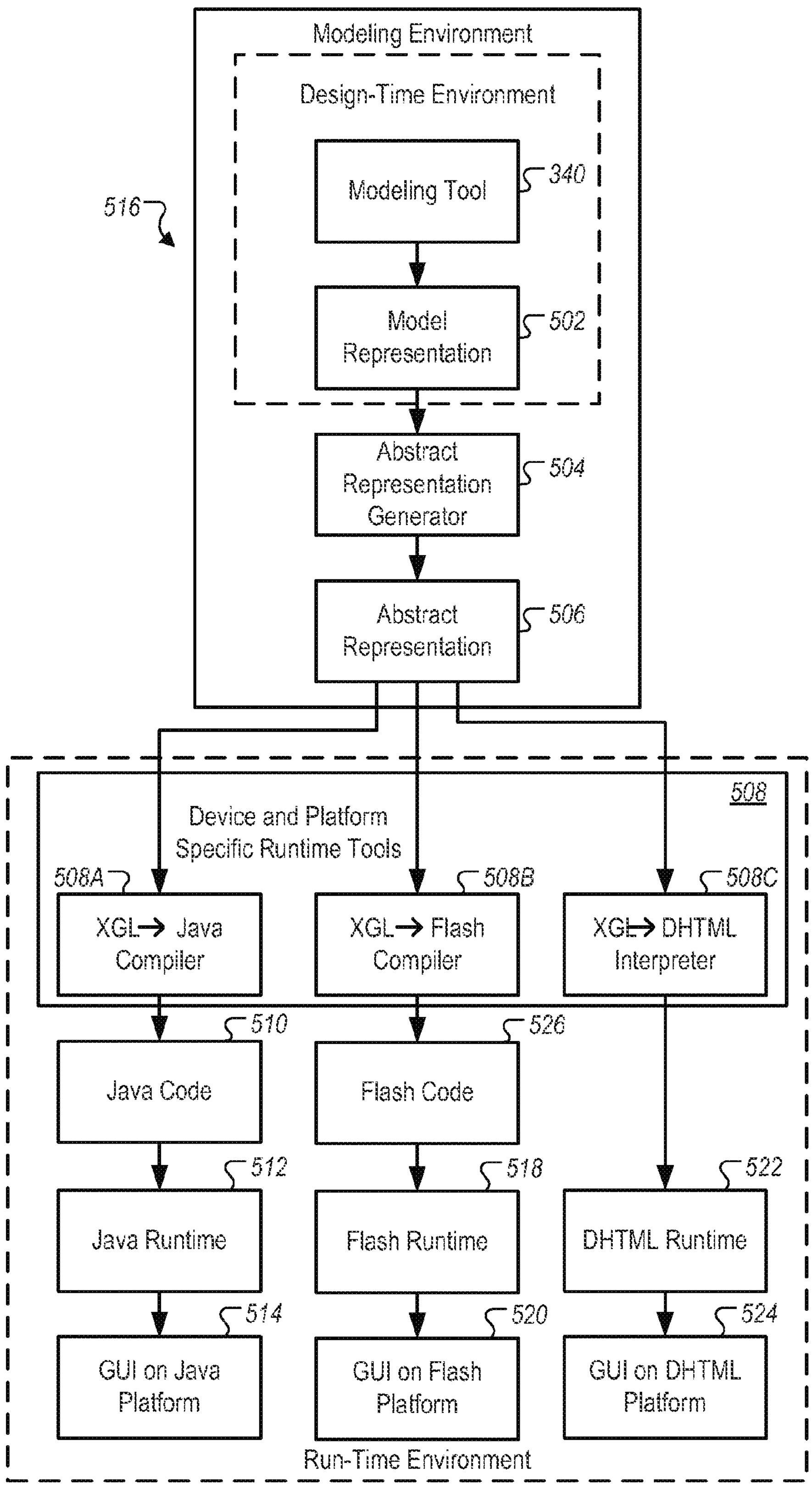
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
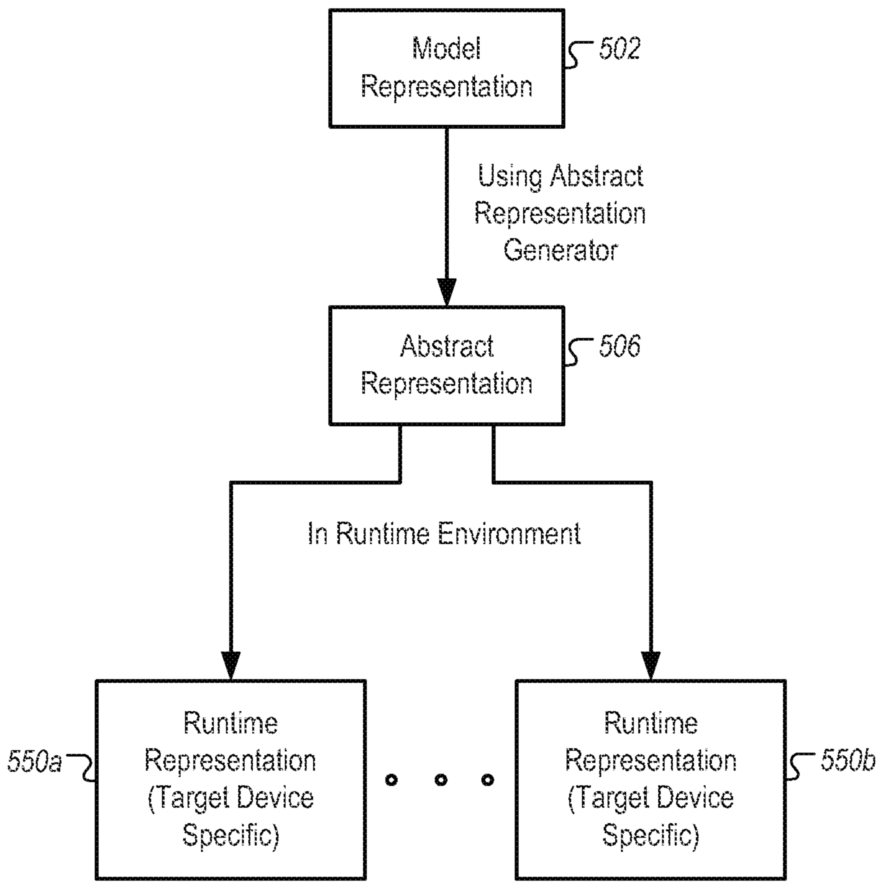
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
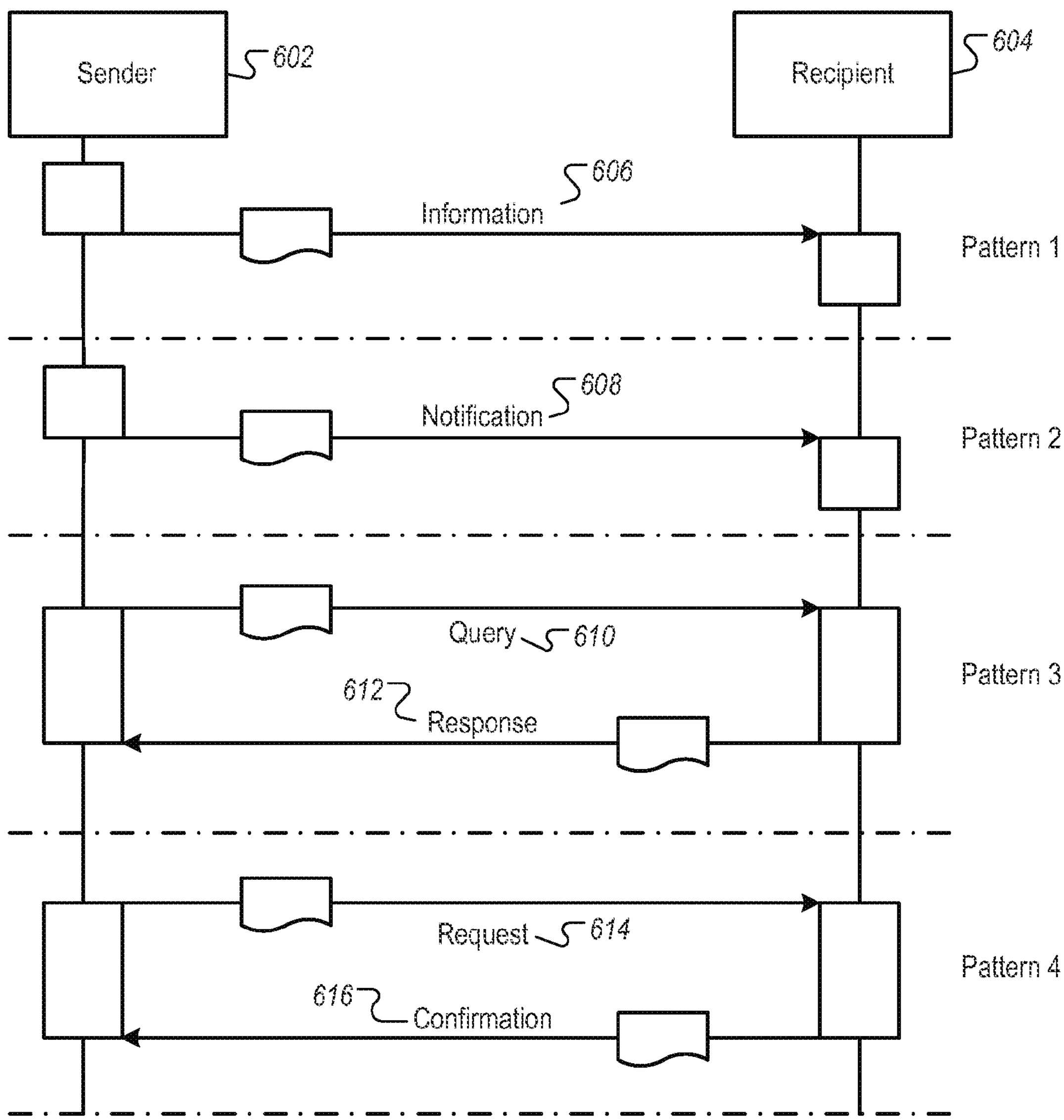
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
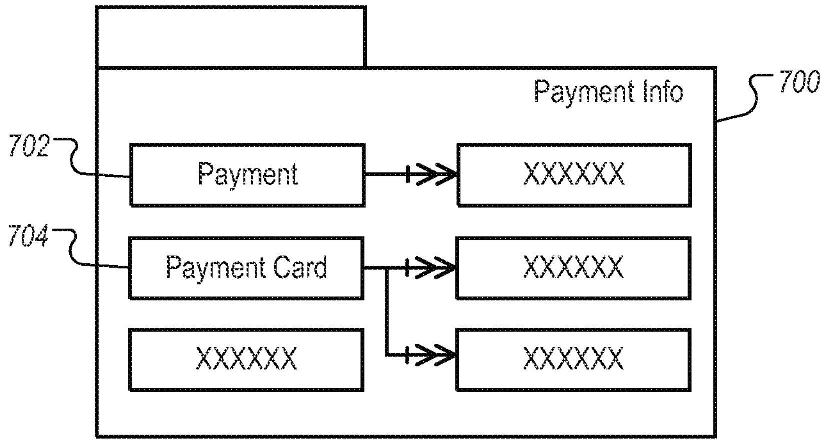
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
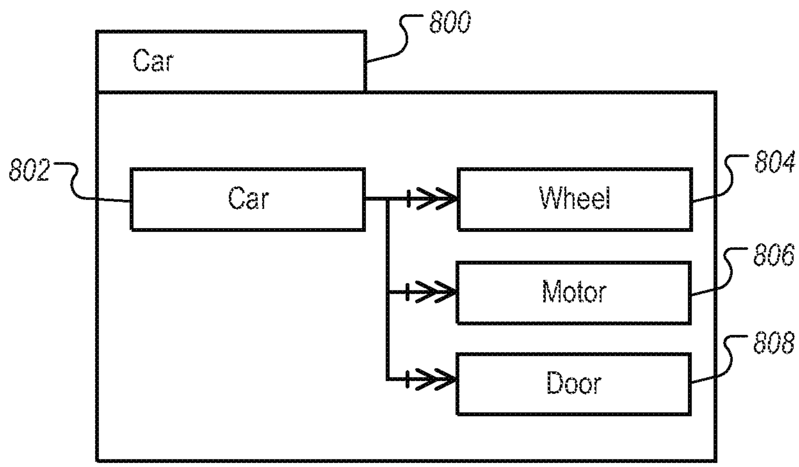
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
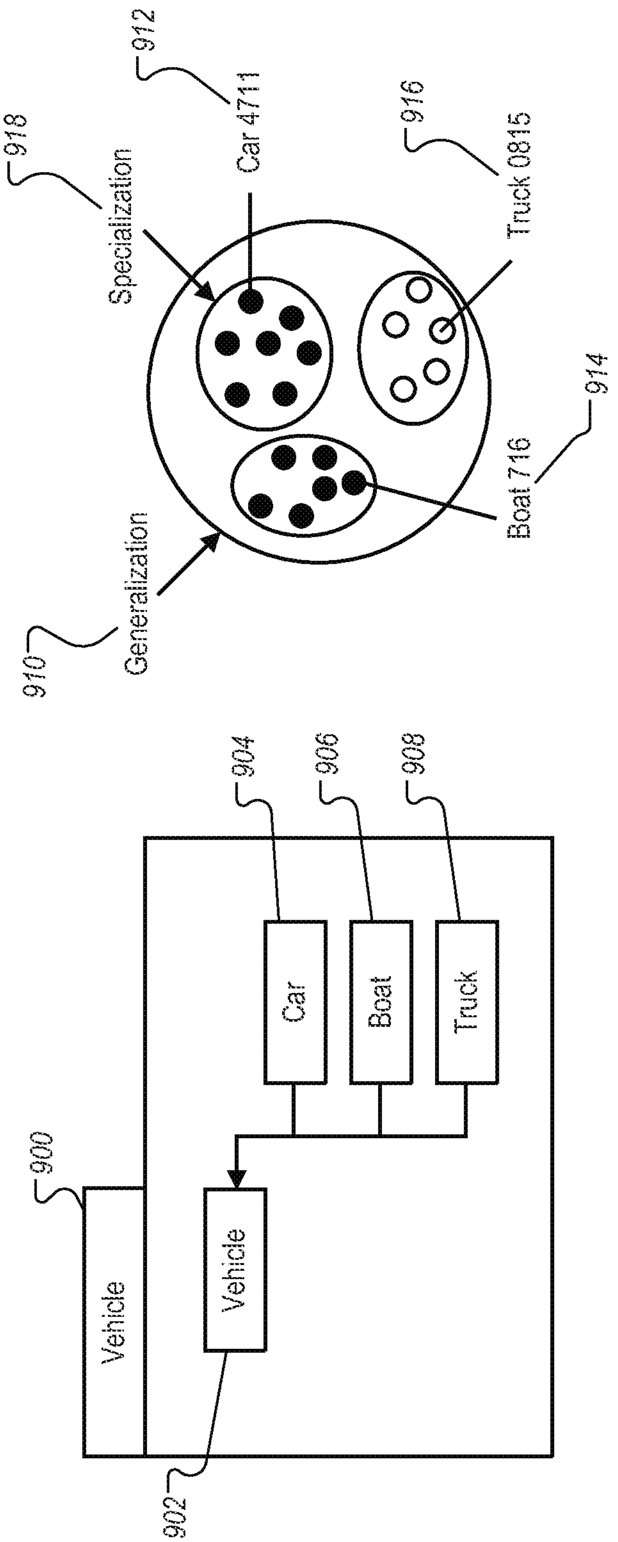
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
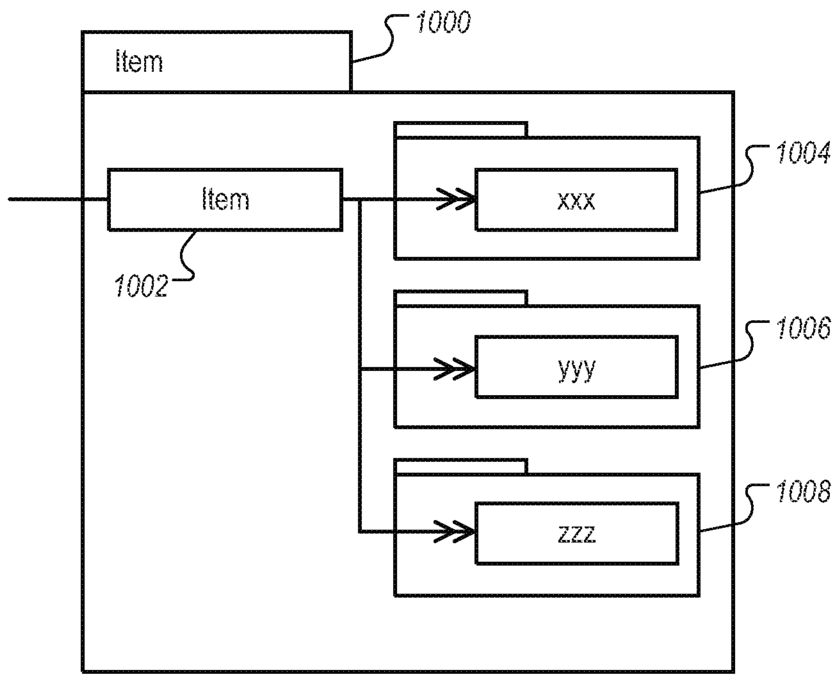
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
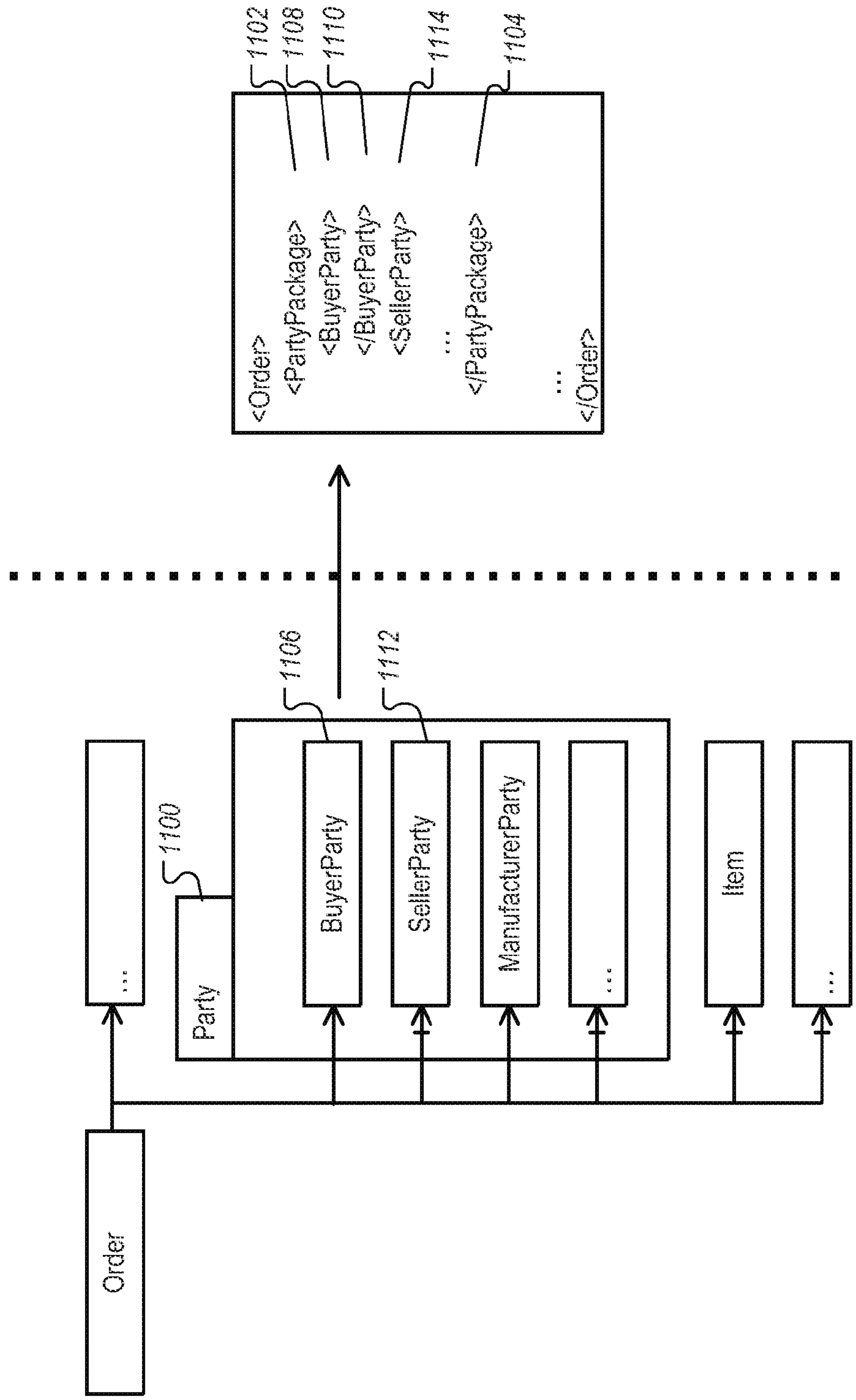
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
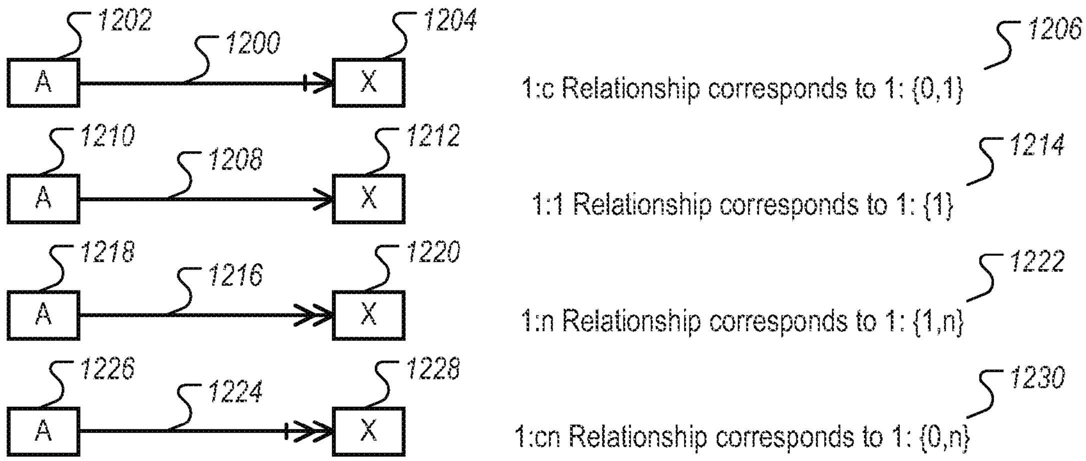
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
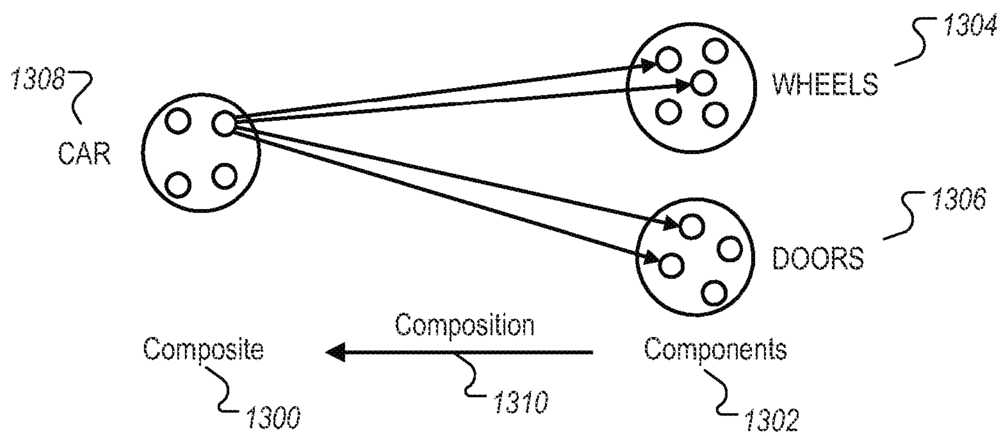
FIG. 13 depicts an example of a composition in accordance with methods and systems consistent with the subject matter described herein.
Figure 14:
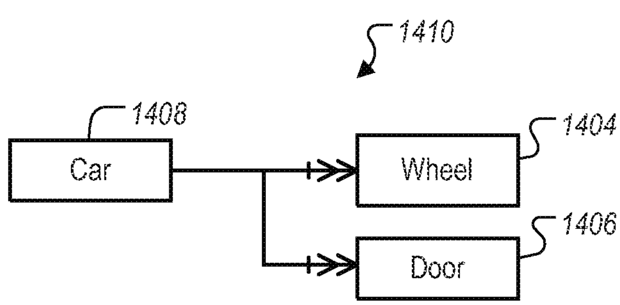
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
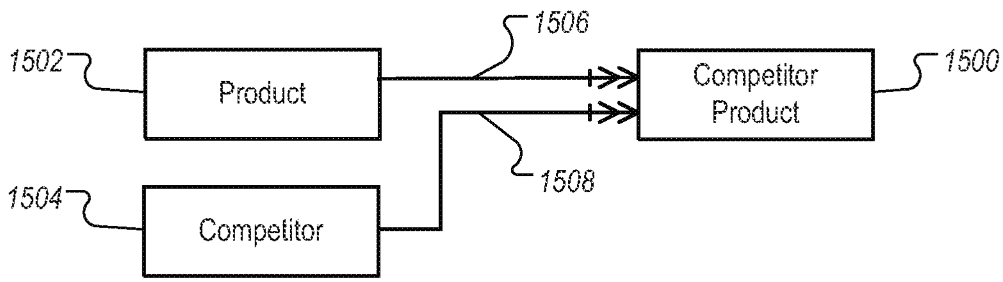
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
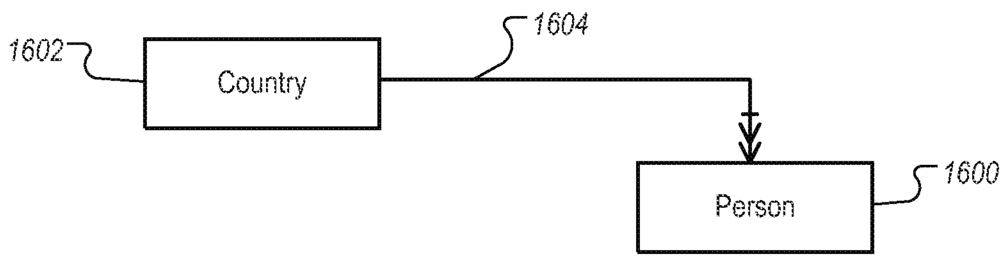
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
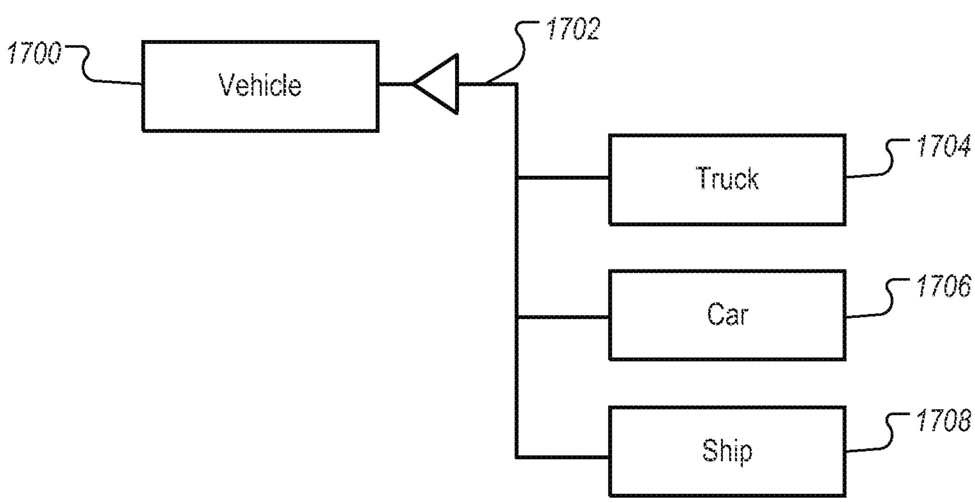
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
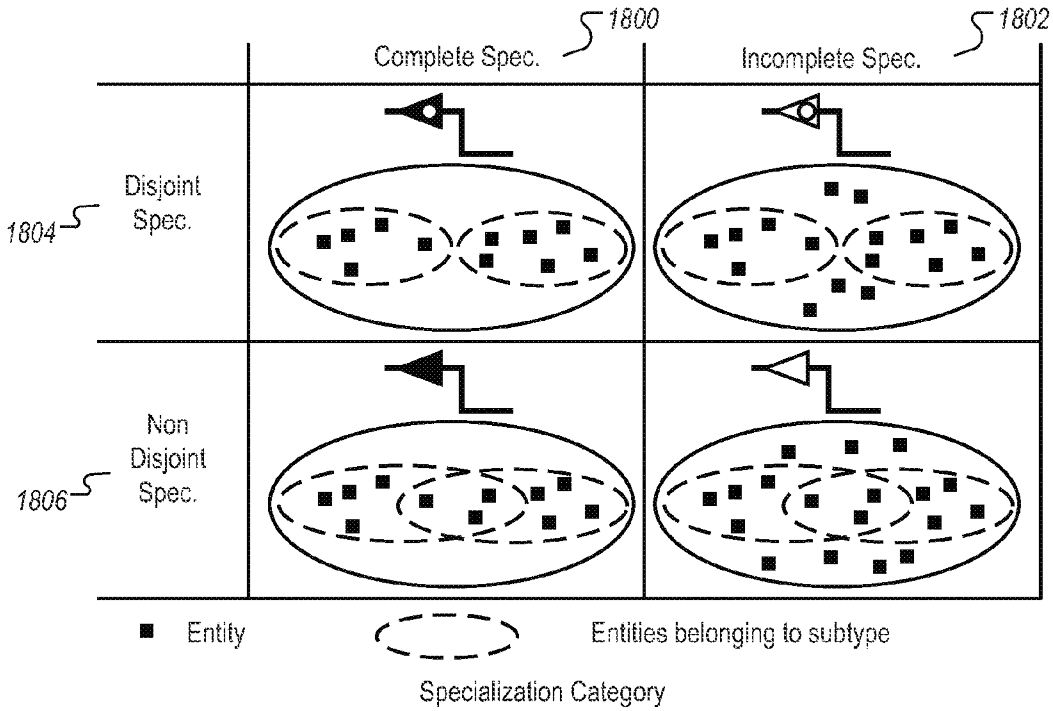
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
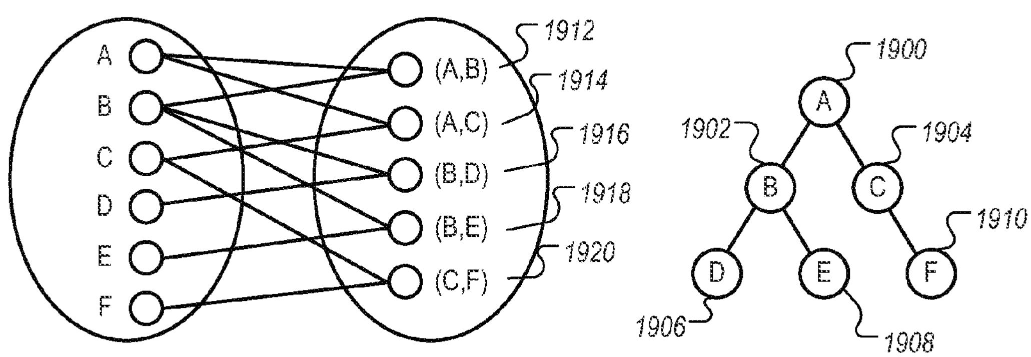
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
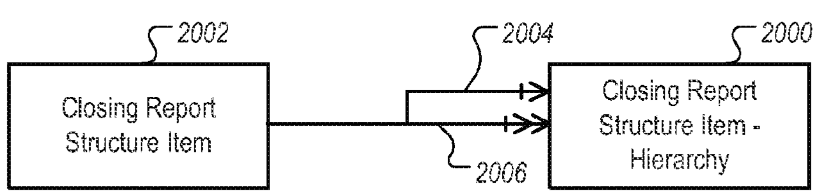
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
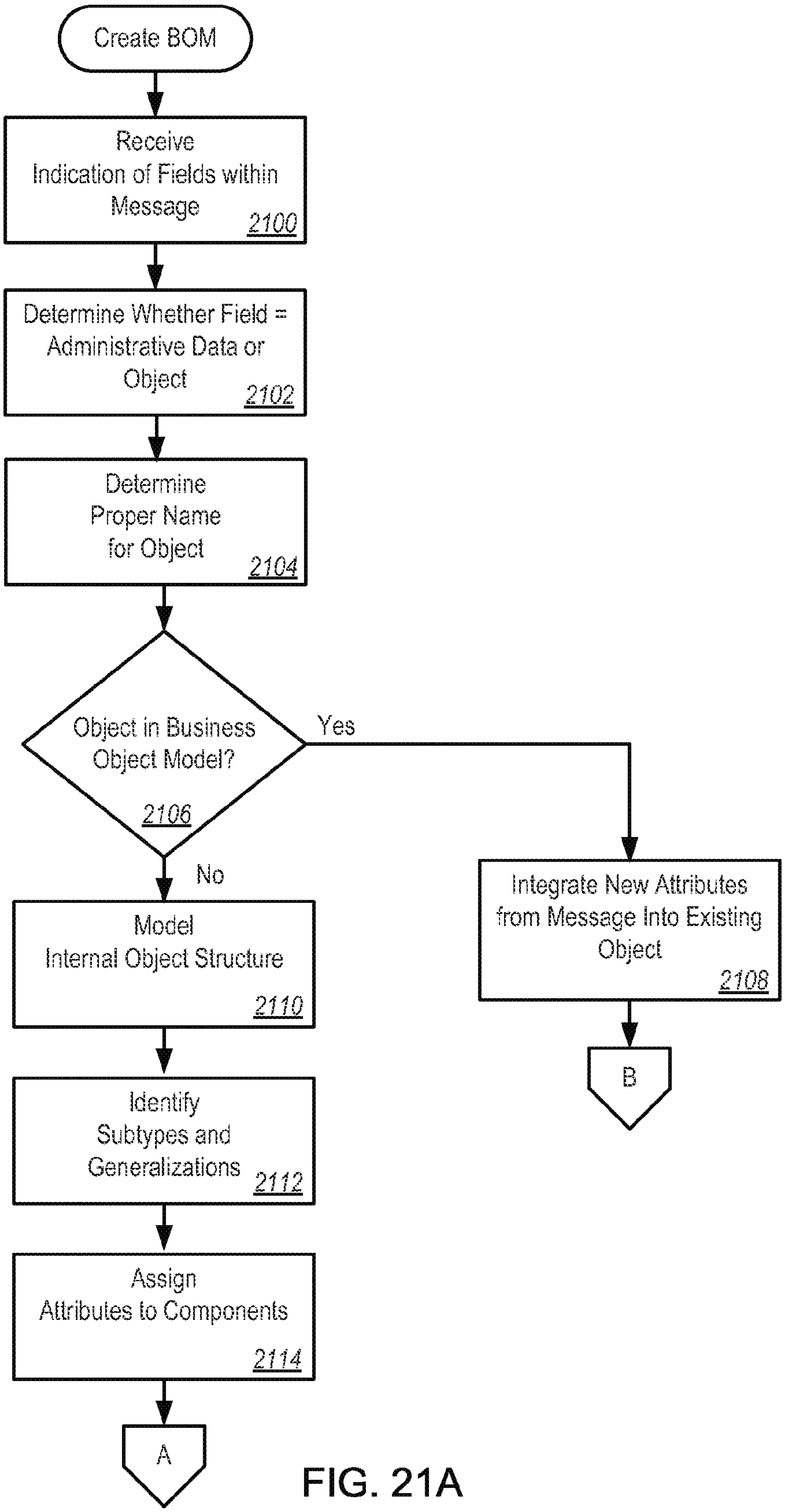
FIGS. 21A-B depict a flow diagram of the steps performed to create a business object model in accordance with methods and systems consistent with the subject matter described herein.
Figure 21B:
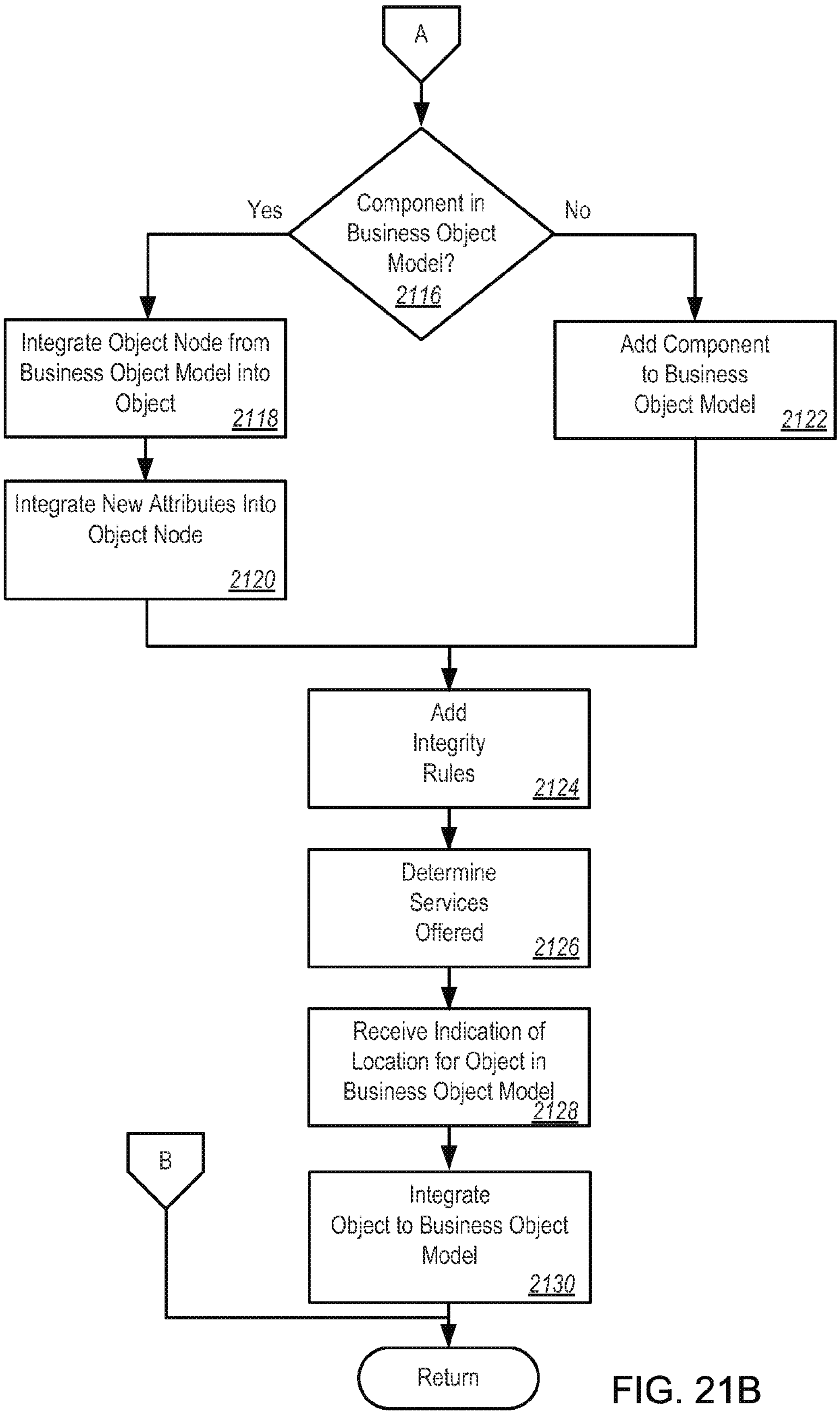

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |

-continued

| | |
|---|---|
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |

-continued

| |
|---|
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | |
|---|---|
| ID | Purchase |
| AdditionalID | Order |
| PostingDate | |

-continued

| | | |
|---|---|---|
| LastChangeDate | | |
| AcceptanceStatus | | |
| Note | | |
| CompleteTransmission Indicator | | |
| Buyer | Buyer | |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobilNumber | | |
| Facsimile | | |
| Email | | |
| ItemSeller | Seller | |
| ItemSellerAddress | | |
| ItemLocation | Location | |
| ItemLocationType | | |
| ItemDeliveryItemGroupID | | |
| ItemDeliveryPriority | | |
| ItemDeliveryCondition | | |
| ItemTransferLocation | | |
| ItemNumberofPartial Delivery | | |
| ItemQuantityTolerance | | |
| ItemMaximumLeadTime | | |
| ItemTransportServiceLevel | | |
| ItemTranportCondition | | |
| ItemTransportDescription | | |
| ContractReference | Contract | |
| QuoteReference | Quote | |
| CatalogueReference | Catalogue | |
| ItemAttachmentID | | |
| ItemAttachmentFilename | | |
| ItemDescription | | |
| ScheduleLineID | | |
| DeliveryPeriod | | |
| Quantity | | |
| ConfirmedScheduleLineID | | |
| ConfirmedDeliveryPeriod | | |
| ConfirmedQuantity | | |

During the step of modeling the internal structure, the designers also model the complete internal structure by identifying the compositions of the components and the corresponding cardinalities, as shown below.

| | | | | |
|---|---|---|---|---|
| Purchase Order | | | | 1 |
| | Buyer | | | 0..1 |
| | | Address | | 0..1 |
| | | ContactPerson | | 0..1 |
| | | | Address | 0..1 |
| | Seller | | | 0..1 |
| | Location | | | 0..1 |
| | | Address | | 0..1 |
| | DeliveryTerms | | | 0..1 |
| | | Incoterms | | 0..1 |
| | | PartialDelivery | | 0..1 |
| | | QuantityTolerance | | 0..1 |
| | | Transport | | 0..1 |
| | CashDiscount Terms | | | 0..1 |
| | | MaximumCashDiscount | | 0..1 |
| | | NormalCashDiscount | | 0..1 |
| | PaymentForm | | | 0..1 |
| | | PaymentCard | | 0..1 |
| | Attachment | | | 0..n |
| | Description | | | 0..1 |
| | Confirmation Description | | | 0..1 |

-continued

| | | | |
|---|---|---|---|
| Item | | | 0..n |
| | HierarchyRelationship | | 0..1 |
| | Product | | 0..1 |
| | ProductCategory | | 0..1 |
| | Price | | 0..1 |
| | | Netunit Price | 0..1 |
| | ConfirmedPrice | | 0..1 |
| | | Netunit Price | 0..1 |
| | Buyer | | 0..1 |
| | Seller | | 0..1 |
| | Location | | 0..1 |
| | DeliveryTerms | | 0..1 |
| | Attachment | | 0..n |
| | Description | | 0..1 |
| | ConfirmationDescription | | 0..1 |

-continued

| | | |
|---|---|---|
| ScheduleLine | | 0..n |
| | Delivery Period | 1 |
| ConfirmedScheduleLine | | 0..n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0..1 |
| | | | Address | | 0..1 |
| | | | ContactPerson | | 0..1 |
| | | | | Address | 0..1 |
| | | SellerParty | | | 0..1 |
| | Location | | | | |
| | | ShipToLocation | | | 0..1 |
| | | | Address | | 0..1 |
| | | ShipFromLocation | | | 0..1 |
| | | | Address | | 0..1 |
| | DeliveryTerms | | | | 0..1 |
| | | Incoterms | | | 0..1 |
| | | PartialDelivery | | | 0..1 |
| | | QuantityTolerance | | | 0..1 |
| | | Transport | | | 0..1 |
| | CashDiscount Terms | | | | 0..1 |
| | | MaximumCash Discount | | | 0..1 |
| | | NormalCashDiscount | | | 0..1 |
| | PaymentForm | | | | 0..1 |
| | | PaymentCard | | | 0..1 |
| | Attachment | | | | 0..n |
| | Description | | | | 0..1 |
| | Confirmation Description | | | | 0..1 |
| | Item | | | | 0..n |
| | | HierarchyRelationship | | | 0..1 |
| | | Product | | | 0..1 |
| | | ProductCategory | | | 0..1 |
| | | Price | | | 0..1 |
| | | | NetunitPrice | | 0..1 |
| | | ConfirmedPrice | | | 0..1 |
| | | | NetunitPrice | | 0..1 |
| | | Party | | | |
| | | | BuyerParty | | 0..1 |
| | | | SellerParty | | 0..1 |
| | | Location | | | |
| | | | ShipTo Location | | 0..1 |
| | | | ShipFrom Location | | 0..1 |
| | | DeliveryTerms | | | 0..1 |
| | | Attachment | | | 0..n |
| | | Description | | | 0..1 |
| | | Confirmation Description | | | 0..1 |

-continued

| | | | |
|---|---|---|---|
| | ScheduleLine | | 0..n |
| | | Delivery Period | 1 |
| | ConfirmedScheduleLine | | 0..n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0..1 |
| | BuyerPosting DateTime | | | 0..1 |
| | BuyerLast ChangeDate Time | | | 0..1 |
| | SellerPosting DateTime | | | 0..1 |
| | SellerLast ChangeDate Time | | | 0..1 |
| | Acceptance StatusCode | | | 0..1 |
| | Note | | | 0..1 |
| | ItemList Complete Transmission Indicator | | | 0..1 |
| | BuyerParty | | | 0..1 |
| | | StandardID | | 0..n |
| | | BuyerID | | 0..1 |
| | | SellerID | | 0..1 |
| | | Address | | 0..1 |
| | | ContactPerson | | 0..1 |
| | | | BuyerID | 0..1 |
| | | | SellerID | 0..1 |
| | | | Address | 0..1 |
| | SellerParty | | | 0..1 |
| | Product RecipientParty | | | 0..1 |
| | VendorParty | | | 0..1 |
| | Manufacturer Party | | | 0..1 |
| | BillToParty | | | 0..1 |
| | PayerParty | | | 0..1 |
| | CarrierParty | | | 0..1 |
| | ShipTo Location | | | 0..1 |
| | | StandardID | | 0..n |
| | | BuyerID | | 0..1 |
| | | SellerID | | 0..1 |
| | | Address | | 0..1 |
| | ShipFrom Location | | | 0..1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
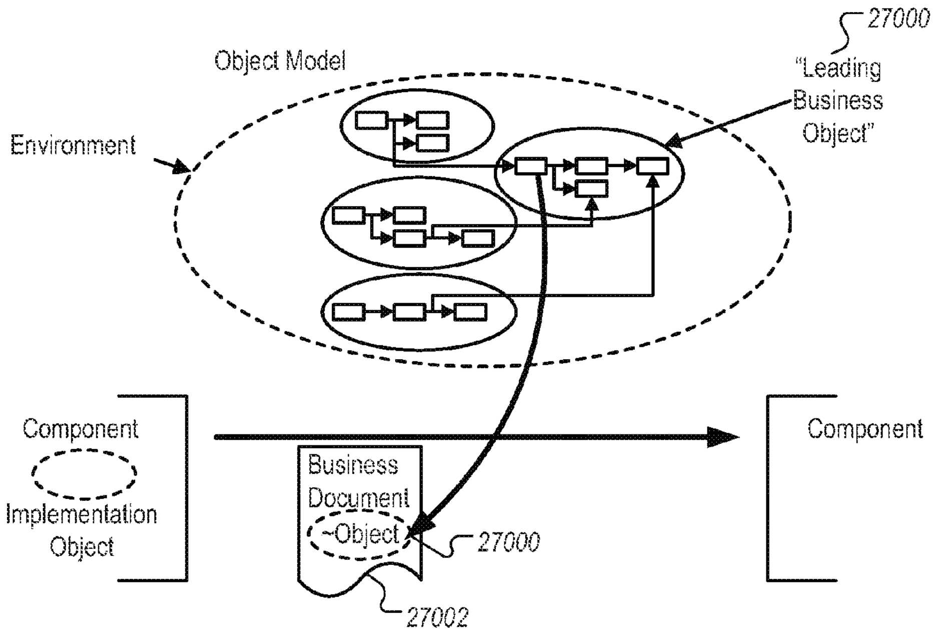
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
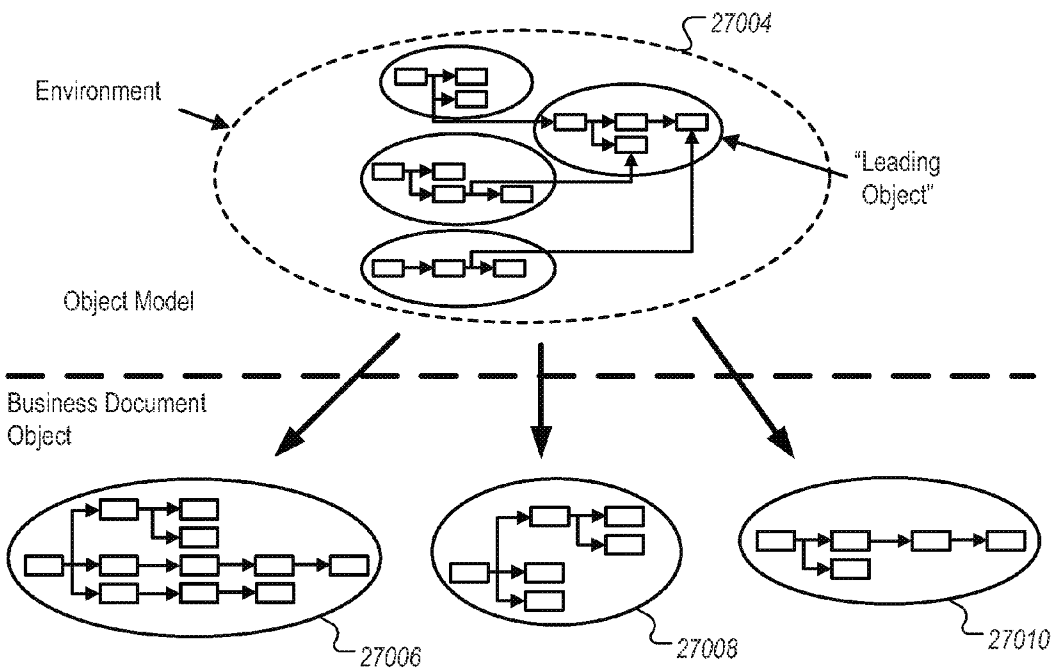

As illustrated in FIG. 27B, several business document objects 27006, 27008, and 27010 as overlapping views may be derived for a given leading object 27004. Each business document object results from the object model by hierarchization.

Figure 27C:
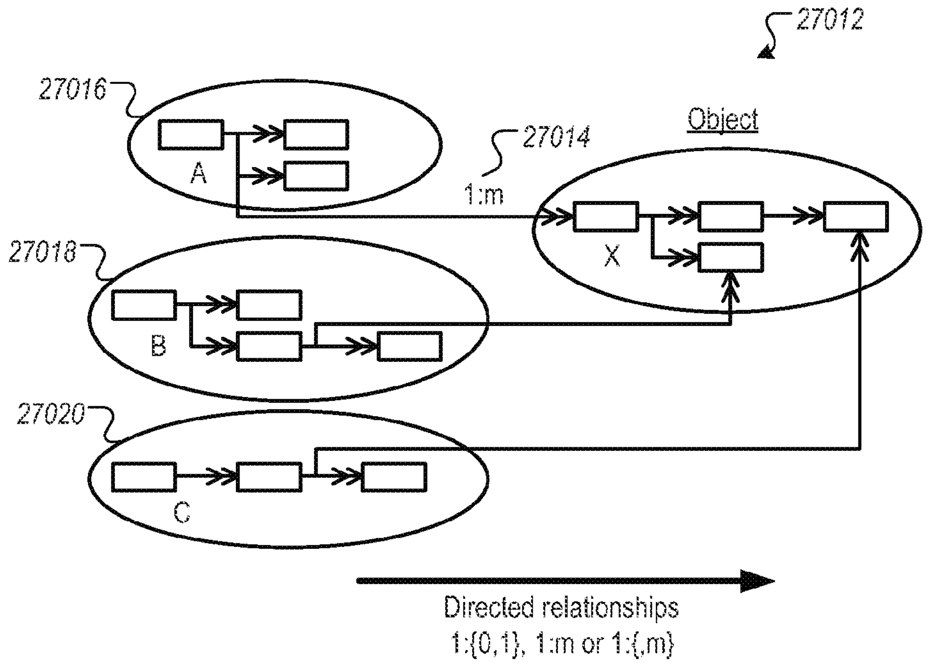

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
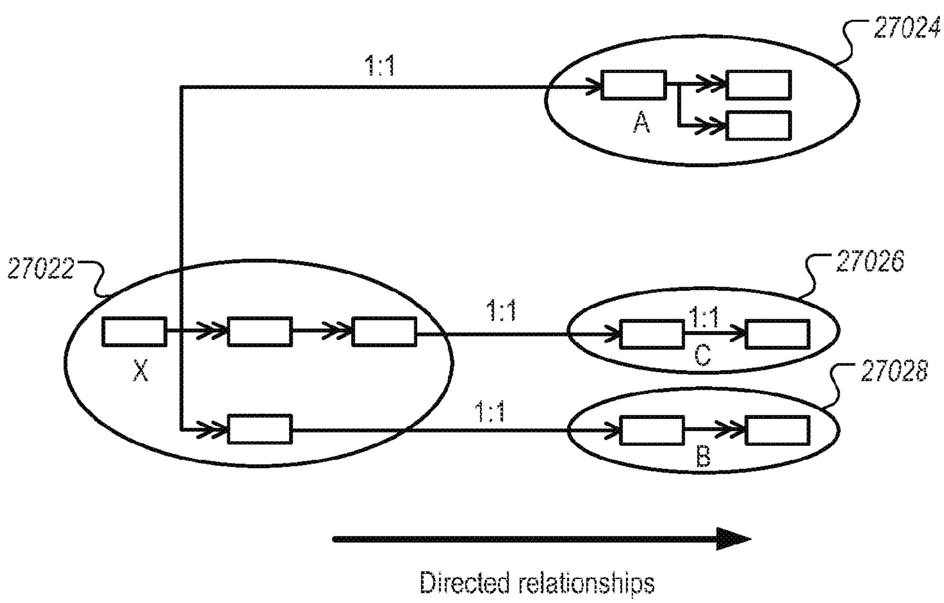

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
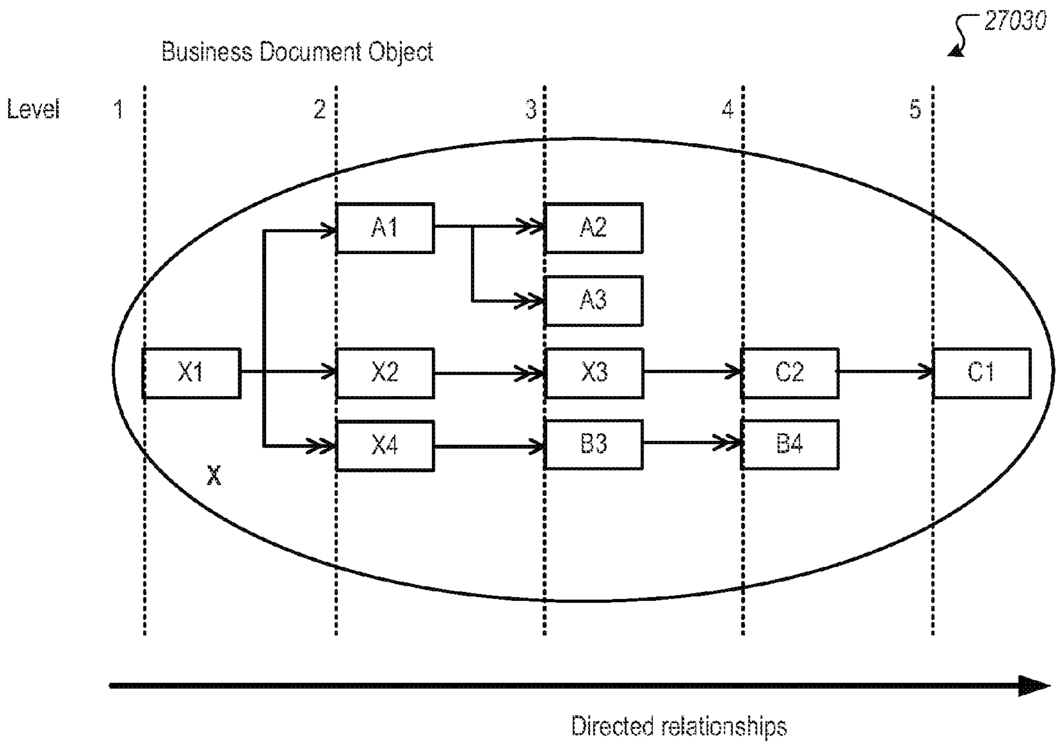
Figure 27E:
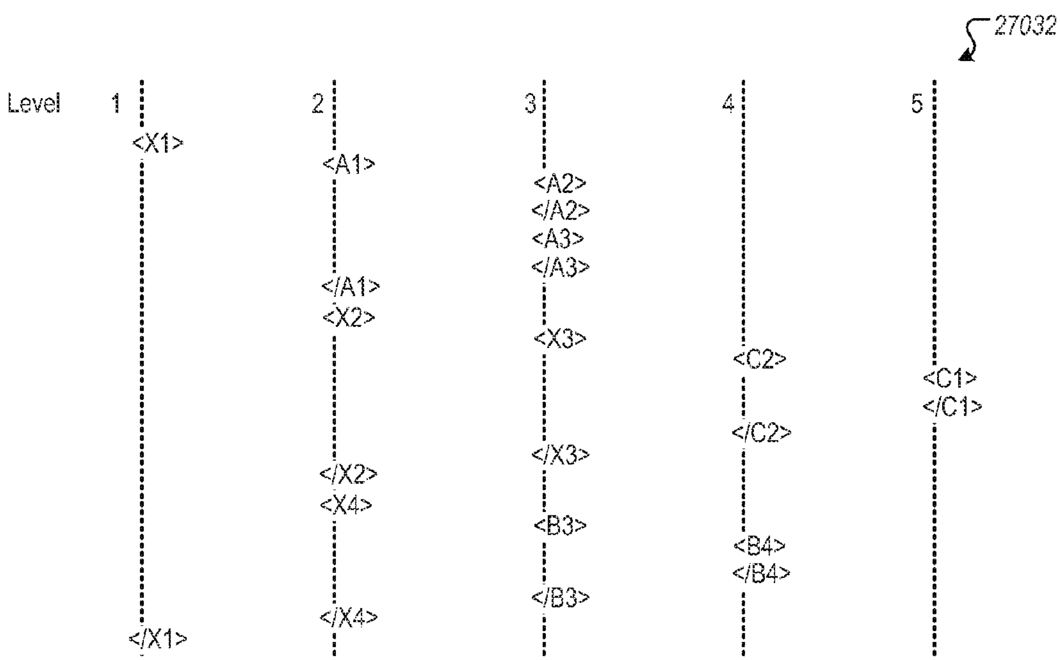

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role> Party, for example, BuyerParty, ItemBuyerParty. BTDReference nodes are modeled as separate entities for each reference type in the business document object. These nodes are given the name <Qualifier><BO><Node> Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message". For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
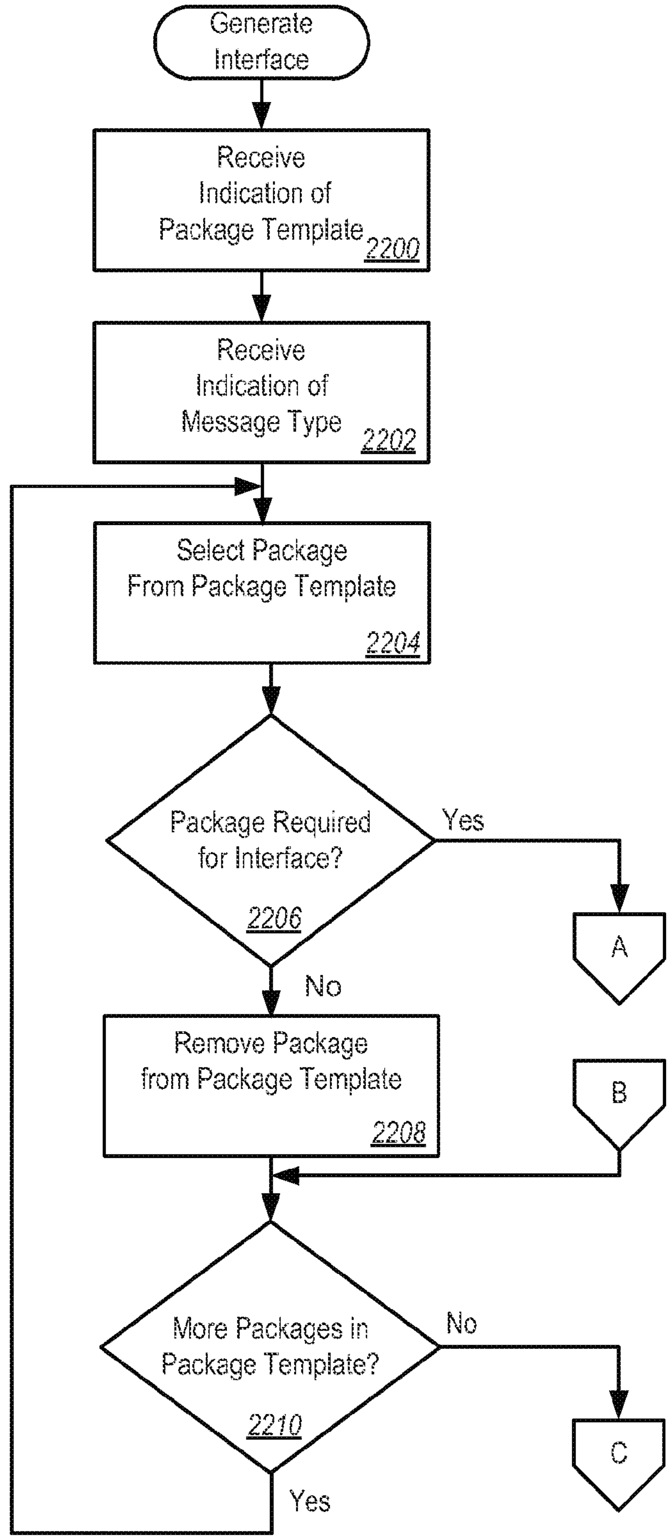
FIGS. 22A-F depict a flow diagram of the steps performed to generate an interface from the business object model in accordance with methods and systems consistent with the subject matter described herein.
Figure 22B:
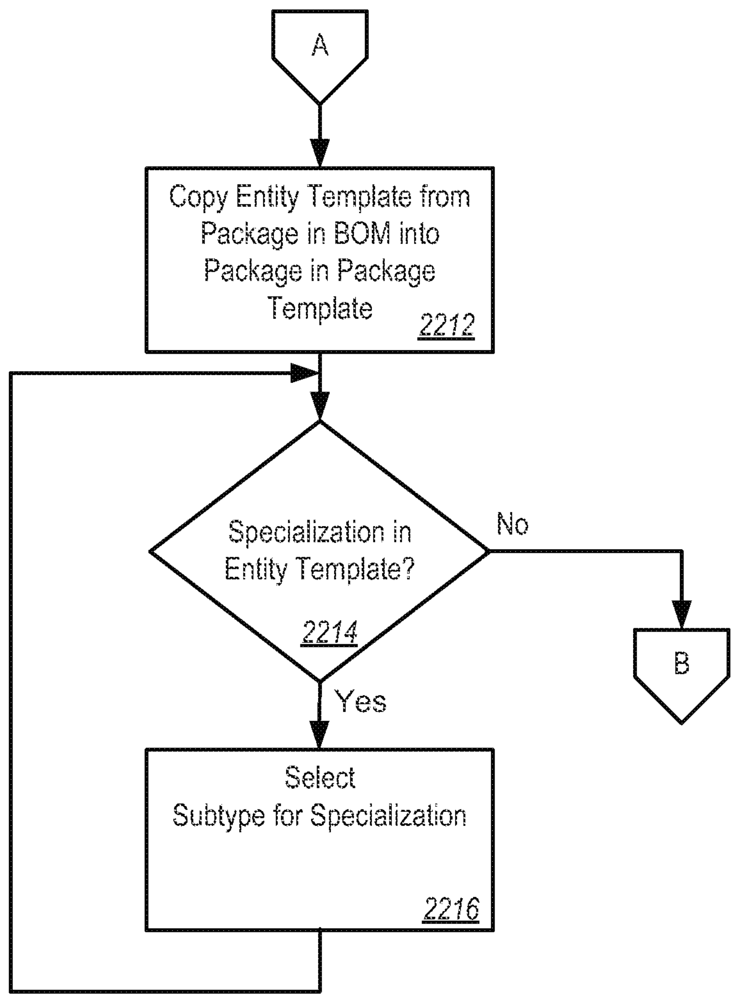
Figure 22C:
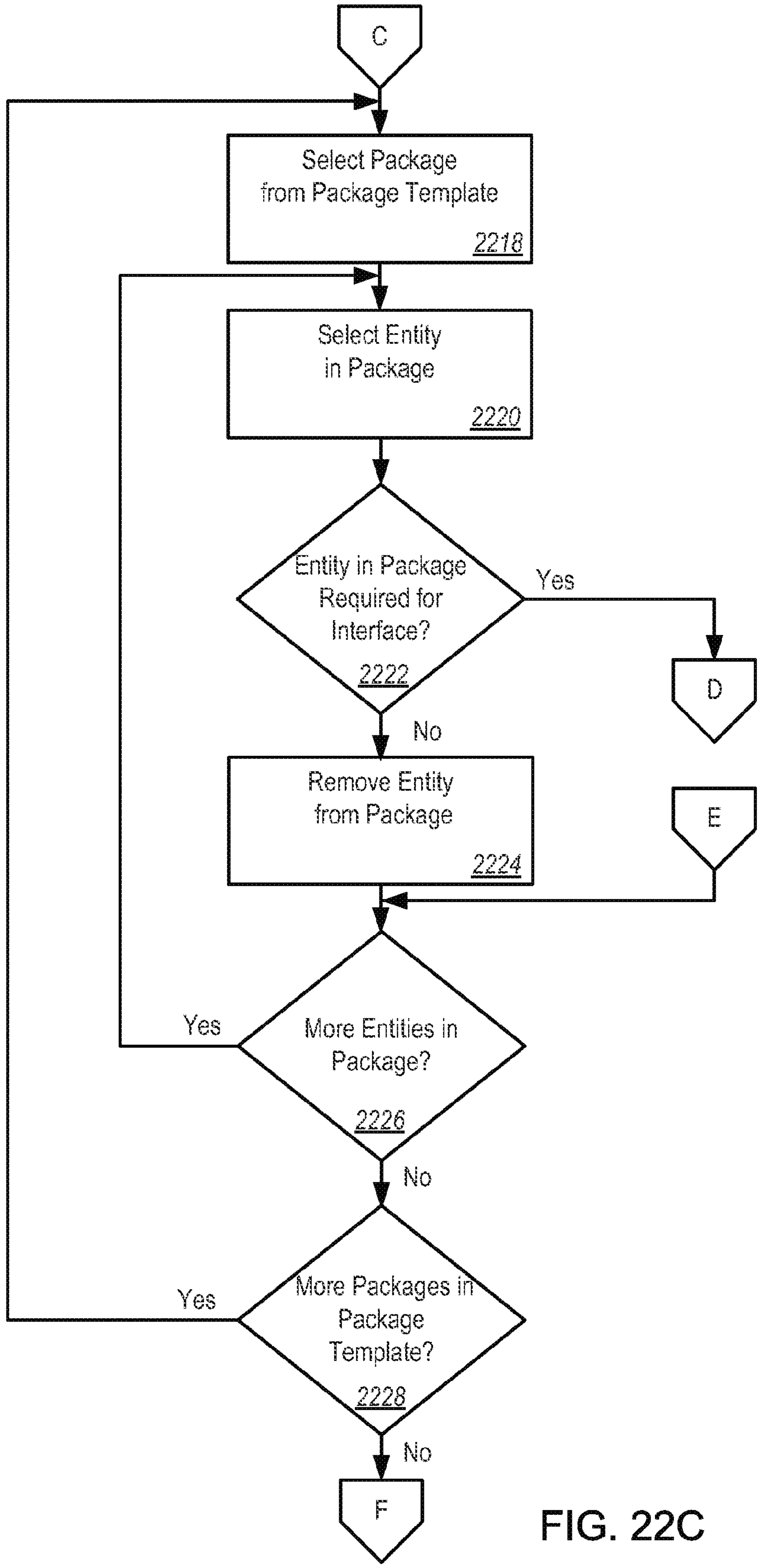

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
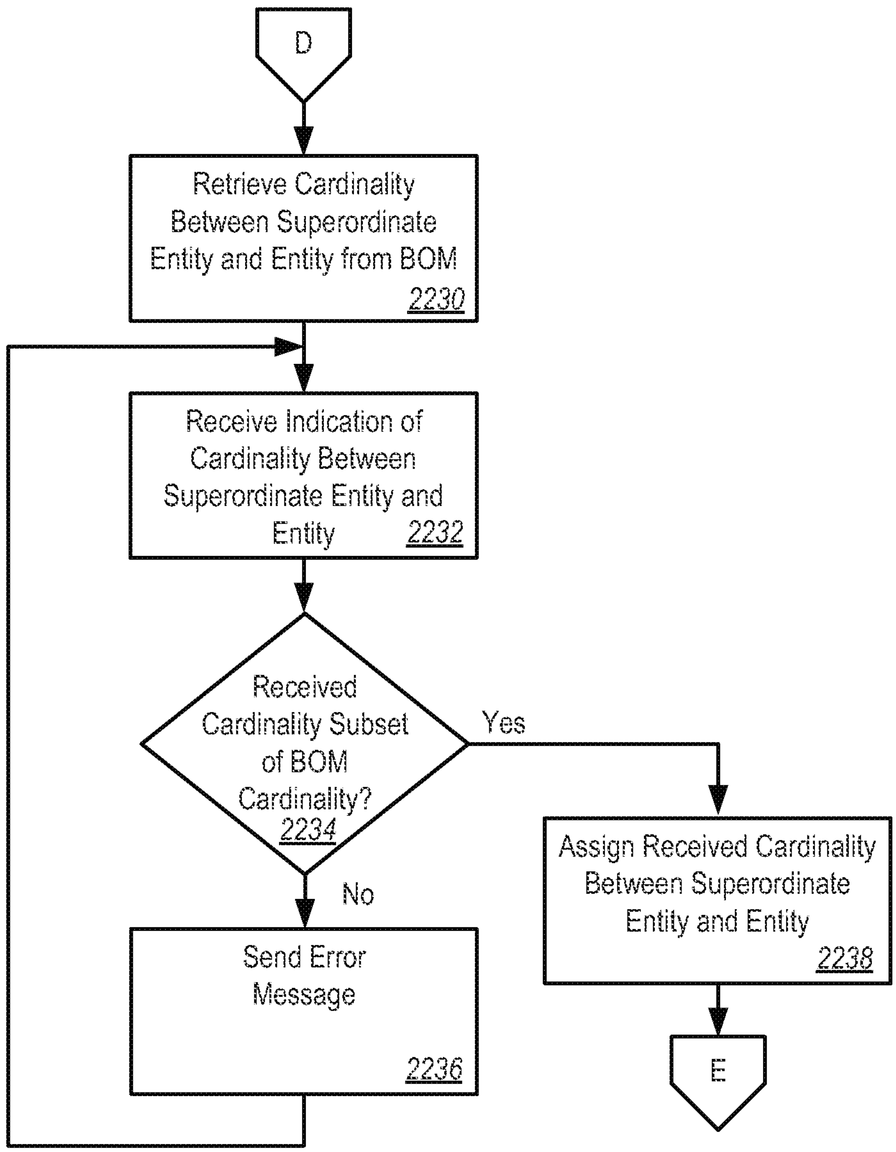

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
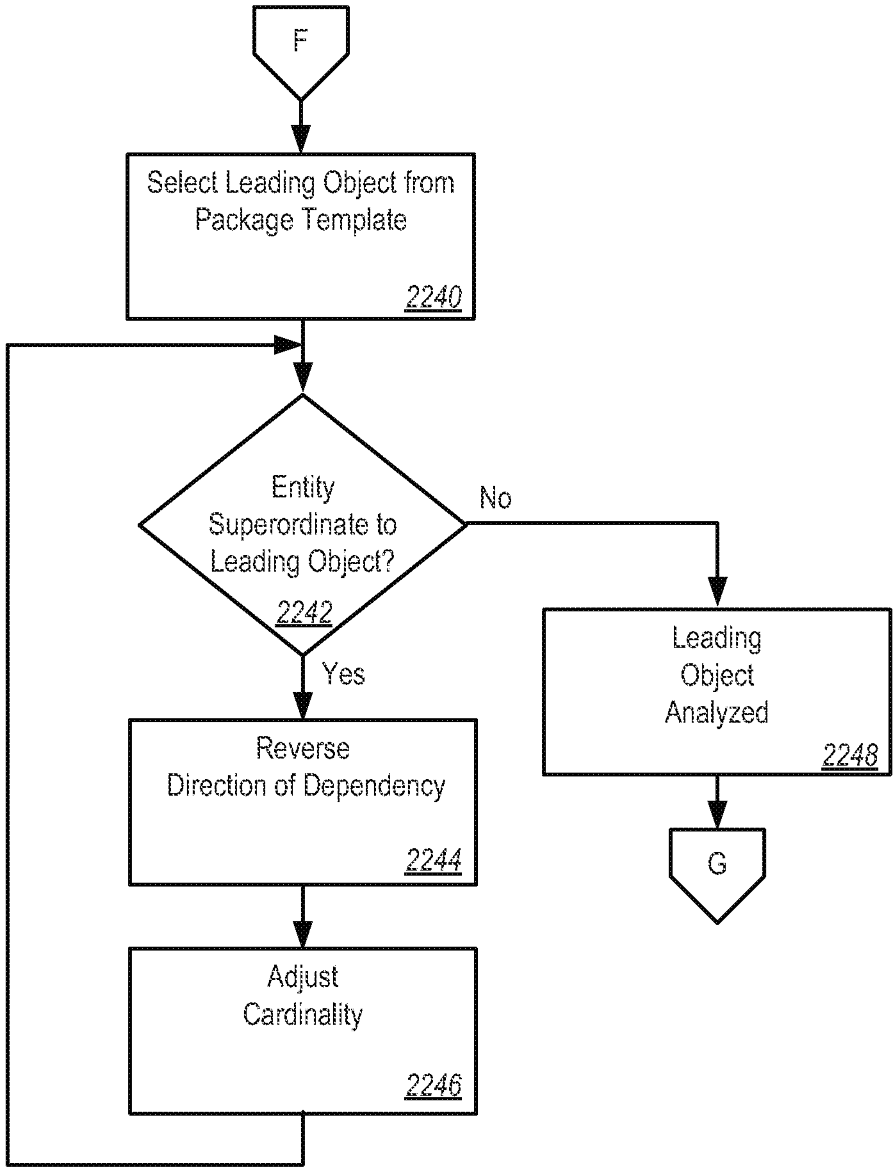

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
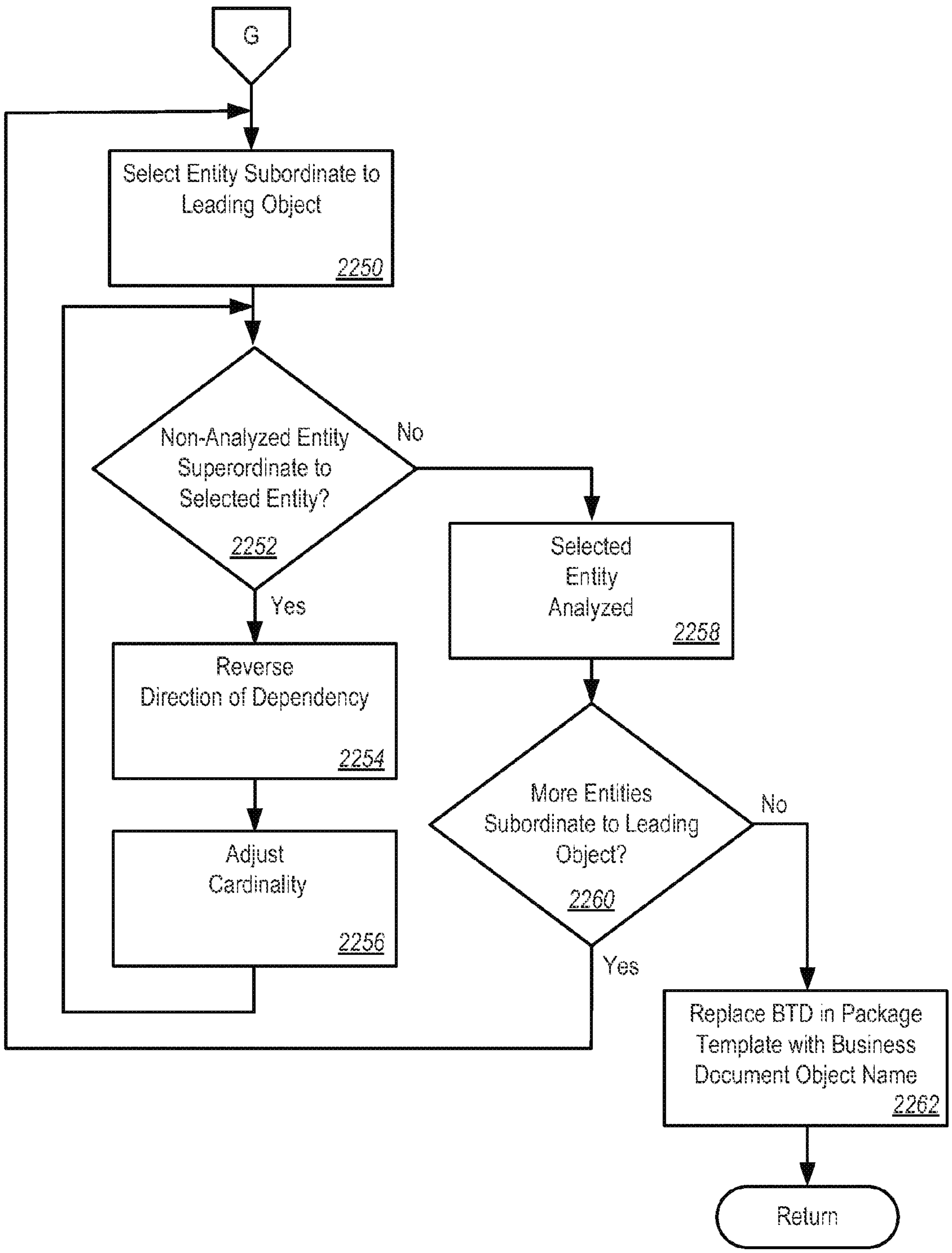

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
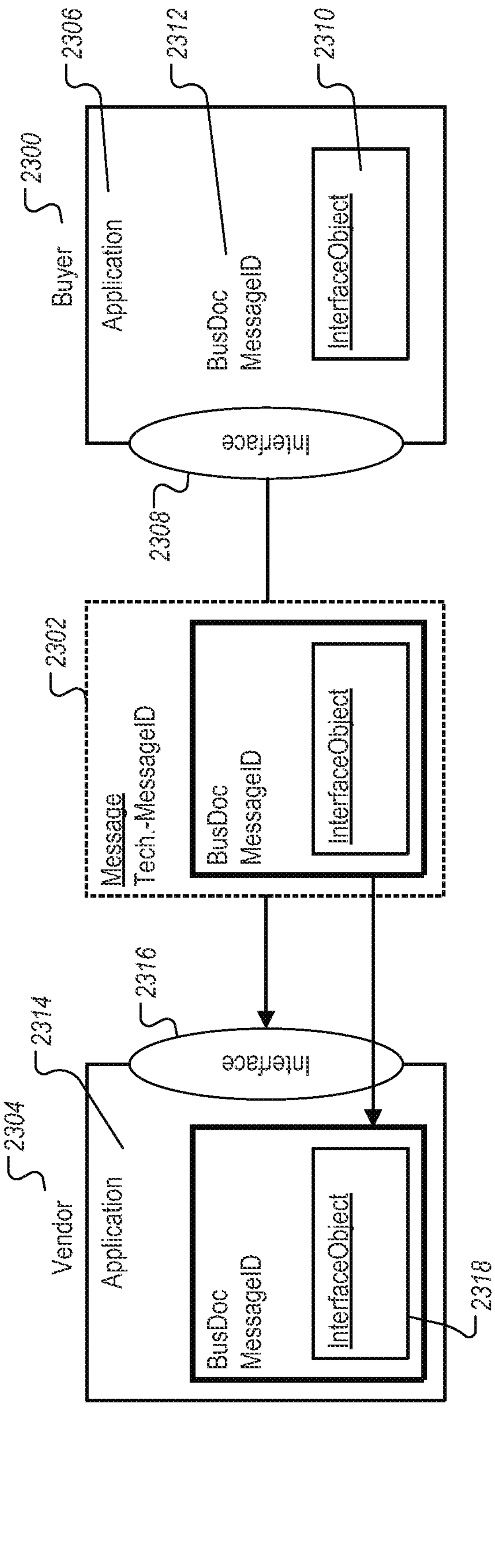
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
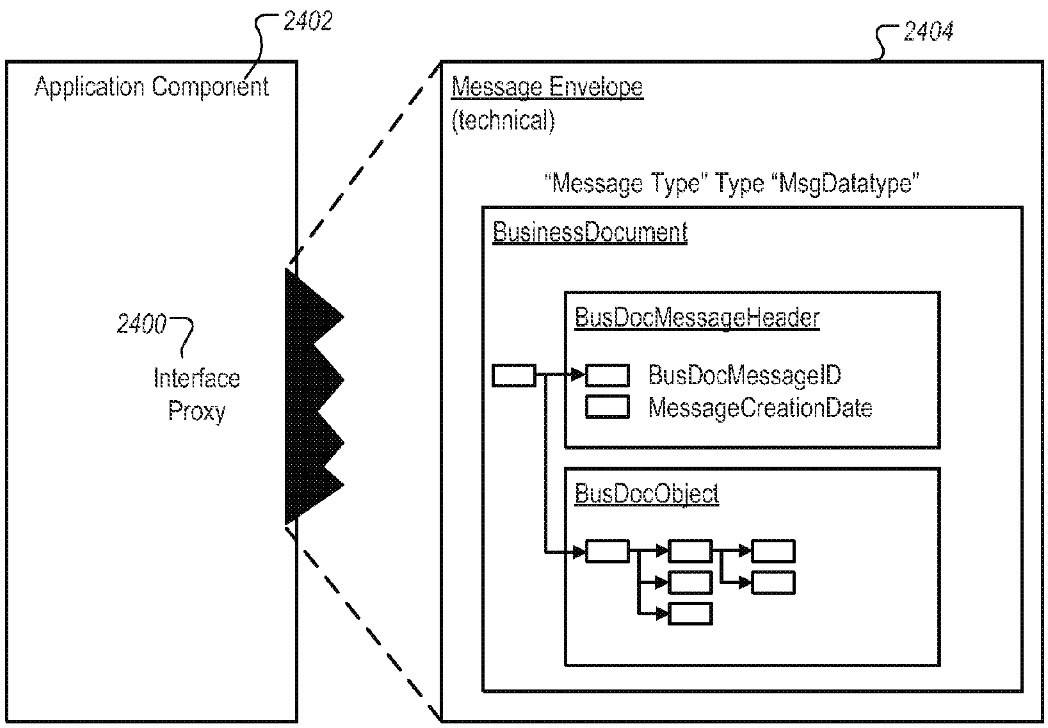
FIG. 24 depicts an interface proxy in accordance with methods and systems consistent with the subject matter described herein.
Figure 25:
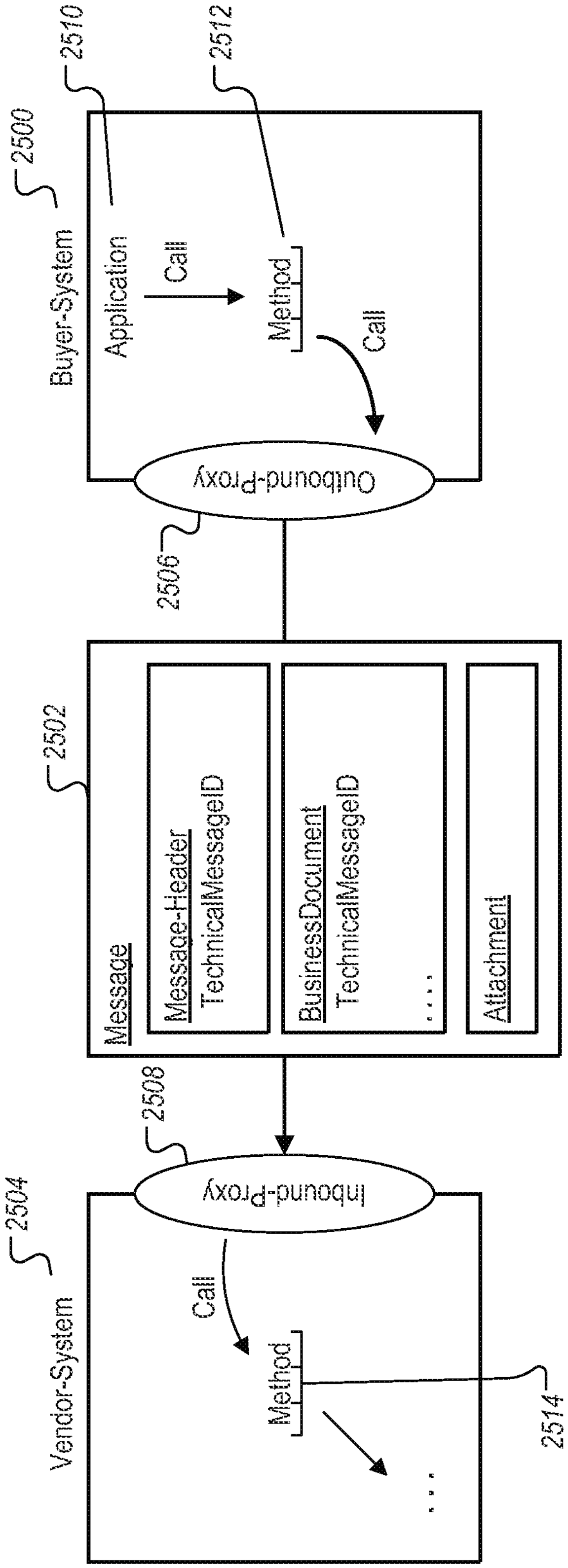
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
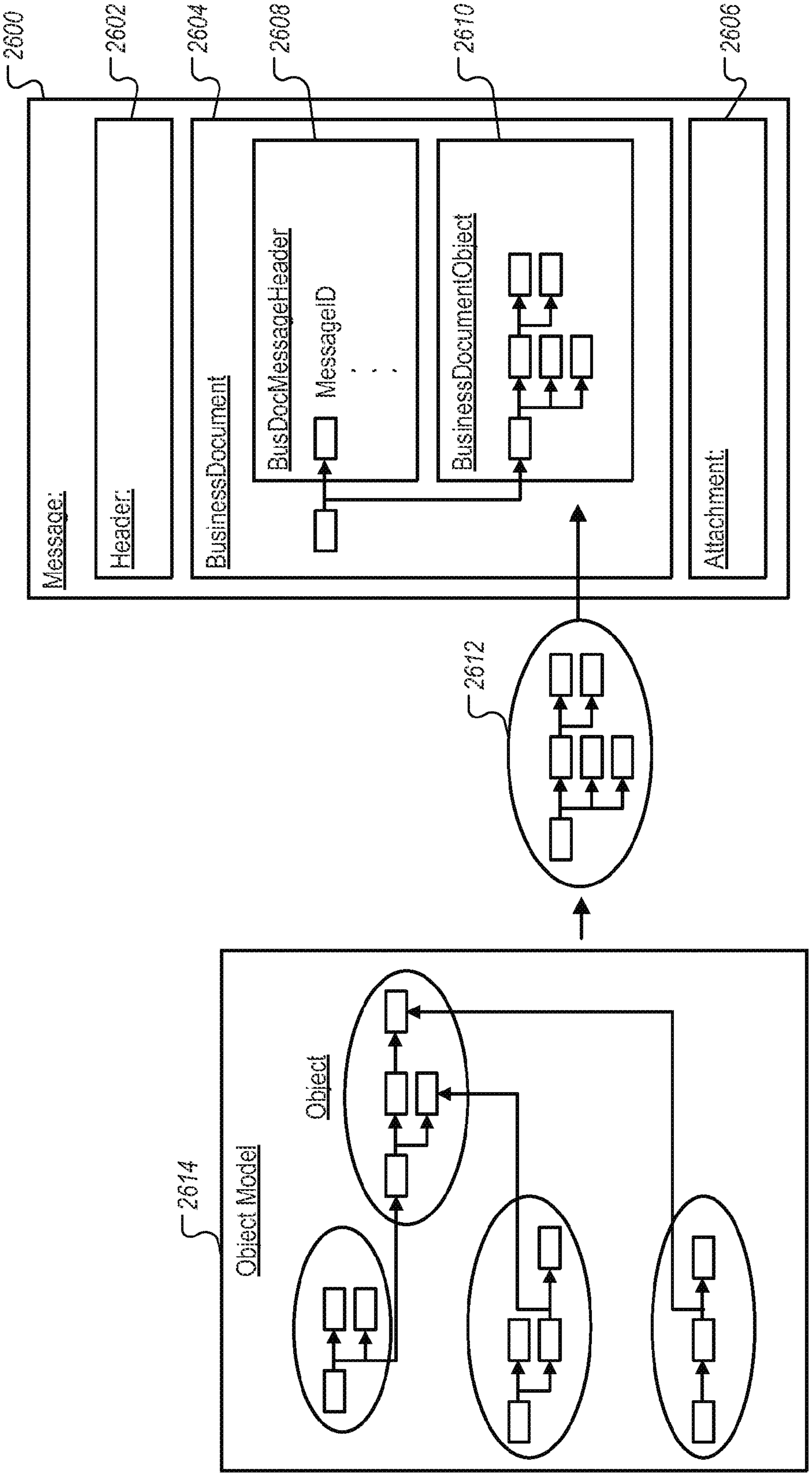
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
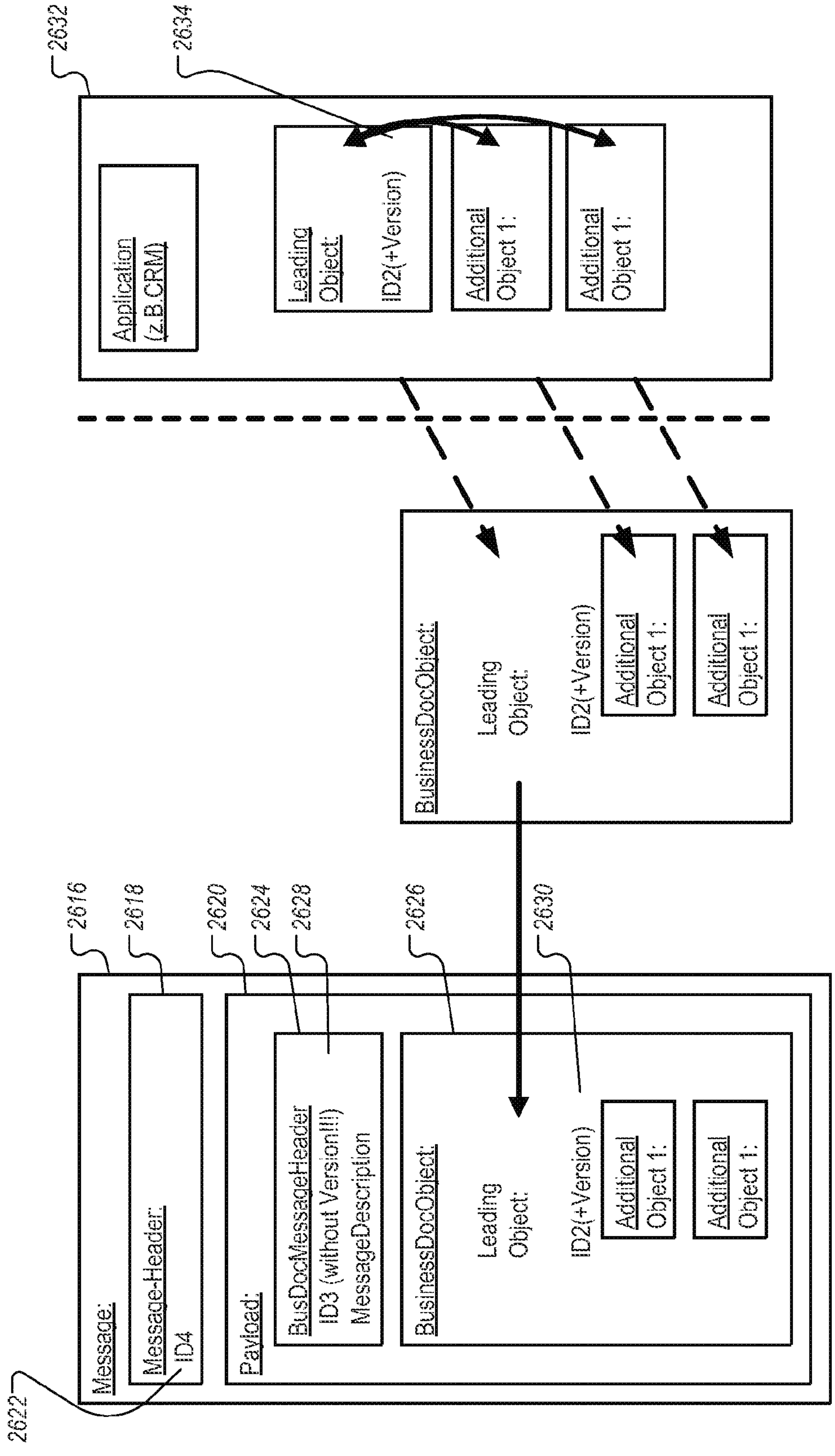
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
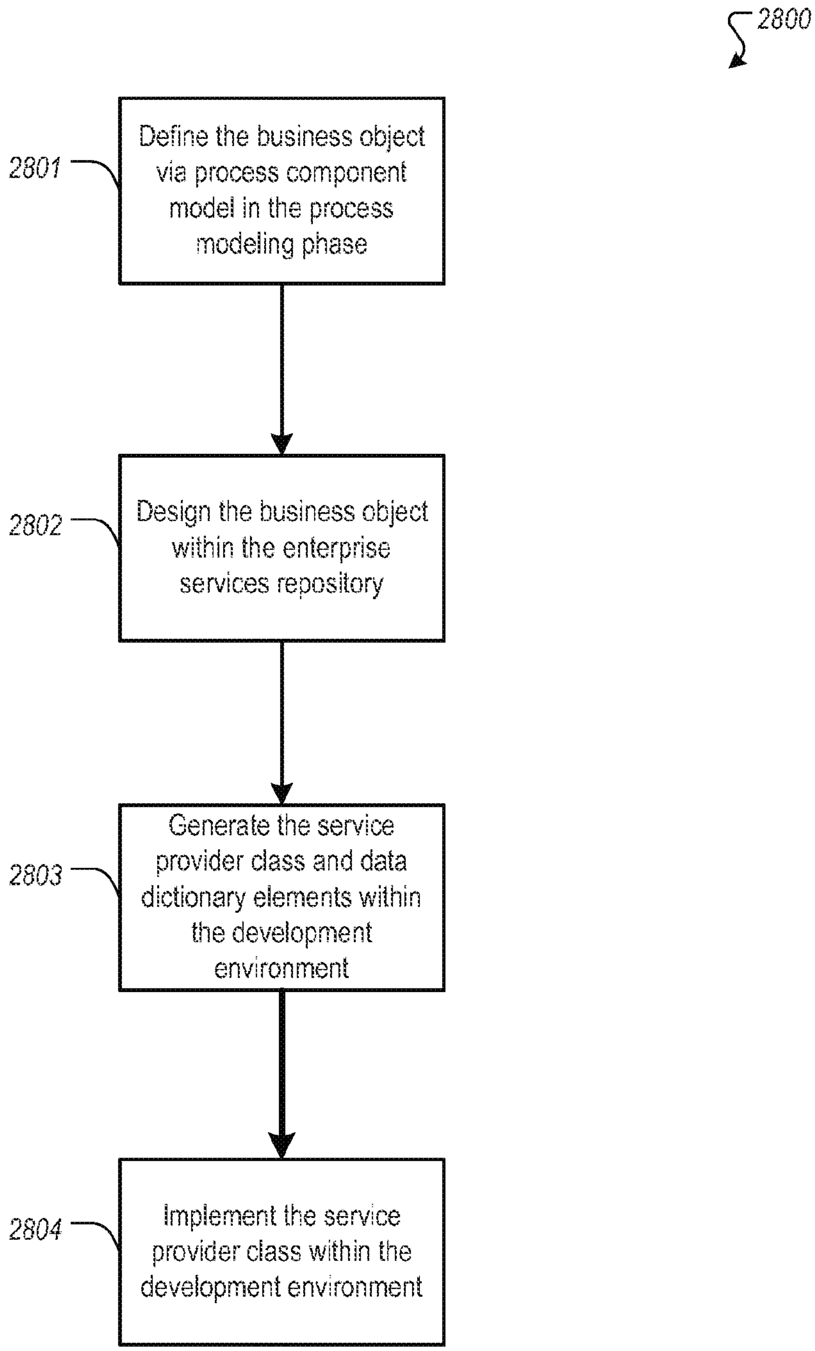
FIG. 28 illustrates an example method for service enabling in accordance with one embodiment of the present disclosure.
Figure 29:
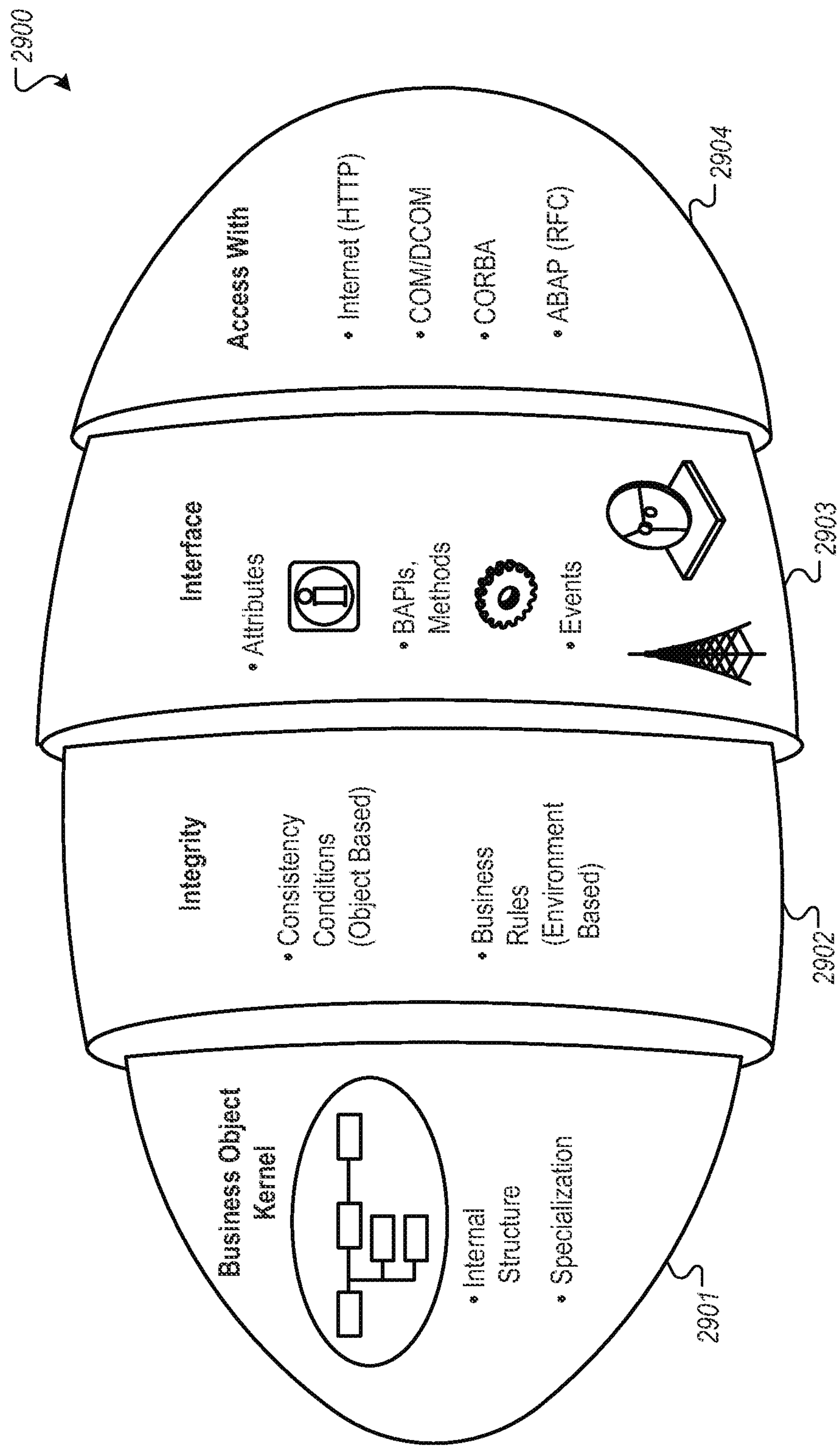
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
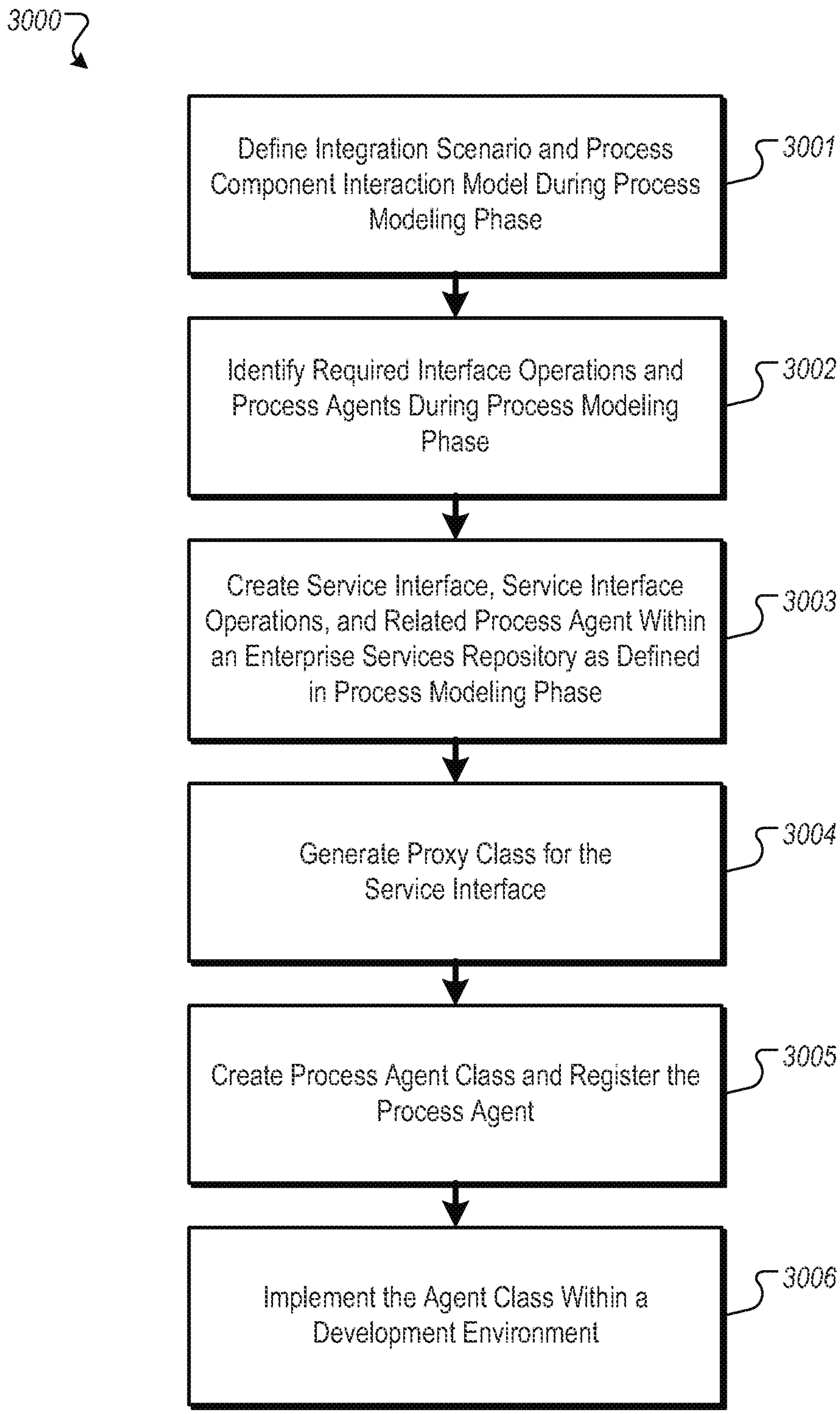
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
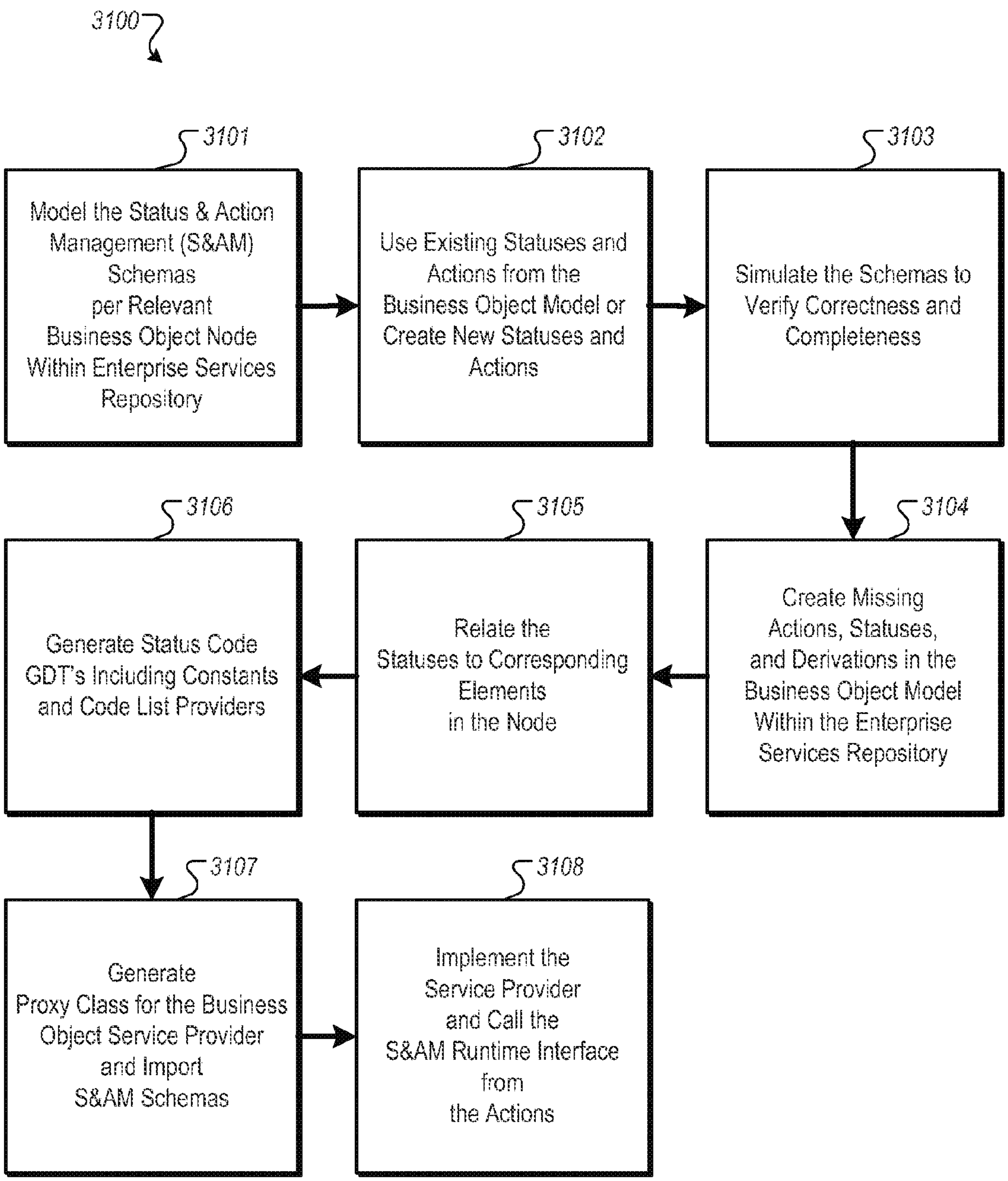
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Figure 32:
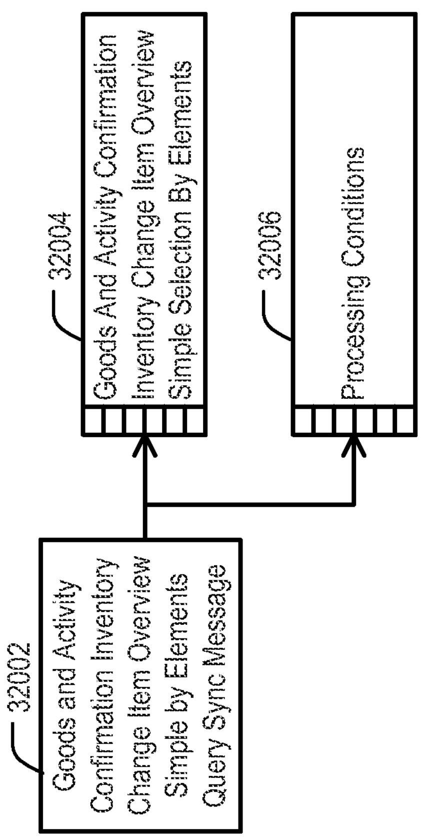
FIG. 32 depicts an example Goods And Activity Confirmation Inventory Change Item Overview Simple By Elements Query Sync message data type.

FIG. 32 illustrates one example logical configuration of a Goods and Activity Confirmation Inventory Change Item Overview Simple by Elements Query Sync message 32000. Specifically, this figure depicts the arrangement and hierarchy of various components such as one or more levels of packages, entities, and data types, shown here as 32000 through 32006. As described above, packages may be used to represent hierarchy levels, and different types of cardinality relationships among entities can be represented using different arrowhead styles. Entities are discrete business elements that are used during a business transaction. Data types are used to type object entities and interfaces with a structure. For example, the Goods and Activity Confirmation Inventory Change Item Overview Simple by Elements Query Sync message 32000 includes, among other things, the Processing Conditions entity 32006. Accordingly, heterogeneous applications may communicate using this consistent message configured as such.

The message type Goods and Activity Confirmation Inventory Change Item Overview Simple by Elements Query_sync is derived from the business object Goods and Activity Confirmation as a leading object together with its operation signature. The message type Goods and Activity Confirmation Inventory Change Item Overview Simple by Elements Query_sync is a query about an overview of GoodsAndActivityConfirmationInventoryChangeItems. The structure of the message type Goods and Activity Confirmation Inventory Change Item Overview Simple by Elements Query_sync is determined by the message data type GoodsAndActivityConfirmationInventoryChangeItemOverviewSimpleByElementsQueryMessage_sync. The message data type GoodsAndActivityConfirmationInventoryChangeItemOverviewSimpleByElementsQueryMessage_sync includes the GoodsAndActivityConfirmationInventoryChangeItemOverview SimpleSelectionByElements package and the ProcessingConditions package. The package ProcessingConditions includes the entity ProcessingConditions. ProcessingConditions is typed by datatype QueryProcessingConditions.

The package GoodsAndActivityConfirmationInventoryChangeItemOverviewSimpleSelectionByElements includes the entity GoodsAndActivityConfirmationInventoryChangeItemOverview SimpleSelectionByElements. GoodsAndActivityConfirmationInventoryChangeItemOverviewSimpleSelectionByElements includes the following non-node elements: SelectionByInventoryLocationInventoryTypeCode, SelectionByInventoryLocationLocationUUID, SelectionByInventoryLocationLocationID, SelectionByInventoryLocationCustodianPartyUUID, SelectionByInventoryLocationCustodianPartyInternalID, SelectionByInventoryLocationLogisticsAreaUUID, SelectionByInventoryLocationLogisticsAreaKeyID, SelectionByInventoryLocationLogisticsAreaKeySiteID, SelectionByInventoryLocationInventoryManagedLocationUUID, SelectionByInventoryLocationInventoryManagedLogisticsAreaUUID, SelectionByInventoryLocationPermanentEstablishmentUUID, SelectionByInventoryItemChangeMainInventorySeparatingValuesMaterialUUID, SelectionByInventoryItemChangeMainInventorySeparatingValuesMaterialKeyProductTypeCode, SelectionByInventoryItemChangeMainInventorySeparatingValuesMaterialKeyProductidentifierType, SelectionByInventoryItemChangeMainInventorySeparatingValuesMaterialKey ProductID, SelectionByInventoryItemChangeMainInventorySeparatingValuesOwnerPartyUUID, SelectionByInventoryItemChangeMainInventorySeparatingValuesOwnerPartyID, SelectionByInventoryItemChangeMainInventorySeparatingValuesSupplyPlanningAreaUUID, SelectionByInventoryItemChangeMainInventorySeparatingValuesSupplyPlanningAreaID, SelectionByInventoryItemChangeMainInventorySeparatingValuesInventoryRestrictedUseIndicator, SelectionByInventoryItemChangeIdentifiedStockInventorySeparatingValues IdentifiedStockUUID, SelectionByInventoryItemChangeIdentifiedStockInventorySeparatingValuesIdentifiedStockKeyID, SelectionByInventoryItemChangeSpecialStockSeparatingValuesOutbound DeliveryReferenceID, SelectionByInventoryItemChangeSpecialStockSeparatingValuesOutboundDeliveryReferenceUUID, SelectionByInventoryItemChangeSpecialStockSeparatingValuesSite LogisticsLotUUID, SelectionByInventoryItemChangeSpecialStockSeparatingValuesSiteLogisticsLotID, SelectionByInventoryItemChangeDefaultRecordedQuantityUUID, SelectionByID, SelectionByInventoryMovementDirectionCode, SelectionByInventoryRelevanceIndicator, SelectionByInventoryManagedQuantity, SelectionByInventoryManagedQuantityTypeCode, SelectionByDefaultRecordedQuantity, SelectionByDefaultRecordedQuantityTypeCode, SelectionBySiteUUID, SelectionByTransferGroupID, SelectionByConfirmationCreationDateTime, SelectionByConfirmationBusinessTransactionDateTime, SelectionByConfirmationCancellationStatusCode, SelectionByConfirmationCancellationDocumentIndicator, SelectionByConfirmationCancelledConfirmationUUID, SelectionByConfirmationCompanyID, SelectionByConfirmationCompanyUUID, SelectionByConfirmationID, and SelectionByConfirmationUUID.

SelectionByInventoryLocationInventoryTypeCode may have a multiplicity of 0 . . . * and may be based on datatype GACCnfInvItOvSBElQuerySelectionByInventoryLocationInventoryTypeCode. SelectionByInventoryLocationLocationUUID may have a multiplicity of 0 . . . * and may be based on datatype GoodsAndActivityConfirmationInventoryChangehemOverviewSimpleByElementsQuerySelectionByInventoryLocationLocationUUID. SelectionByInventoryLocationLocationID may have a multiplicity of 0 . . . * and may be based on datatype GoodsAndActivityConfirmationInventoryChangehemOverviewSimpleByElementsQuerySelection ByInventoryLocationLocationID. SelectionByInventoryLocationCustodianPartyUUID may have a multiplicity of 0 . . . * and may be based on datatype GACCnfInvItOvSBElQuerySelectionByInventoryLocationCustodianPartyUUID. SelectionByInventoryLocationCustodianPartyInternalID may have a multiplicity of 0 . . . * and may be based on datatype GACCnfInvItOvSBElQuerySelectionByInventoryLocationCustodianPartyInternalID. SelectionByInventoryLocationLogisticsAreaUUID may have a multiplicity of 0 . . . * and may be based on datatype GACCnfInvItOvSBElQuerySelectionByInventoryLocationLogisticsAreaUUID. SelectionByInventoryLocationLogisticsAreaKeyID may have a multiplicity of 0 . . . * and may be based on datatype GACCnfInvItOvSBElQuerySelectionByInventoryLocationLogisticsAreaKeyID. SelectionByInventoryLocationLogisticsAreaKeySiteID may have a multiplicity of 0 . . . * and may be based on datatype GACCnfInvItOvSBElQuerySelectionByInventoryLocationLogisticsAreaKeySiteID. SelectionByInventoryLocationInventoryManagedLocationUUID may have a multiplicity of 0 . . . * and may be based on datatype GACCnfInvItOvSBElQuerySelectionByInventoryLocationInventoryManagedLocationUUID. SelectionByInventoryLocationInventoryManagedLogisticsAreaUUID may have a multiplicity of 0 . . . * and may be based on datatype GACCnfInvItOvSBElQuerySelectionByInventoryLocationInventory ManagedLogisticsArea UUID. SelectionByInventoryLocationPermanentEstablishmentUUID may have a multiplicity of 0 . . . * and may be based on datatype GACCnfInvItOvSBElQuerySelectionByInventoryLocationPermanentEstablishmentUUID SelectionByInventoryItemChangeMainInventorySeparatingValuesMaterial UUID may have a multiplicity of 0 . . . * and may be based on datatype GACCnfInvItOvSBElQuerySelectionByInventoryItemChangeMainInventorySeparatingValuesMaterialUUID. SelectionByInventoryItemChangeMainInventorySeparatingValues MaterialKeyProductTypeCode may have a multiplicity of 0 . . . * and may be based on datatype GACCnfInvItOvSBElQuerySelectionByInventoryItemChangeMainInventorySeparatingValuesMaterialKeyProductTypeCode. SelectionByInventoryItemChangeMainInventorySeparatingValuesMaterialKeyProductidentifierTypeCode may have a multiplicity of 0 . . . * and may be based on datatype GACCnfInvItOvSBElQuerySelectionByInventoryItemChangeMainInventorySeparatingValues-MaterialKeyProductidentifierTypeCode. SelectionByInventoryItemChangeMainInventorySeparatingValuesMaterialKeyProductID may have a multiplicity of 0 . . . * and may be based on datatype GACCnfInvItOvSBElQuerySelectionByInventoryItemChangeMainInventorySeparatingValuesMaterialKeyProductID. SelectionByInventoryItemChangeMainInventorySeparating ValuesOwnerPartyUUID may have a multiplicity of 0 . . . * and may be based on datatype GACCnfInvItOvSBElQuerySelectionByInventoryItemChangeMainInventorySeparatingValuesOwnerPartyUUID. SelectionByInventoryItemChangeMainInventorySeparatingValuesOwnerPartyID may have a multiplicity of 0 . . . * and may be based on datatype GACCnfInvItOvSBElQuerySelectionByInventoryItemChangeMainInventorySeparatingValuesOwnerPartyID. SelectionByInventoryItemChangeMainInventorySeparatingValuesSupply PlanningAreaUUID may have a multiplicity of 0 . . . * and may be based on datatype GACCnfInvItOvSBElQuerySelectionByInventoryItemChangeMainInventorySeparatingValueSupplyPlanningAreaUUID. SelectionByInventoryItemChangeMainInventorySeparatingValuesSupplyPlanningAreaID may have a multiplicity of 0 . . . * and may be based on datatype GACCnfInvItOvSBElQuerySelectionByInventoryItemChangeMainInventorySeparatingValueSupplyPlanningAreaID. SelectionByInventoryItemChangeMainInventorySeparating ValuesInventoryRestrictedUseIndicator may have a multiplicity of 0 . . . * and may be based on datatype GACCnfInvItOvSBElQuerySelectionByInventoryItemChangeMainInventorySeparatingValues InventoryRestrictedUseIndicator. SelectionByInventoryItemChangeIdentifiedStockInventorySeparatingValuesIdentifiedStockUUID may have a multiplicity of 0 . . . * and may be based on datatype GACCnfInvItOvSBElQuerySelectionByInventoryItemChangeIdentifiedStockInventorySeparatingValuesIdentifiedStockUUID. SelectionByInventoryItemChangeIdentifiedStockInventorySeparatingValuesIdentifiedStockKeyID may have a multiplicity of 0 . . . * and may be based on datatype GACCnfInvItOvSBElQuerySelectionByInventoryItemChangeIdentifiedStockInventorySeparatingValuesIdentifiedStockKeyID. SelectionByInventoryItemChangeSpecialStockSeparatingValuesOutboundDeliveryReferenceID may have a multiplicity of 0 . . . * and may be based on datatype GACCnfInvItOvSBElQuerySelectionByInventoryItemChangeSpecialStockSeparatingValuesOutboundDeliveryReferenceID. SelectionByInventoryItemChangeSpecialStockSeparatingValuesOutboundDeliveryReference UUID may have a multiplicity of 0 . . . * and may be based on datatype GACCnfInvItOvSBElQuerySelectionByInventoryItemChangeSpecialStockSeparatingValuesOutboundDeliveryReferenceUUID. SelectionByInventoryItemChangeSpecialStockSeparatingValuesSiteLogisticsLotUUID may have a multiplicity of 0 . . . * and may be based on datatype GACCnfInvItOvSBElQuerySelectionByInventory- ItemChangeSpecialStockSeparatingValuesSiteLogisticsLotUUID. SelectionByInventoryItemChangeSpecialStockSeparatingValuesSiteLogisticsLotID may have a multiplicity of 0 . . . * and may be based on datatype GACCnfInvItOvSBElQuerySelectionByInventoryItemChangeSpecialStockSeparatingValuesSiteLogisticsLotID. SelectionByInventoryItemChangeDefaultRecordedQuantityUUID may have a multiplicity of 0 . . . * and may be based on datatype GACCnfInvItOvSBElQuerySelectionByInventoryItemChangeDefaultRecordedQuantityUUID. SelectionByChangeReasonCode may have a multiplicity of 0 . . . * and may be based on datatype GoodsAndActivityConfirmationInventoryChangeItemOverviewSimpleByElementsQuerySelectionByChangeReasonCode. SelectionByID may have a multiplicity of 0 . . . * and may be based on datatype GoodsAndActivityConfirmationInventoryChangeItemOverviewSimpleByElementsQuerySelectionByID. SelectionByInventoryMovementDirectionCode may have a multiplicity of 0 . . . * and may be based on datatype GoodsAndActivityConfirmationInventoryChangeItemOverviewSimpleByElementsQuerySelectionByInventoryMovementDirectionCode. SelectionByInventoryRelevanceIndicator may have a multiplicity of 0 . . . * and may be based on datatype GoodsAndActivityConfirmationInventoryChangeItemOverviewSimpleByElementsQuerySelectionByInventoryRelevanceIndicator. SelectionByInventoryManagedQuantity may have a multiplicity of 0 . . . * and may be based on datatype GoodsAndActivityConfirmationInventoryChangeItemOverviewSimpleByElementsQuerySelectionByInventoryManagedQuantity. SelectionByInventoryManagedQuantityTypeCode may have a multiplicity of 0 . . . * and may be based on datatype GoodsAndActivityConfirmationInventoryChangeItemOverviewSimpleByElementsQuerySelectionByInventoryManagedQuantityTypeCode. SelectionByDefaultRecordedQuantity may have a multiplicity of 0 . . . * and may be based on datatype GoodsAndActivityConfirmationInventoryChangeItemOverviewSimpleByElementsQuerySelectionByDefaultRecordedQuantity. SelectionByDefaultRecordedQuantityTypeCode may have a multiplicity of 0 . . . * and may be based on datatype GoodsAndActivityConfirmationInventoryChangeItemOverviewSimpleByElementsQuerySelectionByDefaultRecordedQuantityTypeCode. SelectionBySiteUUID may have a multiplicity of 0 . . . * and may be based on datatype GoodsAndActivityConfirmationInventoryChangeItemOverviewSimpleByElementsQuerySelectionBySiteUUID. SelectionByTransferGroupID may have a multiplicity of 0 . . . * and may be based on datatype GoodsAndActivityConfirmationInventoryChangeItemOverviewSimpleByElementsQuerySelectionByTransferGroupID. SelectionByConfirmationCreationDateTime may have a multiplicity of 0 . . . * and may be based on datatype GoodsAndActivityConfirmationInventoryChangeItemOverviewSimpleByElementsQuerySelectionByConfirmationCreationDateTime. SelectionByConfirmationBusinessTransactionDateTime may have a multiplicity of 0 . . . * and may be based on datatype GACCnfInvItOvSBElQuerySelectionByConfirmationBusinessTransactionDateTime. SelectionByConfirmationCancellationStatusCode may have a multiplicity of 0 . . . * and may be based on datatype GACCnfInvItOvSBElQuerySelectionByConfirmationCancellationStatusCode. SelectionByConfirmationCancellationDocumentIndicator may have a multiplicity of 0 . . . * and may be based on datatype GACCnfInvItOvSBElQuerySelectionByConfirmationCancellationDocumentIndicator. SelectionByConfirmationCancelledConfirmationUUID may have a multiplicity of 0 . . . * and may be based on datatype GACCnfInvItOvSBElQuerySelectionByConfirmationCancelledConfirmationUUID. SelectionByConfirmationCompanyID may have a multiplicity of 0 . . . * and may be based on datatype GoodsAndActivityConfirmationInventoryChangeItemOverviewSimpleByElementsQuerySelectionByConfirmationCompanyID. SelectionByConfirmationCompanyUUID may have a multiplicity of 0 . . . * and may be based on datatype GoodsAndActivityConfirmationInventoryChangeItemOverviewSimpleByElementsQuerySelectionByConfirmationCompanyUUID. SelectionByConfirmationID may have a multiplicity of 0 . . . * and may be based on datatype GoodsAndActivityConfirmationInventoryChangeItemOverviewSimpleByElementsQuerySelectionByConfirmationID. SelectionByConfirmationUUID may have a multiplicity of 0 . . . * and may be based on datatype GoodsAndActivityConfirmationInventoryChangeItemOverviewSimpleByElementsQuerySelectionByConfirmationUUID.

Figure 33:
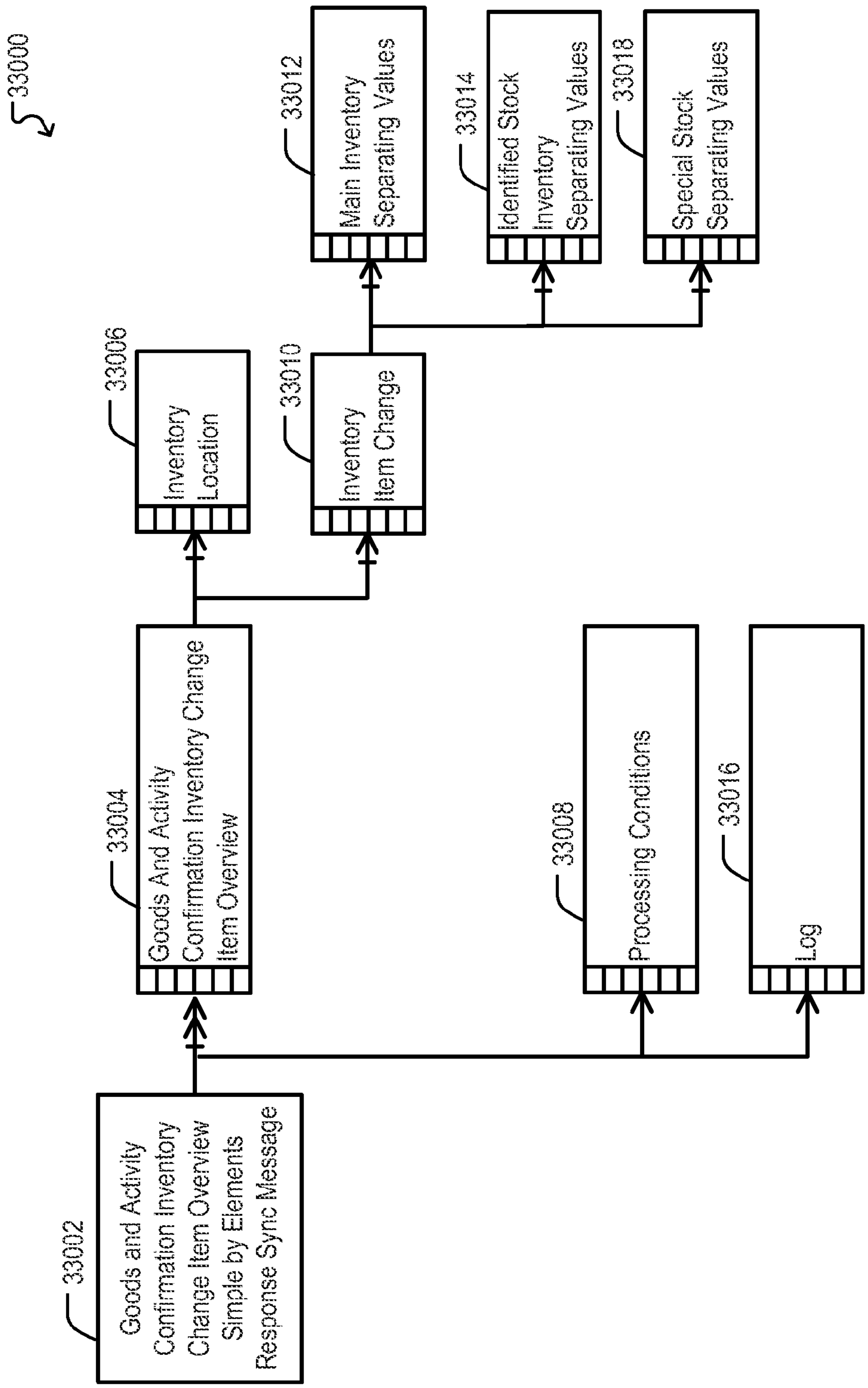
FIG. 33 depicts an example Goods And Activity Confirmation Inventory Change Item Overview Simple By Elements Response Sync message data type.

FIG. 33 illustrates one example logical configuration of a Goods and Activity Confirmation Inventory Change Item Overview Simple by Elements Response Sync message 33000. Specifically, this figure depicts the arrangement and hierarchy of various components such as one or more levels of packages, entities, and data types, shown here as 33000 through 33018. As described above, packages may be used to represent hierarchy levels, and different types of cardinality relationships among entities can be represented using different arrowhead styles. Entities are discrete business elements that are used during a business transaction. Data types are used to type object entities and interfaces with a structure. For example, the Goods and Activity Confirmation Inventory Change Item Overview Simple by Elements Response Sync message 33000 includes, among other things, the Processing Conditions entity 33008. Accordingly, heterogeneous applications may communicate using this consistent message configured as such.

The message type Goods and Activity Confirmation Inventory Change Item Overview Simple by Elements Response_sync is derived from the business object Goods and Activity Confirmation as a leading object together with its operation signature. The message type Goods and Activity Confirmation Inventory Change Item Overview Simple by Elements Response_sync is a response concerning an inquiry about an overview of GoodsAndActivityConfirmationInventoryChangeItems. The structure of the message type Goods and Activity Confirmation Inventory Change Item Overview Simple by Elements Response_sync is determined by the message data type GoodsAndActivityConfirmationInventoryChangeItemOverviewSimpleByElementsResponse Message_sync. The message data type GoodsAndActivityConfirmationInventoryChangeItemOverviewSimpleByElementsResponse Message_sync includes the GoodsAndActivityConfirmationInventoryChangeItemOverview package, the ProcessingConditions package, and the Log package. The package ProcessingConditions includes the entity ProcessingConditions. ProcessingConditions is typed by datatype ResponseProcessingConditions. The package Log includes the entity Log. Log is typed by datatype Log.

The package GoodsAndActivityConfirmationInventoryChangeItemOverview includes the sub-packages InventoryLocation and InventoryItemChange, and the entity GoodsAndActivityConfirmationInventoryChangeItemOverview. GoodsAndActivityConfirmationInventoryChangeItemOverview includes the following non-node elements: GoodsAndActivityConfirmationUUID, GoodsAndActivityConfirmationID, GoodsAndActivityConfirmationInventoryChangeItemUUID, ChangeReasonCode, ChangeReasonName, ID, InventoryMovementDirectionCode, InventoryMovementDirectionName, InventoryRelevanceIndicator, InventoryManagedQuantity, InventoryManagedQuantityTypeCode, InventoryManagedQuantityTypeName, DefaultRecordedQuantity, DefaultRecordedQuantityTypeCode, DefaultRecordedQuantityTypeName, SiteUUID, TransferGroupID, ConfirmationCreationDateTime, ConfirmationBusinessTransactionDateTime, ConfirmationCancellationStatusCode, ConfirmationCancellationStatusName, ConfirmationCancellationDocumentIndicator, ConfirmationCancelledConfirmationUUID, ConfirmationCompanyID, ConfirmationCompanyUUID, ConfirmationID, ConfirmationUUID, OutboundDeliveryItemID, OutboundDeliveryItemUUID, OutboundDeliveryRootID, OutboundDeliveryRootUUID, OutboundDeliveryProcessingTypeCode, OutboundDeliveryProcessingTypeName, OutboundDeliveryProductRecipientPartyKey, PartyTypeCode, PartyTypeName, and PartyID.

GoodsAndActivityConfirmationUUID may have a multiplicity of 0 . . . 1 and may be based on datatype BGDT:UUID. GoodsAndActivityConfirmationID may have a multiplicity of 0 . . . 1 and may be based on datatype BGDT:BusinessTransactionDocumentID. GoodsAndActivityConfirmationInventoryChangeItemUUID may have a multiplicity of 0 . . . 1 and may be based on datatype BGDT:UUID. ChangeReasonCode may have a multiplicity of 0 . . . 1 and may be based on datatype BGDT:InventoryChangeReasonCode. ChangeReasonName may have a multiplicity of 0 . . . 1 and may be based on datatype CDT:LANGUAGEINDEPENDENT_LONG_Name. ID may have a multiplicity of 0 . . . 1 and may be based on datatype BGDT:BusinessTransactionDocumentItemID. InventoryMovementDirectionCode may have a multiplicity of 0 . . . 1 and may be based on datatype BGDT:InventoryMovementDirectionCode. InventoryMovementDirectionName may have a multiplicity of 0 . . . 1 and may be based on datatype CDT:LANGUAGEINDEPENDENT_LONG_Name. InventoryRelevanceIndicator may have a multiplicity of 0 . . . 1 and may be based on datatype CDT:Indicator. InventoryManagedQuantity may have a multiplicity of 0 . . . 1 and may be based on datatype CDT:Quantity. InventoryManagedQuantityTypeCode may have a multiplicity of 0 . . . 1 and may be based on datatype BGDT:QuantityTypeCode. InventoryManagedQuantityTypeName may have a multiplicity of 0 . . . 1 and may be based on datatype CDT:LANGUAGEINDEPENDENT_LONG_Name. DefaultRecordedQuantity may have a multiplicity of 0 . . . 1 and may be based on datatype CDT:Quantity. DefaultRecordedQuantityTypeCode may have a multiplicity of 0 . . . 1 and may be based on datatype BGDT:QuantityTypeCode. DefaultRecordedQuantityTypeName may have a multiplicity of 0 . . . 1 and may be based on datatype CDT:LANGUAGEINDEPENDENT_LONG_Name. SiteUUID may have a multiplicity of 0 . . . 1 and may be based on datatype BGDT:UUID. TransferGroupID may have a multiplicity of 0 . . . 1 and may be based on datatype BGDT:BusinessTransactionDocumentItemGroupID. ConfirmationCreationDateTime may have a multiplicity of 0 . . . 1 and may be based on datatype CDT:GLOBAL_DateTime. ConfirmationBusinessTransactionDateTime may have a multiplicity of 0 . . . 1 and may be based on datatype CDT:GLOBAL_DateTime. ConfirmationCancellationStatusCode may have a multiplicity of 0 . . . 1 and may be based on datatype BGDT:CancellationStatusCode. ConfirmationCancellationStatusName may have a multiplicity of 0 . . . 1 and may be based on datatype CDT:LANGUAGEINDEPENDENT_LONG_Name. ConfirmationCancellationDocumentIndicator may have a multiplicity of 0 . . . 1 and may be based on datatype CDT:Indicator. ConfirmationCancelledConfirmationUUID may have a multiplicity of 0 . . . 1 and may be based on datatype BGDT:UUID. ConfirmationCompanyID may have a multiplicity of 0 . . . 1 and may be based on datatype BGDT:OrganisationalCentreID. ConfirmationCompanyUUID may have a multiplicity of 0 . . . 1 and may be based on datatype BGDT:UUID. ConfirmationID may have a multiplicity of 0 . . . 1 and may be based on datatype BGDT:BusinessTransactionDocumentID. ConfirmationUUID may have a multiplicity of 0 . . . 1 and may be based on datatype BGDT:UUID. OutboundDeliveryItemID may have a multiplicity of 0 . . . 1 and may be based on datatype BGDT:BusinessTransactionDocumentItemID OutboundDeliveryItemUUID may have a multiplicity of 0 . . . 1 and may be based on datatype BGDT:UUID. OutboundDeliveryRootID may have a multiplicity of 0 . . . 1 and may be based on datatype BGDT:BusinessTransactionDocumentID. OutboundDeliveryRootUUID may have a multiplicity of 0 . . . 1 and may be based on datatype BGDT:UUID. OutboundDeliveryProcessingTypeCode may have a multiplicity of 0 . . . 1 and may be based on datatype BGDT:BusinessTransactionDocumentProcessingTypeCode. OutboundDeliveryProcessingTypeName may have a multiplicity of 0 . . . 1 and may be based on datatype CDT:LANGUAGEINDEPENDENT_LONG_Name. OutboundDeliveryProductRecipientPartyKey may have a multiplicity of 0 . . . 1 and may be based on datatype MIDT:GoodsAndActivityConfirmationInventoryChangeItemOverviewSimpleByElementsRe sponseOutboundDeliveryProductRecipientPartyKey. PartyTypeCode may have a multiplicity of 0 . . . 1 and may be based on datatype BGDT:BusinessObjectTypeCode. PartyTypeName may have a multiplicity of 0 . . . 1 and may be based on datatype CDT:LANGUAGEINDEPENDENT_LONG_Name. PartyID may have a multiplicity of 0 . . . 1 and may be based on datatype BGDT:PartyID. GoodsAndActivityConfirmationInventoryChangeItemOverview includes the following node elements: InventoryLocation, with a cardinality of 1:C; and InventoryItemChange, with a cardinality of 1:C.

The package GoodsAndActivityConfirmationInventoryChangeItemOverviewInventoryLocation includes the entity InventoryLocation. InventoryLocation includes the following non-node elements: InventoryTypeCode, InventoryTypeName, LocationUUID, LocationID, CustodianPartyUUID, CustodianPartyInternalID, LogisticsAreaUUID, LogisticsAreaKey, ID, SiteID, InventoryManagedLocationUUID, InventoryManagedLogisticsAreaUUID, and PermanentEstablishmentUUID. InventoryTypeCode may have a multiplicity of 0 . . . 1 and may be based on datatype BGDT: InventoryTypeCode. InventoryTypeName may have a multiplicity of 0 . . . 1 and may be based on datatype CDT:LANGUAGEINDEPENDENT_LONG_Name. LocationUUID may have a multiplicity of 0 . . . 1 and may be based on datatype BGDT:UUID. LocationID may have a multiplicity of 0 . . . 1 and may be based on datatype BGDT:LocationID. CustodianPartyUUID may have a multiplicity of 0 . . . 1 and may be based on datatype BGDT:UUID. CustodianPartyInternalID may have a multiplicity of 0 . . . 1 and may be based on datatype BGDT:BusinessPartnerInternalID. LogisticsAreaUUID may have a multiplicity of 0 . . . 1 and may be based on datatype BGDT:UUID. LogisticsAreaKey may have a multiplicity of 0 . . . 1 and may be based on datatype MIDT: GoodsAndActivityConfirmation-InventoryChangeItemOverviewSimpleByElementsRe sponseInventoryLocationLogisticsAreaKey. ID may have a multiplicity of 0 . . . 1 and may be based on datatype BGDT: LogisticsAreaID. SiteID may have a multiplicity of 0 . . . 1 and may be based on datatype BGDT:LocationID. InventoryManagedLocationUUID may have a multiplicity of 0 . . . 1 and may be based on datatype BGDT:UUID. InventoryManagedLogisticsAreaUUID may have a multiplicity of 0 . . . 1 and may be based on datatype BGDT:UUID. PermanentEstablishmentUUID may have a multiplicity of 0 . . . 1 and may be based on datatype BGDT:UUID.

The package GoodsAndActivityConfirmation-InventoryChangeItemOverviewInventoryItemChange includes the sub-packages MainInventorySeparatingValues, IdentifiedStockInventorySeparatingValues, and SpecialStockSeparatingValues, and the entity InventoryItemChange. InventoryItemChange includes the DefaultRecordedQuantityUUID non-node element, which may have a multiplicity of 0 . . . 1 and may be based on datatype BGDT:UUID. InventoryItemChange includes the following node elements: MainInventorySeparatingValues, with a cardinality of 1:C; IdentifiedStockInventorySeparatingValues, with a cardinality of 1:C; and SpecialStockSeparatingValues, with a cardinality of 1:C.

The package GoodsAndActivityConfirmation-InventoryChangeItemOverview-InventoryItemChangeMainInventorySeparatingValues includes the entity MainInventorySeparatingValues. MainInventorySeparatingValues includes the following non-node elements: MaterialUUID, MaterialKey, ProductTypeCode, ProductTypeName, ProductidentifierTypeCode, ProductidentifierTypeName, ProductID, OwnerPartyUUID, OwnerPartyID, SupplyPlanningAreaUUID, SupplyPlanningAreaID, and InventoryRestrictedUseIndicator. MaterialUUID may have a multiplicity of 0 . . . 1 and may be based on datatype BGDT:UUID. MaterialKey may have a multiplicity of 0 . . . 1 and may be based on datatype MIDT:GACCnfInvItOvSBElResponseInventory-ItemChangeMainInventorySeparatingValues MaterialKey. ProductTypeCode may have a multiplicity of 0 . . . 1 and may be based on datatype BGDT:ProductTypeCode. ProductTypeName may have a multiplicity of 0 . . . 1 and may be based on datatype CDT:LANGUAGEINDEPENDENT_LONG_Name. ProductidentifierTypeCode may have a multiplicity of 0 . . . 1 and may be based on datatype BGDT: ProductidentifierTypeCode. ProductidentifierTypeName may have a multiplicity of 0 . . . 1 and may be based on datatype CDT:LANGUAGEINDEPENDENT_LONG_Name. ProductID may have a multiplicity of 0 . . . 1 and may be based on datatype BGDT:ProductID. OwnerPartyUUID may have a multiplicity of 0 . . . 1 and may be based on datatype BGDT:UUID. OwnerPartyID may have a multiplicity of 0 . . . 1 and may be based on datatype BGDT:BusinessPartnerInternalID. SupplyPlanningAreaUUID may have a multiplicity of 0 . . . 1 and may be based on datatype BGDT: UUID. SupplyPlanningAreaID may have a multiplicity of 0 . . . 1 and may be based on datatype BGDT:SupplyPlanningAreaID. InventoryRestrictedUseIndicator may have a multiplicity of 0 . . . 1 and may be based on datatype CDT: Indicator.

The package GoodsAndActivityConfirmation-InventoryChangeItemOverview-InventoryItemChangeIdentifiedStockInventorySeparatingValues includes the entity IdentifiedStockInventorySeparatingValues. IdentifiedStockInventorySeparatingValues includes the following non-node elements: IdentifiedStockUUID, ID, MaterialKey, ProductTypeCode, ProductTypeName, ProductidentifierTypeCode, ProductidentifierTypeName, and ProductID. IdentifiedStockUUID may have a multiplicity of 0 . . . 1 and may be based on datatype BGDT:UUID. IdentifiedStockKey may have a multiplicity of 0 . . . 1 and may be based on datatype MIDT:GACCnfInvItOvSBElResponseInventoryItemChangeIdentified-StockInventorySeparatingValuesIdentifiedStockKey. ID may have a multiplicity of 0 . . . 1 and may be based on datatype BGDT:IdentifiedStockID. MaterialKey may have a multiplicity of 0 . . . 1 and may be based on datatype MIDT: GACCnfInvItOvSBElResponseInventoryItemChangeIdentified-StockInventorySeparatingValuesIdentifiedStockKey MaterialKey. ProductTypeCode may have a multiplicity of 0 . . . 1 and may be based on datatype BGDT:ProductTypeCode. ProductTypeName may have a multiplicity of 0 . . . 1 and may be based on datatype CDT:LANGUAGEINDEPENDENT_ LONG_Name. ProductidentifierTypeCode may have a multiplicity of 0 . . . 1 and may be based on datatype BGDT:ProductidentifierTypeCode. ProductidentifierTypeName may have a multiplicity of 0 . . . 1 and may be based on datatype CDT:LANGUAGEINDEPENDENT_LONG_Name. ProductID may have a multiplicity of 0 . . . 1 and may be based on datatype BGDT:ProductID.

The package GoodsAndActivityConfirmation-InventoryChangeItemOverview-InventoryItemChangeSpecial StockSeparatingValues includes the entity SpecialStockSeparatingValues. SpecialStockSeparatingValues includes the following non-node elements: OutboundDeliveryReference, ID, UUID, SiteLogisticsLotUUID, and SiteLogisticsLotID. OutboundDeliveryReference may have a multiplicity of 0 . . . 1 and may be based on datatype MIDT:GACCnfInvItOvSBElResponseInventoryItem-ChangeSpecialStockSeparatingValuesOutboundDeliveryReference. ID may have a multiplicity of 0 . . . 1 and may be based on datatype BGDT: BusinessTransactionDocumentID. UUID may have a multiplicity of 0 . . . 1 and may be based on datatype BGDT:UUID. SiteLogisticsLotUUID may have a multiplicity of 0 . . . 1 and may be based on datatype BGDT:UUID. SiteLogisticsLotID may have a multiplicity of 0 . . . 1 and may be based on datatype BGDT:BusinessTransactionDocumentID.

FIGS. 34-1 through 34-44 show an example configuration of an Element Structure that includes a Goods and Activity Confirmation Inventory Change Item Overview Simple by Elements Query_sync 340000 package. Specifically, these figures depict the arrangement and hierarchy of various components such as one or more levels of packages, entities, and datatypes, shown here as 340000 through 341400. As described above, packages may be used to represent hierarchy levels. Entities are discrete business elements that are used during a business transaction. Data types are used to type object entities and interfaces with a structure. For example, the Goods and Activity Confirmation Inventory Change Item Overview Simple by Elements Query_sync 340000 includes, among other things, a Goods and Activity Confirmation Inventory Change Item Overview Simple by Elements Query_sync 340002. Accordingly, heterogeneous applications may communicate using this consistent message configured as such.

The Goods and Activity Confirmation Inventory Change Item Overview Simple by Elements Query_sync 340000 package is a GoodsAndActivityConfirmationInventoryChangeItemOverviewSimpleByElementsQueryMessage_sync 340004 data type. The Goods and Activity Confirmation Inventory Change Item Overview Simple by Elements Query_sync 340000 package includes a Goods and Activity Confirmation Inventory Change Item Overview Simple by Elements Query_sync 340002 entity. The Goods and Activity Confirmation Inventory Change Item Overview Simple by Elements Query_sync 340000 package includes various packages, namely a GoodsAndActivityConfirmationInventoryChangeItemOverviewSimpleSelectionByElements 340006 and a ProcessingConditions 341394. The GoodsAndActivityConfirmationInventoryChangeItemOverviewSimpleSelectionByElements 340006 package is a GoodsAndActivityConfirmationInventoryChangeItemOverviewSimpleByElementsQuery 340012 data type. The GoodsAndActivityConfirmationInventoryChangeItemOverviewSimpleSelectionByElements 340006 package includes a GoodsAndActivityConfirmationInventoryChangeItemOverviewSimpleSelectionByElements 340008 entity.

The GoodsAndActivityConfirmationInventoryChangeItemOverviewSimpleSelectionByElements 340008 entity has a cardinality of 1 340010 meaning that for each instance of the GoodsAndActivityConfirmationInventoryChangeItemOverviewSimpleSelectionByElements 340006 package there is one GoodsAndActivityConfirmationInventoryChangeItemOverviewSimpleSelectionByElements 340008 entity. The GoodsAndActivityConfirmationInventoryChangeItemOverview SimpleSelectionByElements 340008 entity includes various subordinate entities, namely a SelectionByInventoryLocationInventoryTypeCode 340014, a SelectionByInventoryLocationLocationUUID 340044, a SelectionByInventoryLocationLocationID 340074, a SelectionByInventoryLocationCustodianPartyUUID 340104, a SelectionByInventoryLocationCustodianPartyInternalID 340134, a SelectionByInventoryLocationLogisticsAreaUUID 340164, a SelectionByInventoryLocationLogisticsAreaKeyID 340194, a SelectionByInventoryLocationLogisticsAreaKeySiteID 340224, a SelectionByInventoryLocationInventoryManagedLocationUUID 340254, a SelectionByInventoryLocationInventoryManagedLogisticsAreaUUID 340284, a SelectionByInventoryLocationPermanentEstablishmentUUID 340314, a SelectionByInventoryItemChangeMainInventorySeparatingValuesMaterialUUID 340344, a SelectionByInventoryItemChangeMainInventorySeparatingValuesMaterialKeyProductTypeCode 340374, a SelectionByInventoryItemChangeMainInventorySeparatingValues MaterialKeyProductIdentifierTypeCode 340404, a SelectionByInventoryItemChangeMainInventorySeparatingValuesMaterialKeyProductID 340434, a SelectionByInventoryItemChangeMainInventorySeparatingValuesOwnerPartyUUID 340464, a SelectionByInventoryItemChangeMainInventorySeparatingValuesOwnerPartyID 340494, a SelectionByInventoryItemChangeMainInventorySeparatingValuesSupplyPlanningAreaUUID 340524, a SelectionByInventoryItemChangeMainInventorySeparatingValuesSupply PlanningAreaID 340554, a SelectionByInventoryItemChangeMainInventorySeparatingValuesInventoryRestrictedUseIndicator 340584, a SelectionByInventoryItemChangeIdentifiedStockInventorySeparating ValuesIdentifiedStockUUID 340614, a SelectionByInventoryItemChangeIdentifiedStockInventorySeparatingValuesIdentifiedStockKeyID 340644, a SelectionByInventoryItemChangeSpecialStockSeparatingValuesOutboundDeliveryReference ID 340674, a SelectionByInventoryItemChangeSpecialStockSeparatingValues OutboundDeliveryReferenceUUID 340704, a SelectionByInventoryItemChangeSpecialStockSeparatingValuesSiteLogisticsLotUUID 340734, a SelectionByInventoryItemChangeSpecialStockSeparatingValuesSiteLogisticsLotID 340764, a SelectionByInventoryItemChangeDefaultRecordedQuantityUUID 340794, a SelectionByChangeReasonCode 340824, a SelectionByID 340854, a SelectionByInventoryMovementDirectionCode 340884, a SelectionByInventoryRelevanceIndicator 340914, a SelectionByInventoryManagedQuantity 340944, a SelectionByInventoryManagedQuantityTypeCode 340974, a SelectionByDefaultRecordedQuantity 341004, a SelectionByDefaultRecordedQuantityTypeCode 341034, a SelectionBySiteUUID 341064, a SelectionByTransferGroupID 341094, a SelectionByConfirmationCreationDateTime 341124, a SelectionByConfirmationBusinessTransactionDateTime 341154, a SelectionByConfirmationCancellationStatusCode 341184, a SelectionByConfirmationCancellationDocumentIndicator 341214, a SelectionByConfirmationCancelledConfirmationUUID 341244, a SelectionByConfirmationCompanyID 341274, a SelectionByConfirmationCompanyUUID 341304, a SelectionByConfirmationID 341334 and a SelectionByConfirmationUUID 341364.

The SelectionByInventoryLocationInventoryTypeCode 340014 entity has a cardinality of 0 . . . N 340016 meaning that for each instance of the GoodsAndActivityConfirmationInventoryChangeItemOverviewSimpleSelectionByElements 340008 entity there may be one or more SelectionByInventoryLocationInventoryTypeCode 340014 entities. The SelectionByInventoryLocationInventoryTypeCode 340014 entity includes various attributes, namely an InclusionExclusionCode 340020, an IntervalBoundaryTypeCode 340026, a LowerBoundaryInventoryTypeCode 340032 and an UpperBoundaryInventoryTypeCode 340038.

The InclusionExclusionCode 340020 attribute is an InclusionExclusionCode 340024 data type. The InclusionExclusionCode 340020 attribute has a cardinality of 0 . . . 1 340022 meaning that for each instance of the SelectionByInventoryLocationInventoryTypeCode 340014 entity there may be one InclusionExclusionCode 340020 attribute. The IntervalBoundaryTypeCode 340026 attribute is an IntervalBoundaryTypeCode 340030 data type. The IntervalBoundaryTypeCode 340026 attribute has a cardinality of 1 340028 meaning that for each instance of the SelectionByInventoryLocation- InventoryTypeCode 340014 entity there is one IntervalBoundaryTypeCode 340026 attribute.

The LowerBoundaryInventoryTypeCode 340032 attribute is an InventoryTypeCode 340036 data type. The LowerBoundaryInventoryTypeCode 340032 attribute has a cardinality of 0 . . . 1 340034 meaning that for each instance of the SelectionByInventoryLocationInventoryTypeCode 340014 entity there may be one LowerBoundaryInventoryTypeCode 340032 attribute. The UpperBoundaryInventoryTypeCode 340038 attribute is an InventoryTypeCode 340042 data type. The UpperBoundaryInventoryTypeCode 340038 attribute has a cardinality of 0 . . . 1 340040 meaning that for each instance of the SelectionByInventoryLocationInventoryTypeCode 340014 entity there may be one UpperBoundaryInventoryTypeCode 340038 attribute.

The SelectionByInventoryLocationLocationUUID 340044 entity has a cardinality of 0 . . . N 340046 meaning that for each instance of the GoodsAndActivityConfirmationInventoryChangeItemOverviewSimpleSelectionByElements 340008 entity there may be one or more SelectionByInventoryLocationLocationUUID 340044 entities. The SelectionByInventoryLocationLocationUUID 340044 entity includes various attributes, namely an InclusionExclusionCode 340050, an IntervalBoundaryTypeCode 340056, a LowerBoundaryLocationUUID 340062 and an UpperBoundaryLocationUUID 340068.

The InclusionExclusionCode 340050 attribute is an InclusionExclusionCode 340054 data type. The InclusionExclusionCode 340050 attribute has a cardinality of 0 . . . 1 340052 meaning that for each instance of the SelectionByInventoryLocationLocationUUID 340044 entity there may be one InclusionExclusionCode 340050 attribute. The IntervalBoundaryTypeCode 340056 attribute is an IntervalBoundaryTypeCode 340060 data type. The IntervalBoundaryTypeCode 340056 attribute has a cardinality of 1 340058 meaning that for each instance of the SelectionByInventoryLocationLocationUUID 340044 entity there is one IntervalBoundaryTypeCode 340056 attribute.

The LowerBoundaryLocationUUID 340062 attribute is an UUID 340066 data type. The LowerBoundaryLocationUUID 340062 attribute has a cardinality of 0 . . . 1 340064 meaning that for each instance of the SelectionByInventoryLocationLocationUUID 340044 entity there may be one LowerBoundaryLocationUUID 340062 attribute. The UpperBoundaryLocationUUID 340068 attribute is an UUID 340072 data type. The UpperBoundaryLocationUUID 340068 attribute has a cardinality of 0 . . . 1 340070 meaning that for each instance of the SelectionByInventoryLocationLocationUUID 340044 entity there may be one UpperBoundaryLocationUUID 340068 attribute.

The SelectionByInventoryLocationLocationID 340074 entity has a cardinality of 0 . . . N 340076 meaning that for each instance of the GoodsAndActivityConfirmationInventoryChangeItemOverviewSimpleSelectionByElements 340008 entity there may be one or more SelectionByInventoryLocationLocationID 340074 entities. The SelectionByInventoryLocationLocationID 340074 entity includes various attributes, namely an InclusionExclusionCode 340080, an IntervalBoundaryTypeCode 340086, a LowerBoundaryLocationID 340092 and an UpperBoundaryLocationID 340098.

The InclusionExclusionCode 340080 attribute is an InclusionExclusionCode 340084 data type. The InclusionExclusionCode 340080 attribute has a cardinality of 0 . . . 1 340082 meaning that for each instance of the SelectionByInventoryLocationLocationID 340074 entity there may be one InclusionExclusionCode 340080 attribute. The IntervalBoundaryTypeCode 340086 attribute is an IntervalBoundaryTypeCode 340090 data type. The IntervalBoundaryTypeCode 340086 attribute has a cardinality of 1 340088 meaning that for each instance of the SelectionByInventoryLocationLocationID 340074 entity there is one IntervalBoundaryTypeCode 340086 attribute.

The LowerBoundaryLocationID 340092 attribute is a LocationID 340096 data type. The LowerBoundaryLocationID 340092 attribute has a cardinality of 0 . . . 1 340094 meaning that for each instance of the SelectionByInventoryLocationLocationID 340074 entity there may be one LowerBoundaryLocationID 340092 attribute. The UpperBoundaryLocationID 340098 attribute is a LocationID 340102 data type. The UpperBoundaryLocationID 340098 attribute has a cardinality of 0 . . . 1 340100 meaning that for each instance of the SelectionByInventoryLocationLocationID 340074 entity there m UpperBoundaryLocationID 340098 attribute.

The SelectionByInventoryLocationCustodianPartyUUID 340104 entity has a cardinality of 0 . . . N 340106 meaning that for each instance of the GoodsAndActivityConfirmationInventoryChangeItemOverviewSimpleSelectionByElements 340008 entity there may be one or more SelectionByInventoryLocationCustodianPartyUUID 340104 entities. The SelectionByInventoryLocationCustodianPartyUUID 340104 entity includes various attributes, namely an InclusionExclusionCode 340110, an IntervalBoundaryTypeCode 340116, a LowerBoundaryCustodianPartyUUID 340122 and an UpperBoundaryCustodianPartyUUID 340128.

The InclusionExclusionCode 340110 attribute is an InclusionExclusionCode 340114 data type. The InclusionExclusionCode 340110 attribute has a cardinality of 0 . . . 1 340112 meaning that for each instance of the SelectionByInventoryLocationCustodianPartyUUID 340104 entity there may be one InclusionExclusionCode 340110 attribute. The IntervalBoundaryTypeCode 340116 attribute is an IntervalBoundaryTypeCode 340120 data type. The IntervalBoundaryTypeCode 340116 attribute has a cardinality of 1 340118 meaning that for each instance of the SelectionByInventoryLocationCustodianPartyUUID 340104 entity there is one IntervalBoundaryTypeCode 340116 attribute.

The LowerBoundaryCustodianPartyUUID 340122 attribute is an UUID 340126 data type. The LowerBoundaryCustodianPartyUUID 340122 attribute has a cardinality of 0 . . . 1 340124 meaning that for each instance of the SelectionByInventoryLocationCustodianPartyUUID 340104 entity there may be one LowerBoundaryCustodianPartyUUID 340122 attribute. The UpperBoundaryCustodianPartyUUID 340128 attribute is an UUID 340132 data type. The UpperBoundaryCustodianPartyUUID 340128 attribute has a cardinality of 0 . . . 1 340130 meaning that for each instance of the SelectionByInventoryLocationCustodianPartyUUID 340104 entity there may be one UpperBoundaryCustodianPartyUUID 340128 attribute.

The SelectionByInventoryLocationCustodianPartyInternalID 340134 entity has a cardinality of 0 . . . N 340136 meaning that for each instance of the GoodsAndActivityConfirmationInventoryChangeItemOverviewSimpleSelectionByElements 340008 entity there may be one or more SelectionByInventoryLocationCustodianPartyInternalID 340134 entities. The SelectionByInventoryLocationCustodianPartyInternalID 340134 entity includes various attributes, namely an InclusionExclusionCode 340140, an IntervalBoundaryTypeCode 340146, a LowerBoundaryCustodianPartyInternalID 340152 and an UpperBoundaryCustodianPartyInternalID 340158.

The InclusionExclusionCode 340140 attribute is an InclusionExclusionCode 340144 data type. The InclusionExclusionCode 340140 attribute has a cardinality of 0 . . . 1 340142 meaning that for each instance of the SelectionByInventoryLocationCustodianPartyInternalID 340134 entity there may be one InclusionExclusionCode 340140 attribute. The IntervalBoundaryTypeCode 340146 attribute is an IntervalBoundaryTypeCode 340150 data type. The IntervalBoundaryTypeCode 340146 attribute has a cardinality of 1 340148 meaning that for each instance of the SelectionByInventoryLocationCustodianPartyInternalID 340134 entity there is one IntervalBoundaryTypeCode 340146 attribute.

The LowerBoundaryCustodianPartyInternalID 340152 attribute is a BusinessPartnerInternalID 340156 data type. The LowerBoundaryCustodianPartyInternalID 340152 attribute has a cardinality of 0 . . . 1 340154 meaning that for each instance of the SelectionByInventoryLocationCustodianPartyInternalID 340134 entity there may be one LowerBoundaryCustodianPartyInternalID 340152 attribute. The UpperBoundaryCustodianPartyInternalID 340158 attribute is a BusinessPartnerInternalID 340162 data type. The UpperBoundaryCustodianPartyInternalID 340158 attribute has a cardinality of 0 . . . 1 340160 meaning that for each instance of the SelectionByInventoryLocationCustodianPartyInternalID 340134 entity there may be one UpperBoundaryCustodianPartyInternalID 340158 attribute.

The SelectionByInventoryLocationLogisticsAreaUUID 340164 entity has a cardinality of 0 . . . N 340166 meaning that for each instance of the GoodsAndActivityConfirmationInventoryChangeItemOverviewSimpleSelectionByElements 340008 entity there may be one or more SelectionByInventoryLocationLogisticsAreaUUID 340164 entities. The SelectionByInventoryLocationLogisticsAreaUUID 340164 entity includes various attributes, namely an InclusionExclusionCode 340170, an IntervalBoundaryTypeCode 340176, a LowerBoundaryLogisticsAreaUUID 340182 and an UpperBoundaryLogisticsAreaUUID 340188.

The InclusionExclusionCode 340170 attribute is an InclusionExclusionCode 340174 data type. The InclusionExclusionCode 340170 attribute has a cardinality of 0 . . . 1 340172 meaning that for each instance of the SelectionByInventoryLocationLogisticsAreaUUID 340164 entity there may be one InclusionExclusionCode 340170 attribute. The IntervalBoundaryTypeCode 340176 attribute is an IntervalBoundaryTypeCode 340180 data type. The IntervalBoundaryTypeCode 340176 attribute has a cardinality of 1 340178 meaning that for each instance of the SelectionByInventoryLocationLogisticsAreaUUID 340164 entity there is one IntervalBoundaryTypeCode 340176 attribute.

The LowerBoundaryLogisticsAreaUUID 340182 attribute is an UUID 340186 data type. The LowerBoundaryLogisticsAreaUUID 340182 attribute has a cardinality of 0 . . . 1 340184 meaning that for each instance of the SelectionByInventoryLocationLogisticsAreaUUID 340164 entity there may be one LowerBoundaryLogisticsAreaUUID 340182 attribute. The UpperBoundaryLogisticsAreaUUID 340188 attribute is an UUID 340192 data type. The UpperBoundaryLogisticsAreaUUID 340188 attribute has a cardinality of 0 . . . 1 340190 meaning that for each instance of the SelectionByInventoryLocationLogisticsAreaUUID 340164 entity there may be one UpperBoundaryLogisticsAreaUUID 340188 attribute.

The SelectionByInventoryLocationLogisticsAreaKeyID 340194 entity has a cardinality of 0 . . . N 340196 meaning that for each instance of the GoodsAndActivityConfirmationInventoryChangeItemOverviewSimpleSelectionByElements 340008 entity there may be one or more SelectionByInventoryLocationLogisticsAreaKeyID 340194 entities. The SelectionByInventoryLocationLogisticsAreaKeyID 340194 entity includes various attributes, namely an InclusionExclusionCode 340200, an IntervalBoundaryTypeCode 340206, a LowerBoundaryID 340212 and an UpperBoundaryID 340218.

The InclusionExclusionCode 340200 attribute is an InclusionExclusionCode 340204 data type. The InclusionExclusionCode 340200 attribute has a cardinality of 0 . . . 1 340202 meaning that for each instance of the SelectionByInventoryLocationLogisticsAreaKeyID 340194 entity there may be one InclusionExclusionCode 340200 attribute. The IntervalBoundaryTypeCode 340206 attribute is an IntervalBoundaryTypeCode 340210 data type. The IntervalBoundaryTypeCode 340206 attribute has a cardinality of 1 340208 meaning that for each instance of the SelectionByInventoryLocationLogisticsAreaKeyID 340194 entity there is one IntervalBoundaryTypeCode 340206 attribute.

The LowerBoundaryID 340212 attribute is a LogisticsAreaID 340216 data type. The LowerBoundaryID 340212 attribute has a cardinality of 0 . . . 1 340214 meaning that for each instance of the SelectionByInventoryLocationLogisticsAreaKeyID 340194 entity there may be one LowerBoundaryID 340212 attribute. The UpperBoundaryID 340218 attribute is a LogisticsAreaID 340222 data type. The UpperBoundaryID 340218 attribute has a cardinality of 0 . . . 1 340220 meaning that for each instance of the SelectionByInventoryLocationLogisticsAreaKeyID 340194 entity there may be one UpperBoundaryID 340218 attribute.

The SelectionByInventoryLocationLogisticsAreaKeySiteID 340224 entity has a cardinality of 0 . . . N 340226 meaning that for each instance of the GoodsAndActivityConfirmationInventoryChangeItemOverviewSimpleSelectionByElements 340008 entity there may be one or more SelectionByInventoryLocationLogisticsAreaKeySiteID 340224 entities. The SelectionByInventoryLocationLogisticsAreaKeySiteID 340224 entity includes various attributes, namely an InclusionExclusionCode 340230, an IntervalBoundaryTypeCode 340236, a LowerBoundarySiteID 340242 and an UpperBoundarySiteID 340248.

The InclusionExclusionCode 340230 attribute is an InclusionExclusionCode 340234 data type. The InclusionExclusionCode 340230 attribute has a cardinality of 0 . . . 1 340232 meaning that for each instance of the SelectionByInventoryLocationLogisticsAreaKeySiteID 340224 entity there may be one InclusionExclusionCode 340230 attribute. The IntervalBoundaryTypeCode 340236 attribute is an IntervalBoundaryTypeCode 340240 data type. The IntervalBoundaryTypeCode 340236 attribute has a cardinality of 1 340238 meaning that for each instance of the SelectionByInventoryLocationLogisticsAreaKeySiteID 340224 entity there is one IntervalBoundaryTypeCode 340236 attribute.

The LowerBoundarySiteID 340242 attribute is a LocationID 340246 data type. The LowerBoundarySiteID 340242 attribute has a cardinality of 0 . . . 1 340244 meaning that for each instance of the SelectionByInventoryLocationLogisticsAreaKeySiteID 340224 entity there may be one LowerBoundarySiteID 340242 attribute. The UpperBoundarySiteID 340248 attribute is a LocationID 340252 data type. The UpperBoundarySiteID 340248 attribute has a cardinality of 0 . . . 1 340250 meaning that for each instance of the SelectionByInventoryLocationLogisticsAreaKeySiteID 340224 entity there may be one UpperBoundarySiteID 340248 attribute.

The SelectionByInventoryLocationInventoryManagedLocationUUID 340254 entity has a cardinality of 0 . . . N 340256 meaning that for each instance of the GoodsAndActivityConfirmationInventoryChangeItemOverviewSimpleSelectionByElements 340008 entity there may be one or more SelectionByInventoryLocationInventoryManagedLocationUUID 340254 entities. The SelectionByInventoryLocationInventoryManagedLocationUUID 340254 entity includes various attributes, namely an InclusionExclusionCode 340260, an IntervalBoundaryTypeCode 340266, a LowerBoundaryInventoryManagedLocationUUID 340272 and an UpperBoundaryInventoryManagedLocationUUID 340278.

The InclusionExclusionCode 340260 attribute is an InclusionExclusionCode 340264 data type. The InclusionExclusionCode 340260 attribute has a cardinality of 0 . . . 1 340262 meaning that for each instance of the SelectionByInventoryLocationInventoryManagedLocationUUID 340254 entity there may be one InclusionExclusionCode 340260 attribute. The IntervalBoundaryTypeCode 340266 attribute is an IntervalBoundaryTypeCode 340270 data type. The IntervalBoundaryTypeCode 340266 attribute has a cardinality of 1 340268 meaning that for each instance of the SelectionByInventoryLocationInventoryManagedLocationUUID 340254 entity there is one IntervalBoundaryTypeCode 340266 attribute.

The LowerBoundaryInventoryManagedLocationUUID 340272 attribute is an UUID 340276 data type. The LowerBoundaryInventoryManagedLocationUUID 340272 attribute has a cardinality of 0 . . . 1 340274 meaning that for each instance of the SelectionByInventoryLocationInventoryManagedLocationUUID 340254 entity there may be one LowerBoundaryInventoryManagedLocationUUID 340272 attribute. The UpperBoundaryInventoryManagedLocationUUID 340278 attribute is an UUID 340282 data type. The UpperBoundaryInventoryManagedLocationUUID 340278 attribute has a cardinality of 0 . . . 1 340280 meaning that for each instance of the SelectionByInventoryLocationInventoryManagedLocationUUID 340254 entity there may be one UpperBoundaryInventoryManagedLocationUUID 340278 attribute.

The SelectionByInventoryLocationInventoryManagedLogisticsAreaUUID 340284 entity has a cardinality of 0 . . . N 340286 meaning that for each instance of the GoodsAndActivityConfirmationInventoryChangeItemOverviewSimpleSelectionByElements 340008 entity there may be one or more SelectionByInventoryLocationInventoryManagedLogisticsAreaUUID 340284 entities. The SelectionByInventoryLocationInventoryManagedLogisticsAreaUUID 340284 entity includes various attributes, namely an InclusionExclusionCode 340290, an IntervalBoundaryTypeCode 340296, a LowerBoundaryInventoryManagedLogisticsAreaUUID 340302 and an UpperBoundaryInventoryManagedLogisticsAreaUUID 340308.

The InclusionExclusionCode 340290 attribute is an InclusionExclusionCode 340294 data type. The InclusionExclusionCode 340290 attribute has a cardinality of 0 . . . 1 340292 meaning that for each instance of the SelectionByInventoryLocationInventoryManagedLogisticsAreaUUID 340284 entity there may be one InclusionExclusionCode 340290 attribute. The IntervalBoundaryTypeCode 340296 attribute is an IntervalBoundaryTypeCode 340300 data type. The IntervalBoundaryTypeCode 340296 attribute has a cardinality of 1 340298 meaning that for each instance of the SelectionByInventoryLocationInventoryManagedLogisticsAreaUUID 340284 entity there is one IntervalBoundaryTypeCode 340296 attribute.

The LowerBoundaryInventoryManagedLogisticsAreaUUID 340302 attribute is an UUID 340306 data type. The LowerBoundaryInventoryManagedLogisticsAreaUUID 340302 attribute has a cardinality of 0 . . . 1 340304 meaning that for each instance of the SelectionByInventoryLocationInventoryManagedLogisticsAreaUUID 340284 entity there may be one LowerBoundaryInventoryManagedLogisticsAreaUUID 340302 attribute. The UpperBoundaryInventoryManagedLogisticsAreaUUID 340308 attribute is an UUID 340312 data type. The UpperBoundaryInventoryManagedLogisticsAreaUUID 340308 attribute has a cardinality of 0 . . . 1 340310 meaning that for each instance of the SelectionByInventoryLocationInventoryManagedLogisticsAreaUUID 340284 entity there may be one UpperBoundaryInventoryManagedLogisticsAreaUUID 340308 attribute.

The SelectionByInventoryLocationPermanentEstablishmentUUID 340314 entity has a cardinality of 0 . . . N 340316 meaning that for each instance of the GoodsAndActivityConfirmationInventoryChangeItemOverviewSimpleSelectionByElements 340008 entity there may be one or more SelectionByInventoryLocationPermanentEstablishmentUUID 340314 entities. The SelectionByInventoryLocationPermanentEstablishmentUUID 340314 entity includes various attributes, namely an InclusionExclusionCode 340320, an IntervalBoundaryTypeCode 340326, a LowerBoundaryPermanentEstablishmentUUID 340332 and an UpperBoundaryPermanentEstablishmentUUID 340338.

The InclusionExclusionCode 340320 attribute is an InclusionExclusionCode 340324 data type. The InclusionExclusionCode 340320 attribute has a cardinality of 0 . . . 1 340322 meaning that for each instance of the SelectionByInventoryLocationPermanentEstablishmentUUID 340314 entity there may be one InclusionExclusionCode 340320 attribute. The IntervalBoundaryTypeCode 340326 attribute is an IntervalBoundaryTypeCode 340330 data type. The IntervalBoundaryTypeCode 340326 attribute has a cardinality of 1 340328 meaning that for each instance of the SelectionByInventoryLocationPermanentEstablishmentUUID 340314 entity there is one IntervalBoundaryTypeCode 340326 attribute.

The LowerBoundaryPermanentEstablishmentUUID 340332 attribute is an UUID 340336 data type. The LowerBoundaryPermanentEstablishmentUUID 340332 attribute has a cardinality of 0 . . . 1 340334 meaning that for each instance of the SelectionByInventoryLocationPermanentEstablishmentUUID 340314 entity there may be one LowerBoundaryPermanentEstablishmentUUID 340332 attribute. The UpperBoundaryPermanentEstablishmentUUID 340338 attribute is an UUID 340342 data type. The UpperBoundaryPermanentEstablishmentUUID 340338 attribute has a cardinality of 0 . . . 1 340340 meaning that for each instance of the SelectionByInventoryLocationPermanentEstablishmentUUID 340314 entity there may be one UpperBoundaryPermanentEstablishmentUUID 340338 attribute.

The SelectionByInventoryItemChangeMainInventorySeparatingValuesMaterialUUID 340344 entity has a cardinality of 0 . . . N 340346 meaning that for each instance of the GoodsAndActivityConfirmationInventoryChangeItemOverviewSimpleSelectionByElements 340008 entity there may be one or more SelectionByInventoryItemChangeMainInventorySeparatingValuesMaterialUUID 340344 entities. The SelectionByInventoryItemChangeMainInventorySeparatingValuesMaterialUUID 340344 entity includes various attributes, namely an InclusionExclusionCode 340350, an IntervalBoundaryTypeCode 340356, a LowerBoundaryMaterialUUID 340362 and an UpperBoundaryMaterialUUID 340368.

The InclusionExclusionCode 340350 attribute is an InclusionExclusionCode 340354 data type. The InclusionExclusionCode 340350 attribute has a cardinality of 0 . . . 1 340352 meaning that for each instance of the SelectionByInventoryItemChangeMainInventorySeparatingValuesMaterialUUID 340344 entity there may be one InclusionExclusionCode 340350 attribute. The IntervalBoundaryTypeCode 340356 attribute is an IntervalBoundaryTypeCode 340360 data type. The IntervalBoundaryTypeCode 340356 attribute has a cardinality of 1 340358 meaning that for each instance of the SelectionByInventoryItemChangeMainInventorySeparatingValuesMaterialUUID 340344 entity there is one IntervalBoundaryTypeCode 340356 attribute.

The LowerBoundaryMaterialUUID 340362 attribute is an UUID 340366 data type. The LowerBoundaryMaterialUUID 340362 attribute has a cardinality of 0 . . . 1 340364 meaning that for each instance of the SelectionByInventoryItemChangeMainInventorySeparatingValuesMaterialUUID 340344 entity there may be one LowerBoundaryMaterialUUID 340362 attribute. The UpperBoundaryMaterialUUID 340368 attribute is an UUID 340372 data type. The UpperBoundaryMaterialUUID 340368 attribute has a cardinality of 0 . . . 1 340370 meaning that for each instance of the SelectionByInventoryItemChangeMainInventorySeparatingValuesMaterialUUID 340344 entity there may be one UpperBoundaryMaterialUUID 340368 attribute.

The SelectionByInventoryItemChangeMainInventorySeparatingValuesMaterialKeyProductTypeCode 340374 entity has a cardinality of 0 . . . N 340376 meaning that for each instance of the GoodsAndActivityConfirmationInventoryChangeItemOverviewSimpleSelectionByElements 340008 entity there may be one or more SelectionByInventoryItemChangeMainInventorySeparatingValuesMaterialKeyProductTypeCode 340374 entities. The SelectionByInventoryItemChangeMainInventorySeparatingValuesMaterialKeyProductTypeCode 340374 entity includes various attributes, namely an InclusionExclusionCode 340380, an IntervalBoundaryTypeCode 340386, a LowerBoundaryProductTypeCode 340392 and an UpperBoundaryProductTypeCode 340398.

The InclusionExclusionCode 340380 attribute is an InclusionExclusionCode 340384 data type. The InclusionExclusionCode 340380 attribute has a cardinality of 0 . . . 1 340382 meaning that for each instance of the SelectionByInventoryItemChangeMainInventorySeparatingValuesMaterialKeyProductTypeCode 340374 entity there may be one InclusionExclusionCode 340380 attribute. The IntervalBoundaryTypeCode 340386 attribute is an IntervalBoundaryTypeCode 340390 data type. The IntervalBoundaryTypeCode 340386 attribute has a cardinality of 1 340388 meaning that for each instance of the SelectionByInventoryItemChangeMainInventorySeparatingValuesMaterialKeyProductTypeCode 340374 entity there is one IntervalBoundaryTypeCode 340386 attribute.

The LowerBoundaryProductTypeCode 340392 attribute is a ProductTypeCode 340396 data type. The LowerBoundaryProductTypeCode 340392 attribute has a cardinality of 0 . . . 1 340394 meaning that for each instance of the SelectionByInventoryItemChangeMainInventorySeparatingValuesMaterialKeyProductTypeCode 340374 entity there may be one LowerBoundaryProductTypeCode 340392 attribute. The UpperBoundaryProductTypeCode 340398 attribute is a ProductTypeCode 340402 data type. The UpperBoundaryProductTypeCode 340398 attribute has a cardinality of 0 . . . 1 340400 meaning that for each instance of the SelectionByInventoryItemChangeMainInventorySeparatingValuesMaterialKeyProductTypeCode 340374 entity there may be one UpperBoundaryProductTypeCode 340398 attribute.

The SelectionByInventoryItemChangeMainInventorySeparatingValuesMaterialKeyProductIdentifierTypeCode 340404 entity has a cardinality of 0 . . . N 340406 meaning that for each instance of the GoodsAndActivityConfirmationInventoryChangeItemOverviewSimpleSelectionByElements 340008 entity there may be one or more SelectionByInventoryItemChangeMainInventorySeparatingValuesMaterialKeyProductIdentifierTypeCode 340404 entities. The SelectionByInventoryItemChangeMainInventorySeparatingValuesMaterialKeyProductIdentifierTypeCode 340404 entity includes various attributes, namely an InclusionExclusionCode 340410, an IntervalBoundaryTypeCode 340416, a LowerBoundaryProductIdentifierTypeCode 340422 and an UpperBoundaryProductIdentifierTypeCode 340428.

The InclusionExclusionCode 340410 attribute is an InclusionExclusionCode 340414 data type. The InclusionExclusionCode 340410 attribute has a cardinality of 0 . . . 1 340412 meaning that for each instance of the SelectionByInventoryItemChangeMainInventorySeparatingValuesMaterialKeyProductIdentifierTypeCode 340404 entity there may be one InclusionExclusionCode 340410 attribute. The IntervalBoundaryTypeCode 340416 attribute is an IntervalBoundaryTypeCode 340420 data type. The IntervalBoundaryTypeCode 340416 attribute has a cardinality of 1 340418 meaning that for each instance of the SelectionByInventoryItemChangeMainInventorySeparatingValuesMaterialKeyProductIdentifierTypeCode 340404 entity there is one IntervalBoundaryTypeCode 340416 attribute.

The LowerBoundaryProductIdentifierTypeCode 340422 attribute is a ProductIdentifierTypeCode 340426 data type. The LowerBoundaryProductIdentifierTypeCode 340422 attribute has a cardinality of 0 . . . 1 340424 meaning that for each instance of the SelectionByInventoryItemChangeMainInventorySeparatingValuesMaterialKeyProductIdentifierTypeCode 340404 entity there may be one LowerBoundaryProductIdentifierTypeCode 340422 attribute. The UpperBoundaryProductIdentifierTypeCode 340428 attribute is a ProductIdentifierTypeCode 340432 data type. The UpperBoundaryProductIdentifierTypeCode 340428 attribute has a cardinality of 0 . . . 1 340430 meaning that for each instance of the SelectionByInventoryItemChangeMainInventorySeparatingValuesMaterialKeyProductIdentifierTypeCode 340404 entity there may be one UpperBoundaryProductIdentifierTypeCode 340428 attribute.

The SelectionByInventoryItemChangeMainInventorySeparatingValuesMaterialKeyProductID 340434 entity has a cardinality of 0 . . . N 340436 meaning that for each instance of the GoodsAndActivityConfirmationInventoryChangeItemOverviewSimpleSelectionByElements 340008 entity there may be one or more SelectionByInventoryItemChangeMainInventorySeparatingValuesMaterialKeyProductID 340434 entities. The SelectionByInventoryItemChangeMainInventorySeparatingValuesMaterialKeyProductID 340434 entity includes various attributes, namely an InclusionExclusionCode 340440, an IntervalBoundaryTypeCode 340446, a LowerBoundaryProductID 340452 and an UpperBoundaryProductID 340458.

The InclusionExclusionCode 340440 attribute is an InclusionExclusionCode 340444 data type. The InclusionExclusionCode 340440 attribute has a cardinality of 0 . . . 1 340442 meaning that for each instance of the SelectionByInventoryItemChangeMainInventorySeparatingValuesMaterialKeyProductID 340434 entity there may be one InclusionExclusionCode 340440 attribute. The IntervalBoundaryTypeCode 340446 attribute is an IntervalBoundaryTypeCode 340450 data type. The IntervalBoundaryTypeCode 340446 attribute has a cardinality of 1 340448 meaning that for each instance of the SelectionByInventoryItemChangeMainInventorySeparatingValuesMaterialKeyProductID 340434 entity there is one IntervalBoundaryTypeCode 340446 attribute.

The LowerBoundaryProductID 340452 attribute is a ProductID 340456 data type. The LowerBoundaryProductID 340452 attribute has a cardinality of 0 . . . 1 340454 meaning that for each instance of the SelectionByInventoryItemChangeMainInventorySeparatingValuesMaterialKeyProductID 340434 entity there may be one LowerBoundaryProductID 340452 attribute. The UpperBoundaryProductID 340458 attribute is a ProductID 340462 data type. The UpperBoundaryProductID 340458 attribute has a cardinality of 0 . . . 1 340460 meaning that for each instance of the SelectionByInventoryItemChangeMainInventorySeparatingValuesMaterialKeyProductID 340434 entity there may be one UpperBoundaryProductID 340458 attribute.

The SelectionByInventoryItemChangeMainInventorySeparatingValuesOwnerPartyUUID 340464 entity has a cardinality of 0 . . . N 340466 meaning that for each instance of the GoodsAndActivityConfirmationInventoryChangeItemOverviewSimpleSelectionByElements 340008 entity there may be one or more SelectionByInventoryItemChangeMainInventorySeparatingValuesOwnerPartyUUID 340464 entities. The SelectionByInventoryItemChangeMainInventorySeparatingValuesOwnerPartyUUID 340464 entity includes various attributes, namely an InclusionExclusionCode 340470, an IntervalBoundaryTypeCode 340476, a LowerBoundaryOwnerPartyUUID 340482 and an UpperBoundaryOwnerPartyUUID 340488.

The InclusionExclusionCode 340470 attribute is an InclusionExclusionCode 340474 data type. The InclusionExclusionCode 340470 attribute has a cardinality of 0 . . . 1 340472 meaning that for each instance of the SelectionByInventoryItemChangeMainInventorySeparatingValuesOwnerPartyUUID 340464 entity there may be one InclusionExclusionCode 340470 attribute. The IntervalBoundaryTypeCode 340476 attribute is an IntervalBoundaryTypeCode 340480 data type. The IntervalBoundaryTypeCode 340476 attribute has a cardinality of 1 340478 meaning that for each instance of the SelectionByInventoryItemChangeMainInventorySeparatingValuesOwnerPartyUUID 340464 entity there is one IntervalBoundaryTypeCode 340476 attribute.

The LowerBoundaryOwnerPartyUUID 340482 attribute is an UUID 340486 data type. The LowerBoundaryOwnerPartyUUID 340482 attribute has a cardinality of 0 . . . 1 340484 meaning that for each instance of the SelectionByInventoryItemChangeMainInventorySeparatingValuesOwnerPartyUUID 340464 entity there may be one LowerBoundaryOwnerPartyUUID 340482 attribute. The UpperBoundaryOwnerPartyUUID 340488 attribute is an UUID 340492 data type. The UpperBoundaryOwnerPartyUUID 340488 attribute has a cardinality of 0 . . . 1 340490 meaning that for each instance of the SelectionByInventoryItemChangeMainInventorySeparatingValuesOwnerPartyUUID 340464 entity there may be one UpperBoundaryOwnerPartyUUID 340488 attribute.

The SelectionByInventoryItemChangeMainInventorySeparatingValuesOwnerPartyID 340494 entity has a cardinality of 0 . . . N 340496 meaning that for each instance of the GoodsAndActivityConfirmationInventoryChangeItemOverviewSimpleSelectionByElements 340008 entity there may be one or more SelectionByInventoryItemChangeMainInventorySeparatingValuesOwnerPartyID 340494 entities. The SelectionByInventoryItemChangeMainInventorySeparatingValuesOwnerPartyID 340494 entity includes various attributes, namely an InclusionExclusionCode 340500, an IntervalBoundaryTypeCode 340506, a LowerBoundaryOwnerPartyID 340512 and an UpperBoundaryOwnerPartyID 340518.

The InclusionExclusionCode 340500 attribute is an InclusionExclusionCode 340504 data type. The InclusionExclusionCode 340500 attribute has a cardinality of 0 . . . 1 340502 meaning that for each instance of the SelectionByInventoryItemChangeMainInventorySeparatingValuesOwnerPartyID 340494 entity there may be one InclusionExclusionCode 340500 attribute. The IntervalBoundaryTypeCode 340506 attribute is an IntervalBoundaryTypeCode 340510 data type. The IntervalBoundaryTypeCode 340506 attribute has a cardinality of 1 340508 meaning that for each instance of the SelectionByInventoryItemChangeMainInventorySeparatingValuesOwnerPartyID 340494 entity there is one IntervalBoundaryTypeCode 340506 attribute.

The LowerBoundaryOwnerPartyID 340512 attribute is a BusinessPartnerInternalID 340516 data type. The LowerBoundaryOwnerPartyID 340512 attribute has a cardinality of 0 . . . 1 340514 meaning that for each instance of the SelectionByInventoryItemChangeMainInventorySeparatingValuesOwnerPartyID 340494 entity there may be one LowerBoundaryOwnerPartyID 340512 attribute. The UpperBoundaryOwnerPartyID 340518 attribute is a BusinessPartnerInternalID 340522 data type. The UpperBoundaryOwnerPartyID 340518 attribute has a cardinality of 0 . . . 1 340520 meaning that for each instance of the SelectionByInventoryItemChangeMainInventorySeparatingValuesOwnerPartyID 340494 entity there may be one UpperBoundaryOwnerPartyID 340518 attribute.

The SelectionByInventoryItemChangeMainInventorySeparatingValuesSupplyPlanningAreaUUID 340524 entity has a cardinality of 0 . . . N 340526 meaning that for each instance of the GoodsAndActivityConfirmation-InventoryChangeItemOverviewSimpleSelectionByElements 340008 entity there may be one or more SelectionByInventoryItemChangeMainInventorySeparatingValuesSupplyPlanningAreaUUID 340524 entities. The SelectionByInventoryItemChangeMainInventorySeparating ValuesSupplyPlanningAreaUUID 340524 entity includes various attributes, namely an InclusionExclusionCode 340530, an IntervalBoundaryTypeCode 340536, a LowerBoundarySupplyPlanningAreaUUID 340542 and an UpperBoundarySupplyPlanningAreaUUID 340548.

The InclusionExclusionCode 340530 attribute is an InclusionExclusionCode 340534 data type. The InclusionExclusionCode 340530 attribute has a cardinality of 0 . . . 1 340532 meaning that for each instance of the SelectionByInventoryItemChangeMainInventorySeparatingValuesSupplyPlanningAreaUUID 340524 entity there may be one InclusionExclusionCode 340530 attribute. The IntervalBoundaryTypeCode 340536 attribute is an IntervalBoundaryTypeCode 340540 data type. The IntervalBoundaryTypeCode 340536 attribute has a cardinality of 1 340538 meaning that for each instance of the SelectionByInventoryItemChangeMainInventorySeparatingValuesSupplyPlanningAreaUUID 340524 entity there is one IntervalBoundaryTypeCode 340536 attribute.

The LowerBoundarySupplyPlanningAreaUUID 340542 attribute is an UUID 340546 data type. The LowerBoundarySupplyPlanningAreaUUID 340542 attribute has a cardinality of 0 . . . 1 340544 meaning that for each instance of the SelectionByInventoryItemChangeMainInventorySeparatingValuesSupplyPlanningAreaUUID 340524 entity there may be one LowerBoundarySupplyPlanningAreaUUID 340542 attribute. The UpperBoundarySupplyPlanningAreaUUID 340548 attribute is an UUID 340552 data type. The UpperBoundarySupplyPlanningAreaUUID 340548 attribute has a cardinality of 0 . . . 1 340550 meaning that for each instance of the SelectionByInventoryItemChangeMainInventorySeparatingValuesSupplyPlanningAreaUUID 340524 entity there may be one UpperBoundarySupplyPlanningAreaUUID 340548 attribute.

The SelectionByInventoryItemChangeMainInventorySeparatingValuesSupplyPlanningAreaID 340554 entity has a cardinality of 0 . . . N 340556 meaning that for each instance of the GoodsAndActivityConfirmationInventoryChangeItemOverviewSimpleSelectionByElements 340008 entity there may be one or more SelectionByInventoryItemChangeMainInventorySeparatingValuesSupplyPlanningAreaID 340554 entities. The SelectionByInventoryItemChangeMainInventorySeparatingValuesSupplyPlanningAreaID 340554 entity includes various attributes, namely an InclusionExclusionCode 340560, an IntervalBoundaryTypeCode 340566, a LowerBoundarySupplyPlanningAreaID 340572 and an UpperBoundarySupplyPlanningAreaID 340578.

The InclusionExclusionCode 340560 attribute is an InclusionExclusionCode 340564 data type. The InclusionExclusionCode 340560 attribute has a cardinality of 0 . . . 1 340562 meaning that for each instance of the SelectionByInventoryItemChangeMainInventorySeparatingValuesSupplyPlanningAreaID 340554 entity there may be one InclusionExclusionCode 340560 attribute. The IntervalBoundaryTypeCode 340566 attribute is an IntervalBoundaryTypeCode 340570 data type. The IntervalBoundaryTypeCode 340566 attribute has a cardinality of 1 340568 meaning that for each instance of the SelectionByInventoryItemChangeMainInventorySeparatingValuesSupplyPlanningAreaID 340554 entity there is one IntervalBoundaryTypeCode 340566 attribute.

The LowerBoundarySupplyPlanningAreaID 340572 attribute is a SupplyPlanningAreaID 340576 data type. The LowerBoundarySupplyPlanningAreaID 340572 attribute has a cardinality of 0 . . . 1 340574 meaning that for each instance of the SelectionByInventoryItemChangeMainInventorySeparatingValuesSupplyPlanningAreaID 340554 entity there may be one LowerBoundarySupplyPlanningAreaID 340572 attribute. The UpperBoundarySupplyPlanningAreaID 340578 attribute is a SupplyPlanningAreaID 340582 data type. The UpperBoundarySupplyPlanningAreaID 340578 attribute has a cardinality of 0 . . . 1 340580 meaning that for each instance of the SelectionByInventoryItemChangeMainInventorySeparatingValuesSupplyPlanningAreaID 340554 entity there may be one UpperBoundarySupplyPlanningAreaID 340578 attribute.

The SelectionByInventoryItemChangeMainInventorySeparatingValuesInventoryRestrictedUseIndicator 340584 entity has a cardinality of 0 . . . N 340586 meaning that for each instance of the GoodsAndActivityConfirmation-InventoryChangeItemOverviewSimpleSelectionByElements 340008 entity there may be one or more SelectionByInventoryItemChangeMainInventorySeparatingValuesInventoryRestrictedUseIndicator 340584 entities. The SelectionByInventoryItemChangeMainInventorySeparatingValuesInventoryRestrictedUseIndicator 340584 entity includes various attributes, namely an InclusionExclusionCode 340590, an IntervalBoundaryTypeCode 340596, a LowerBoundaryInventoryRestrictedUseIndicator 340602 and an UpperBoundaryInventoryRestrictedUseIndicator 340608.

The InclusionExclusionCode 340590 attribute is an InclusionExclusionCode 340594 data type. The InclusionExclusionCode 340590 attribute has a cardinality of 0 . . . 1 340592 meaning that for each instance of the SelectionByInventoryItemChangeMainInventorySeparatingValuesInventoryRestrictedUseIndicator 340584 entity there may be one InclusionExclusionCode 340590 attribute. The IntervalBoundaryTypeCode 340596 attribute is an IntervalBoundaryTypeCode 340600 data type. The IntervalBoundaryTypeCode 340596 attribute has a cardinality of 1 340598 meaning that for each instance of the SelectionByInventoryItemChangeMainInventorySeparatingValuesInventoryRestrictedUseIndicator 340584 entity there is one IntervalBoundaryTypeCode 340596 attribute.

The LowerBoundaryInventoryRestrictedUseIndicator 340602 attribute is an Indicator 340606 data type. The LowerBoundaryInventoryRestrictedUseIndicator 340602 attribute has a cardinality of 0 . . . 1 340604 meaning that for each instance of the SelectionByInventoryItemChangeMainInventorySeparatingValuesInventoryRestrictedUseIndicator 340584 entity there may be one LowerBoundaryInventoryRestrictedUseIndicator 340602 attribute. The UpperBoundaryInventoryRestrictedUseIndicator 340608 attribute is an Indicator 340612 data type. The UpperBoundaryInventoryRestrictedUseIndicator 340608 attribute has a cardinality of 0 . . . 1 340610 meaning that for each instance of the SelectionByInventoryItemChangeMainInventorySeparatingValuesInventoryRestrictedUseIndicator 340584 entity there may be one UpperBoundaryInventoryRestrictedUseIndicator 340608 attribute.

The SelectionByInventoryItemChangeIdentifiedStockInventorySeparatingValuesIdentifiedStockUUID 340614 entity has a cardinality of 0 . . . N 340616 meaning that for each instance of the GoodsAndActivityConfirmationInventoryChangeItemOverviewSimpleSelectionByElements 340008 entity there may be one or more SelectionByInventoryItemChangeIdentifiedStockInventorySeparatingValuesIdentifiedStockUUID 340614 entities. The SelectionByInventoryItemChangeIdentifiedStockInventorySeparatingValuesIdentifiedStockUUID 340614 entity includes various attributes, namely an InclusionExclusionCode 340620, an IntervalBoundaryTypeCode 340626, a LowerBoundaryIdentifiedStockUUID 340632 and an UpperBoundaryIdentifiedStockUUID 340638.

The InclusionExclusionCode 340620 attribute is an InclusionExclusionCode 340624 data type. The InclusionExclusionCode 340620 attribute has a cardinality of 0 . . . 1 340622 meaning that for each instance of the SelectionByInventoryItemChangeIdentifiedStockInventorySeparatingValuesIdentifiedStockUUID 340614 entity there may be one InclusionExclusionCode 340620 attribute. The IntervalBoundaryTypeCode 340626 attribute is an IntervalBoundaryTypeCode 340630 data type. The IntervalBoundaryTypeCode 340626 attribute has a cardinality of 1 340628 meaning that for each instance of the SelectionByInventoryItemChangeIdentifiedStockInventorySeparatingValuesIdentifiedStockUUID 340614 entity there is one IntervalBoundaryTypeCode 340626 attribute.

The LowerBoundaryIdentifiedStockUUID 340632 attribute is an UUID 340636 data type. The LowerBoundaryIdentifiedStockUUID 340632 attribute has a cardinality of 0 . . . 1 340634 meaning that for each instance of the SelectionByInventoryItemChangeIdentifiedStockInventorySeparatingValuesIdentifiedStockUUID 340614 entity there may be one LowerBoundaryIdentifiedStockUUID 340632 attribute. The UpperBoundaryIdentifiedStockUUID 340638 attribute is an UUID 340642 data type. The UpperBoundaryIdentifiedStockUUID 340638 attribute has a cardinality of 0 . . . 1 340640 meaning that for each instance of the SelectionByInventoryItemChangeIdentifiedStockInventorySeparatingValuesIdentifiedStockUUID 340614 entity there may be one UpperBoundaryIdentifiedStockUUID 340638 attribute.

The SelectionByInventoryItemChangeIdentifiedStockInventorySeparatingValuesIdentifiedStockKeyID 340644 entity has a cardinality of 0 . . . N 340646 meaning that for each instance of the GoodsAndActivityConfirmationInventoryChangeItemOverviewSimpleSelectionByElements 340008 entity there may be one or more SelectionByInventoryItemChangeIdentifiedStockInventorySeparatingValuesIdentifiedStockKeyID 340644 entities. The SelectionByInventoryItemChangeIdentifiedStockInventorySeparatingValuesIdentifiedStockKeyID 340644 entity includes various attributes, namely an InclusionExclusionCode 340650, an IntervalBoundaryTypeCode 340656, a LowerBoundaryID 340662 and an UpperBoundaryID 340668.

The InclusionExclusionCode 340650 attribute is an InclusionExclusionCode 340654 data type. The InclusionExclusionCode 340650 attribute has a cardinality of 0 . . . 1 340652 meaning that for each instance of the SelectionByInventoryItemChangeIdentifiedStockInventorySeparatingValuesIdentifiedStockKeyID 340644 entity there may be one InclusionExclusionCode 340650 attribute. The IntervalBoundaryTypeCode 340656 attribute is an IntervalBoundaryTypeCode 340660 data type. The IntervalBoundaryTypeCode 340656 attribute has a cardinality of 1 340658 meaning that for each instance of the SelectionByInventoryItemChangeIdentifiedStockInventorySeparatingValuesIdentifiedStockKeyID 340644 entity there is one IntervalBoundaryTypeCode 340656 attribute.

The LowerBoundaryID 340662 attribute is an IdentifiedStockID 340666 data type. The LowerBoundaryID 340662 attribute has a cardinality of 0 . . . 1 340664 meaning that for each instance of the SelectionByInventoryItemChangeIdentifiedStockInventorySeparatingValuesIdentifiedStockKeyID 340644 entity there may be one LowerBoundaryID 340662 attribute. The UpperBoundaryID 340668 attribute is an IdentifiedStockID 340672 data type. The UpperBoundaryID 340668 attribute has a cardinality of 0 . . . 1 340670 meaning that for each instance of the SelectionByInventoryItemChangeIdentifiedStockInventorySeparatingValuesIdentifiedStockKeyID 340644 entity there may be one UpperBoundaryID 340668 attribute.

The SelectionByInventoryItemChangeSpecialStockSeparatingValuesOutboundDeliveryReference ID 340674 entity has a cardinality of 0 . . . N 340676 meaning that for each instance of the GoodsAndActivityConfirmationInventoryChangeItemOverviewSimpleSelectionByElements 340008 entity there may be one or more SelectionByInventoryItemChangeSpecialStockSeparatingValuesOutboundDeliveryReference ID 340674 entities. The SelectionByInventoryItemChangeSpecialStockSeparatingValuesOutboundDeliveryReference ID 340674 entity includes various attributes, namely an InclusionExclusionCode 340680, an IntervalBoundaryTypeCode 340686, a LowerBoundaryID 340692 and an UpperBoundaryID 340698.

The InclusionExclusionCode 340680 attribute is an InclusionExclusionCode 340684 data type. The InclusionExclusionCode 340680 attribute has a cardinality of 0 . . . 1 340682 meaning that for each instance of the SelectionByInventoryItemChangeSpecialStockSeparatingValuesOutboundDeliveryReference ID 340674 entity there may be one InclusionExclusionCode 340680 attribute. The IntervalBoundaryTypeCode 340686 attribute is an IntervalBoundaryTypeCode 340690 data type. The IntervalBoundaryTypeCode 340686 attribute has a cardinality of 1 340688 meaning that for each instance of the SelectionByInventoryItemChangeSpecialStockSeparatingValuesOutboundDeliveryReference ID 340674 entity there is one IntervalBoundaryTypeCode 340686 attribute.

The LowerBoundaryID 340692 attribute is a BusinessTransactionDocumentID 340696 data type. The LowerBoundaryID 340692 attribute has a cardinality of 0 . . . 1

340694 meaning that for each instance of the SelectionByInventoryItemChangeSpecialStockSeparatingValuesOutboundDeliveryReference ID 340674 entity there may be one LowerBoundaryID 340692 attribute. The UpperBoundaryID 340698 attribute is a BusinessTransactionDocumentID 340702 data type. The UpperBoundaryID 340698 attribute has a cardinality of 0 . . . 1 340700 meaning that for each instance of the SelectionByInventoryItemChangeSpecialStockSeparatingValuesOutboundDeliveryReferenceID 340674 entity there may be one UpperBoundaryID 340698 attribute.

The SelectionByInventoryItemChangeSpecialStockSeparatingValuesOutboundDeliveryReferenceUUID 340704 entity has a cardinality of 0 . . . N 340706 meaning that for each instance of the GoodsAndActivityConfirmationInventoryChangeItemOverviewSimpleSelectionByElements 340008 entity there may be one or more SelectionByInventoryItemChangeSpecialStockSeparatingValuesOutboundDeliveryReferenceUUID 340704 entities. The SelectionByInventoryItemChangeSpecialStockSeparatingValuesOutboundDeliveryReferenceUUID 340704 entity includes various attributes, namely an InclusionExclusionCode 340710, an IntervalBoundaryTypeCode 340716, a LowerBoundaryUUID 340722 and an UpperBoundaryUUID 340728.

The InclusionExclusionCode 340710 attribute is an InclusionExclusionCode 340714 data type. The InclusionExclusionCode 340710 attribute has a cardinality of 0 . . . 1 340712 meaning that for each instance of the SelectionByInventoryItemChangeSpecialStockSeparatingValuesOutboundDeliveryReferenceUUID 340704 entity there may be one InclusionExclusionCode 340710 attribute. The IntervalBoundaryTypeCode 340716 attribute is an IntervalBoundaryTypeCode 340720 data type. The IntervalBoundaryTypeCode 340716 attribute has a cardinality of 1 340718 meaning that for each instance of the SelectionByInventoryItemChangeSpecialStockSeparatingValuesOutboundDeliveryReferenceUUID 340704 entity there is one IntervalBoundaryTypeCode 340716 attribute.

The LowerBoundaryUUID 340722 attribute is an UUID 340726 data type. The LowerBoundaryUUID 340722 attribute has a cardinality of 0 . . . 1 340724 meaning that for each instance of the SelectionByInventoryItemChangeSpecialStockSeparatingValuesOutboundDeliveryReferenceUUID 340704 entity there may be one LowerBoundaryUUID 340722 attribute. The UpperBoundaryUUID 340728 attribute is an UUID 340732 data type. The UpperBoundaryUUID 340728 attribute has a cardinality of 0 . . . 1 340730 meaning that for each instance of the SelectionByInventoryItemChangeSpecialStockSeparatingValuesOutboundDeliveryReferenceUUID 340704 entity there may be one UpperBoundaryUUID 340728 attribute.

The SelectionByInventoryItemChangeSpecialStockSeparatingValuesSiteLogisticsLotUUID 340734 entity has a cardinality of 0 . . . N 340736 meaning that for each instance of the GoodsAndActivityConfirmationInventoryChangeItemOverviewSimpleSelectionByElements 340008 entity there may be one or more SelectionByInventoryItemChangeSpecialStockSeparatingValuesSiteLogisticsLotUUID 340734 entities. The SelectionByInventoryItemChangeSpecialStockSeparatingValues SiteLogisticsLotUUID 340734 entity includes various attributes, namely an InclusionExclusionCode 340740, an IntervalBoundaryTypeCode 340746, a LowerBoundarySiteLogisticsLotUUID 340752 and an UpperBoundarySiteLogisticsLotUUID 340758.

The InclusionExclusionCode 340740 attribute is an InclusionExclusionCode 340744 data type. The InclusionExclusionCode 340740 attribute has a cardinality of 0 . . . 1 340742 meaning that for each instance of the SelectionByInventoryItemChangeSpecialStockSeparatingValuesSiteLogisticsLotUUID 340734 entity there may be one InclusionExclusionCode 340740 attribute. The IntervalBoundaryTypeCode 340746 attribute is an IntervalBoundaryTypeCode 340750 data type. The IntervalBoundaryTypeCode 340746 attribute has a cardinality of 1 340748 meaning that for each instance of the SelectionByInventoryItemChangeSpecialStockSeparatingValuesSiteLogisticsLotUUID 340734 entity there is one IntervalBoundaryTypeCode 340746 attribute.

The LowerBoundarySiteLogisticsLotUUID 340752 attribute is an UUID 340756 data type. The LowerBoundarySiteLogisticsLotUUID 340752 attribute has a cardinality of 0 . . . 1 340754 meaning that for each instance of the SelectionByInventoryItemChangeSpecialStockSeparatingValuesSiteLogisticsLotUUID 340734 entity there may be one LowerBoundarySiteLogisticsLotUUID 340752 attribute. The UpperBoundarySiteLogisticsLotUUID 340758 attribute is an UUID 340762 data type. The UpperBoundarySiteLogisticsLotUUID 340758 attribute has a cardinality of 0 . . . 1 340760 meaning that for each instance of the SelectionByInventoryItemChangeSpecialStockSeparatingValuesSiteLogisticsLotUUID 340734 entity there may be one UpperBoundarySiteLogisticsLotUUID 340758 attribute.

The SelectionByInventoryItemChangeSpecialStockSeparatingValuesSiteLogisticsLotID 340764 entity has a cardinality of 0 . . . N 340766 meaning that for each instance of the GoodsAndActivityConfirmationInventoryChangeItemOverviewSimpleSelectionByElements 340008 entity there may be one or more SelectionByInventoryItemChangeSpecialStockSeparatingValuesSiteLogisticsLotID 340764 entities. The SelectionByInventoryItemChangeSpecialStockSeparatingValuesSiteLogisticsLotID 340764 entity includes various attributes, namely an InclusionExclusionCode 340770, an IntervalBoundaryTypeCode 340776, a LowerBoundarySiteLogisticsLotID 340782 and an UpperBoundarySiteLogisticsLotID 340788.

The InclusionExclusionCode 340770 attribute is an InclusionExclusionCode 340774 data type. The InclusionExclusionCode 340770 attribute has a cardinality of 0 . . . 1 340772 meaning that for each instance of the SelectionByInventoryItemChangeSpecialStockSeparatingValuesSiteLogisticsLotID 340764 entity there may be one InclusionExclusionCode 340770 attribute. The IntervalBoundaryTypeCode 340776 attribute is an IntervalBoundaryTypeCode 340780 data type. The IntervalBoundaryTypeCode 340776 attribute has a cardinality of 1 340778 meaning that for each instance of the SelectionByInventoryItemChangeSpecialStockSeparatingValuesSiteLogisticsLotID 340764 entity there is one IntervalBoundaryTypeCode 340776 attribute.

The LowerBoundarySiteLogisticsLotID 340782 attribute is a BusinessTransactionDocumentID 340786 data type. The LowerBoundarySiteLogisticsLotID 340782 attribute has a cardinality of 0 . . . 1 340784 meaning that for each instance of the SelectionByInventoryItem-ChangeSpecialStockSeparatingValuesSiteLogisticsLotID 340764 entity there may be one LowerBoundarySiteLogisticsLotID 340782 attribute. The UpperBoundarySiteLogisticsLotID 340788 attribute is a BusinessTransactionDocumentID 340792 data type. The UpperBoundarySiteLogisticsLotID 340788 attribute has a cardinality of 0 . . . 1 340790 meaning that for each instance of the SelectionByInventoryItem-ChangeSpecialStockSeparatingValuesSiteLogisticsLotID 340764 entity there may be one UpperBoundarySiteLogisticsLotID 340788 attribute.

The SelectionByInventoryItem-ChangeDefaultRecordedQuantityUUID 340794 entity has a cardinality of 0 . . . N 340796 meaning that for each instance of the GoodsAndActivityConfirmation-InventoryChangeItemOverviewS-impleSelectionByElements 340008 entity there may be one or more SelectionByInventoryItem-ChangeDefaultRecordedQuantityUUID 340794 entities. The SelectionByInventoryItem-ChangeDefaultRecordedQuantityUUID 340794 entity includes various attributes, namely an InclusionExclusionCode 340800, an IntervalBoundaryTypeCode 340806, a LowerBoundaryDefaultRecordedQuantityUUID 340812 and an UpperBoundaryDefaultRecordedQuantityUUID 340818.

The InclusionExclusionCode 340800 attribute is an InclusionExclusionCode 340804 data type. The InclusionExclusionCode 340800 attribute has a cardinality of 0 . . . 1 340802 meaning that for each instance of the SelectionByInventoryItemChangeDefaultRecordedQuantityUUID 340794 entity there may be one InclusionExclusionCode 340800 attribute. The IntervalBoundaryTypeCode 340806 attribute is an IntervalBoundaryTypeCode 340810 data type. The IntervalBoundaryTypeCode 340806 attribute has a cardinality of 1 340808 meaning that for each instance of the SelectionByInventoryItemChangeDefaultRecordedQuantityUUID 340794 entity there is one IntervalBoundaryTypeCode 340806 attribute.

The LowerBoundaryDefaultRecordedQuantityUUID 340812 attribute is an UUID 340816 data type. The LowerBoundaryDefaultRecordedQuantityUUID 340812 attribute has a cardinality of 0 . . . 1 340814 meaning that for each instance of the SelectionByInventoryItem-ChangeDefaultRecordedQuantityUUID 340794 entity there may be one LowerBoundaryDefaultRecordedQuantityUUID 340812 attribute. The UpperBoundaryDefaultRecordedQuantityUUID 340818 attribute is an UUID 340822 data type. The UpperBoundaryDefaultRecordedQuantityUUID 340818 attribute has a cardinality of 0 . . . 1 340820 meaning that for each instance of the SelectionByInventoryItem-ChangeDefaultRecordedQuantityUUID 340794 entity there may be one UpperBoundaryDefaultRecordedQuantityUUID 340818 attribute.

The SelectionByChangeReasonCode 340824 entity has a cardinality of 0 . . . N 340826 meaning that for each instance of the GoodsAndActivityConfirmation-InventoryChangeItemOverviewS-impleSelectionByElements 340008 entity there may be one or more SelectionByChangeReasonCode 340824 entities. The SelectionByChangeReasonCode 340824 entity includes various attributes, namely an InclusionExclusionCode 340830, an IntervalBoundaryTypeCode 340836, a LowerBoundaryChangeReasonCode 340842 and an UpperBoundaryChangeReasonCode 340848.

The InclusionExclusionCode 340830 attribute is an InclusionExclusionCode 340834 data type. The InclusionExclusionCode 340830 attribute has a cardinality of 0 . . . 1 340832 meaning that for each instance of the SelectionByChangeReasonCode 340824 entity there may be one InclusionExclusionCode 340830 attribute. The IntervalBoundaryTypeCode 340836 attribute is an IntervalBoundaryTypeCode 340840 data type. The IntervalBoundaryTypeCode 340836 attribute has a cardinality of 1 340838 meaning that for each instance of the SelectionByChangeReasonCode 340824 entity there is one IntervalBoundaryTypeCode 340836 attribute.

The LowerBoundaryChangeReasonCode 340842 attribute is an InventoryChangeReasonCode 340846 data type. The LowerBoundaryChangeReasonCode 340842 attribute has a cardinality of 0 . . . 1 340844 meaning that for each instance of the SelectionByChangeReasonCode 340824 entity there may be one LowerBoundaryChangeReasonCode 340842 attribute. The UpperBoundaryChangeReasonCode 340848 attribute is an InventoryChangeReasonCode 340852 data type. The UpperBoundaryChangeReasonCode 340848 attribute has a cardinality of 0 . . . 1 340850 meaning that for each instance of the SelectionByChangeReasonCode 340824 entity there may be one UpperBoundaryChangeReasonCode 340848 attribute.

The SelectionByID 340854 entity has a cardinality of 0 . . . N 340856 meaning that for each instance of the GoodsAndActivityConfirmationIn-ventoryChangeItemOverviewSimpleSelectionByElements 340008 entity there may be one or more SelectionByID 340854 entities. The SelectionByID 340854 entity includes various attributes, namely an InclusionExclusionCode 340860, an IntervalBoundaryTypeCode 340866, a LowerBoundaryID 340872 and an UpperBoundaryID 340878.

The InclusionExclusionCode 340860 attribute is an InclusionExclusionCode 340864 data type. The InclusionExclusionCode 340860 attribute has a cardinality of 0 . . . 1 340862 meaning that for each instance of the SelectionByID 340854 entity there may be one InclusionExclusionCode 340860 attribute. The IntervalBoundaryTypeCode 340866 attribute is an IntervalBoundaryTypeCode 340870 data type. The IntervalBoundaryTypeCode 340866 attribute has a cardinality of 1 340868 meaning that for each instance of the SelectionByID 340854 entity there is one IntervalBoundaryTypeCode 340866 attribute.

The LowerBoundaryID 340872 attribute is a BusinessTransactionDocumentItemID 340876 data type. The LowerBoundaryID 340872 attribute has a cardinality of 0 . . . 1 340874 meaning that for each instance of the SelectionByID 340854 entity there may be one LowerBoundaryID 340872 attribute. The UpperBoundaryID 340878 attribute is a BusinessTransactionDocumentItemID 340882 data type. The UpperBoundaryID 340878 attribute has a cardinality of 0 . . . 1 340880 meaning that for each instance of the SelectionByID 340854 entity there may be one UpperBoundaryID 340878 attribute.

The SelectionByInventoryMovementDirectionCode 340884 entity has a cardinality of 0 . . . N 340886 meaning that for each instance of the GoodsAndActivityConfirmationInventoryChangeItemOver-viewSimpleSelectionByElements 340008 entity there may be one or more SelectionByInventoryMovement-DirectionCode 340884 entities. The SelectionByInventory-MovementDirectionCode 340884 entity includes various attributes, namely an InclusionExclusionCode 340890, an IntervalBoundaryTypeCode 340896, a LowerBoundaryInventoryMovementDirectionCode 340902 and an UpperBoundaryInventoryMovementDirectionCode 340908.

The InclusionExclusionCode 340890 attribute is an InclusionExclusionCode 340894 data type. The InclusionExclusionCode 340890 attribute has a cardinality of 0 . . . 1 340892 meaning that for each instance of the SelectionByInventoryMovementDirectionCode 340884 entity there may be one InclusionExclusionCode 340890 attribute. The IntervalBoundaryTypeCode 340896 attribute is an IntervalBoundaryTypeCode 340900 data type. The IntervalBoundaryTypeCode 340896 attribute has a cardinality of 1 340898 meaning that for each instance of the SelectionByInventoryMovementDirectionCode 340884 entity there is one IntervalBoundaryTypeCode 340896 attribute.

The LowerBoundaryInventoryMovementDirectionCode 340902 attribute is an InventoryMovementDirectionCode 340906 data type. The LowerBoundaryInventoryMovementDirectionCode 340902 attribute has a cardinality of 0 . . . 1 340904 meaning that for each instance of the SelectionByInventoryMovementDirectionCode 340884 entity there may be one LowerBoundaryInventoryMovementDirectionCode 340902 attribute. The UpperBoundaryInventoryMovementDirectionCode 340908 attribute is an InventoryMovementDirectionCode 340912 data type. The UpperBoundaryInventoryMovementDirectionCode 340908 attribute has a cardinality of 0 . . . 1 340910 meaning that for each instance of the SelectionByInventoryMovementDirectionCode 340884 entity there may be one UpperBoundaryInventoryMovementDirectionCode 340908 attribute.

The SelectionByInventoryRelevanceIndicator 340914 entity has a cardinality of 0 . . . N 340916 meaning that for each instance of the GoodsAndActivityConfirmationInventoryChangeItemOverviewSimpleSelectionByElements 340008 entity there may be one or more SelectionByInventoryRelevanceIndicator 340914 entities. The SelectionByInventoryRelevanceIndicator 340914 entity includes various attributes, namely an InclusionExclusionCode 340920, an IntervalBoundaryTypeCode 340926, a LowerBoundaryInventoryRelevanceIndicator 340932 and an UpperBoundaryInventoryRelevanceIndicator 340938.

The InclusionExclusionCode 340920 attribute is an InclusionExclusionCode 340924 data type. The InclusionExclusionCode 340920 attribute has a cardinality of 0 . . . 1 340922 meaning that for each instance of the SelectionByInventoryRelevanceIndicator 340914 entity there may be one InclusionExclusionCode 340920 attribute. The IntervalBoundaryTypeCode 340926 attribute is an IntervalBoundaryTypeCode 340930 data type. The IntervalBoundaryTypeCode 340926 attribute has a cardinality of 1 340928 meaning that for each instance of the SelectionByInventoryRelevanceIndicator 340914 entity there is one IntervalBoundaryTypeCode 340926 attribute.

The LowerBoundaryInventoryRelevanceIndicator 340932 attribute is an Indicator 340936 data type. The LowerBoundaryInventoryRelevanceIndicator 340932 attribute has a cardinality of 0 . . . 1 340934 meaning that for each instance of the SelectionByInventoryRelevanceIndicator 340914 entity there may be one LowerBoundaryInventoryRelevanceIndicator 340932 attribute. The UpperBoundaryInventoryRelevanceIndicator 340938 attribute is an Indicator 340942 data type. The UpperBoundaryInventoryRelevanceIndicator 340938 attribute has a cardinality of 0 . . . 1 340940 meaning that for each instance of the SelectionByInventoryRelevanceIndicator 340914 entity there may be one UpperBoundaryInventoryRelevanceIndicator 340938 attribute.

The SelectionByInventoryManagedQuantity 340944 entity has a cardinality of 0 . . . N 340946 meaning that for each instance of the GoodsAndActivityConfirmationInventoryChangeItemOverviewSimpleSelectionByElements 340008 entity there may be one or more SelectionByInventoryManagedQuantity 340944 entities. The SelectionByInventoryManagedQuantity 340944 entity includes various attributes, namely an InclusionExclusionCode 340950, an IntervalBoundaryTypeCode 340956, a LowerBoundaryInventoryManagedQuantity 340962 and an UpperBoundaryInventoryManagedQuantity 340968.

The InclusionExclusionCode 340950 attribute is an InclusionExclusionCode 340954 data type. The InclusionExclusionCode 340950 attribute has a cardinality of 0 . . . 1 340952 meaning that for each instance of the SelectionByInventoryManagedQuantity 340944 entity there may be one InclusionExclusionCode 340950 attribute. The IntervalBoundaryTypeCode 340956 attribute is an IntervalBoundaryTypeCode 340960 data type. The IntervalBoundaryTypeCode 340956 attribute has a cardinality of 1 340958 meaning that for each instance of the SelectionByInventoryManagedQuantity 340944 entity there is one IntervalBoundaryTypeCode 340956 attribute.

The LowerBoundaryInventoryManagedQuantity 340962 attribute is a Quantity 340966 data type. The LowerBoundaryInventoryManagedQuantity 340962 attribute has a cardinality of 0 . . . 1 340964 meaning that for each instance of the SelectionByInventoryManagedQuantity 340944 entity there may be one LowerBoundaryInventoryManagedQuantity 340962 attribute. The UpperBoundaryInventoryManagedQuantity 340968 attribute is a Quantity 340972 data type. The UpperBoundaryInventoryManagedQuantity 340968 attribute has a cardinality of 0 . . . 1 340970 meaning that for each instance of the SelectionByInventoryManagedQuantity 340944 entity there may be one UpperBoundaryInventoryManagedQuantity 340968 attribute.

The SelectionByInventoryManagedQuantityTypeCode 340974 entity has a cardinality of 0 . . . N 340976 meaning that for each instance of the GoodsAndActivityConfirmationInventoryChangeItemOverviewSimpleSelectionByElements 340008 entity there may be one or more SelectionByInventoryManagedQuantityTypeCode 340974 entities. The SelectionByInventoryManagedQuantityTypeCode 340974 entity includes various attributes, namely an InclusionExclusionCode 340980, an IntervalBoundaryTypeCode 340986, a LowerBoundaryInventoryManagedQuantityTypeCode 340992 and an UpperBoundaryInventoryManagedQuantityTypeCode 340998.

The InclusionExclusionCode 340980 attribute is an InclusionExclusionCode 340984 data type. The InclusionExclusionCode 340980 attribute has a cardinality of 0 . . . 1 340982 meaning that for each instance of the SelectionByInventoryManagedQuantityTypeCode 340974 entity there may be one InclusionExclusionCode 340980 attribute. The IntervalBoundaryTypeCode 340986 attribute is an IntervalBoundaryTypeCode 340990 data type. The IntervalBoundaryTypeCode 340986 attribute has a cardinality of 1 340988 meaning that for each instance of the SelectionByInventoryManagedQuantityTypeCode 340974 entity there is one IntervalBoundaryTypeCode 340986 attribute.

The LowerBoundaryInventoryManagedQuantityTypeCode 340992 attribute is a QuantityType- Code 340996 data type. The LowerBoundaryInventoryManagedQuantityTypeCode 340992 attribute has a cardinality of 0 . . . 1 340994 meaning that for each instance of the SelectionByInventoryManagedQuantityTypeCode 340974 entity there may be one LowerBoundaryInventoryManagedQuantityTypeCode 340992 attribute. The UpperBoundaryInventoryManagedQuantityTypeCode 340998 attribute is a QuantityTypeCode 341002 data type. The UpperBoundaryInventoryManagedQuantityTypeCode 340998 attribute has a cardinality of 0 . . . 1 341000 meaning that for each instance of the SelectionByInventoryManagedQuantityTypeCode 340974 entity there may be one UpperBoundaryInventoryManagedQuantityTypeCode 340998 attribute.

The SelectionByDefaultRecordedQuantity 341004 entity has a cardinality of 0 . . . N 341006 meaning that for each instance of the GoodsAndActivityConfirmationInventoryChangeItemOverviewSimpleSelectionByElements 340008 entity there may be one or more SelectionByDefaultRecordedQuantity 341004 entities. The SelectionByDefaultRecordedQuantity 341004 entity includes various attributes, namely an InclusionExclusionCode 341010, an IntervalBoundaryTypeCode 341016, a LowerBoundaryDefaultRecordedQuantity 341022 and an UpperBoundaryDefaultRecordedQuantity 341028.

The InclusionExclusionCode 341010 attribute is an InclusionExclusionCode 341014 data type. The InclusionExclusionCode 341010 attribute has a cardinality of 0 . . . 1 341012 meaning that for each instance of the SelectionByDefaultRecordedQuantity 341004 entity there may be one InclusionExclusionCode 341010 attribute. The IntervalBoundaryTypeCode 341016 attribute is an IntervalBoundaryTypeCode 341020 data type. The IntervalBoundaryTypeCode 341016 attribute has a cardinality of 1 341018 meaning that for each instance of the SelectionByDefaultRecordedQuantity 341004 entity there is one IntervalBoundaryTypeCode 341016 attribute.

The LowerBoundaryDefaultRecordedQuantity 341022 attribute is a Quantity 341026 data type. The LowerBoundaryDefaultRecordedQuantity 341022 attribute has a cardinality of 0 . . . 1 341024 meaning that for each instance of the SelectionByDefaultRecordedQuantity 341004 entity there may be one LowerBoundaryDefaultRecordedQuantity 341022 attribute. The UpperBoundaryDefaultRecordedQuantity 341028 attribute is a Quantity 341032 data type. The UpperBoundaryDefaultRecordedQuantity 341028 attribute has a cardinality of 0 . . . 1 341030 meaning that for each instance of the SelectionByDefaultRecordedQuantity 341004 entity there may be one UpperBoundaryDefaultRecordedQuantity 341028 attribute.

The SelectionByDefaultRecordedQuantityTypeCode 341034 entity has a cardinality of 0 . . . N 341036 meaning that for each instance of the GoodsAndActivityConfirmationInventoryChangeItemOverviewSimpleSelectionByElements 340008 entity there may be one or more SelectionByDefaultRecordedQuantityTypeCode 341034 entities. The SelectionByDefaultRecordedQuantityTypeCode 341034 entity includes various attributes, namely an InclusionExclusionCode 341040, an IntervalBoundaryTypeCode 341046, a LowerBoundaryDefaultRecordedQuantityTypeCode 341052 and an UpperBoundaryDefaultRecordedQuantityTypeCode 341058.

The InclusionExclusionCode 341040 attribute is an InclusionExclusionCode 341044 data type. The InclusionExclusionCode 341040 attribute has a cardinality of 0 . . . 1 341042 meaning that for each instance of the SelectionByDefaultRecordedQuantityTypeCode 341034 entity there may be one InclusionExclusionCode 341040 attribute. The IntervalBoundaryTypeCode 341046 attribute is an IntervalBoundaryTypeCode 341050 data type. The IntervalBoundaryTypeCode 341046 attribute has a cardinality of 1 341048 meaning that for each instance of the SelectionByDefaultRecordedQuantityTypeCode 341034 entity there is one IntervalBoundaryTypeCode 341046 attribute.

The LowerBoundaryDefaultRecordedQuantityTypeCode 341052 attribute is a QuantityTypeCode 341056 data type. The LowerBoundaryDefaultRecordedQuantityTypeCode 341052 attribute has a cardinality of 0 . . . 1 341054 meaning that for each instance of the SelectionByDefaultRecordedQuantityTypeCode 341034 entity there may be one LowerBoundaryDefaultRecordedQuantityTypeCode 341052 attribute. The UpperBoundaryDefaultRecordedQuantityTypeCode 341058 attribute is a QuantityTypeCode 341062 data type. The UpperBoundaryDefaultRecordedQuantityTypeCode 341058 attribute has a cardinality of 0 . . . 1 341060 meaning that for each instance of the SelectionByDefaultRecordedQuantityTypeCode 341034 entity there may be one UpperBoundaryDefaultRecordedQuantityTypeCode 341058 attribute.

The SelectionBySiteUUID 341064 entity has a cardinality of 0 . . . N 341066 meaning that for each instance of the GoodsAndActivityConfirmationInventoryChangeItemOverviewSimpleSelectionByElements 340008 entity there may be one or more SelectionBySiteUUID 341064 entities. The SelectionBySiteUUID 341064 entity includes various attributes, namely an InclusionExclusionCode 341070, an IntervalBoundaryTypeCode 341076, a LowerBoundarySiteUUID 341082 and an UpperBoundarySiteUUID 341088.

The InclusionExclusionCode 341070 attribute is an InclusionExclusionCode 341074 data type. The InclusionExclusionCode 341070 attribute has a cardinality of 0 . . . 1 341072 meaning that for each instance of the SelectionBySiteUUID 341064 entity there may be one InclusionExclusionCode 341070 attribute. The IntervalBoundaryTypeCode 341076 attribute is an IntervalBoundaryTypeCode 341080 data type. The IntervalBoundaryTypeCode 341076 attribute has a cardinality of 1 341078 meaning that for each instance of the SelectionBySiteUUID 341064 entity there is one IntervalBoundaryTypeCode 341076 attribute.

The LowerBoundarySiteUUID 341082 attribute is an UUID 341086 data type. The LowerBoundarySiteUUID 341082 attribute has a cardinality of 0 . . . 1 341084 meaning that for each instance of the SelectionBySiteUUID 341064 entity there may be one LowerBoundarySiteUUID 341082 attribute. The UpperBoundarySiteUUID 341088 attribute is an UUID 341092 data type. The UpperBoundarySiteUUID 341088 attribute has a cardinality of 0 . . . 1 341090 meaning that for each instance of the SelectionBySiteUUID 341064 entity there may be one UpperBoundarySiteUUID 341088 attribute.

The SelectionByTransferGroupID 341094 entity has a cardinality of 0 . . . N 341096 meaning that for each instance of the GoodsAndActivityConfirmationInventoryChangeItemOverviewSimpleSelectionByElements 340008 entity there may be one or more SelectionByTransferGroupID 341094 entities. The SelectionByTransferGroupID 341094 entity includes various attributes, namely an InclusionExclusionCode 341100, an IntervalBoundaryTypeCode 341106, a LowerBoundaryTransferGroupID 341112 and an UpperBoundaryTransferGroupID 341118.

The InclusionExclusionCode 341100 attribute is an InclusionExclusionCode 341104 data type. The InclusionExclusionCode 341100 attribute has a cardinality of 0 . . . 1 341102 meaning that for each instance of the SelectionByTransferGroupID 341094 entity there may be one InclusionExclusionCode 341100 attribute. The IntervalBoundaryTypeCode 341106 attribute is an IntervalBoundaryTypeCode 341110 data type. The IntervalBoundaryTypeCode 341106 attribute has a cardinality of 1 341108 meaning that for each instance of the SelectionByTransferGroupID 341094 entity there is one IntervalBoundaryTypeCode 341106 attribute.

The LowerBoundaryTransferGroupID 341112 attribute is a BusinessTransactionDocumentItemGroupID 341116 data type. The LowerBoundaryTransferGroupID 341112 attribute has a cardinality of 0 . . . 1 341114 meaning that for each instance of the SelectionByTransferGroupID 341094 entity there may be one LowerBoundaryTransferGroupID 341112 attribute. The UpperBoundaryTransferGroupID 341118 attribute is a BusinessTransactionDocumentItemGroupID 341122 data type. The UpperBoundaryTransferGroupID 341118 attribute has a cardinality of 0 . . . 1 341120 meaning that for each instance of the SelectionByTransferGroupID 341094 entity there may be one UpperBoundaryTransferGroupID 341118 attribute.

The SelectionByConfirmationCreationDateTime 341124 entity has a cardinality of 0 . . . N 341126 meaning that for each instance of the GoodsAndActivityConfirmationInventoryChangeItemOverviewSimpleSelectionByElements 340008 entity there may be one or more SelectionByConfirmationCreationDateTime 341124 entities. The SelectionByConfirmationCreationDateTime 341124 entity includes various attributes, namely an InclusionExclusionCode 341130, an IntervalBoundaryTypeCode 341136, a LowerBoundaryConfirmationCreationDateTime 341142 and an UpperBoundaryConfirmationCreationDateTime 341148.

The InclusionExclusionCode 341130 attribute is an InclusionExclusionCode 341134 data type. The InclusionExclusionCode 341130 attribute has a cardinality of 0 . . . 1 341132 meaning that for each instance of the SelectionByConfirmationCreationDateTime 341124 entity there may be one InclusionExclusionCode 341130 attribute. The IntervalBoundaryTypeCode 341136 attribute is an IntervalBoundaryTypeCode 341140 data type. The IntervalBoundaryTypeCode 341136 attribute has a cardinality of 1 341138 meaning that for each instance of the SelectionByConfirmationCreationDateTime 341124 entity there is one IntervalBoundaryTypeCode 341136 attribute.

The LowerBoundaryConfirmationCreationDateTime 341142 attribute is a GLOBAL_DateTime 341146 data type. The LowerBoundaryConfirmationCreationDateTime 341142 attribute has a cardinality of 0 . . . 1 341144 meaning that for each instance of the SelectionByConfirmationCreationDateTime 341124 entity there may be one LowerBoundaryConfirmationCreationDateTime 341142 attribute. The UpperBoundaryConfirmationCreationDateTime 341148 attribute is a GLOBAL_DateTime 341152 data type. The UpperBoundaryConfirmationCreationDateTime 341148 attribute has a cardinality of 0 . . . 1 341150 meaning that for each instance of the SelectionByConfirmationCreationDateTime 341124 entity there may be one UpperBoundaryConfirmationCreationDateTime 341148 attribute.

The SelectionByConfirmationBusinessTransactionDateTime 341154 entity has a cardinality of 0 . . . N 341156 meaning that for each instance of the GoodsAndActivityConfirmationInventoryChangeItemOverviewSimpleSelectionByElements 340008 entity there may be one or more SelectionByConfirmationBusinessTransactionDateTime 341154 entities. The SelectionByConfirmationBusinessTransactionDateTime 341154 entity includes various attributes, namely an InclusionExclusionCode 341160, an IntervalBoundaryTypeCode 341166, a LowerBoundaryConfirmationBusinessTransactionDateTime 341172 and an UpperBoundaryConfirmationBusinessTransactionDateTime 341178.

The InclusionExclusionCode 341160 attribute is an InclusionExclusionCode 341164 data type. The InclusionExclusionCode 341160 attribute has a cardinality of 0 . . . 1 341162 meaning that for each instance of the SelectionByConfirmationBusinessTransactionDateTime 341154 entity there may be one InclusionExclusionCode 341160 attribute. The IntervalBoundaryTypeCode 341166 attribute is an IntervalBoundaryTypeCode 341170 data type. The IntervalBoundaryTypeCode 341166 attribute has a cardinality of 1 341168 meaning that for each instance of the SelectionByConfirmationBusinessTransactionDateTime 341154 entity there is one IntervalBoundaryTypeCode 341166 attribute.

The LowerBoundaryConfirmationBusinessTransactionDateTime 341172 attribute is a GLOBAL_DateTime 341176 data type. The LowerBoundaryConfirmationBusinessTransactionDateTime 341172 attribute has a cardinality of 0 . . . 1 341174 meaning that for each instance of the SelectionByConfirmationBusinessTransactionDateTime 341154 entity there may be one LowerBoundaryConfirmationBusinessTransactionDateTime 341172 attribute. The UpperBoundaryConfirmationBusinessTransactionDateTime 341178 attribute is a GLOBAL_DateTime 341182 data type. The UpperBoundaryConfirmationBusinessTransactionDateTime 341178 attribute has a cardinality of 0 . . . 1 341180 meaning that for each instance of the SelectionByConfirmationBusinessTransactionDateTime 341154 entity there may be one UpperBoundaryConfirmationBusinessTransactionDateTime 341178 attribute.

The SelectionByConfirmationCancellationStatusCode 341184 entity has a cardinality of 0 . . . N 341186 meaning that for each instance of the GoodsAndActivityConfirmationInventoryChangeItemOverviewSimpleSelectionByElements 340008 entity there may be one or more SelectionByConfirmationCancellationStatusCode 341184 entities. The SelectionByConfirmationCancellationStatusCode 341184 entity includes various attributes, namely an InclusionExclusionCode 341190, an IntervalBoundaryTypeCode 341196, a LowerBoundaryConfirmationCancellationStatusCode 341202 and an UpperBoundaryConfirmationCancellationStatusCode 341208.

The InclusionExclusionCode 341190 attribute is an InclusionExclusionCode 341194 data type. The InclusionExclusionCode 341190 attribute has a cardinality of 0 . . . 1 341192 meaning that for each instance of the SelectionByConfirmationCancellationStatusCode 341184 entity there may be one InclusionExclusionCode 341190 attribute. The IntervalBoundaryTypeCode 341196 attribute is an IntervalBoundaryTypeCode 341200 data type. The IntervalBoundaryTypeCode 341196 attribute has a cardinality of 1 341198 meaning that for each instance of the SelectionByConfirmationCancellationStatusCode 341184 entity there is one IntervalBoundaryTypeCode 341196 attribute.

The LowerBoundaryConfirmationCancellationStatusCode 341202 attribute is a CancellationStatusCode 341206 data type. The LowerBoundaryConfirmationCancellationStatusCode 341202 attribute has a cardinality of 0 . . . 1 341204 meaning that for each instance of the SelectionByConfirmationCancellationStatusCode 341184 entity there may be one LowerBoundaryConfirmationCancellationStatusCode 341202 attribute. The UpperBoundaryConfirmationCancellationStatusCode 341208 attribute is a CancellationStatusCode 341212 data type. The UpperBoundaryConfirmationCancellationStatusCode 341208 attribute has a cardinality of 0 . . . 1 341210 meaning that for each instance of the SelectionByConfirmationCancellationStatusCode 341184 entity there may be one UpperBoundaryConfirmationCancellationStatusCode 341208 attribute.

The SelectionByConfirmationCancellationDocumentIndicator 341214 entity has a cardinality of 0 . . . N 341216 meaning that for each instance of the GoodsAndActivityConfirmationInventoryChangeItemOverviewSimpleSelectionByElements 340008 entity there may be one or more SelectionByConfirmationCancellationDocumentIndicator 341214 entities. The SelectionByConfirmationCancellationDocumentIndicator 341214 entity includes various attributes, namely an InclusionExclusionCode 341220, an IntervalBoundaryTypeCode 341226, a LowerBoundaryConfirmationCancellationDocumentIndicator 341232 and an UpperBoundaryConfirmationCancellationDocumentIndicator 341238.

The InclusionExclusionCode 341220 attribute is an InclusionExclusionCode 341224 data type. The InclusionExclusionCode 341220 attribute has a cardinality of 0 . . . 1 341222 meaning that for each instance of the SelectionByConfirmationCancellationDocumentIndicator 341214 entity there may be one InclusionExclusionCode 341220 attribute. The IntervalBoundaryTypeCode 341226 attribute is an IntervalBoundaryTypeCode 341230 data type. The IntervalBoundaryTypeCode 341226 attribute has a cardinality of 1 341228 meaning that for each instance of the SelectionByConfirmationCancellationDocumentIndicator 341214 entity there is one IntervalBoundaryTypeCode 341226 attribute.

The LowerBoundaryConfirmationCancellationDocumentIndicator 341232 attribute is an Indicator 341236 data type. The LowerBoundaryConfirmationCancellationDocumentIndicator 341232 attribute has a cardinality of 0 . . . 1 341234 meaning that for each instance of the SelectionByConfirmationCancellationDocumentIndicator 341214 entity there may be one LowerBoundaryConfirmationCancellationDocumentIndicator 341232 attribute. The UpperBoundaryConfirmationCancellationDocumentIndicator 341238 attribute is an Indicator 341242 data type. The UpperBoundaryConfirmationCancellationDocumentIndicator 341238 attribute has a cardinality of 0 . . . 1 341240 meaning that for each instance of the SelectionByConfirmationCancellationDocumentIndicator 341214 entity there may be one UpperBoundaryConfirmationCancellationDocumentIndicator 341238 attribute.

The SelectionByConfirmationCancelledConfirmationUUID 341244 entity has a cardinality of 0 . . . N 341246 meaning that for each instance of the GoodsAndActivityConfirmationInventoryChangeItemOverviewSimpleSelectionByElements 340008 entity there may be one or more SelectionByConfirmationCancelledConfirmationUUID 341244 entities. The SelectionByConfirmationCancelledConfirmationUUID 341244 entity includes various attributes, namely an InclusionExclusionCode 341250, an IntervalBoundaryTypeCode 341256, a LowerBoundaryConfirmationCancelledConfirmationUUID 341262 and an UpperBoundaryConfirmationCancelledConfirmationUUID 341268.

The InclusionExclusionCode 341250 attribute is an InclusionExclusionCode 341254 data type. The InclusionExclusionCode 341250 attribute has a cardinality of 0 . . . 1 341252 meaning that for each instance of the SelectionByConfirmationCancelledConfirmationUUID 341244 entity there may be one InclusionExclusionCode 341250 attribute. The IntervalBoundaryTypeCode 341256 attribute is an IntervalBoundaryTypeCode 341260 data type. The IntervalBoundaryTypeCode 341256 attribute has a cardinality of 1 341258 meaning that for each instance of the SelectionByConfirmationCancelledConfirmationUUID 341244 entity there is one IntervalBoundaryTypeCode 341256 attribute.

The LowerBoundaryConfirmationCancelledConfirmationUUID 341262 attribute is an UUID 341266 data type. The LowerBoundaryConfirmationCancelledConfirmationUUID 341262 attribute has a cardinality of 0 . . . 1 341264 meaning that for each instance of the SelectionByConfirmationCancelledConfirmationUUID 341244 entity there may be one LowerBoundaryConfirmationCancelledConfirmationUUID 341262 attribute. The UpperBoundaryConfirmationCancelledConfirmationUUID 341268 attribute is an UUID 341272 data type. The UpperBoundaryConfirmationCancelledConfirmationUUID 341268 attribute has a cardinality of 0 . . . 1 341270 meaning that for each instance of the SelectionByConfirmationCancelledConfirmationUUID 341244 entity there may be one UpperBoundaryConfirmationCancelledConfirmationUUID 341268 attribute.

The SelectionByConfirmationCompanyID 341274 entity has a cardinality of 0 . . . N 341276 meaning that for each instance of the GoodsAndActivityConfirmationInventoryChangeItemOverviewSimpleSelectionByElements 340008 entity there may be one or more SelectionByConfirmationCompanyID 341274 entities. The SelectionByConfirmationCompanyID 341274 entity includes various attributes, namely an InclusionExclusionCode 341280, an IntervalBoundaryTypeCode 341286, a LowerBoundaryConfirmationCompanyID 341292 and an UpperBoundaryConfirmationCompanyID 341298.

The InclusionExclusionCode 341280 attribute is an InclusionExclusionCode 341284 data type. The InclusionExclusionCode 341280 attribute has a cardinality of 0 . . . 1 341282 meaning that for each instance of the SelectionByConfirmationCompanyID 341274 entity there may be one InclusionExclusionCode 341280 attribute. The IntervalBoundaryTypeCode 341286 attribute is an IntervalBoundaryTypeCode 341290 data type. The IntervalBoundaryTypeCode 341286 attribute has a cardinality of 1 341288 meaning that for each instance of the SelectionByConfirmationCompanyID 341274 entity there is one IntervalBoundaryTypeCode 341286 attribute.

The LowerBoundaryConfirmationCompanyID 341292 attribute is an OrganisationalCentreID 341296 data type. The LowerBoundaryConfirmationCompanyID 341292 attribute has a cardinality of 0 . . . 1 341294 meaning that for each instance of the SelectionByConfirmationCompanyID 341274 entity there may be one LowerBoundaryConfirmationCompanyID 341292 attribute. The UpperBoundaryConfirmationCompanyID 341298 attribute is an OrganisationalCentreID 341302 data type. The UpperBoundaryConfirmationCompanyID 341298 attribute has a cardinality of 0 . . . 1 341300 meaning that for each instance of the SelectionByConfirmationCompanyID 341274 entity there may be one UpperBoundaryConfirmationCompanyID 341298 attribute.

The SelectionByConfirmationCompanyUUID 341304 entity has a cardinality of 0 . . . N 341306 meaning that for each instance of the GoodsAndActivityConfirmationInventoryChangeItemOverviewSimpleSelectionByElements 340008 entity there may be one or more SelectionByConfirmationCompanyUUID 341304 entities. The SelectionByConfirmationCompanyUUID 341304 entity includes various attributes, namely an InclusionExclusionCode 341310, an IntervalBoundaryTypeCode 341316, a LowerBoundaryConfirmationCompanyUUID 341322 and an UpperBoundaryConfirmationCompanyUUID 341328.

The InclusionExclusionCode 341310 attribute is an InclusionExclusionCode 341314 data type. The InclusionExclusionCode 341310 attribute has a cardinality of 0 . . . 1 341312 meaning that for each instance of the SelectionByConfirmationCompanyUUID 341304 entity there may be one InclusionExclusionCode 341310 attribute. The IntervalBoundaryTypeCode 341316 attribute is an IntervalBoundaryTypeCode 341320 data type. The IntervalBoundaryTypeCode 341316 attribute has a cardinality of 1 341318 meaning that for each instance of the SelectionByConfirmationCompanyUUID 341304 entity there is one IntervalBoundaryTypeCode 341316 attribute.

The LowerBoundaryConfirmationCompanyUUID 341322 attribute is an UUID 341326 data type. The LowerBoundaryConfirmationCompanyUUID 341322 attribute has a cardinality of 0 . . . 1 341324 meaning that for each instance of the SelectionByConfirmationCompanyUUID 341304 entity there may be one LowerBoundaryConfirmationCompanyUUID 341322 attribute. The UpperBoundaryConfirmationCompanyUUID 341328 attribute is an UUID 341332 data type. The UpperBoundaryConfirmationCompanyUUID 341328 attribute has a cardinality of 0 . . . 1 341330 meaning that for each instance of the SelectionByConfirmationCompanyUUID 341304 entity there may be one UpperBoundaryConfirmationCompanyUUID 341328 attribute.

The SelectionByConfirmationID 341334 entity has a cardinality of 0 . . . N 341336 meaning that for each instance of the GoodsAndActivityConfirmationInventoryChangeItemOverviewSimpleSelectionByElements 340008 entity there may be one or more SelectionByConfirmationID 341334 entities. The SelectionByConfirmationID 341334 entity includes various attributes, namely an InclusionExclusionCode 341340, an IntervalBoundaryTypeCode 341346, a LowerBoundaryConfirmationID 341352 and an UpperBoundaryConfirmationID 341358.

The InclusionExclusionCode 341340 attribute is an InclusionExclusionCode 341344 data type. The InclusionExclusionCode 341340 attribute has a cardinality of 0 . . . 1 341342 meaning that for each instance of the SelectionByConfirmationID 341334 entity there may be one InclusionExclusionCode 341340 attribute. The IntervalBoundaryTypeCode 341346 attribute is an IntervalBoundaryTypeCode 341350 data type. The IntervalBoundaryTypeCode 341346 attribute has a cardinality of 1 341348 meaning that for each instance of the SelectionByConfirmationID 341334 entity there is one IntervalBoundaryTypeCode 341346 attribute.

The LowerBoundaryConfirmationID 341352 attribute is a BusinessTransactionDocumentID 341356 data type. The LowerBoundaryConfirmationID 341352 attribute has a cardinality of 0 . . . 1 341354 meaning that for each instance of the SelectionByConfirmationID 341334 entity there may be one LowerBoundaryConfirmationID 341352 attribute. The UpperBoundaryConfirmationID 341358 attribute is a BusinessTransactionDocumentID 341362 data type. The UpperBoundaryConfirmationID 341358 attribute has a cardinality of 0 . . . 1 341360 meaning that for each instance of the SelectionByConfirmationID 341334 entity there may be one UpperBoundaryConfirmationID 341358 attribute.

The SelectionByConfirmationUUID 341364 entity has a cardinality of 0 . . . N 341366 meaning that for each instance of the GoodsAndActivityConfirmationInventoryChangeItemOverviewSimpleSelectionByElements 340008 entity there may be one or more SelectionByConfirmationUUID 341364 entities. The SelectionByConfirmationUUID 341364 entity includes various attributes, namely an InclusionExclusionCode 341370, an IntervalBoundaryTypeCode 341376, a LowerBoundaryConfirmationUUID 341382 and an UpperBoundaryConfirmationUUID 341388.

The InclusionExclusionCode 341370 attribute is an InclusionExclusionCode 341374 data type. The InclusionExclusionCode 341370 attribute has a cardinality of 0 . . . 1 341372 meaning that for each instance of the SelectionByConfirmationUUID 341364 entity there may be one InclusionExclusionCode 341370 attribute. The IntervalBoundaryTypeCode 341376 attribute is an IntervalBoundaryTypeCode 341380 data type. The IntervalBoundaryTypeCode 341376 attribute has a cardinality of 1 341378 meaning that for each instance of the SelectionByConfirmationUUID 341364 entity there is one IntervalBoundaryTypeCode 341376 attribute.

The LowerBoundaryConfirmationUUID 341382 attribute is an UUID 341386 data type. The LowerBoundaryConfirmationUUID 341382 attribute has a cardinality of 0 . . . 1 341384 meaning that for each instance of the SelectionByConfirmationUUID 341364 entity there may be one LowerBoundaryConfirmationUUID 341382 attribute. The UpperBoundaryConfirmationUUID 341388 attribute is an UUID 341392 data type. The UpperBoundaryConfirmationUUID 341388 attribute has a cardinality of 0 . . . 1 341390 meaning that for each instance of the SelectionByConfirmationUUID 341364 entity there may be one UpperBoundaryConfirmationUUID 341388 attribute.

The ProcessingConditions 341394 package is a QueryProcessingConditions 341400 data type. The ProcessingConditions 341394 package includes a ProcessingConditions 341396 entity. The ProcessingConditions 341396 entity has a cardinality of 1 341398 meaning that for each instance of the ProcessingConditions 341394 package there is one ProcessingConditions 341396 entity.

FIGS. 35-1 through 35-20 show an example configuration of an Element Structure that includes a Goods and Activity Confirmation Inventory Change Item Overview Simple by Elements Response_sync 350000 package. Specifically, these figures depict the arrangement and hierarchy of various components such as one or more levels of packages, entities, and datatypes, shown here as 350000 through 350530. As described above, packages may be used to represent hierarchy levels. Entities are discrete business elements that are used during a business transaction. Data types are used to type object entities and interfaces with a structure. For example, the Goods and Activity Confirmation Inventory Change Item Overview Simple by Elements Response_sync 350000 includes, among other things, a Goods and Activity Confirmation Inventory Change Item Overview Simple by Elements Response_sync 350002. Accordingly, heterogeneous applications may communicate using this consistent message configured as such.

The Goods and Activity Confirmation Inventory Change Item Overview Simple by Elements Response_sync 350000 package is a GoodsAndActivityConfirmationInventoryChangeItemOverviewSimpleByElementsResponse Message_sync 350004 data type. The Goods and Activity Confirmation Inventory Change Item Overview Simple by Elements Response_sync 350000 package includes a Goods and Activity Confirmation Inventory Change Item Overview Simple by Elements Response_sync 350002 entity. The Goods and Activity Confirmation Inventory Change Item Overview Simple by Elements Response_sync 350000 package includes various packages, namely a GoodsAndActivityConfirmation-InventoryChangeItemOverview 350006, a ProcessingConditions 350516 and a Log 350524. The GoodsAndActivityConfirmationInventoryChangeItemOverview 350006 package is a GoodsAndActivityConfirmation-InventoryChangeItemOverviewSimpleByElementsResponse 350012 data type. The GoodsAndActivityConfirmationInventoryChangeItemOverview 350006 package includes a GoodsAndActivityConfirmation-InventoryChangeItemOverview 350008 entity. The GoodsAndActivityConfirmationInventoryChangeItemOverview 350006 package includes various packages, namely an InventoryLocation 350236 and an InventoryItemChange 350322.

The GoodsAndActivityConfirmation-InventoryChangeItemOverview 350008 entity has a cardinality of 0 . . . N 350010 meaning that for each instance of the GoodsAndActivityConfirmation-InventoryChangeItemOverview 350006 package there may be one or more GoodsAndActivityConfirmation-InventoryChangeItemOverview 350008 entities. The GoodsAndActivityConfirmationInventoryChangeItemOverview 350008 entity includes various attributes, namely a GoodsAndActivityConfirmationUUID 350014, a GoodsAndActivityConfirmationID 350020, a GoodsAndActivityConfirmationInventoryChangeItemUUID 350026, a ChangeReasonCode 350032, a ChangeReasonName 350038, an ID 350044, an InventoryMovementDirectionCode 350050, an InventoryMovementDirectionName 350056, an InventoryRelevanceIndicator 350062, an InventoryManagedQuantity 350068, an InventoryManagedQuantityTypeCode 350074, an InventoryManagedQuantityTypeName 350080, a DefaultRecordedQuantity 350086, a DefaultRecordedQuantityTypeCode 350092, a DefaultRecordedQuantityTypeName 350098, a SiteUUID 350104, a TransferGroupID 350110, a ConfirmationCreationDateTime 350116, a ConfirmationBusinessTransactionDateTime 350122, a ConfirmationCancellationStatusCode 350128, a ConfirmationCancellationStatusName 350134, a ConfirmationCancellationDocumentIndicator 350140, a ConfirmationCancelledConfirmationUUID 350146, a ConfirmationCompanyID 350152, a ConfirmationCompanyUUID 350158, a ConfirmationID 350164, a ConfirmationUUID 350170, an OutboundDeliveryItemID 350176, an OutboundDeliveryItemUUID 350182, an OutboundDeliveryRootID 350188, an OutboundDeliveryRootUUID 350194, an OutboundDeliveryProcessingTypeCode 350200 and an OutboundDeliveryProcessingTypeName 350206. The GoodsAndActivityConfirmationInventoryChangeItemOverview 350008 entity includes an OutboundDeliveryProductRecipientPartyKey 350212 subordinate entity.

The GoodsAndActivityConfirmationUUID 350014 attribute is an UUID 350018 data type. The GoodsAndActivityConfirmationUUID 350014 attribute has a cardinality of 0 . . . 1 350016 meaning that for each instance of the GoodsAndActivityConfirmation-InventoryChangehemOverview 350008 entity there may be one GoodsAndActivityConfirmationUUID 350014 attribute. The GoodsAndActivityConfirmationID 350020 attribute is a BusinessTransactionDocumentID 350024 data type. The GoodsAndActivityConfirmationID 350020 attribute has a cardinality of 0 . . . 1 350022 meaning that for each instance of the GoodsAndActivityConfirmation-InventoryChangehemOverview 350008 entity there may be one GoodsAndActivityConfirmationID 350020 attribute.

The GoodsAndActivityConfirmation-InventoryChangeItemUUID 350026 attribute is an UUID 350030 data type. The GoodsAndActivityConfirmation-InventoryChangeItemUUID 350026 attribute has a cardinality of 0 . . . 1 350028 meaning that for each instance of the GoodsAndActivityConfirmation-InventoryChangehemOverview 350008 entity there may be one GoodsAndActivityConfirmation-InventoryChangeItemUUID 350026 attribute. The ChangeReasonCode 350032 attribute is an InventoryChangeReasonCode 350036 data type. The ChangeReasonCode 350032 attribute has a cardinality of 0 . . . 1 350034 meaning that for each instance of the GoodsAndActivityConfirmation-InventoryChangeItemOverview 350008 entity there may be one ChangeReasonCode 350032 attribute.

The ChangeReasonName 350038 attribute is a LANGUAGEINDEPENDENT_LONG_Name 350042 data type. The ChangeReasonName 350038 attribute has a cardinality of 0 . . . 1 350040 meaning that for each instance of the GoodsAndActivityConfirmation-InventoryChangeItemOverview 350008 entity there may be one ChangeReasonName 350038 attribute. The ID 350044 attribute is a BusinessTransactionDocumentItemID 350048 data type. The ID 350044 attribute has a cardinality of 0 . . . 1 350046 meaning that for each instance of the GoodsAndActivityConfirmationInventoryChangeItemOverview 350008 entity there may be one ID 350044 attribute.

The InventoryMovementDirectionCode 350050 attribute is an InventoryMovementDirectionCode 350054 data type. The InventoryMovementDirectionCode 350050 attribute has a cardinality of 0 . . . 1 350052 meaning that for each instance of the GoodsAndActivityConfirmation-InventoryChangeItemOverview 350008 entity there may be one InventoryMovementDirectionCode 350050 attribute.

The InventoryMovementDirectionName 350056 attribute is a LANGUAGEINDEPENDENT_LONG_Name 350060 data type. The InventoryMovementDirectionName 350056 attribute has a cardinality of 0 . . . 1 350058 meaning that for each instance of the GoodsAndActivityConfirmation-InventoryChangeItemOverview 350008 entity there may be one InventoryMovementDirectionName 350056 attribute. The InventoryRelevanceIndicator 350062 attribute is an Indicator 350066 data type. The InventoryRelevanceIndicator 350062 attribute has a cardinality of 0 . . . 1 350064 meaning that for each instance of the GoodsAndActivityConfirmationInventoryChangeItemOverview 350008 entity there may be one InventoryRelevanceIndicator 350062 attribute.

The InventoryManagedQuantity 350068 attribute is a Quantity 350072 data type. The InventoryManagedQuantity 350068 attribute has a cardinality of 0 . . . 1 350070 meaning that for each instance of the GoodsAndActivityConfirmationInventoryChangeItemOverview 350008 entity there may be one InventoryManagedQuantity 350068 attribute. The InventoryManagedQuantityTypeCode 350074 attribute is a QuantityTypeCode 350078 data type. The InventoryManagedQuantityTypeCode 350074 attribute has a cardinality of 0 . . . 1 350076 meaning that for each instance of the GoodsAndActivityConfirmationInventoryChangeItemOverview 350008 entity there may be one InventoryManagedQuantityTypeCode 350074 attribute.

The InventoryManagedQuantityTypeName 350080 attribute is a LANGUAGEINDEPENDENT_LONG_Name 350084 data type. The InventoryManagedQuantityTypeName 350080 attribute has a cardinality of 0 . . . 1 350082 meaning that for each instance of the GoodsAndActivityConfirmationInventoryChangeItemOverview 350008 entity there may be one InventoryManagedQuantityTypeName 350080 attribute. The DefaultRecordedQuantity 350086 attribute is a Quantity 350090 data type. The DefaultRecordedQuantity 350086 attribute has a cardinality of 0 . . . 1 350088 meaning that for each instance of the GoodsAndActivityConfirmationInventoryChangeItemOverview 350008 entity there may be one DefaultRecordedQuantity 350086 attribute.

The DefaultRecordedQuantityTypeCode 350092 attribute is a QuantityTypeCode 350096 data type. The DefaultRecordedQuantityTypeCode 350092 attribute has a cardinality of 0 . . . 1 350094 meaning that for each instance of the GoodsAndActivityConfirmation-InventoryChangeItemOverview 350008 entity there may be one DefaultRecordedQuantityTypeCode 350092 attribute. The DefaultRecordedQuantityTypeName 350098 attribute is a LANGUAGEINDEPENDENT_LONG_Name 350102 data type. The DefaultRecordedQuantityTypeName 350098 attribute has a cardinality of 0 . . . 1 350100 meaning that for each instance of the GoodsAndActivityConfirmation-InventoryChangeItemOverview 350008 entity there may be one DefaultRecordedQuantityTypeName 350098 attribute.

The SiteUUID 350104 attribute is an UUID 350108 data type. The SiteUUID 350104 attribute has a cardinality of 0 . . . 1 350106 meaning that for each instance of the GoodsAndActivityConfirmationInventoryChangeItemOverview 350008 entity there may be one SiteUUID 350104 attribute. The TransferGroupID 350110 attribute is a BusinessTransactionDocumentItemGroupID 350114 data type. The TransferGroupID 350110 attribute has a cardinality of 0 . . . 1 350112 meaning that for each instance of the GoodsAndActivityConfirmationInventoryChangeItemOverview 350008 entity there may be one TransferGroupID 350110 attribute.

The ConfirmationCreationDateTime 350116 attribute is a GLOBAL_DateTime 350120 data type. The ConfirmationCreationDateTime 350116 attribute has a cardinality of 0 . . . 1 350118 meaning that for each instance of the GoodsAndActivityConfirmationInventoryChangeItemOverview 350008 entity there may be one ConfirmationCreationDateTime 350116 attribute. The ConfirmationBusinessTransactionDateTime 350122 attribute is a GLOBAL_DateTime 350126 data type. The ConfirmationBusinessTransactionDateTime 350122 attribute has a cardinality of 0 . . . 1 350124 meaning that for each instance of the GoodsAndActivityConfirmationInventoryChangeItemOverview 350008 entity there may be one ConfirmationBusinessTransactionDateTime 350122 attribute.

The ConfirmationCancellationStatusCode 350128 attribute is a CancellationStatusCode 350132 data type. The ConfirmationCancellationStatusCode 350128 attribute has a cardinality of 0 . . . 1 350130 meaning that for each instance of the GoodsAndActivityConfirmation-InventoryChangeItemOverview 350008 entity there may be one ConfirmationCancellationStatusCode 350128 attribute. The ConfirmationCancellationStatusName 350134 attribute is a LANGUAGEINDEPENDENT_LONG_Name 350138 data type. The ConfirmationCancellationStatusName 350134 attribute has a cardinality of 0 . . . 1 350136 meaning that for each instance of the GoodsAndActivityConfirmation-InventoryChangeItemOverview 350008 entity there may be one ConfirmationCancellationStatusName 350134 attribute.

The ConfirmationCancellationDocumentIndicator 350140 attribute is an Indicator 350144 data type. The ConfirmationCancellationDocumentIndicator 350140 attribute has a cardinality of 0 . . . 1 350142 meaning that for each instance of the GoodsAndActivityConfirmation-InventoryChangeItemOverview 350008 entity there may be one ConfirmationCancellationDocumentIndicator 350140 attribute. The ConfirmationCancelledConfirmationUUID 350146 attribute is an UUID 350150 data type. The ConfirmationCancelledConfirmationUUID 350146 attribute has a cardinality of 0 . . . 1 350148 meaning that for each instance of the GoodsAndActivityConfirmation-InventoryChangeItemOverview 350008 entity there may be one ConfirmationCancelledConfirmationUUID 350146 attribute.

The ConfirmationCompanyID 350152 attribute is an OrganisationalCentreID 350156 data type. The ConfirmationCompanyID 350152 attribute has a cardinality of 0 . . . 1 350154 meaning that for each instance of the GoodsAndActivityConfirmationInventoryChangeItemOverview 350008 entity there may be one ConfirmationCompanyID 350152 attribute. The ConfirmationCompanyUUID 350158 attribute is an UUID 350162 data type. The ConfirmationCompanyUUID 350158 attribute has a cardinality of 0 . . . 1 350160 meaning that for each instance of the GoodsAndActivityConfirmationInventoryChangeItemOverview 350008 entity there may be one ConfirmationCompanyUUID 350158 attribute.

The ConfirmationID 350164 attribute is a BusinessTransactionDocumentID 350168 data type. The ConfirmationID 350164 attribute has a cardinality of 0 . . . 1 350166 meaning that for each instance of the GoodsAndActivityConfirmationInventoryChangeItemOverview 350008 entity there may be one ConfirmationID 350164 attribute. The ConfirmationUUID 350170 attribute is an UUID 350174 data type. The ConfirmationUUID 350170 attribute has a cardinality of 0 . . . 1 350172 meaning that for each instance of the GoodsAndActivityConfirmationInventoryChangeItemOverview 350008 entity there may be one ConfirmationUUID 350170 attribute.

The OutboundDeliveryItemID 350176 attribute is a BusinessTransactionDocumentItemID 350180 data type. The OutboundDeliveryItemID 350176 attribute has a cardinality of 0 . . . 1 350178 meaning that for each instance of the GoodsAndActivityConfirmation-InventoryChangeItemOverview 350008 entity there may be one OutboundDeliveryItemID 350176 attribute. The OutboundDeliveryItemUUID 350182 attribute is an UUID 350186 data type. The OutboundDeliveryItemUUID 350182 attribute has a cardinality of 0 . . . 1 350184 meaning that for each instance of the GoodsAndActivityConfirmation-InventoryChangeItemOverview 350008 entity there may be one OutboundDeliveryItemUUID 350182 attribute.

The OutboundDeliveryRootID 350188 attribute is a BusinessTransactionDocumentID 350192 data type. The OutboundDeliveryRootID 350188 attribute has a cardinality of 0 . . . 1 350190 meaning that for each instance of the GoodsAndActivityConfirmationInventoryChangeItemOverview 350008 entity there may be one OutboundDeliveryRootID 350188 attribute. The OutboundDeliveryRootUUID 350194 attribute is an UUID 350198 data type. The OutboundDeliveryRootUUID 350194 attribute has a cardinality of 0 . . . 1 350196 meaning that for each instance of the GoodsAndActivityConfirmationInventoryChangeItemOverview 350008 entity there may be one OutboundDeliveryRootUUID 350194 attribute.

The OutboundDeliveryProcessingTypeCode 350200 attribute is a BusinessTransactionDocument-ProcessingTypeCode 350204 data type. The OutboundDeliveryProcessingTypeCode 350200 attribute has a cardinality of 0 . . . 1 350202 meaning that for each instance of the GoodsAndActivityConfirmationInventoryChangeItemOverview 350008 entity there may be one OutboundDeliveryProcessingTypeCode 350200 attribute. The OutboundDeliveryProcessingTypeName 350206 attribute is a LANGUAGEINDEPENDENT_LONG_Name 350210 data type. The OutboundDeliveryProcessingTypeName 350206 attribute has a cardinality of 0 . . . 1 350208 meaning that for each instance of the GoodsAndActivityConfirmationInventoryChangeItemOverview 350008 entity there may be one OutboundDeliveryProcessingTypeName 350206 attribute.

The OutboundDeliveryProductRecipientPartyKey 350212 entity has a cardinality of 0 . . . 1 350214 meaning that for each instance of the GoodsAndActivityConfirmationInventoryChangeItemOverview 350008 entity there may be one OutboundDeliveryProductRecipientPartyKey 350212 entity. The OutboundDeliveryProductRecipientPartyKey 350212 entity includes various attributes, namely a PartyTypeCode 350218, a PartyTypeName 350224 and a PartyID 350230.

The PartyTypeCode 350218 attribute is a BusinessObjectTypeCode 350222 data type. The PartyTypeCode 350218 attribute has a cardinality of 0 . . . 1 350220 meaning that for each instance of the OutboundDeliveryProductRecipientPartyKey 350212 entity there may be one PartyTypeCode 350218 attribute. The PartyTypeName 350224 attribute is a LANGUAGEINDEPENDENT_LONG_Name 350228 data type. The PartyTypeName 350224 attribute has a cardinality of 0 . . . 1 350226 meaning that for each instance of the OutboundDeliveryProductRecipientPartyKey 350212 entity there may be one PartyTypeName 350224 attribute. The PartyID 350230 attribute is a PartyID 350234 data type. The PartyID 350230 attribute has a cardinality of 0 . . . 1 350232 meaning that for each instance of the OutboundDeliveryProductRecipientPartyKey 350212 entity there may be one PartyID 350230 attribute.

The InventoryLocation 350236 package is a GoodsAndActivityConfirmationInventoryChangehemOverviewSimpleByElementsResponseInventoryLocation 350242 data type. The InventoryLocation 350236 package includes an InventoryLocation 350238 entity. The InventoryLocation 350238 entity has a cardinality of 0 . . . 1 350240 meaning that for each instance of the InventoryLocation 350236 package there may be one InventoryLocation 350238 entity. The InventoryLocation 350238 entity includes various attributes, namely an InventoryTypeCode 350244, an InventoryTypeName 350250, a LocationUUID 350256, a LocationID 350262, a CustodianPartyUUID 350268, a CustodianPartyInternalID 350274, a LogisticsAreaUUID 350280, an InventoryManagedLocationUUID 350304, an InventoryManagedLogisticsAreaUUID 350310 and a PermanentEstablishmentUUID 350316. The InventoryLocation 350238 entity includes a LogisticsAreaKey 350286 subordinate entity.

The InventoryTypeCode 350244 attribute is an InventoryTypeCode 350248 data type. The InventoryTypeCode 350244 attribute has a cardinality of 0 . . . 1 350246 meaning that for each instance of the InventoryLocation 350238 entity there may be one InventoryTypeCode 350244 attribute. The InventoryTypeName 350250 attribute is a LANGUAGEINDEPENDENT_LONG_Name 350254 data type. The InventoryTypeName 350250 attribute has a cardinality of 0 . . . 1 350252 meaning that for each instance of the InventoryLocation 350238 entity there may be one InventoryTypeName 350250 attribute.

The LocationUUID 350256 attribute is an UUID 350260 data type. The LocationUUID 350256 attribute has a cardinality of 0 . . . 1 350258 meaning that for each instance of the InventoryLocation 350238 entity there may be one LocationUUID 350256 attribute. The LocationID 350262 attribute is a LocationID 350266 data type. The LocationID 350262 attribute has a cardinality of 0 . . . 1 350264 meaning that for each instance of the InventoryLocation 350238 entity there may be one LocationID 350262 attribute.

The CustodianPartyUUID 350268 attribute is an UUID 350272 data type. The CustodianPartyUUID 350268 attribute has a cardinality of 0 . . . 1 350270 meaning that for each instance of the InventoryLocation 350238 entity there may be one CustodianPartyUUID 350268 attribute. The CustodianPartyInternalID 350274 attribute is a BusinessPartnerInternalID 350278 data type. The CustodianPartyInternalID 350274 attribute has a cardinality of 0 . . . 1 350276 meaning that for each instance of the InventoryLocation 350238 entity there may be one CustodianPartyInternalID 350274 attribute.

The LogisticsAreaUUID 350280 attribute is an UUID 350284 data type. The LogisticsAreaUUID 350280 attribute has a cardinality of 0 . . . 1 350282 meaning that for each instance of the InventoryLocation 350238 entity there may be one LogisticsAreaUUID 350280 attribute. The InventoryManagedLocationUUID 350304 attribute is an UUID 350308 data type. The InventoryManagedLocationUUID 350304 attribute has a cardinality of 0 . . . 1 350306 meaning that for each instance of the InventoryLocation 350238 entity there may be one InventoryManagedLocationUUID 350304 attribute.

The InventoryManagedLogisticsAreaUUID 350310 attribute is an UUID 350314 data type. The InventoryManagedLogisticsAreaUUID 350310 attribute has a cardinality of 0 . . . 1 350312 meaning that for each instance of the InventoryLocation 350238 entity there may be one InventoryManagedLogisticsAreaUUID 350310 attribute. The PermanentEstablishmentUUID 350316 attribute is an UUID 350320 data type. The PermanentEstablishmentUUID 350316 attribute has a cardinality of 0 . . . 1 350318 meaning that for each instance of the InventoryLocation 350238 entity there may be one PermanentEstablishmentUUID 350316 attribute.

The LogisticsAreaKey 350286 entity has a cardinality of 0 . . . 1 350288 meaning that for each instance of the InventoryLocation 350238 entity there may be one LogisticsAreaKey 350286 entity. The LogisticsAreaKey 350286 entity includes various attributes, namely an ID 350292 and a SiteID 350298. The ID 350292 attribute is a LogisticsAreaID 350296 data type. The ID 350292 attribute has a cardinality of 0 . . . 1 350294 meaning that for each instance of the LogisticsAreaKey 350286 entity there may be one ID 350292 attribute. The SiteID 350298 attribute is a LocationID 350302 data type. The SiteID 350298 attribute has a cardinality of 0 . . . 1 350300 meaning that for each instance of the LogisticsAreaKey 350286 entity there may be one SiteID 350298 attribute.

The InventoryItemChange 350322 package is a GoodsAndActivityConfirmationInventoryChangeItemOverviewSimpleByElementsResponseInventoryItemChange 350328 data type. The InventoryItemChange 350322 package includes an InventoryItemChange 350324 entity. The InventoryItemChange 350322 package includes various packages, namely a MainInventorySeparatingValues 350336, an IdentifiedStockInventorySeparatingValues 350416 and a SpecialStockSeparatingValues 350478. The InventoryItemChange 350324 entity has a cardinality of 0 . . . 1 350326 meaning that for each instance of the InventoryItemChange 350322 package there may be one InventoryItemChange 350324 entity. The InventoryItemChange 350324 entity includes a Default- RecordedQuantityUUID 350330 attribute. The DefaultRecordedQuantityUUID 350330 attribute is an UUID 350334 data type. The DefaultRecordedQuantityUUID 350330 attribute has a cardinality of 0 . . . 1 350332 meaning that for each instance of the InventoryItemChange 350324 entity there may be one DefaultRecordedQuantityUUID 350330 attribute.

The MainInventorySeparatingValues 350336 package is a GACCnfInvItOvSBElResponseInventoryItemChangeMainInventorySeparatingValues 350342 data type. The MainInventorySeparatingValues 350336 package includes a MainInventorySeparatingValues 350338 entity. The MainInventorySeparatingValues 350338 entity has a cardinality of 0 . . . 1 350340 meaning that for each instance of the MainInventorySeparatingValues 350336 package there may be one MainInventorySeparatingValues 350338 entity. The MainInventorySeparatingValues 350338 entity includes various attributes, namely a MaterialUUID 350344, an OwnerPartyUUID 350386, an OwnerPartyID 350392, a SupplyPlanningAreaUUID 350398, a SupplyPlanningAreaID 350404 and an InventoryRestrictedUseIndicator 350410. The MainInventorySeparatingValues 350338 entity includes a MaterialKey 350350 subordinate entity.

The MaterialUUID 350344 attribute is an UUID 350348 data type. The MaterialUUID 350344 attribute has a cardinality of 0 . . . 1 350346 meaning that for each instance of the MainInventorySeparatingValues 350338 entity there may be one MaterialUUID 350344 attribute. The OwnerPartyUUID 350386 attribute is an UUID 350390 data type. The OwnerPartyUUID 350386 attribute has a cardinality of 0 . . . 1 350388 meaning that for each instance of the MainInventorySeparatingValues 350338 entity there may be one OwnerPartyUUID 350386 attribute.

The OwnerPartyID 350392 attribute is a BusinessPartnerInternalID 350396 data type. The OwnerPartyID 350392 attribute has a cardinality of 0 . . . 1 350394 meaning that for each instance of the MainInventorySeparatingValues 350338 entity there may be one OwnerPartyID 350392 attribute. The SupplyPlanningAreaUUID 350398 attribute is an UUID 350402 data type. The SupplyPlanningAreaUUID 350398 attribute has a cardinality of 0 . . . 1 350400 meaning that for each instance of the MainInventorySeparatingValues 350338 entity there may be one SupplyPlanningAreaUUID 350398 attribute.

The SupplyPlanningAreaID 350404 attribute is a SupplyPlanningAreaID 350408 data type. The SupplyPlanningAreaID 350404 attribute has a cardinality of 0 . . . 1 350406 meaning that for each instance of the MainInventorySeparatingValues 350338 entity there may be one SupplyPlanningAreaID 350404 attribute. The InventoryRestrictedUseIndicator 350410 attribute is an Indicator 350414 data type. The InventoryRestrictedUseIndicator 350410 attribute has a cardinality of 0 . . . 1 350412 meaning that for each instance of the MainInventorySeparatingValues 350338 entity there may be one InventoryRestrictedUseIndicator 350410 attribute.

The MaterialKey 350350 entity has a cardinality of 0 . . . 1 350352 meaning that for each instance of the MainInventorySeparatingValues 350338 entity there may be one MaterialKey 350350 entity. The MaterialKey 350350 entity includes various attributes, namely a ProductTypeCode 350356, a ProductTypeName 350362, a ProductIdentifierTypeCode 350368, a ProductIdentifierTypeName 350374 and a ProductID 350380.

The ProductTypeCode 350356 attribute is a ProductTypeCode 350360 data type. The ProductTypeCode 350356 attribute has a cardinality of 0 . . . 1 350358 meaning that for each instance of the MaterialKey 350350 entity there may be one ProductTypeCode 350356 attribute. The ProductTypeName 350362 attribute is a LANGUAGEINDEPENDENT_LONG_Name 350366 data type. The ProductTypeName 350362 attribute has a cardinality of 0 . . . 1 350364 meaning that for each instance of the MaterialKey 350350 entity there may be one ProductTypeName 350362 attribute.

The ProductIdentifierTypeCode 350368 attribute is a ProductIdentifierTypeCode 350372 data type. The ProductIdentifierTypeCode 350368 attribute has a cardinality of 0 . . . 1 350370 meaning that for each instance of the MaterialKey 350350 entity there may be one ProductIdentifierTypeCode 350368 attribute. The ProductIdentifierTypeName 350374 attribute is a LANGUAGEINDEPENDENT_LONG_Name 350378 data type. The ProductIdentifierTypeName 350374 attribute has a cardinality of 0 . . . 1 350376 meaning that for each instance of the MaterialKey 350350 entity there may be one ProductIdentifierTypeName 350374 attribute. The ProductID 350380 attribute is a ProductID 350384 data type. The ProductID 350380 attribute has a cardinality of 0 . . . 1 350382 meaning that for each instance of the MaterialKey 350350 entity there may be one ProductID 350380 attribute.

The IdentifiedStockInventorySeparatingValues 350416 package is a GACCnfInvItOvSBElResponseInventoryItemChangeIdentifiedStockInventorySeparatingValues 350422 data type. The IdentifiedStockInventorySeparatingValues 350416 package includes an IdentifiedStockInventorySeparatingValues 350418 entity. The IdentifiedStockInventorySeparatingValues 350418 entity has a cardinality of 0 . . . 1 350420 meaning that for each instance of the IdentifiedStockInventorySeparatingValues 350416 package there may be one IdentifiedStockInventorySeparatingValues 350418 entity. The IdentifiedStockInventorySeparatingValues 350418 entity includes an IdentifiedStockUUID 350424 attribute. The IdentifiedStockInventorySeparatingValues 350418 entity includes an IdentifiedStockKey 350430 subordinate entity. The IdentifiedStockUUID 350424 attribute is an UUID 350428 data type. The IdentifiedStockUUID 350424 attribute has a cardinality of 0 . . . 1 350426 meaning that for each instance of the IdentifiedStockInventorySeparatingValues 350418 entity there may be one IdentifiedStockUUID 350424 attribute.

The IdentifiedStockKey 350430 entity has a cardinality of 0 . . . 1 350432 meaning that for each instance of the IdentifiedStockInventorySeparatingValues 350418 entity there may be one IdentifiedStockKey 350430 entity. The IdentifiedStockKey 350430 entity includes an ID 350436 attribute. The IdentifiedStockKey 350430 entity includes a MaterialKey 350442 subordinate entity. The ID 350436 attribute is an IdentifiedStockID 350440 data type. The ID 350436 attribute has a cardinality of 0 . . . 1 350438 meaning that for each instance of the IdentifiedStockKey 350430 entity there may be one ID 350436 attribute.

The MaterialKey 350442 entity has a cardinality of 0 . . . 1 350444 meaning that for each instance of the IdentifiedStockKey 350430 entity there may be one MaterialKey 350442 entity. The MaterialKey 350442 entity includes various attributes, namely a ProductTypeCode 350448, a ProductTypeName 350454, a ProductIdentifierTypeCode 350460, a ProductIdentifierTypeName 350466 and a ProductID 350472.

The ProductTypeCode 350448 attribute is a ProductTypeCode 350452 data type. The ProductTypeCode 350448 attribute has a cardinality of 0 . . . 1 350450 meaning that for each instance of the MaterialKey 350442 entity there may be one ProductTypeCode 350448 attribute. The ProductTypeName 350454 attribute is a LANGUAGEINDEPENDENT_

LONG_Name 350458 data type. The ProductTypeName 350454 attribute has a cardinality of 0 . . . 1 350456 meaning that for each instance of the MaterialKey 350442 entity there may be one ProductTypeName 350454 attribute.

The ProductIdentifierTypeCode 350460 attribute is a ProductIdentifierTypeCode 350464 data type. The ProductIdentifierTypeCode 350460 attribute has a cardinality of 0 . . . 1 350462 meaning that for each instance of the MaterialKey 350442 entity there may be one ProductIdentifierTypeCode 350460 attribute. The ProductIdentifierTypeName 350466 attribute is a LANGUAGEINDEPENDENT_LONG_Name 350470 data type. The ProductIdentifierTypeName 350466 attribute has a cardinality of 0 . . . 1 350468 meaning that for each instance of the MaterialKey 350442 entity there may be one ProductIdentifierTypeName 350466 attribute. The ProductID 350472 attribute is a ProductID 350476 data type. The ProductID 350472 attribute has a cardinality of 0 . . . 1 350474 meaning that for each instance of the MaterialKey 350442 entity there may be one ProductID 350472 attribute.

The SpecialStockSeparatingValues 350478 package is a GACCnfInvItOvSBElResponseInventoryItemChangeSpecialStockSeparatingValues 350484 data type. The SpecialStockSeparatingValues 350478 package includes a SpecialStockSeparatingValues 350480 entity. The SpecialStockSeparatingValues 350480 entity has a cardinality of 0 . . . 1 350482 meaning that for each instance of the SpecialStockSeparatingValues 350478 package there may be one SpecialStockSeparatingValues 350480 entity. The SpecialStockSeparatingValues 350480 entity includes various attributes, namely a SiteLogisticsLotUUID 350504 and a SiteLogisticsLotID 350510. The SpecialStockSeparatingValues 350480 entity includes an OutboundDeliveryReference 350486 subordinate entity.

The SiteLogisticsLotUUID 350504 attribute is an UUID 350508 data type. The SiteLogisticsLotUUID 350504 attribute has a cardinality of 0 . . . 1 350506 meaning that for each instance of the SpecialStockSeparatingValues 350480 entity there may be one SiteLogisticsLotUUID 350504 attribute. The SiteLogisticsLotID 350510 attribute is a BusinessTransactionDocumentID 350514 data type. The SiteLogisticsLotID 350510 attribute has a cardinality of 0 . . . 1 350512 meaning that for each instance of the SpecialStockSeparatingValues 350480 entity there may be one SiteLogisticsLotID 350510 attribute.

The OutboundDeliveryReference 350486 entity has a cardinality of 0 . . . 1 350488 meaning that for each instance of the SpecialStockSeparatingValues 350480 entity there may be one OutboundDeliveryReference 350486 entity. The OutboundDeliveryReference 350486 entity includes various attributes, namely an ID 350492 and an UUID 350498. The ID 350492 attribute is a BusinessTransactionDocumentID 350496 data type. The ID 350492 attribute has a cardinality of 0 . . . 1 350494 meaning that for each instance of the OutboundDeliveryReference 350486 entity there may be one ID 350492 attribute. The UUID 350498 attribute is an UUID 350502 data type. The UUID 350498 attribute has a cardinality of 0 . . . 1 350500 meaning that for each instance of the OutboundDeliveryReference 350486 entity there may be one UUID 350498 attribute.

The ProcessingConditions 350516 package is a ResponseProcessingConditions 350522 data type. The ProcessingConditions 350516 package includes a ProcessingConditions 350518 entity. The ProcessingConditions 350518 entity has a cardinality of 1 350520 meaning that for each instance of the ProcessingConditions 350516 package there is one ProcessingConditions 350518 entity.

The Log 350524 package is a Log 350530 data type. The Log 350524 package includes a Log 350526 entity. The Log 350526 entity has a cardinality of 1 350528 meaning that for each instance of the Log 350524 package there is one Log 350526 entity.

Figures 1, 36:
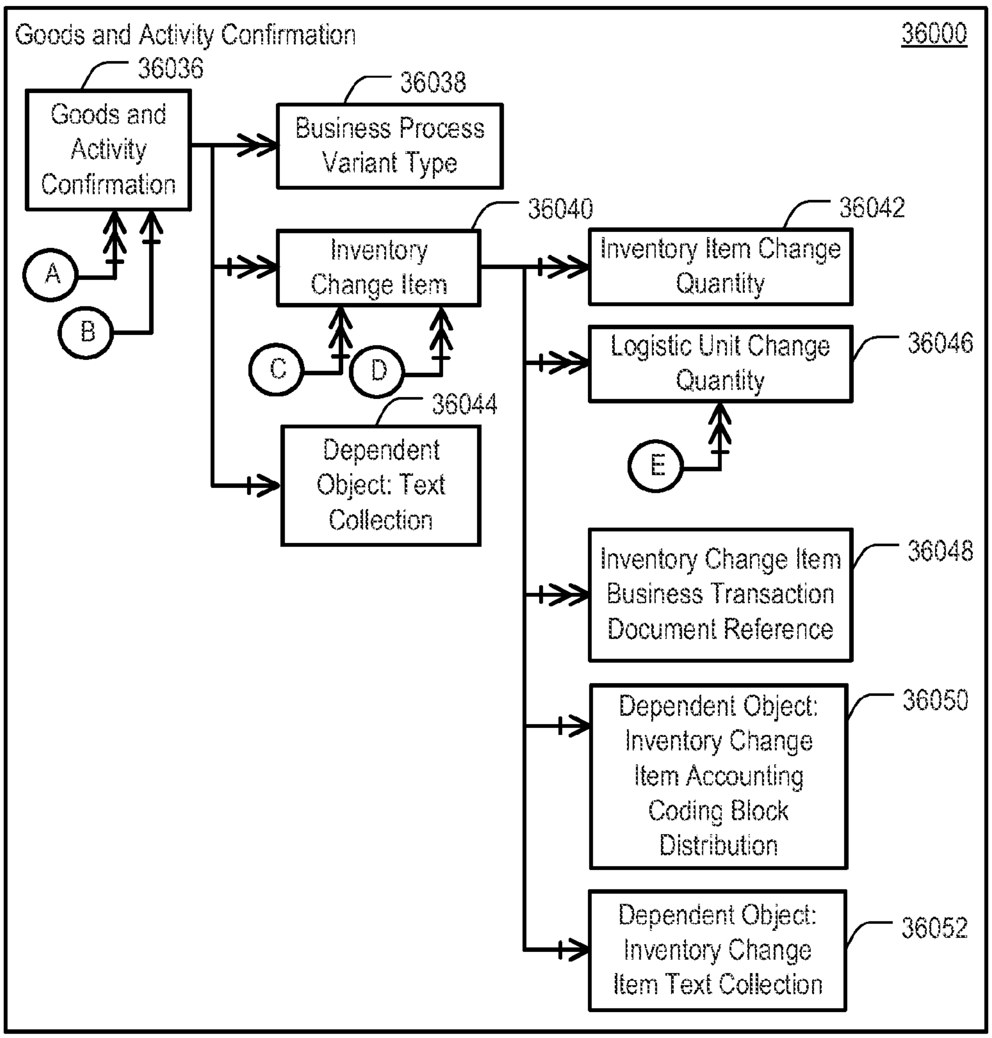
Figures 2, 36:
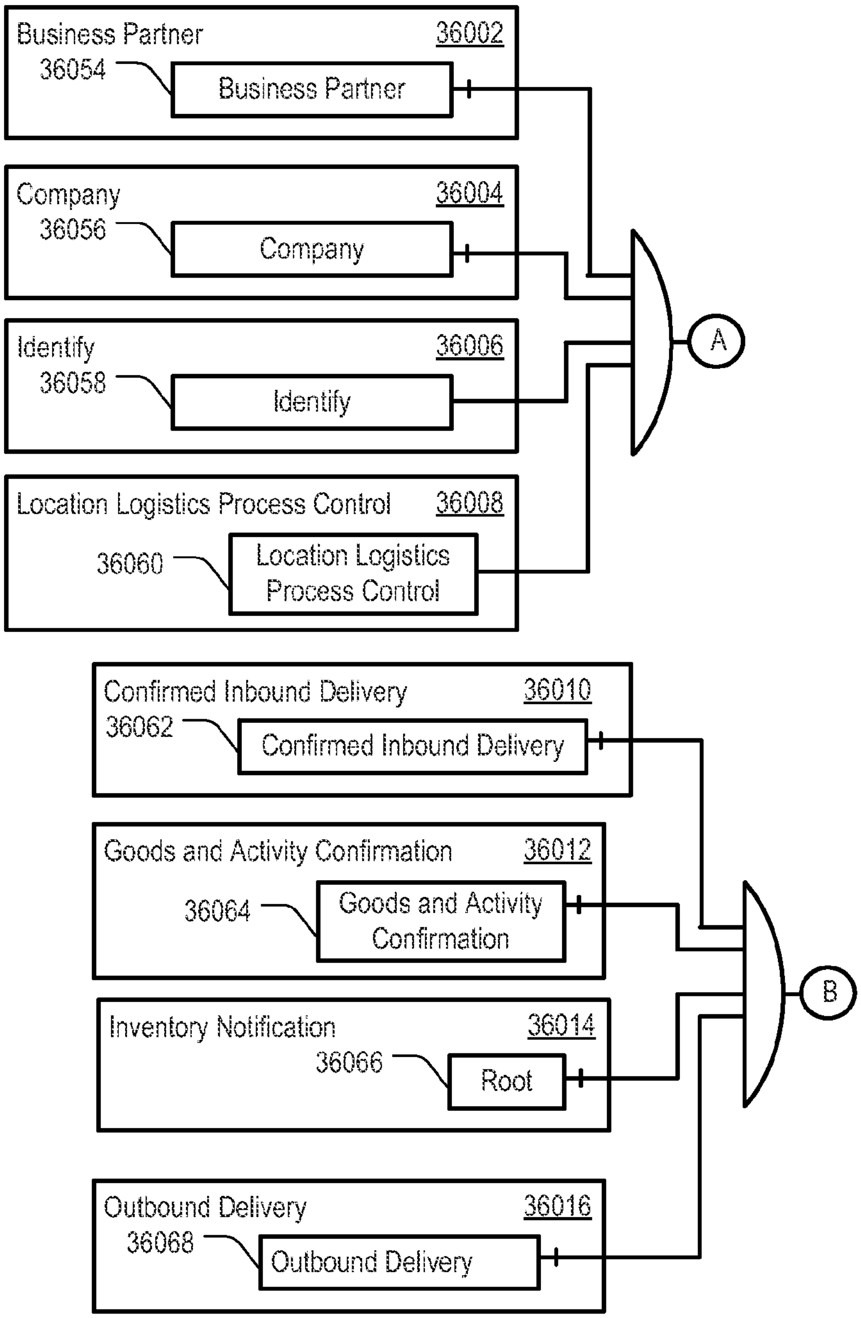
Figures 3, 36:
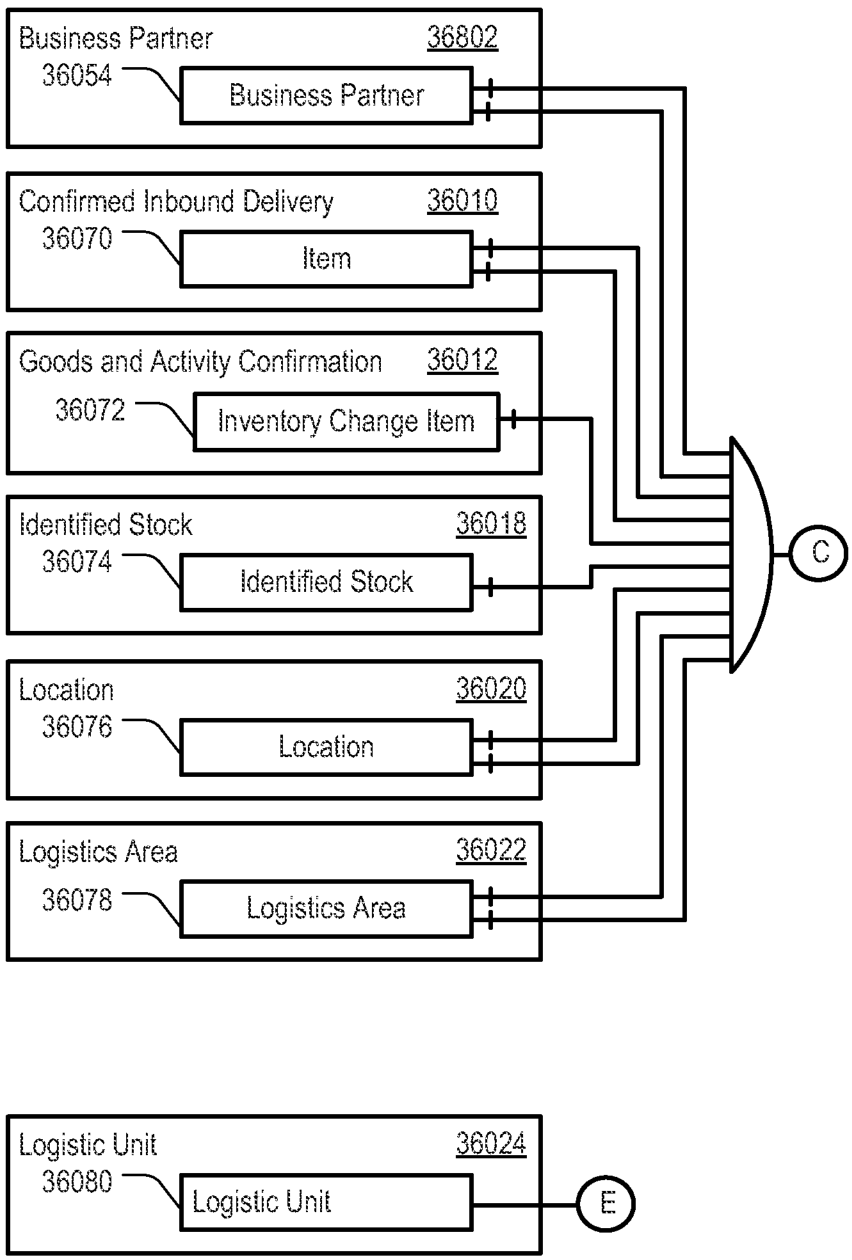
Figures 4, 36:
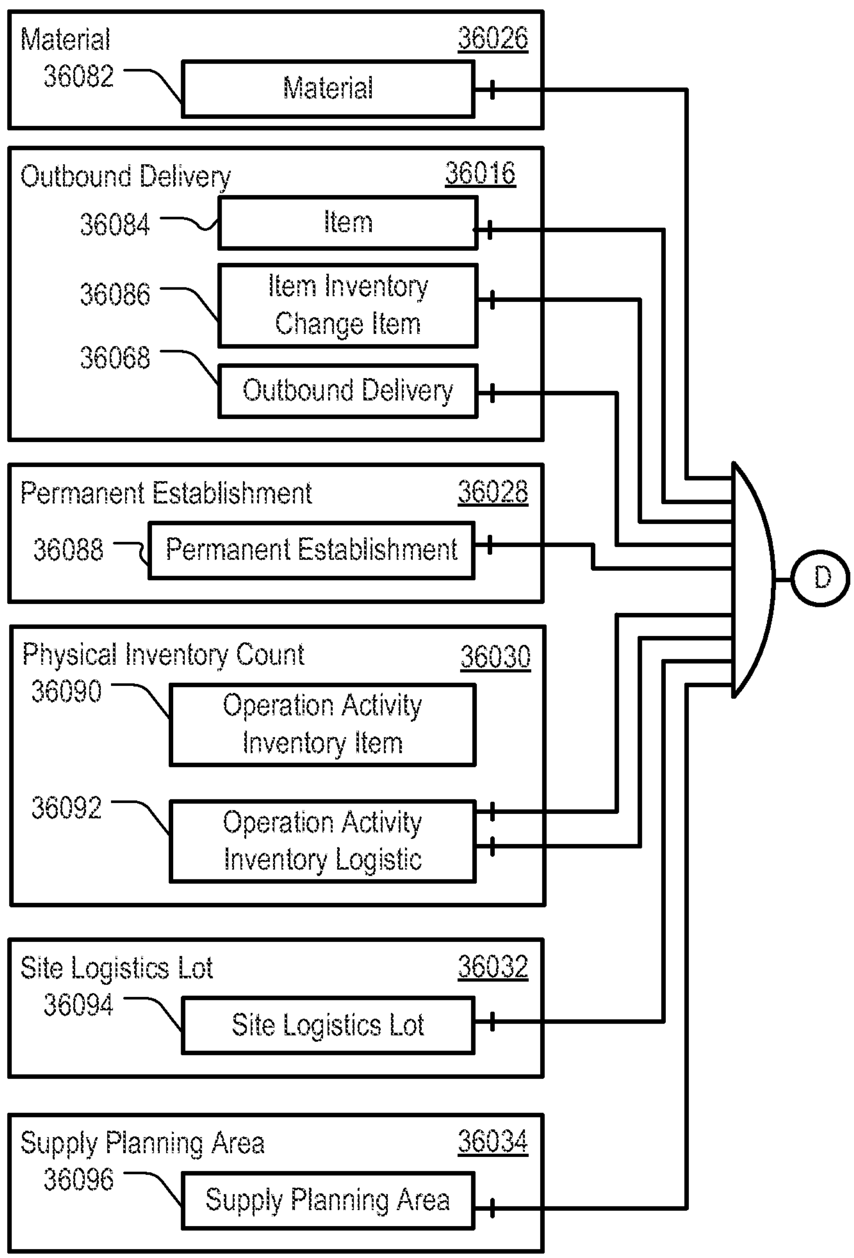

FIGS. 36-1 through 36-4 collectively illustrate an example object model for a Goods and Activity Confirmation business object 36000. Specifically, the object model depicts interactions among various components of the Goods and Activity Confirmation business object 36000, as well as external components that interact with the Goods and Activity Confirmation business object 36000 (shown here as 36002 through 36032 and 36054 through 36096). The Goods and Activity Confirmation business object 36000 includes elements 36036 through 36052 which can be hierarchical, as depicted. For example, the Goods and Activity Confirmation entity 36036 hierarchically includes entities 36038, 36040 and 36044. Some or all of the entities 36036 through 36052 can correspond to packages and/or entities in the message data types described above.

The business object Goods and Activity Confirmation is a record of confirmed inventory changes that occur at a specific time. The Goods and Activity Confirmation business object belongs to the process component Inventory Processing. The Goods and Activity Confirmation business object belongs to the deployment unit Production and Site Logistics Execution. The Goods and Activity Confirmation business object is a projection of Logistics Confirmation_Template. A Goods and Activity Confirmation can be used in processes which are not guided by a Logistics Lots Production or Site Logistics Lot. Goods and Activity Confirmations can include ad hoc inventory changes, posting of differences in physical inventory, and confirmations from a CRM (Customer Relationship Management) system. GoodsAndActivityConfirmation can update an inventory business object Inventory, Financial Accounting, and/or Supply Chain Control. A Logistics Confirmation can be subdivided into Inventory Change Items which describe changes to inventory that are to be documented. The business object Goods and Activity Confirmation has an object category of Business Transaction Document and a technical category of Standard Business Object.

The business object Goods and Activity Confirmation is involved in the following Process Component Interactions: Data Migration System_Inventory Processing, Inventory Processing_Accounting, Inventory Processing_Project Processing, Inventory Processing_Supply and Demand Matching_Ad Hoc, Point Of Sale Transaction Processing_Inventory Processing, and Service Confirmation Processing_Inventory Processing.

A service interface Goods And Activity Confirmation Migration In has a technical name of InventoryProcessingGoodsAndActivityConfirmationMigrationIn. The service interface Goods And Activity Confirmation Migration In is part of the process component interaction Data Migration System_Inventory Processing, and is an interface to create a goods and activity confirmation for inventory quantities from a source data migration system. A Migrate Goods And Activity Confirmation operation has a technical name of InventoryProcessingGoodsAndActivityConfirmationMigrationIn.MigrateGoodsAndActivityConfirmation, can be used to create a new goods and activity confirmation during a data migration process, based on information about inventory, can be used for data migration and can handle data according to migration-specific requirements, and can be based on message type Goods And Activity Confirmation Inventory Change Migrate Request derived from business object Goods and Activity Confirmation.

A service interface Inventory And Activity Accounting Out has a technical name of InventoryProcessingInventoryAndActivityAccountingOut. The service interface Inventory And Activity Accounting Out is part of the process component interaction Inventory Processing_Accounting, and is an interface to notify of confirmed and cancelled inventory changes. A Notify of Inventory Change and Activity Confirmation operation has a technical name of InventoryProcessingInventoryAndActivityAccountingOut.NotifyOfInventoryChangeAndActivity Confirmation, can be used to notify about inventory changes for physical goods and activity confirmations and to trigger a valuation of relevant inventory changes and activities, and can be based on message type Inventory Change And Activity Confirmation Accounting Notification derived from business object Accounting Notification. A Notify of Inventory Change and Activity Confirmation Cancellation operation has a technical name of InventoryProcessingInventoryAndActivityAccountingOut.NotifyOfInventoryChangeAndActivityConfirmationCancellation, can be used to notify about a cancellation of inventory changes and previously sent activity confirmations, and can be based on message type Inventory Change And Activity Confirmation Cancellation Accounting Notification derived from business object Accounting Notification.

A service interface Inventory Changing In has a technical name of InventoryProcessingInventoryChangingIn. The service interface Inventory Changing In is part of the following Process Component Interactions: Point Of Sale Transaction Processing_Inventory Processing, and Service Confirmation Processing_Inventory Processing. The service interface Inventory Changing In is an interface to create a goods and activity confirmation based on incoming inventory changes. A Create Goods and Activity Confirmation operation has a technical name of InventoryProcessingInventoryChangingIn.CreateGoodsAndActivityConfirmation, can be used to create a goods and activity confirmation, and can be based on message type Goods and Activity Confirmation Inventory Change Notification derived from business object Goods and Activity Confirmation.

A service interface Inventory Changing Out has a technical name of InventoryProcessingInventoryChangingOut. The service interface Inventory Changing Out is part of process component interaction Inventory Processing_Supply and Demand Matching_Ad Hoc, and is an interface to notify of an inventory change. A Notify of Inventory Change operation has a technical name of InventoryProcessingInventoryChangingOut.NotifyOfInventoryChange, can be used to notify about inventory changes and to trigger an update of the view of aggregated stock in planning, and can be based on message type Logistics Confirmation Inventory Change Notification derived from business object Logistics Confirmation_Template.

A service interface Project Expense Notification Out has a technical name of InventoryProcessingProjectExpenseNotificationOut. The service interface Project Expense Notification Out is part of the process component interaction Inventory Processing_Project Processing, and is an interface to notify of an inventory change that affects invoicing. A Notify of Project Expense operation has a technical name of InventoryProcessingProjectExpenseNotificationOut.NotifyOfProjectExpense, can be used to notify of a project expense, and can be based on message type Project Expense View Notification derived from business object Project Expense View.

The business object Goods and Activity Confirmation includes a Root node. The Root node includes information concerning a record of logistic process changes that occur at a specific time, such as inventory changes, plan adjustments, resource utilizations, service product consumptions, work in-process quantity changes, and activity durations. The business object Goods and Activity Confirmation can be time dependent on Time Point.

The elements located directly at the node Goods and Activity Confirmation are defined by the data type LogisticsConfirmationElements. These elements include: UUID, ID, CancelledConfirmationUUID, CancellationDocumentIndicator, InventoryAlignmentIndicator, BaseBusinessTransactionDocumentReference, OutboundDeliveryUUID, SystemAdministrativeData, CompanyUUID, ProcessorPartyUUID, TransactionDateTime, BusinessTransactionDateTime, InventoryChangeDateTime, Status, and LocationLogisticsProcessControlUUID.

UUID may be an alternative key, is a universally unique identifier of a LogisticsConfirmation, and may be based on datatype GDT: UUID. ID may be an alternative key, is an identifier of a LogisticsConfirmation, and may be based on datatype GDT: BusinessTransactionDocumentID. CancelledConfirmationUUID may be optional, is a universally unique identifier of a canceled Confirmation, and may be based on datatype GDT: UUID. CancellationDocumentIndicator may be optional and indicates whether a current LogisticsConfirmation is used to cancel a previously created LogisticsConfirmation, where a reference to the canceled LogisticsConfirmation can be kept in one of the fields CancelledGoodsAndActivityConfirmationUUID, CancelledSiteLogisticsConfirmationUUID or CancelledProductionConfirmationUUID. CancellationDocumentIndicator may be based on datatype GDT: Indicator, with a qualifier of CancellationDocument. InventoryAlignmentIndicator may be optional, indicates if a current Logistics Confirmation is used to realign Inventory to a sum of all documented inventory changes, and may be based on datatype GDT: Indicator, with a qualifier of Alignment. The sum of all inventory changes documented by all types of Logistics Confirmations can be equal to the quantity of a corresponding InventoryItem. If there is a mismatch between these values, a dedicated GoodsAndActivityConfirmation can be created to realign the Inventory Item. A Logistics Confirmation marked as Inventory alignment may or may not be considered when building the sum of inventory changes. In some implementations, GoodsAndActivityConfirmations which are alignments are not able to be cancelled. BaseBusinessTransactionDocumentReference may be optional and may be based on datatype GDT: BusinessTransactionDocumentReference. OutboundDeliveryUUID may be optional, is a universally unique identifier of an OutboundDelivery that created a confirmation, and may be based on datatype GDT: UUID. SystemAdministrativeData includes administrative data about the creation of a LogisticsConfirmation, and may be based on datatype GDT: SystemAdministrativeData. For example, the fields CreationDateTime and CreationIdentityUUID may be used. CompanyUUID may be optional, is a universally unique identifier of the company that is financially affected by a confirmation, and may be based on datatype GDT: UUID. In some implementations, at most one company is financially affected by one confirmation document. A company can be financially affected in the following cases: inventory owned by the company is changed, a resource owned by the company is used, in a production confirmation where an associated production lot belongs to the company, and if inventory is changed with an account assignment relevant to the company.

ProcessorPartyUUID may be optional, is a universally unique identifier of a party that performed changes reported in a confirmation, and may be based on datatype GDT: UUID. TransactionDateTime is a point in time indicating when reported changes are performed, and may be based on datatype GDT: GLOBAL_DateTime, with a qualifier of Transaction. BusinessTransactionDateTime is a point in time indicating when reported changes are performed from a business point of view, and may be based on datatype GDT: GLOBAL_DateTime, with a qualifier of Transaction. Within an inbound process, a goods receipt can be posted to inventory during an unload process. From the perspective of supplier invoice processing or financial accounting, a logical receipt takes place when the goods arrive, which can be earlier than completion of the unload process (e.g., the logical receipt does not depend on unloading delays). InventoryChangeDateTime is a point in time indicating when reported inventory changes are applied to inventory, and may be based on datatype GDT: GLOBAL_DateTime, with a qualifier of Change. InventoryChangeDateTime can be compared with a SnapshotDateTime in the business object Inventory, node Item. Status may be optional, is a status of a LogisticsConfirmation, and may be based on datatype BOIDT: LogisticsConfirmationStatus. Status can include Status/CancellationStatusCode, which may be optional, indicates if a LogisticsConfirmation has a status "canceled" or "not canceled", and may be based on datatype GDT: CancellationStatusCode. LocationLogisticsProcessControlUUID is a universally unique identifier of a location logistics process control instance belonging to a site where reported changes are performed, and may be based on datatype GDT: UUID.

The following composition relationships to subordinate nodes exist: BusinessProcessVariantType, with a cardinality of 1:N; and InventoryChangeItem, with a cardinality of 1:CN, which may be filtered. The filter elements are defined by the data type LogisticsConfirmationInventoryChangeItemFilterElements. These elements include: TypeCode and InventoryMovementDirectionCode. TypeCode may be optional, is a coded representation of a type of an inventory change item, and may be based on datatype GDT: BusinessTransactionDocumentItemTypeCode. Values for TypeCode can include values indicating Material Inventory Change Item, Identified Logistic Unit Inventory Change Item, and Logistic Unit Inventory Change Item. InventoryMovementDirectionCode may be optional, is a coded representation of a direction of an inventory movement inventory receipt or inventory issue, and may be based on datatype GDT: InventoryMovementDirectionCode. The following composition relationships to dependent objects exist: TextCollection, with a cardinality of 1:C, which is a collection of natural language texts related to a LogisticsConfirmation.

The following inbound association relationships may exist: ProcessorParty, from the business object Business Partner/node Business Partner, with a cardinality of C:CN, which is a party that performed changes reported in a confirmation; Company, from the business object Company/node Company, with a cardinality of C:CN, which is a company that is financially affected by a confirmation; ConfirmedInboundDelivery, from the business object Confirmed Inbound Delivery/node Confirmed Inbound Delivery, with a cardinality of C:C; Cancelled Confirmation, from the business object Goods and Activity Confirmation/node Goods and Activity Confirmation, with a cardinality of C:C, which is a confirmation that has been cancelled; CreationIdentity, from the business object Identity/node Identity, with a cardinality of 1:CN, which is an identity of a creator of a LogisticsConfirmation; InventoryNotification, from the business object Inventory Notification/node Root, with a cardinality of C:C; LocationLogisticsProcessControl, from the business object Location Logistics Process Control/node Location Logistics Process Control, with a cardinality of 1:CN, which is a location logistics process control instance of a site where reported changes are performed; and OutboundDelivery, from the business object Outbound Delivery/node Outbound Delivery, with a cardinality of C:C, which is an outbound delivery that created a confirmation.

The following specialization associations for navigation may exist: Business Document Flow, to the business object Business Document Flow/node Business Document Flow, with a target cardinality of C, which enables navigation to a business document flow in which a logistics confirmation participates; Processor Party Overview, to the business object Business Partner/node Overview, with a target cardinality of C, which is a party that performed changes reported in a confirmation; Main Business Process Variant Type, to the node Business Process Variant Type, with a target cardinality of 1, which is an association to an instance of node BusinessProcessVariantType which is marked as a main business process variant type; and Cancelling Confirmation, to the node Goods and Activity Confirmation, with a target cardinality of C, which is a Confirmation that is cancelling a current confirmation.

An Apply Inventory Changes action can be used to carry out inventory changes with data of LogisticsConfirmation at a business object Inventory. The ApplyInventoryChanges action can result in posting of inventory changes in the business object Inventory. For example, the ApplyInventoryChanges action of LogisticsConfirmation can call a ApplyConfirmation action of the business object Inventory. In the business object GoodsAndActivityConfirmation, the ApplyInventoryChanges action can be called from the user interface of the business object. In the business object SiteLogisticsConfirmation, the ApplyInventoryChanges action can be called from the business object SiteLogisticsLot in a same process component. In the business object ProductionConfirmation, the ApplyInventoryChanges action can be called from the business object ProductionLot in a same process component.

An Apply Inventory Notification Changes action incorporates into a GoodsAndActivityConfirmation changes of data which are currently being recorded in an InventoryNotification. Data in InventoryNotification which relate to confirmation process inventory changes and associated quantities can be propagated to the GoodsAndActivityConfirmation. The action elements are defined by the inline structure PCFM_S_APPLY_IN_NOTIF_ACT_EL. These elements include: TargetReleaseStatusCode and InventoryUpdateIndicator. TargetReleaseStatusCode may be optional and may be based on datatype GDT: ReleaseStatusCode. InventoryUpdateIndicator may be based on datatype GDT: Indicator. In the business object GoodsAndActivityConfirmation, the Apply Inventory Notification Changes action can be called from the business object InventoryNotification.

A Cancel action cancels a LogisticsConfirmation. The Cancel action can be carried out at the LogisticsConfirmation to be canceled. The Cancel action results in a new LogisticsConfirmation being created that cancels the effects of an original LogisticsConfirmation. The canceling LogisticsConfirmation can keep a reference to the canceled LogisticsConfirmation. The original LogisticsConfirmation can remain unchanged, except for a status change and an additional association to the canceling LogisticsConfirmation. In some implementations, once a LogisticsConfirmation has been saved, the LogisticsConfirmation can no longer be changed (e.g., an only action allowed after saving can be cancelling the LogisticsConfirmation). Preconditions of the Cancel action can include the LogisticsConfirmation having a "simple" life cycle that requires only a simple status representation. Business objects involved in the process component Accounting can be informed about a cancellation of LogisticsConfirmation. A cancellation status of the canceled LogisticsConfirmation can be set to "cancelled". In the business object GoodsAndActivityConfirmation, the Cancel action can be called from the user interface of the business object. In the SiteLogisticsConfirmation and ProductionConfirmation business objects, the Cancel action can be called from respective LogisticsLots.

A RevokeCancellation action revokes an ongoing confirmation cancellation by deleting a new cancelling confirmation and setting a cancellation status on an original confirmation back to "not cancelled". In some implementations, a cancelling confirmation which has been applied to the business object Inventory and has been saved cannot be revoked by the RevokeCancellation action. The RevokeCancellation action can be performed for cancelling confirmations which have not yet been saved. Preconditions of the RevokeCancellation action include the existence of a confirmation that has been cancelled but where a cancellation process has not been finalized. In the business object GoodsAndActivityConfirmation, the RevokeCancellation action can be called from the user interface of the business object, such as if during a cancellation process, the cancellation is aborted by a user.

An Apply Outbound Delivery Changes action incorporates into a GoodsAndActivityConfirmation changes of data which are currently being recorded in an OutboundDelivery. Data in the OutboundDelivery which relate to the confirmation process inventory changes and associated quantities can be propagated to the GoodsAndActivityConfirmation. The action elements are defined by the inline structure: APCFM_A_ROOT_APPLY_OD_CHG_EL. These elements include: TargetReleaseStatusCode and InventoryUpdateIndicator. TargetReleaseStatusCode may be optional and may be based on datatype GDT: ReleaseStatusCode. InventoryUpdateIndicator may be optional and may be based on datatype GDT: Indicator. In the business object GoodsAndActivityConfirmation, the Apply Outbound Delivery Changes action can be called from the business object OutboundDelivery.

An Apply Confirmed Inbound Delivery Changes action incorporates into a GoodsAndActivityConfirmation changes of data which are currently being recorded in a ConfirmedInboundDelivery. Data in the ConfirmedInboundDelivery which relate to confirmation process inventory changes and associated quantities can be propagated to the GoodsAndActivityConfirmation. The action elements are defined by the inline structure: APCFM_A_ROOT_APPLY_CID_CHG_EL. These elements include: TargetReleaseStatusCode and InventoryUpdateIndicator. TargetReleaseStatusCode may be optional and may be based on datatype GDT: ReleaseStatusCode. InventoryUpdateIndicator may be optional and may be based on datatype GDT: Indicator. In the business object GoodsAndActivityConfirmation, the Apply Confirmed Inbound Delivery Changes action can be called from the business object ConfirmedInboundDelivery.

A Select All query can be used to provide the NodeIDs of all instances of the node and to enable an initial load of data for a Fast Search Infrastructure. A Query By Company query provides a list of LogisticsConfirmations that are financially relevant for a given set of companies according to search criteria. The query elements are defined by the inline structure: APCFM_S_COMPANY_QUERY_EL. These elements include: Company_ID, CreationDateTime, BusinessTransactionDateTime, CancellationDocumentIndicator, LogisticsConfirmationStatus, and BaseBusinessTransactionDocumentReference.

Company_ID is an ID of a Company that is financially affected by a LogisticsConfirmation according to the association Company, and may be based on datatype GDT: OrganisationalCentreID. CreationDateTime is a creation date/time date and time stamp, and may be based on datatype GDT: GLOBAL_DateTime, with a qualifier of Creation. BusinessTransactionDateTime is a point in time indicating when reported changes are performed from a business point of view, and may be based on datatype GDT: GLOBAL_DateTime, with a qualifier of Transaction. Within an inbound process, a goods receipt can be posted to inventory during an unload process. From the perspective of supplier invoice processing or financial accounting, a logical receipt takes place when the goods arrive, which can be earlier than completion of the unloading process (e.g., the logical receipt does not necessarily depend on unloading delays). CancellationDocumentIndicator may be based on datatype GDT: Indicator, with a qualifier of CancellationDocument. LogisticsConfirmationStatus may be based on datatype BOIDT: LogisticsConfirmationStatus. LogisticsConfirmationStatus/CancellationStatusCode indicates if a LogisticsConfirmation has a status of "canceled" or "not canceled", and may be based on datatype GDT: CancellationStatusCode. BaseBusinessTransactionDocumentReference may be based on datatype GDT: BusinessTransactionDocumentReference, with a qualifier of Base.

A Query By Elements query can be used to provide a list of LogisticsConfirmations that match search criteria. The query elements are defined by the inline structure: APCFM_S_BY_HDR_EL_QU. These elements include: ID, BaseBusinessTransactionDocumentReference, OutboundDeliveryUUID, ProcessorPartyUUID, TransactionDateTime, BusinessTransactionDateTime, InventoryChangeDateTime, SystemAdministrativeData, InventoryAlignmentIndicator, LocationLogisticsProcessControlUUID, CancellationDocumentIndicator, and LogisticsConfirmationStatus. ID may be based on datatype GDT: BusinessTransactionDocumentID. BaseBusinessTransactionDocumentReference may be based on datatype GDT: BusinessTransactionDocumentReference, with a qualifier of Base. OutboundDeliveryUUID is a universally unique identifier of an OutboundDelivery that created a confirmation, and may be based on datatype GDT: UUID. ProcessorPartyUUID may be based on datatype GDT: UUID. TransactionDateTime may be based on datatype GDT: GLOBAL_DateTime, with a qualifier of Transaction. BusinessTransactionDateTime is a point in time indicating when reported changes are performed from a business point of view, and may be based on datatype GDT: GLOBAL_DateTime, with a qualifier of Transaction. Within an inbound process, a goods receipt can be posted to inventory during an unload process. From the perspective of supplier invoice processing or financial accounting, a logical receipt takes place when the goods arrive, which can be earlier than completion of the unloading process. InventoryChangeDateTime is a point in time indicating when reported inventory changes are applied to inventory, and may be based on datatype GDT: GLOBAL_DateTime, with a qualifier of Transaction. SystemAdministrativeData may be based on datatype GDT: SystemAdministrativeData and can include, for example, the fields CreationDateTime and CreationIdentityUUID. InventoryAlignmentIndicator indicates if a current Logistics Confirmation is used to realign Inventory to a sum of all documented inventory changes, and may be based on datatype GDT: Indicator, with a qualifier of Alignment. LocationLogisticsProcessControlUUID may be based on datatype GDT: UUID. CancellationDocumentIndicator may be based on datatype GDT: Indicator, with a qualifier of Cancellation-Document. LogisticsConfirmationStatus may be based on datatype BOIDT: LogisticsConfirmationStatus. LogisticsConfirmationStatus can include LogisticsConfirmation-Status/CancellationStatusCode, which indicates if a LogisticsConfirmation has a status of "canceled" or "not canceled", and may be based on datatype GDT: CancellationStatusCode.

Business Process Variant Type defines the character of a business process variant of a LogisticsConfirmation and represents a typical way of processing of a LogisticsConfirmation within a process component from a business point of view. The elements located directly at the node Business Process Variant Type are defined by the inline structure: APCFM_S_BPVT_EL. These elements include: BusinessProcessVariantTypeCode and MainIndicator. BusinessProcessVariantTypeCode is a coded representation of a business process variant type of a LogisticsConfirmation, and may be based on datatype GDT: BusinessProcessVariant-TypeCode. MainIndicator may be optional, specifies whether a current BusinessProcessVariantTypeCode is a main variant, and may be based on datatype GDT: Indicator, with a qualifier of Main. The following specialization associations for navigation may exist to the node Goods and Activity Confirmation: Parent, with a target cardinality of 1; and Root, with a target cardinality of 1. In some implementations, one of the instances of the ItemBusinessProcessVariantType is allowed to be indicated as main.

Inventory Change Item documents an inventory change within a LogisticsConfirmation. Inventory Change Item can occur in the following complete, disjoint specializations: Inventory Item Change, Logistic Unit Change, and Identified Logistic Unit Change. A specialization type can be implemented by a type attribute. The elements located directly at the node Inventory Change Item are defined by the data type LogisticsConfirmationInventoryChangeItemElements.
These elements include: UUID, ID, TypeCode, Inventory-ChangeReasonCode, InventoryMovementDirectionCode, LeadingItemUUID, TransferGroupID, AutomaticallyGeneratedIndicator, InventoryRelevanceIndicator, LogisticsDeviationReasonCode, InventoryLocation, InventoryItemChange, and Reference.

InventoryLocation can include InventoryLocation/InventoryTypeCode, InventoryLocation/LocationUUID, InventoryLocation/LocationID, InventoryLocation/CustodianParty-UUID, InventoryLocation/CustodianPartyInternalID, InventoryLocation/LogisticsAreaUUID, InventoryLocation/LogisticsAreaKey, InventoryLocation/LogisticsAreaKey/ID, InventoryLocation/LogisticsAreaKey/SiteID, Inventory-Location/InventoryManagedLocationUUID, InventoryLocation/InventoryManagedLogisticsAreaUUID, and InventoryLocation/PermanentEstablishmentUUID. InventoryItemChange can include InventoryItemChange/MainInventorySeparatingValues, and InventoryItem-ChangeddentifiedStockInventorySeparatingValues. InventoryItemChange/MainInventorySeparatingValues can include InventoryItemChange/MainInventorySeparatingValues/MaterialUUID, InventoryItemChange/MainInventorySeparatingValues/MaterialKey, InventoryItemChange/MainInventorySeparatingValues/OwnerPartyUUID, InventoryItemChange/MainInventorySeparatingValues/OwnerPartyID, InventoryItemChange/MainInventorySeparatingValues/SupplyPlanningAreaUUID, InventoryItem-Change/MainInventorySeparatingValues/SupplyPlanningAreaID, and InventoryItemChange/MainInventorySeparatingValues/InventoryRestrictedUseIndicator. InventoryItemChange/MainInventorySeparatingValues/MaterialKey can include InventoryItemChange/MainInventorySeparatingValues/MaterialKey/ProductTypeCode, InventoryItemChange/MainInventorySeparatingValues/MaterialKey/Productidentifier-TypeCode, and InventoryItemChange/MainInventorySeparatingValues/MaterialKey/ProductID. InventoryItemChange/IdentifiedStockInventorySeparatingValues can include InventoryItemChangeddentifiedStockInventorySeparatingValues/IdentifiedStockUUID and InventoryItemChangeddentifiedStockInventorySeparatingValues/IdentifiedStockKey. InventoryItemChangeddentifiedStockInventorySeparatingValues/IdentifiedStockKey can include InventoryItemChangeddentifiedStockInventorySeparatingValues/IdentifiedStockKey/ID and InventoryItemChangeddentifiedStockInventorySeparatingValues/IdentifiedStockKey/MaterialKey.

InventoryItemChangeddentifiedStockInventorySeparatingValues/IdentifiedStockKey/MaterialKey can include InventoryItemChangeddentifiedStockInventorySeparatingValues/IdentifiedStockKey/MaterialKey/ProductTypeCode, InventoryItemChangeddentifiedStockInventorySeparatingValues/IdentifiedStockKey/MaterialKey/ProductidentifierypeCode, and InventoryItem-ChangeddentifiedStockInventorySeparatingValues/IdentifiedStockKey/MaterialKey/ProductID. InventoryItemChange can include InventoryItemChange/SpecialStockSeparatingValues and InventoryItemChange/DefaultRecordedQuantityUUID. Reference can include Reference/OutboundDeliveryItemUUID, Reference/OutboundDeliveryItemInventoryChangeItemUUID, Reference/ConfirmedInboundDeliveryItemUUID, Reference/InventoryNotificationItemUUID, Reference/Physical-InventoryCountOperationActivityInventoryItemUUID, and Reference/PhysicalInventoryCountOperationActivityInventoryLogisticpackageUUID.

UUID may be an alternative key, is a universally unique identifier of an InventoryChangeItem, and may be based on datatype GDT: UUID. ID is an identifier of an Inventory-ChangeItem, and may be based on datatype GDT: BusinessTransactionDocumentItemID TypeCode is a coded representation of a type of an inventory change item, and may be based on datatype GDT: BusinessTransactionDocument-ItemTypeCode. Types can include Material Inventory Change Item, Identified Logistic Unit Inventory Change Item, and Logistic Unit Inventory Change Item. Inventory-ChangeReasonCode may be optional, is a coded representation of a reason for an inventory change, and may be based on datatype GDT: InventoryChangeReasonCode. Inventory-MovementDirectionCode is a coded representation of a direction of an inventory movement inventory receipt or inventory issue, and may be based on datatype GDT: InventoryMovementDirectionCode. LeadingItemUUID is a reference of a dependent InventoryChangeItem to a relevant leading InventoryChangeItem, and may be based on datatype GDT: UUID. An InventoryChangeItem can be "Leading" if it is of the type "LogisticUnitChange" or "IdentifiedLogisticUnitChange" and a corresponding changed Logisticpackage is not changed in the context of changes made to another, higher-level Logisticpackage. A InventoryChangeItem can be "Dependent" if it is changed in the context of changes made to another, higher-level Logisticpackage. TransferGroupID may be optional, identifies a group of Inventory-ChangeItems involved in a transfer posting, and may be based on datatype GDT: BusinessTransactionDocumentItemGroupID. A transfer posting expresses the change of an inventory location or an inventory-separating attribute according to InventorySeparatingValues. Several InventoryChangeItems describing inventory receipts and issues can be used to represent transfer postings in LogisticsConfirmation. AutomaticallyGeneratedIndicator may be optional, indicates whether an InventoryChangeItem is created automatically, and may be based on datatype GDT: Indicator, with a qualifier of AutomaticallyGenerated. In general, not all inventory changes may be recorded explicitly when LogisticsConfirmation is created but rather information that is used for a redundancy-free and unique description of the real inventory change may be recorded. When transferring a handling unit, for example, a source location of the handling unit may not need to be specified or dependent InventoryChangeItems may not need to be recorded. Such data can be derived from information on a packing hierarchy of a relevant handling unit that is stored in the business object Inventory. To completely document an actual inventory change, however, the system can generate InventoryChangeItems for such implicit inventory changes. Such automatically created items can be identified by AutomaticallyGeneratedIndicator. InventoryRelevanceIndicator may be optional, indicates whether an InventoryChangeItem documents an inventory change which is not to be applied to the business object Inventory, and may be based on datatype GDT: Indicator, with a qualifier of InventoryRelevance. In SiteLogistics an unloading operation can be represented by a transfer movement from a truck into a warehouse. In some implementations, the warehouse but not the truck is managed by business object Inventory. An issuing part of the transfer movement can be documented in a confirmation but might not change business object Inventory. LogisticsDeviationReasonCode is a coded representation of a reason for a deviation, and may be based on datatype GDT: LogisticsDeviationReasonCode. InventoryLocation is a location of an inventory to be changed, and may be based on datatype BOIDT: LogisticsConfirmationInventoryChangeItemInventoryLocation. InventoryLocation/InventoryTypeCode may be optional, is a coded display of a type of an inventory which is being changed by a current LogisticsConfirmation, and may be based on datatype GDT: InventoryTypeCode. In some implementations, InventoryTypeCode is set if an InventoryChangeItem is relevant for business object Inventory (e.g., based on inventory_relevance_indicator).

InventoryLocation/LocationUUID is a universally unique identifier of a location at which an inventory is physically located, and may be based on datatype GDT: UUID. InventoryLocation/LocationID is an identifier of a location at which an inventory is physically located, and may be based on datatype GDT: LocationID. InventoryLocation/CustodianPartyUUID is a universally unique identifier of a custodian to whom an inventory is assigned, and may be based on datatype GDT: UUID. InventoryLocation/CustodianPartyInternalID may be optional, is an identifier of a custodian to whom an inventory is assigned, and may be based on datatype GDT: BusinessPartnerInternalID. InventoryLocation/LogisticsAreaUUID is a universally unique identifier of a logistics area at which an inventory is physically located, and may be based on datatype GDT: UUID. InventoryLocation/LogisticsAreaKey is a business key of a logistics area at which an inventory is physically located, and may be based on datatype KDT: LogisticsAreaKey. InventoryLocation/LogisticsAreaKey/ID is an identifier for a logistics area, and may be based on datatype GDT: LogisticsAreaID. InventoryLocation/LogisticsAreaKey/SiteID is an identifier for a site at which a logistics area is located, and may be based on datatype GDT: LocationID. InventoryLocation/InventoryManagedLocationUUID is a universally unique identifier of a location at which an inventory is managed, and may be based on datatype GDT: UUID. InventoryLocation/InventoryManagedLogisticsAreaUUID is a universally unique identifier of a logistics area at which an inventory is managed, and may be based on datatype GDT: UUID. InventoryLocation/PermanentEstablishmentUUID is a universally unique identifier of a permanent establishment that is financially responsible for an inventory being changed, and may be based on datatype GDT: UUID. Inventory changes can be recorded by specifying where an inventory is physically located (i.e. providing one of the elements InventoryLocationUUID, LogisticsAreaUUID, ResourceUUID or IdentifiedLogisticUnitUUID). Inventory may be managed at an aggregated level in the system. Such a level can be derived by the system and redundantly recorded in the elements InventoryManagedLocationUUID, InventoryManagedLogisticsAreaUUID and InventoryManagedResourceUUID. InventoryItemChange is a change of a quantity of material at a storage location, and may be based on datatype BOIDT: LogisticsConfirmationInventoryItemChange. InventoryItemChange/MainInventorySeparatingValues includes values of stock-separating attributes that are used for inventory posting, and may be based on datatype BOIDT: ObjectNodeMainInventorySeparatingValues. InventoryItemChange/MainInventorySeparatingValues/MaterialUUID is a globally unique identifier for a material, and may be based on datatype GDT: UUID. InventoryItemChange/MainInventorySeparatingValues/MaterialKey is a grouping of elements that uniquely identifies a material by product type code, product identifier type code, and/or product ID, and may be based on datatype KDT: ProductKey. InventoryItemChange/MainInventorySeparatingValues/MaterialKey/ProductTypeCode is a coded representation of a product type such as a material or service, and may be based on datatype GDT: ProductTypeCode. InventoryItemChange/MainInventorySeparatingValues/MaterialKey/ProductidentifierTypeCode is a coded representation of a product identifier type, and may be based on datatype GDT: ProductidentifierTypeCode. InventoryItemChange/MainInventorySeparatingValues/MaterialKey/ProductID is an identifier for a product, and may be based on datatype GDT: ProductID. InventoryItemChange/MainInventorySeparatingValues/OwnerPartyUUID is a globally unique identifier for an inventory owner, and may be based on datatype GDT: UUID. InventoryItemChange/MainInventorySeparatingValues/OwnerPartyID is an identifier for an inventory owner, and may be based on datatype GDT: BusinessPartnerInternalID. InventoryItemChange/MainInventorySeparatingValues/SupplyPlanningAreaUUID is a globally unique identifier for an area in planning for which a punctual availability of products is guaranteed, and may be based on datatype GDT: UUID. InventoryItemChange/MainInventorySeparatingValues/SupplyPlanningAreaID is an identifier for an area in planning for which a punctual availability of products is guaranteed, and may be based on datatype GDT: SupplyPlanningAreaID. InventoryItemChange/MainInventorySeparatingValues/InventoryRestrictedUseIndicator is an indicator that specifies whether inventory is allowed to be used by other business processes, and may be based on datatype GDT: Indicator, with a qualifier of RestrictedUse. InventoryItemChange/IdentifiedStockInventorySeparatingValues includes values of selected IdentifiedStock attributes that separate Inventory, and may be based on datatype BOIDT: ObjectNodeIdentifiedStockInventorySeparatingValues. InventoryItemChangeddentifiedStockInventorySeparatingValues/IdentifiedStockUUID is a globally unique identifier for an identified stock used to separate inventory, and may be based on datatype GDT: UUID. An identified stock is a homogenous subset of a material that is managed separately from other subsets of the same material. InventoryItemChangeddentifiedStockInventorySeparatingValues/IdentifiedStockKey indicates a grouping of elements that uniquely identifies identified stock by identified stock ID and a material key, and may be based on datatype KDT: IdentifiedStockKey. InventoryItemChangeddentifiedStockInventorySeparatingValues/IdentifiedStockKey/ID may be based on datatype GDT: IdentifiedStockID. InventoryItemChangeddentifiedStockInventorySeparatingValues/IdentifiedStockKey/MaterialKey indicates a grouping of elements that uniquely identifies a material, a sub-quantity of which can be identified by an identified stock, and may be based on datatype KDT: ProductKey. InventoryItemChangeddentifiedStockInventorySeparatingValues/IdentifiedStockKey/MaterialKey/ProductTypeCode is a coded representation of a product type such as a material or service, and may be based on datatype GDT: ProductTypeCode. InventoryItemChangeddentifiedStockInventorySeparatingValues/IdentifiedStockKey/MaterialKey/ProductidentifierTypeCode is a coded representation of a product identifier type, and may be based on datatype GDT: ProductidentifierTypeCode. InventoryItemChangeddentifiedStockInventorySeparatingValues/IdentifiedStockKey/MaterialKey/ProductID is an identifier for a product, may be based on datatype GDT: ProductID, and can be a key for an identified stock used to separate inventory. InventoryItemChange/SpecialStockSeparatingValues are values that are universally unique that identify separate special stock, and may be based on datatype GDT: SpecialStockInventorySeparatingValues. Special Stock are materials that are managed separately for reasons of logistics processes. The elements MaterialInspectionUUID and MaterialInspectionID of the GDT SpecialStockInventorySeparatingValues may or may not be used within a LogisticsConfirmation. InventoryItemChange/DefaultRecordedQuantityUUID is a universally unique identifier of a default InventoryItemChangeQuantity which is entered originally by a caller of a LogisticsConfirmation, may be based on datatype GDT: UUID, and can group those elements which are specific for the node specialization InventoryItemChange. A quantity can be provided in the subnode InventoryItemChangeQuantity.

Reference is a reference to a document item that initiated an inventory change, and may be based on datatype BOIDT: LogisticsConfirmationInventoryChangeItemReference. Reference/OutboundDeliveryItemUUID is a universally unique identifier of an outbound delivery item that causes an inventory change, and may be based on datatype GDT: UUID. Reference/OutboundDeliveryItemInventoryChangeItemUUID is a universally unique identifier of an outbound delivery item inventory change item that causes an inventory change, and may be based on datatype GDT: UUID. Reference/ConfirmedInboundDeliveryItemUUID may be based on datatype GDT: UUID. Reference/InventoryNotificationItemUUID may be based on datatype GDT: UUID. Reference/PhysicalInventoryCountOperationActivityInventoryItemUUID is a universally unique identifier of a physical inventory material count that causes an inventory change, and may be based on datatype GDT: UUID. Reference/PhysicalInventoryCountOperationActivityInventoryLogisticpackageUUID is a universally unique identifier of a physical inventory logistic package count that causes an inventory change, and may be based on datatype GDT: UUID.

The following composition relationships to subordinate nodes exist: InventoryItemChangeQuantity, with a cardinality of 1:CN; LogisticUnitChangeQuantity, with a cardinality of 1:CN; and InventoryChangeItemBusinessTransactionDocumentReference, with a cardinality of 1:CN. The following composition relationships to dependent objects exist: InventoryChangeItemAccountingCodingBlockDistribution, with a cardinality of 1:C, which is an assignment of an inventory change to a number of AccountingCodingBlocks; and InventoryChangeItemTextCollection, with a cardinality of 1:C, which is a collection of natural language texts related to an InventoryChangeItem.

The following inbound association relationships may exist: CustodianParty, from the business object Business Partner/node Business Partner, with a cardinality of C:CN, which specifies a custodian possessing the inventory that is changed and which can be used if no dedicated inventory managed locations are maintained for the custodian (e.g. such as when inventory is located at a customer); OwnerParty, from the business object Business Partner/node Business Partner, with a cardinality of C:CN, which specifies an owner for which an inventory is changed; Confirmed Inbound Delivery Item, from the business object Confirmed Inbound Delivery/node Item, with a cardinality of C:CN, which is a confirmed inbound delivery item that is used as a stock separator; Base Confirmed Inbound Delivery Item, from the business object Confirmed Inbound Delivery/node Item, with a cardinality of C:CN, which is a confirmed inbound delivery item that causes an inventory change; Leading Inventory Change Item, from the business object Goods and Activity Confirmation/node Inventory Change Item, with a cardinality of C:CN, which specifies a leading InventoryChangeItem for a given dependent item; IdentifiedStock, from the business object Identified Stock/node Identified Stock, with a cardinality of C:CN, which specifies a batch subset for which an inventory is changed; InventoryManagedLocation, from the business object Location/node Location, with a cardinality of C:CN, which specifies a location at which an inventory is managed; Location, from the business object Location/node Location, with a cardinality of C:CN, which specifies a location at which an inventory is physically located; InventoryManagedLogisticsArea, from the business object Logistics Area/node Logistics Area, with a cardinality of C:CN, which specifies a LogisticsArea at which an inventory is managed; LogisticsArea, from the business object Logistics Area/node Logistics Area, with a cardinality of C:CN, which specifies a LogisticsArea at which an inventory is physically located; Material, from the business object Material/node Material, with a cardinality of C:CN, which specifies a material for which an inventory is changed; OutboundDeliveryItem, from the business object Outbound Delivery/node Item, with a cardinality of C:CN, which is an outbound delivery item that causes an inventory change; Outbound Delivery Item Inventory Change Item, from the business object Outbound Delivery/node Item Inventory Change Item, with a cardinality of C:CN, which is an outbound delivery item inventory change item that causes an inventory change; OutboundDelivery, from the business object Outbound Delivery/node Outbound Delivery, with a cardinality of C:CN, which is an outbound delivery that is used as a stock separator; PermanentEstablishment, from the business object Permanent Establishment/node Permanent Establishment, with a cardinality of C:CN, which specifies a PermanentEstablishment for which an inventory is changed; PhysicalInventoryMaterialCount, from the business object Physical Inventory Count/node Operation Activity Inventory Item, with a cardinality of C:CN, which specifies a physical inventory material count that causes an inventory change; PhysicalInventoryLogisticpackageCount, from the business object Physical Inventory Count/node Operation Activity Inventory Logistic package, with a cardinality of C:CN, which specifies a physical inventory logistic package count that causes an inventory change; SiteLogisticsLot, from the business object Site Logistics Lot/node Site Logistics Lot, with a cardinality of C:CN, which is a site logistics lot that is used to separate stock; and SupplyPlanningArea, from the business object Supply Planning Area/node Supply Planning Area, with a cardinality of C:CN, which specifies a planning-relevant area for which an inventory is changed.

The following specialization associations for navigation may exist: Custodian Party Overview, to the business object Business Partner/node Overview, with a target cardinality of C, which specifies a custodian for which an inventory is changed; Owner Party Overview, to the business object Business Partner/node Overview, with a target cardinality of C, which specifies an owner for which an inventory is changed; Automatic Identification, to the node Automatic Identification, with a target cardinality of C, which specifies an AutomaticIdentification for an item; Parent, to the node Goods and Activity Confirmation, with a target cardinality of 1; Root, to the node Goods and Activity Confirmation, with a target cardinality of 1; Inventory And Valuation Quantity, to the node Inventory Item Change Quantity, with a target cardinality of C, Default Recorded Quantity, to the node Inventory Item Change Quantity, with target cardinality of C, which specifies a default recorded quantity of a material; Recorded Logistic Unit Quantity, to the node Logistic Unit Change Quantity, with a target cardinality of C, which specifies a quantity of a recorded LogisticUnit; Material Overview, to the business object Material/node Overview, with a target cardinality of C, which specifies a material for which an inventory is changed; Dependent Inventory Change Item, to the node Inventory Change Item, with a target cardinality of CN; and Transfer Group Inventory Change Item, to the node Inventory Change Item, with a target cardinality of CN, which may be filtered and which specifies InventoryChangeItems belonging to a same transfer group. The filter elements are defined by the inline structure APCFM_S_XFER_GROUP_ICI_AF. These elements include InventoryMovementDirectionCode, which may be optional and may be based on datatype GDT: InventoryMovementDirectionCode.

A Query By Inventory Change Date Time And Inventory Separating Values query provides a list of InventoryChangeItems that match search criteria, can be used in a context of a DataFlowVerification, and can be called by the business object Inventory, where the usage of UUIDs can be sufficient (i.e. no IDs are needed). The query elements are defined by the inline structure: APCFM_S_INV_SEP_QUERY_EL. These elements include: InventoryTypeCode, InventoryChangeDateTime, InventoryManagedLogisticsAreaUUID, InventoryManagedLocationUUID, CustodianPartyUUID, MainInventorySeparatingValues, IdentifiedStockInventorySeparatingValues, and SpecialStockInventorySeparatingValues. MainInventorySeparatingValues can include MainInventorySeparatingValues/MaterialUUID, MainInventorySeparatingValues/OwnerPartyUUID, MainInventorySeparatingValues/SupplyPlanningAreaUUID, and MainInventorySeparatingValues/InventoryRestrictedUseIndicator.

InventoryTypeCode is a coded display of a type of an inventory which is being changed by a current LogisticsConfirmation, and may be based on datatype GDT: InventoryTypeCode. In some implementations, InventoryTypeCode is set if an InventoryChangeItem is relevant for business object Inventory (e.g., based on inventory_relevance_indicator). InventoryChangeDateTime may be based on datatype GDT: GLOBAL_DateTime, with a qualifier of Change. InventoryManagedLogisticsAreaUUID may be based on datatype GDT: UUID. InventoryManagedLocationUUID is a universally unique identifier of a location at which an inventory is managed, and may be based on datatype GDT: UUID. CustodianPartyUUID may be based on datatype GDT: UUID. MainInventorySeparatingValues may be based on datatype BOIDT: ObjectNodeMainInventorySeparatingValues. MainInventorySeparatingValues/MaterialUUID is a globally unique identifier for a material, and may be based on datatype GDT: UUID. MainInventorySeparatingValues/OwnerPartyUUID is a globally unique identifier for an inventory owner, and may be based on datatype GDT: UUID. MainInventorySeparatingValues/SupplyPlanningAreaUUID is a globally unique identifier for an area in planning for which a punctual availability of products is guaranteed, and may be based on datatype GDT: UUID. MainInventorySeparatingValues/InventoryRestrictedUseIndicator is an indicator that specifies whether inventory is allowed to be used by other business processes, and may be based on datatype GDT: Indicator, with a qualifier of RestrictedUse. IdentifiedStockInventorySeparatingValues may be based on datatype BOIDT: ObjectNodeIdentifiedStockInventorySeparatingValues. IdentifiedStockInventorySeparatingValues/IdentifiedStockUUID is a globally unique identifier for an identified stock used to separate inventory, and may be based on datatype GDT: UUID. An identified stock is a homogenous subset of a material that is managed separately from other subsets of the same material. SpecialStockInventorySeparatingValues may be based on datatype GDT: SpecialStockInventorySeparatingValues.

A Query By Referenced Document query provides a list of InventoryChangeItems that include references to entered reference documents. The query elements are defined by the inline structure: APCFM_S_REF_DOC_QUERY_EL. These elements include: PhysicalInventoryCountOperationActivityInventoryItemUUID, PhysicalInventoryCountOperationActivityInventoryLogisticpackageUUID, and Reference. PhysicalInventoryCountOperationActivityInventoryItemUUID may be based on datatype GDT: UUID. PhysicalInventoryCountOperationActivityInventoryLogisticpackageUUID may be based on datatype GDT: UUID. Reference is a reference to a document item that initiated an inventory change, and may be based on datatype GDT: BusinessTransactionDocumentReference.

Inventory Item Change Quantity is a quantity of a material by which an inventory item InventoryItem is changed. The elements located directly at the node Inventory Item Change Quantity are defined by the inline structure: APCFM_S_INV_ITEM_CHG_QTY_EL. These elements include: UUID, Quantity, QuantityTypeCode, QuantityOriginCode, AccountingRelevanceIndicator, InventoryRelevanceIndicator, and AutomaticallyGeneratedIndicator. UUID may be an alternative key, is a universally unique identifier of InventoryItemChangeQuantity, and may be based on datatype GDT: UUID. Quantity is a quantity of a material by which an inventory item InventoryItem in the business object Inventory changes, and may be based on datatype GDT: Quantity. QuantityTypeCode indicates details of a quantity, and may be based on datatype GDT: QuantityTypeCode. QuantityOriginCode may be optional, indicates details of an origin of a quantity, and may be based on datatype GDT: QuantityOriginCode. AccountingRelevanceIndicator may be optional, indicates that a change of quantity is relevant for financial accounting, and may be based on datatype GDT: Indicator, with a qualifier of Relevance. InventoryRelevanceIndicator may be optional, indicates that a change of quantity is relevant for an update of the business object inventory, and may be based on datatype GDT: Indicator, with a qualifier of Relevance. AutomaticallyGeneratedIndicator may be optional, indicates whether a quantity is derived from other quantities using quantity conversion, and may be based on datatype GDT: Indicator, with a qualifier of AutomaticallyGenerated. The following specialization associations for navigation may exist: Root, to the node Goods and Activity Confirmation, with a target cardinality of 1; and Parent, to the node Inventory Change Item, with a target cardinality of 1.

Logistic Unit Change Quantity is a change of a quantity of logistic units at a storage location. The elements located directly at the node Logistic Unit Change Quantity are defined by the data type LogisticsConfirmationLogisticUnitChangeQuantityElements. These elements include: UUID, LogisticUnitUUID, LogisticUnitID, Quantity, QuantityTypeCode, AutomaticallyGeneratedIndicator, InventoryRelevanceIndicator, and LogisticUnitQuantityVariationCode. UUID may be an alternative key, is a universally unique identifier of LogisticUnitChangeQuantity, and may be based on datatype GDT: UUID. LogisticUnitUUID is a universally unique identifier of a logistic unit for which an inventory node Logisticpackage in the business object Inventory is changed, and may be based on datatype GDT: UUID. LogisticUnitID may be optional, is a status Code of a logistic unit for which an inventory is changed, and may be based on datatype GDT: LogisticUnitID. Quantity is a quantity of a logistics unit by which Inventory is changed in node LogisticUnitQuantity in the business object Inventory, and may be based on datatype GDT: INTEGER_Quantity. QuantityTypeCode indicates details of a quantity, and may be based on datatype GDT: QuantityTypeCode. AutomaticallyGeneratedIndicator may be optional, indicates whether a quantity is derived from other quantities using quantity conversion, and may be based on datatype GDT: Indicator, with a qualifier of AutomaticallyGenerated. InventoryRelevanceIndicator may be optional, indicates that a change of quantity is relevant for an update of the business object Inventory, and may be based on datatype GDT: Indicator, with a qualifier of Relevance. LogisticUnitQuantityVariationCode is a quantity variance code of a logistic unit for which an inventory is changed, and may be based on datatype GDT: LogisticUnitQuantityVariationCode. A LogisticUnit inbound association relationship may exist from the business object Logistic Unit/node Logistic Unit, with a cardinality of 1:CN, which specifies a LogisticUnit for which an inventory is changed. The following specialization associations for navigation may exist: Root, to the node Goods and Activity Confirmation; with a target cardinality of 1; and Parent, to the node Inventory Change Item, with a target cardinality of 1.

Inventory Change Item Business Transaction Document Reference is a reference to an item of another Business Transaction Document related to a LogisticsConfirmation. The elements located directly at the node Inventory Change Item Business Transaction Document Reference are defined by the inline structure: APCFM_S_INV_CHG_IT_BTD_REF_EL. These elements include: UUID and Reference. UUID may be an alternative key, is a universally unique identifier of an InventoryChangeItemBusinessTransactionDocumentReference, and may be based on datatype GDT: UUID. Reference is a reference to an item of another business transaction document, and may be based on datatype GDT: BusinessTransactionDocumentReference. The following specialization associations for navigation may exist: Root, to the node Goods and Activity Confirmation, with a target cardinality of 1; and Parent, to the node Inventory Change Item, with a target cardinality of 1.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for exchanging information about goods and activity confirmation inventory change items, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for querying about an overview of goods and activity confirmation inventory change items, the first message including a first message package hierarchically organized in memory, the first message package including:

at a first hierarchical level in the first message package, a goods and activity confirmation inventory change item overview simple by elements query sync message entity;

at the first hierarchical level in the first message package, a goods and activity confirmation inventory change item overview simple selection by elements package including, at a second hierarchical level in the first message package, a goods and activity confirmation inventory change item overview simple selection by elements entity, wherein the goods and activity confirmation inventory change item overview simple selection by elements entity includes, at a third hierarchical level in the first message package, at least one of the following: at least one selection by inventory location inventory type code, at least one selection by inventory location location universal unique identifier (UUID), at least one selection by inventory location location identifier (ID), and at least one selection by inventory location custodian party UUID; and at the first hierarchical level in the first message package, a processing conditions package including, at the second hierarchical level in the first message package, a processing conditions entity;

processing the first message based on the hierarchical organization of the first message package, where processing the first message includes unpacking the first message package based on the first message package's structure and the first message package's derivation from the common business object model, wherein the particular structure of the first message package is used at least in part to identify the purpose of the first message; and program code for sending a second message to the heterogeneous application responsive to the first message, where the second message includes a second message package derived from the common business object model to provide consistent semantics with the first message package.

2. The computer readable medium of claim 1, wherein the goods and activity confirmation inventory change item overview simple selection by elements entity further includes at least one of the following:

at least one selection by inventory location custodian party internal ID, at least one selection by inventory location logistics area UUID, at least one selection by inventory location logistics area key ID, at least one selection by inventory location logistics area key site ID, at least one selection by inventory location inventory managed location UUID, at least one selection by inventory location inventory managed logistics area UUID, at least one selection by inventory location permanent establishment UUID, at least one selection by inventory item change main inventory separating values material UUID, at least one selection by inventory item change main inventory separating values material key product identifier type code, at least one selection by inventory item change main inventory separating values material key product ID, at least one selection by inventory item change main inventory separating values owner party UUID, at least one selection by inventory item change main inventory separating values owner party ID, at least one selection by inventory item change main inventory separating values supply planning area UUID, at least one selection by inventory item change main inventory separating values supply planning area ID, at least one selection by inventory item change main inventory separating values inventory restricted use indicator, at least one selection by inventory item change identified stock inventory separating values identified stock UUID, at least one selection by inventory item change identified stock inventory separating values identified stock key ID, at least one selection by inventory item change special stock separating values outbound delivery reference ID, at least one selection by inventory item change special stock separating values outbound delivery reference UUID, at least one selection by inventory item change special stock separating values site logistics lot UUID, at least one selection by inventory item change special stock separating values site logistics lot ID, at least one selection by inventory item change default recorded quantity UUID, at least one selection by change reason code, at least one selection by ID, at least one selection by inventory movement direction code, at least one selection by inventory relevance indicator, at least one selection by inventory managed quantity, at least one selection by inventory managed quantity type code, at least one selection by default recorded quantity, at least one selection by default recorded quantity type code, at least one selection by site UUID, at least one selection by transfer group ID, at least one selection by confirmation creation date time, at least one selection by confirmation business transaction date time, at least one selection by confirmation cancellation status code, at least one selection by confirmation cancellation document indicator, at least one selection by confirmation cancelled confirmation UUID, at least one selection by confirmation company ID, at least one selection by confirmation company UUID, at least one selection by confirmation ID, and at least one selection by confirmation UUID.

3. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for querying about an overview of goods and activity confirmation inventory change items, the instructions using a request;

a first memory storing a user interface controller executable by the at least one processor for processing the request and involving a message including a message package derived from a common business object model, where the common business object model includes business objects having relationships that enable derivation of message-based service interfaces and message packages, the message package hierarchically organized, the hierarchical organization of the first message package including:

at a first hierarchical level in the first message package, a goods and activity confirmation inventory change item overview simple by elements query sync message entity;

at the first hierarchical level in the first message package, a goods and activity confirmation inventory change item overview simple selection by elements package including, at a second hierarchical level in the first message package, a goods and activity confirmation inventory change item overview simple selection by elements entity, wherein the goods and activity confirmation inventory change item overview simple selection by elements entity includes, at a third hierarchical level in the first message package, at least one of the following: at least one selection by inventory location inventory type code, at least one selection by inventory location location universal unique identifier (UUID), at least one selection by inventory location location identifier (ID), and at least one selection by inventory location custodian party UUID; and at the first hierarchical level in the first message package, a processing conditions package including, at the second hierarchical level in the first message package, a processing conditions entity; and a second memory, remote from the graphical user interface, storing a plurality of service interfaces executable by the at least one processor and derived from the common business object model to provide consistent semantics with messages derived from the common business object model, where one of the service interfaces is operable to process the message via the service interface based on the hierarchical organization of the message package, where processing the message includes unpacking the first message package based on the message package's structure and the message package's derivation from the common business object model, wherein the particular structure of the message package is used at least in part to identify the purpose of the message.

4. The distributed system of claim 3, wherein the first memory is remote from the graphical user interface.

5. The distributed system of claim 3, wherein the first memory is remote from the second memory.

* * * * *